US007677971B2

(12) United States Patent
Baerlocher et al.

(10) Patent No.: US 7,677,971 B2
(45) Date of Patent: Mar. 16, 2010

(54) GAMING SYSTEM AND METHOD FOR ENABLING A PLAYER TO SELECT PROGRESSIVE AWARDS TO TRY FOR AND CHANCES OF WINNING PROGRESSIVE AWARDS

(75) Inventors: Anthony J. Baerlocher, Reno, NV (US); Alexander Casey Naglestad Cohen, Reno, NV (US); Tonja Marie Ferry, Reno, NV (US); Adam Koby, Reno, NV (US)

(73) Assignee: IGT, Reno, NV (US)

( * ) Notice: Subject to any disclaimer, the term of this patent is extended or adjusted under 35 U.S.C. 154(b) by 3 days.

(21) Appl. No.: 11/759,035

(22) Filed: Jun. 6, 2007

(65) Prior Publication Data

US 2007/0298874 A1 Dec. 27, 2007

Related U.S. Application Data

(60) Provisional application No. 60/826,872, filed on Sep. 25, 2006, provisional application No. 60/804,399, filed on Jun. 9, 2006.

(51) Int. Cl.
*A63F 9/24* (2006.01)
*A63F 13/00* (2006.01)
*G06F 17/00* (2006.01)
*G06F 19/00* (2006.01)

(52) U.S. Cl. ..................... 463/27; 273/143 R; 273/292; 463/20; 463/21; 463/25

(58) Field of Classification Search .................... 463/27
See application file for complete search history.

(56) References Cited

U.S. PATENT DOCUMENTS 4,072,930 A 2/1978 Lucero et al.
4,679,143 A 7/1987 Hagiwara
4,805,907 A 2/1989 Hagiwara
4,837,728 A 6/1989 Barrie et al.
4,838,552 A 6/1989 Hagiwara
4,842,278 A 6/1989 Markowicz
4,844,464 A 7/1989 Berge (Continued)

FOREIGN PATENT DOCUMENTS

AU 524709 9/1982

(Continued)

OTHER PUBLICATIONS

Aristrocrat Brochure, written by Aristocrat Gaming, published in 2004.

(Continued)

*Primary Examiner*—John M. Hotaling, II
*Assistant Examiner*—Paul A. D'Agostino
(74) *Attorney, Agent, or Firm*—K&L Gates LLP

(57) ABSTRACT

The present disclosure provides a gaming device, a gaming system and a method for operating a gaming device or gaming system with a plurality of progressive awards. The gaming device enables a player to select one of the progressive awards. The player's selection of which progressive award to play for is based, at least in part, on a relative probability of the player winning the selected progressive award compared to the relative probabilities of the player winning the non-selected progressive awards. After selecting which award to play for, the gaming device either provides the selected progressive award to the player or modifies the relative probability that the player will win the selected progressive award with one or more of any award selections remaining. Such a configuration enables the player to strategically select which award to play for and the order that the player will play for the awards.

52 Claims, 65 Drawing Sheets

U.S. PATENT DOCUMENTS

| | | | | | |
|---|---|---|---|---|---|
| 4,856,787 | A | | 8/1989 | Itkis | |
| 4,871,171 | A | | 10/1989 | Rivero | |
| 5,048,833 | A | | 9/1991 | Lamle | |
| 5,092,598 | A | | 3/1992 | Kamille | |
| 5,116,055 | A | | 5/1992 | Tracy | |
| 5,123,649 | A | | 6/1992 | Tiberio | |
| 5,249,800 | A | * | 10/1993 | Hilgendorf et al. | 463/27 |
| 5,275,400 | A | | 1/1994 | Weingardt | |
| 5,280,909 | A | | 1/1994 | Tracy | |
| 5,286,023 | A | * | 2/1994 | Wood | 463/20 |
| 5,292,127 | A | | 3/1994 | Kelly et al. | |
| 5,342,049 | A | | 8/1994 | Wichinsky et al. | |
| 5,344,144 | A | * | 9/1994 | Canon | 463/27 |
| 5,417,430 | A | | 5/1995 | Breeding | |
| 5,472,194 | A | | 12/1995 | Breeding et al. | |
| 5,476,259 | A | | 12/1995 | Weingardt | |
| 5,489,101 | A | | 2/1996 | Moody | |
| 5,511,781 | A | | 4/1996 | Wood | |
| 5,531,441 | A | | 7/1996 | Dabrowski et al. | |
| 5,536,016 | A | | 7/1996 | Thompson | |
| 5,544,893 | A | | 8/1996 | Jones et al. | |
| 5,547,192 | A | | 8/1996 | Ishibashi | |
| 5,564,700 | A | * | 10/1996 | Celona | 463/27 |
| 5,584,485 | A | | 12/1996 | Jone et al. | |
| 5,584,763 | A | | 12/1996 | Kelly et al. | |
| 5,611,730 | A | | 3/1997 | Weiss | |
| 5,626,341 | A | | 5/1997 | Jones | |
| 5,645,486 | A | | 7/1997 | Nagao et al. | |
| 5,655,961 | A | | 8/1997 | Acres et al. | |
| 5,662,332 | A | | 9/1997 | Garfield | |
| 5,702,304 | A | | 12/1997 | Acres et al. | |
| 5,741,183 | A | | 4/1998 | Acres et al. | |
| 5,743,523 | A | | 4/1998 | Kelly et al. | |
| 5,743,800 | A | | 4/1998 | Huard et al. | |
| 5,752,882 | A | | 5/1998 | Acres et al. | |
| 5,761,647 | A | | 6/1998 | Boushy | |
| 5,762,552 | A | | 6/1998 | Vuong | |
| 5,766,076 | A | | 6/1998 | Pease et al. | |
| 5,779,545 | A | | 7/1998 | Berg et al. | |
| 5,779,547 | A | | 7/1998 | SoRelle et al. | |
| 5,816,918 | A | | 10/1998 | Kelly et al. | |
| 5,820,459 | A | | 10/1998 | Acres et al. | |
| 5,833,537 | A | | 11/1998 | Barrie | |
| 5,836,817 | A | | 11/1998 | Acres et al. | |
| 5,851,011 | A | | 12/1998 | Lott | |
| 5,851,149 | A | | 12/1998 | Xidos et al. | |
| 5,855,514 | A | | 1/1999 | Kamille | |
| 5,855,515 | A | | 1/1999 | Pease et al. | |
| 5,876,284 | A | | 3/1999 | Acres et al. | |
| 5,882,259 | A | * | 3/1999 | Holmes et al. | 463/13 |
| 5,885,158 | A | | 3/1999 | Torango et al. | |
| 5,941,773 | A | | 8/1999 | Harlick | |
| 5,944,606 | A | | 8/1999 | Gerow | |
| 5,947,820 | A | | 9/1999 | Morro et al. | |
| 5,951,011 | A | | 9/1999 | Potter et al. | |
| 5,967,894 | A | | 10/1999 | Kinoshita et al. | |
| 5,976,015 | A | | 11/1999 | Seelig et al. | |
| 5,980,384 | A | | 11/1999 | Barrie | |
| 5,984,779 | A | | 11/1999 | Bridgeman et al. | |
| 5,989,121 | A | | 11/1999 | Sakamoto | |
| 5,993,316 | A | | 11/1999 | Coyle et al. | |
| 5,997,400 | A | | 12/1999 | Seelig et al. | |
| 6,001,016 | A | | 12/1999 | Walker et al. | |
| 6,004,207 | A | | 12/1999 | Wilson, Jr. et al. | |
| 6,007,427 | A | | 12/1999 | Wiener | |
| 6,012,982 | A | | 1/2000 | Piechowiak et al. | |
| 6,019,369 | A | | 2/2000 | Nakagawa et al. | |
| 6,033,307 | A | | 3/2000 | Vancura | |
| 6,039,648 | A | | 3/2000 | Guinn et al. | |
| 6,056,642 | A | | 5/2000 | Bennett | |
| 6,062,980 | A | | 5/2000 | Luciano | |
| 6,062,981 | A | | 5/2000 | Luciano, Jr. | |
| 6,068,553 | A | | 5/2000 | Parker | |
| 6,077,162 | A | | 6/2000 | Weiss | |
| 6,080,062 | A | | 6/2000 | Olson | |
| 6,089,977 | A | | 7/2000 | Bennett | |
| 6,089,980 | A | | 7/2000 | Gauselmann | |
| 6,102,400 | A | | 8/2000 | Scott et al. | |
| 6,110,041 | A | | 8/2000 | Walker et al. | |
| 6,110,043 | A | | 8/2000 | Olsen | |
| 6,126,541 | A | | 10/2000 | Fuchs | |
| 6,126,542 | A | | 10/2000 | Fier | |
| 6,142,872 | A | | 11/2000 | Walker et al. | |
| 6,142,875 | A | | 11/2000 | Kodachi et al. | |
| 6,146,273 | A | | 11/2000 | Olsen | |
| 6,152,823 | A | | 11/2000 | Lacoste et al. | |
| 6,155,925 | A | | 12/2000 | Giobbi et al. | |
| 6,159,095 | A | | 12/2000 | Frohm et al. | |
| 6,159,096 | A | | 12/2000 | Yoseloff | |
| 6,159,097 | A | | 12/2000 | Gura | |
| 6,162,122 | A | | 12/2000 | Acres et al. | |
| 6,168,520 | B1 | | 1/2001 | Baerlocher et al. | |
| 6,174,233 | B1 | | 1/2001 | Sunaga et al. | |
| 6,174,235 | B1 | | 1/2001 | Walker et al. | |
| 6,179,290 | B1 | * | 1/2001 | Maahs | 273/292 |
| 6,179,711 | B1 | * | 1/2001 | Yoseloff | 463/25 |
| 6,183,366 | B1 | | 2/2001 | Goldberg et al. | |
| 6,193,606 | B1 | | 2/2001 | Walker et al. | |
| 6,203,010 | B1 | | 3/2001 | Jorasch et al. | |
| 6,203,429 | B1 | | 3/2001 | Demar et al. | |
| 6,203,430 | B1 | | 3/2001 | Walker et al. | |
| 6,206,374 | B1 | | 3/2001 | Jones | |
| 6,210,275 | B1 | | 4/2001 | Olsen | |
| 6,210,277 | B1 | | 4/2001 | Stefan | |
| 6,217,448 | B1 | | 4/2001 | Olsen | |
| 6,220,961 | B1 | | 4/2001 | Keane et al. | |
| 6,224,482 | B1 | | 5/2001 | Bennett | |
| 6,224,484 | B1 | | 5/2001 | Okuda et al. | |
| 6,231,445 | B1 | | 5/2001 | Acres | |
| 6,234,897 | B1 | | 5/2001 | Frohm et al. | |
| 6,238,287 | B1 | | 5/2001 | Komori et al. | |
| 6,238,288 | B1 | | 5/2001 | Walker et al. | |
| 6,241,608 | B1 | | 6/2001 | Torango | |
| 6,244,958 | B1 | | 6/2001 | Acres | |
| 6,254,483 | B1 | | 7/2001 | Acres | |
| 6,257,981 | B1 | | 7/2001 | Acres et al. | |
| 6,270,409 | B1 | | 8/2001 | Shuster | |
| 6,287,202 | B1 | | 9/2001 | Pascal et al. | |
| 6,293,866 | B1 | | 9/2001 | Walker et al. | |
| 6,299,165 | B1 | | 10/2001 | Nagano | |
| 6,309,298 | B1 | | 10/2001 | Gerow | |
| 6,309,299 | B1 | | 10/2001 | Weiss | |
| 6,312,330 | B1 | | 11/2001 | Jones et al. | |
| 6,315,660 | B1 | | 11/2001 | DeMar et al. | |
| 6,315,662 | B1 | | 11/2001 | Jorasch et al. | |
| 6,315,664 | B1 | | 11/2001 | Baerlocher et al. | |
| 6,319,125 | B1 | | 11/2001 | Acres | |
| 6,322,078 | B1 | | 11/2001 | Adams | |
| 6,322,309 | B1 | | 11/2001 | Thomas et al. | |
| 6,328,649 | B1 | | 12/2001 | Randall et al. | |
| 6,336,857 | B1 | | 1/2002 | McBride | |
| 6,343,989 | B1 | | 2/2002 | Wood et al. | |
| 6,358,149 | B1 | | 3/2002 | Schneider et al. | |
| 6,361,441 | B1 | | 3/2002 | Walker et al. | |
| 6,371,852 | B1 | | 4/2002 | Acres | |
| 6,375,567 | B1 | | 4/2002 | Acres | |
| 6,375,569 | B1 | | 4/2002 | Acres | |
| 6,386,977 | B1 | | 5/2002 | Hole | |
| 6,398,218 | B1 | | 6/2002 | Vancura | |
| 6,406,369 | B1 | | 6/2002 | Baerlocher et al. | |
| 6,409,602 | B1 | | 6/2002 | Wiltshire et al. | |
| 6,416,408 | B2 | | 7/2002 | Tracy et al. | |
| 6,416,409 | B1 | | 7/2002 | Jordan | |
| 6,419,583 | B1 | | 7/2002 | Crumby et al. | |

| | | | |
|---|---|---|---|
| 6,431,983 | B2 | 8/2002 | Acres |
| 6,435,511 | B1 | 8/2002 | Vancura et al. |
| 6,435,968 | B1 | 8/2002 | Torango |
| 6,439,995 | B1 | 8/2002 | Hughs-Baird et al. |
| 6,443,837 | B1 | 9/2002 | Jaffe et al. |
| 6,454,651 | B1 | 9/2002 | Yoseloff |
| 6,464,582 | B1 | 10/2002 | Baerlocher et al. |
| 6,471,591 | B1 | 10/2002 | Crumby |
| 6,506,118 | B1 | 1/2003 | Baerlocher et al. |
| 6,508,707 | B2 | 1/2003 | DeMar et al. |
| 6,511,375 | B1 | 1/2003 | Kaminkow |
| 6,511,376 | B2 | 1/2003 | Walker et al. |
| 6,514,141 | B1 | 2/2003 | Kaminkow et al. |
| 6,533,658 | B1 | 3/2003 | Walker et al. |
| 6,533,664 | B1 | 3/2003 | Crumby |
| 6,546,374 | B1 | 4/2003 | Esposito et al. |
| 6,554,283 | B2 | 4/2003 | Vancura et al. |
| 6,565,434 | B1 | 5/2003 | Acres |
| 6,565,436 | B1 | 5/2003 | Baerlocher |
| 6,569,015 | B1 | 5/2003 | Baerlocher et al. |
| 6,575,830 | B2 | 6/2003 | Baerlocher et al. |
| 6,575,832 | B1 | 6/2003 | Manfredi et al. |
| 6,589,115 | B2 | 7/2003 | Walker et al. |
| 6,592,460 | B2 | 7/2003 | Torango |
| 6,595,854 | B2 | 7/2003 | Hughs-Baird et al. |
| 6,599,185 | B1 | 7/2003 | Kaminkow et al. |
| 6,599,192 | B1 | 7/2003 | Baerlocher et al. |
| 6,599,193 | B2 | 7/2003 | Baerlocher et al. |
| 6,607,437 | B2 | 8/2003 | Casey et al. |
| 6,609,971 | B2 | 8/2003 | Vancura |
| 6,609,973 | B1 | 8/2003 | Weiss |
| 6,616,531 | B1 | 9/2003 | Mullins |
| 6,620,046 | B2 | 9/2003 | Rowe |
| 6,626,758 | B1 | 9/2003 | Parham et al. |
| 6,656,046 | B1 * | 12/2003 | Yoseloff et al. ............... 463/20 |
| 6,656,047 | B1 | 12/2003 | Tarantino et al. |
| 6,656,048 | B2 | 12/2003 | Olsen |
| 6,656,052 | B2 | 12/2003 | Abramopoulos et al. |
| 6,659,864 | B2 | 12/2003 | McGahn et al. |
| 6,666,765 | B2 | 12/2003 | Vancura |
| 6,676,516 | B2 | 1/2004 | Baerlocher et al. |
| 6,682,419 | B2 | 1/2004 | Webb et al. |
| 6,682,420 | B2 | 1/2004 | Webb et al. |
| 6,688,977 | B1 | 2/2004 | Baerlocher et al. |
| 6,692,355 | B2 | 2/2004 | Baerlocher et al. |
| 6,712,695 | B2 | 3/2004 | Mothwurf et al. |
| 6,712,697 | B2 | 3/2004 | Acres |
| 6,726,563 | B1 | 4/2004 | Baerlocher et al. |
| 6,746,328 | B2 | 6/2004 | Cannon et al. |
| 6,749,510 | B2 | 6/2004 | Giobbi |
| 6,758,750 | B2 | 7/2004 | Baerlocher et al. |
| 6,776,714 | B2 | 8/2004 | Ungaro et al. |
| 6,776,715 | B2 | 8/2004 | Price |
| 6,780,110 | B2 | 8/2004 | Baerlocher et al. |
| 6,783,457 | B2 | 8/2004 | Hughs-Baird et al. |
| 6,790,141 | B2 | 9/2004 | Muir |
| 6,800,030 | B2 | 10/2004 | Acres |
| 6,805,352 | B2 | 10/2004 | Hunter |
| 6,811,483 | B1 | 11/2004 | Webb et al. |
| 6,814,664 | B2 | 11/2004 | Baerlocher et al. |
| 6,832,958 | B2 | 12/2004 | Acres et al. |
| 6,837,788 | B2 | 1/2005 | Cannon |
| 6,852,030 | B2 | 2/2005 | Baerlocher et al. |
| 6,869,361 | B2 | 3/2005 | Sharpless et al. |
| 6,884,168 | B2 | 4/2005 | Wood et al. |
| 6,887,154 | B1 | 5/2005 | Luciano, Jr. et al. |
| 6,899,625 | B2 | 5/2005 | Luciano, Jr. et al. |
| 6,910,964 | B2 | 6/2005 | Acres |
| 6,913,532 | B2 | 7/2005 | Baerlocher et al. |
| 6,918,832 | B2 | 7/2005 | Baerlocher et al. |
| 6,918,834 | B2 | 7/2005 | Vancura |
| 6,935,958 | B2 | 8/2005 | Nelson |
| 6,939,224 | B2 | 9/2005 | Palmer et al. |

| | | | |
|---|---|---|---|
| 6,939,234 | B2 | 9/2005 | Beatty |
| 6,955,600 | B2 | 10/2005 | Glavich et al. |
| 6,966,834 | B1 | 11/2005 | Johnson |
| 7,004,835 | B2 * | 2/2006 | Baerlocher ................... 463/16 |
| 7,008,319 | B2 * | 3/2006 | Montgomery et al. ......... 463/21 |
| 7,029,395 | B1 | 4/2006 | Baerlocher |
| 7,112,137 | B2 | 9/2006 | Baerlocher et al. |
| 7,217,187 | B2 | 5/2007 | Vancura |
| 7,357,716 | B2 * | 4/2008 | Marks et al. .................. 463/27 |
| 7,481,430 | B1 * | 1/2009 | Jackson et al. ........... 273/138.1 |
| 2001/0049303 | A1 | 12/2001 | Found |
| 2002/0002073 | A1 * | 1/2002 | Montgomery et al. ......... 463/13 |
| 2002/0045475 | A1 | 4/2002 | Glavich et al. |
| 2002/0071557 | A1 | 6/2002 | Nguyen |
| 2002/0094855 | A1 | 7/2002 | Berman |
| 2002/0116615 | A1 | 8/2002 | Nguyen et al. |
| 2002/0138594 | A1 | 9/2002 | Rowe |
| 2002/0142822 | A1 | 10/2002 | Baerlocher et al. |
| 2002/0142829 | A1 | 10/2002 | Inoue |
| 2002/0151354 | A1 | 10/2002 | Boesen et al. |
| 2002/0152120 | A1 | 10/2002 | Howington |
| 2002/0165023 | A1 | 11/2002 | Brosnan et al. |
| 2002/0187834 | A1 | 12/2002 | Rowe et al. |
| 2002/0198036 | A1 | 12/2002 | Baerlocher et al. |
| 2003/0027625 | A1 * | 2/2003 | Rowe .......................... 463/20 |
| 2003/0027630 | A1 | 2/2003 | Kelly et al. |
| 2003/0040360 | A1 | 2/2003 | Kaminkow |
| 2003/0045350 | A1 | 3/2003 | Baerlocher et al. |
| 2003/0050111 | A1 | 3/2003 | Saffari |
| 2003/0054878 | A1 | 3/2003 | Benoy et al. |
| 2003/0060254 | A1 | 3/2003 | Cuddy et al. |
| 2003/0060266 | A1 | 3/2003 | Baerlocher |
| 2003/0060269 | A1 | 3/2003 | Paulsen et al. |
| 2003/0060272 | A1 | 3/2003 | Glavich et al. |
| 2003/0060279 | A1 | 3/2003 | Torango |
| 2003/0064772 | A1 | 4/2003 | Tempest et al. |
| 2003/0064773 | A1 | 4/2003 | Baerlocher et al. |
| 2003/0064785 | A1 | 4/2003 | Stone et al. |
| 2003/0069056 | A1 | 4/2003 | Cormack et al. |
| 2003/0069064 | A1 | 4/2003 | Ainsworth |
| 2003/0073482 | A1 | 4/2003 | Baerlocher et al. |
| 2003/0083943 | A1 | 5/2003 | Adams et al. |
| 2003/0092484 | A1 | 5/2003 | Schneider et al. |
| 2003/0119583 | A1 | 6/2003 | Kaminkow et al. |
| 2003/0162584 | A1 | 8/2003 | Hughs-Baird et al. |
| 2003/0162585 | A1 | 8/2003 | Bigelow et al. |
| 2003/0181231 | A1 | 9/2003 | Vancura et al. |
| 2003/0199321 | A1 | 10/2003 | Williams |
| 2003/0207710 | A1 | 11/2003 | Rodgers et al. |
| 2003/0211879 | A1 | 11/2003 | Englman |
| 2003/0211884 | A1 | 11/2003 | Gauselmann |
| 2003/0216166 | A1 | 11/2003 | Baerlocher et al. |
| 2003/0222402 | A1 | 12/2003 | Olive |
| 2003/0228904 | A1 | 12/2003 | Acres et al. |
| 2003/0232647 | A1 | 12/2003 | Moser |
| 2003/0236116 | A1 | 12/2003 | Marks et al. |
| 2004/0009811 | A1 | 1/2004 | Torango |
| 2004/0029631 | A1 | 2/2004 | Duhamel |
| 2004/0048649 | A1 | 3/2004 | Peterson et al. |
| 2004/0048652 | A1 | 3/2004 | Ching et al. |
| 2004/0053672 | A1 | 3/2004 | Baerlocher |
| 2004/0053683 | A1 | 3/2004 | Hartl et al. |
| 2004/0072615 | A1 | 4/2004 | Maya et al. |
| 2004/0087368 | A1 | 5/2004 | Gauselmann |
| 2004/0137982 | A1 | 7/2004 | Cuddy et al. |
| 2004/0147306 | A1 | 7/2004 | Randall et al. |
| 2004/0152509 | A1 | 8/2004 | Hornik et al. |
| 2004/0171416 | A1 | 9/2004 | Baerlocher et al. |
| 2004/0171420 | A1 | 9/2004 | Baerlocher et al. |
| 2004/0235552 | A1 | 11/2004 | Gauselmann |
| 2004/0242297 | A1 | 12/2004 | Walker |
| 2005/0026694 | A1 | 2/2005 | Kelly et al. |
| 2005/0032573 | A1 | 2/2005 | Acres et al. |

| | | | |
|---|---|---|---|
| 2005/0054429 A1 | 3/2005 | Baerlocher et al. | |
| 2005/0070356 A1 | 3/2005 | Mothwurf | |
| 2005/0075163 A1 | 4/2005 | Cuddy et al. | |
| 2005/0079908 A1 | 4/2005 | Pacey | |
| 2005/0079911 A1 | 4/2005 | Nakatsu | |
| 2005/0101374 A1 | 5/2005 | Acres | |
| 2005/0101375 A1 | 5/2005 | Webb et al. | |
| 2005/0101384 A1 | 5/2005 | Parham | |
| 2005/0119047 A1 | 6/2005 | Olive | |
| 2005/0130729 A1 | 6/2005 | Baerlocher et al. | |
| 2005/0143168 A1 | 6/2005 | Torango | |
| 2005/0159211 A1 | 7/2005 | Englman | |
| 2005/0176488 A1 | 8/2005 | Olive | |
| 2005/0176498 A1 | 8/2005 | Nguyen | |
| 2005/0192083 A1 | 9/2005 | Iwamoto | |
| 2005/0192099 A1 | 9/2005 | Nguyen et al. | |
| 2005/0197180 A1 | 9/2005 | Kaminkow et al. | |
| 2005/0209004 A1 | 9/2005 | Torango | |
| 2005/0227754 A1 | 10/2005 | Kaminkow et al. | |
| 2005/0239542 A1 | 10/2005 | Olsen | |
| 2005/0267610 A1 | 12/2005 | Shinoda | |
| 2005/0282626 A1 | 12/2005 | Manfredi et al. | |
| 2006/0003829 A1 | 1/2006 | Thomas | |
| 2006/0009270 A1 | 1/2006 | Kobayashi et al. | |
| 2006/0025210 A1 | 2/2006 | Johnson | |
| 2006/0030403 A1 | 2/2006 | Lafkey et al. | |
| 2006/0035694 A1 | 2/2006 | Fuller | |
| 2006/0035706 A1 | 2/2006 | Thomas et al. | |
| 2006/0040732 A1 | 2/2006 | Baerlocher et al. | |
| 2006/0040736 A1 | 2/2006 | Baerlocher et al. | |
| 2006/0052159 A1 | 3/2006 | Cahill et al. | |
| 2006/0052161 A1 | 3/2006 | Soukup et al. | |
| 2006/0052162 A1 | 3/2006 | Soukup et al. | |
| 2006/0073889 A1 | 4/2006 | Edidin et al. | |
| 2006/0073897 A1 | 4/2006 | Englman et al. | |
| 2006/0178203 A1 | 8/2006 | Hughes et al. | |
| 2006/0183535 A1 | 8/2006 | Marks et al. | |
| 2007/0060271 A1 | 3/2007 | Cregan et al. | |
| 2007/0060319 A1 | 3/2007 | Block et al. | |
| 2007/0060321 A1* | 3/2007 | Vasquez et al. | 463/27 |
| 2007/0129139 A1 | 6/2007 | Nguyen et al. | |
| 2007/0298873 A1 | 12/2007 | Nguyen et al. | |

FOREIGN PATENT DOCUMENTS

| | | | |
|---|---|---|---|
| AU | 555905 | | 10/1986 |
| AU | 567001 | | 11/1987 |
| AU | 585160 | | 6/1989 |
| AU | 589158 | | 10/1989 |
| AU | 593059 | | 2/1990 |
| AU | 630112 | | 3/1990 |
| AU | 628330 | | 9/1992 |
| AU | 633469 | | 1/1993 |
| AU | 649009 | | 5/1994 |
| AU | 655801 | | 1/1995 |
| AU | 1996 70247 | | 4/1997 |
| AU | 680920 | | 8/1997 |
| AU | 710015 | | 9/1997 |
| AU | 733599 | | 10/1997 |
| AU | 722969 | | 6/1998 |
| AU | 1998 63553 | A | 10/1998 |
| AU | 1998 84162 | A1 | 3/1999 |
| AU | 707687 | | 7/1999 |
| AU | 1999 17318 | A1 | 9/1999 |
| AU | 709724 | | 9/1999 |
| AU | 711501 | | 10/1999 |
| AU | 714299 | | 12/1999 |
| AU | 716299 | | 2/2000 |
| AU | 721968 | | 7/2000 |
| AU | 722107 | | 7/2000 |
| AU | 728788 | | 1/2001 |
| AU | 2001 1000032 | | 11/2001 |
| AU | 2001 1000033 | | 11/2001 |
| AU | 748263 | | 5/2002 |
| AU | 749222 | | 6/2002 |
| AU | 754689 | | 11/2002 |
| AU | 758306 | | 3/2003 |
| DE | 3415114 | | 10/1985 |
| DE | 8710757 | | 11/1987 |
| DE | 3638100 | | 11/1988 |
| DE | 3915655 | | 11/1990 |
| DE | 3917683 | | 12/1990 |
| DE | 4200254 | | 8/1993 |
| DE | 4301855 | | 7/1994 |
| DE | 19600787 | C2 | 5/1997 |
| DE | 19613455 | C2 | 8/1997 |
| DE | 19936196 | A1 | 1/2001 |
| EP | 0 342 797 | | 11/1989 |
| EP | 0 444 932 | | 2/1991 |
| EP | 0 449 433 | A2 | 10/1991 |
| EP | 0 798 676 | A1 | 10/1997 |
| EP | 0 874 337 | A1 | 10/1998 |
| EP | 0 926 645 | A2 | 6/1999 |
| EP | 0 944 060 | A2 | 9/1999 |
| EP | 0 945 837 | A2 | 9/1999 |
| EP | 0 981 119 | A2 | 2/2000 |
| EP | 0 984 408 | A2 | 3/2000 |
| EP | 0 984 409 | A2 | 3/2000 |
| EP | 1 003 138 | A2 | 5/2000 |
| EP | 1 467 329 | A2 | 10/2004 |
| EP | 1 498 860 | A1 | 1/2005 |
| EP | 1 513 114 | A2 | 3/2005 |
| EP | 1 528 516 | A2 | 5/2005 |
| EP | 1 528 517 | A2 | 5/2005 |
| EP | 1 693 090 | | 8/2006 |
| GB | 912 685 | | 12/1962 |
| GB | 2 083 936 | A | 3/1982 |
| GB | 2 096 376 | A | 10/1982 |
| GB | 2 097 160 | A | 10/1982 |
| GB | 2 100 905 | A | 1/1983 |
| GB | 2 117 155 | A | 10/1983 |
| GB | 2 117 952 | A | 10/1983 |
| GB | 2 118 445 | | 11/1983 |
| GB | 2 144 644 | A | 3/1984 |
| GB | 2 137 392 | A | 10/1984 |
| GB | 2 139 390 | | 11/1984 |
| GB | 2 142 457 | A | 1/1985 |
| GB | 2 147 773 | | 5/1985 |
| GB | 2 148 135 | | 5/1985 |
| GB | 1 151 054 | A | 7/1985 |
| GB | 2 153 572 | A | 8/1985 |
| GB | 2 161 008 | A | 1/1986 |
| GB | 2 161 009 | A | 1/1986 |
| GB | 2 170 636 | A | 8/1986 |
| GB | 2 180 682 | A | 4/1987 |
| GB | 2 181 589 | A | 4/1987 |
| GB | 2 183 882 | A | 6/1987 |
| GB | 2 191 030 | A | 12/1987 |
| GB | 2 201 821 | A | 9/1988 |
| GB | 2 222 712 | A | 3/1990 |
| GB | 2 226 436 | A | 6/1990 |
| GB | 2 226 907 | A | 7/1990 |
| GB | 2 231 189 | | 11/1990 |
| GB | 2 282 690 | | 4/1995 |
| GB | 2 322 217 | A | 8/1998 |
| GB | 2 333 880 | A | 9/1998 |
| GB | 2 328 311 | | 2/1999 |
| GB | 2 353 128 | A | 2/2001 |
| GB | 2 383 668 | A | 11/2001 |
| GB | 2 387 703 | | 10/2003 |
| JP | 7148307 | | 6/1995 |
| JP | 2002-320703 | | 11/2002 |
| WO | WO 94 12256 | | 6/1994 |
| WO | WO 95 22811 | | 8/1995 |
| WO | WO 95 30944 | | 11/1995 |
| WO | WO 97 12338 | | 4/1997 |

| | | |
|---|---|---|
| WO | WO 97 27568 | 7/1997 |
| WO | WO 97 32285 | 9/1997 |
| WO | WO 98 35309 | 8/1998 |
| WO | WO 98 47115 | 10/1998 |
| WO | WO 98 51384 | 11/1998 |
| WO | WO 99 03078 | 1/1999 |
| WO | WO 99 10849 | 3/1999 |
| WO | WO 00 12186 | 3/2000 |
| WO | WO 00 32286 | 6/2000 |
| WO | WO 00 66235 | 11/2000 |
| WO | WO 00 76606 | 12/2000 |
| WO | WO 01 10523 | 2/2001 |
| WO | WO 01 15055 | 3/2001 |
| WO | WO 01 15790 | 3/2001 |
| WO | WO 01 26019 | 4/2001 |
| WO | WO 03 030066 | 4/2003 |
| WO | WO 03 075235 | 9/2003 |
| WO | WO 2004 035161 | 4/2004 |
| WO | WO 2004 066061 | 8/2004 |
| WO | WO 2005 27058 | 3/2005 |
| WO | WO 2005 076193 | 8/2005 |
| WO | WO 2005 081623 | 9/2005 |
| WO | WO 2005 083599 | 9/2005 |
| WO | WO 2005 099425 | 10/2005 |
| WO | WO 2005 099845 | 10/2005 |
| WO | WO 2005 106702 | 11/2005 |
| WO | WO 2005 113093 | 12/2005 |
| WO | WO 2006 014770 | 2/2006 |
| WO | WO 2006 014883 | 2/2006 |
| WO | WO 2006 014990 | 2/2006 |
| WO | WO 2006 039366 | 4/2006 |

OTHER PUBLICATIONS

Atronic Systems Progressive Products at G2E, published by Atronic in 2004, printed from ForRelease.com.
Austin Powers in Goldmember™ Advertisement written by IGT, published in 2003.
Big Shot!™ Advertisement published by Aristocrat Technologies, Inc., published in 2002.
Big Top Keno Advertisement published by Aristocrat Technologies, Inc., published in 2000.
Cartoon Jackpots description, printed from www.ballygaming.com/home.asp, on Feb. 4, 2005.
Cash Express Advertisements, written by Aristocrat, published in 2002.
Cashing In Article, written by Strictly Slots, published in Aug. 2006.
Castle Risk Rules, available on or before Jun. 9, 2006, printed from www.gamingcorner.nl/rules/boardgames/castle%20risk_uk.pdf, on Jan. 17, 2008.
Dynasty Warriors 5 Xtreme Legends description, available on or before Jun. 9, 2006, printed from www.koei.com/dw5xl/main.htm, on Jan. 17, 2008.
Fast Buck Systems Manual, written by International Game Technology, available to Mirage shift supervisors at least as early as May 30, 1990.
Ghost Hunter Advertisement written by Atronic, published in 2003.
Hot Shot Progressive Article, written by Strictly Slots, published in Feb. 2006.
Jackpot Carnival Hyperlink Advertisement, written by Aristocrat, published prior to 2002.
Jackpot Hunter Advertisement, written by IGT, available prior to Jan. 2005.
Lemons, Cherries and Bell-Fruit-Gum written by Richard M. Bueschel, pp. 39-41, 64, 70, 137, 149-150, 195-196 and 251, 1995.
Lemons, Cherries and Bell-Fruit-Gum, pp. 1 to 4 and 304 to 314, written by Bueschel, published in Royal Bell Books in Nov. 1995.
Little Green Men Jr.™ Article written by Strictly Slots, published in Feb. 2003.
Magic 8 Ball Advertisement written by IGT, published in 2002.
Mikohn Product Catalog, Chapters 1, 2, 6, 7 and 8, written by Mikohn, published in Jan. 1993.
Mikohn Ripley's Believe It or Not Article written by Strictly Slots published in 2001.
Mikohn Super Controller Manual, Chapters 1 to 3 and 6 to 7, written by Mikohn, published in 1989.
Millioni$er articles, written by Strictly Slots, published in Sep. 2003 and Mar. 2004.
Money Grab Article written by Strictly Slots, published in Apr. 2001.
Money Time advertisement, written by Mikohn Gaming, published in 1999.
Money to Burn Brochure written by WMS Gaming, Inc., published prior to 2001.
Monte Carlo Advertisement written by Bally Gaming, published prior to Sep. 2002.
PEM—Precision Electronic Meter, written by GRIPS Electronic GmbH, printed from website reported as archived on Feb. 20, 1997 (available at http://web.archive/org/web/19970220165753/www.grips.com/pem.htm).
Penguin Pucks article, written by Note in Gaming Marketplace, published prior to 2004.
Pick a Prize Brochure written by Acres Gaming Incorporated, published prior to 2001.
Player Tracking on Slots, written by GRIPS Electronic GmbH, printed from website reported as archived on Feb. 20, 1997 (available at http://web.archive.org/web/19970220165921/www.grips.com/playtrac.htm).
Progressive Jackpot System article, printed from casinomagazine.com.managearticle.asp@c_290&a=518, on Jun. 21, 2004.
ProLINK Progressive Controller User/Reference Manual, written by Casino Data Systems, published in Apr. 1997.
Quick Pick Paytime Brochure written by Acres Gaming Incorporated, published prior to 2001.
Risk Description, available on or before Jun. 9, 2006, printed from www.hasbro.com/common/instruct/risk.pdf on Jan. 17, 2008.
Scarne's Complete Guide to Gambling (© 1997)—John Scarne.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machines A Pictorial History of the First 100 Years (pp. 216, 242 to 243), 5th edition, written by Marshall Fey, published in 1983-1997.
Slot Machines and Coin-Op Games written by Bill Kurtz, pp. 16, 65, 105 and 111, 1991.
Slot Machines on Parade, 1st edition written by Robert N. Geddes and illustrated by Daniel R. Mead, published in 1980.
Southpark—Dodgeball Advertisement, written by IGT, published in 2000.
Super Cherry Advertisement written by IGT in 2001.
Take Your Pick Brochure and Article written by IGT/Anchor Games, Strictly Slots, published in 1999.
Top Dollar Brochure written by IGT, published in 1998.
Treasure Hunter written by Atronic, published in 1996.
*Wide Area Progressive Link System, written by GRIPS Electronic GmbH*, printed from website reported as archived on Feb. 20, 1997 (available at http://web.archive.org/web/19970220165457/www.grips.com/wap.htm).
Zorro Advertisement, written by Aristocrat, published in 2004.

* cited by examiner

FIG. 3

| | AWARD | INCREMENTED VALUE | PERCENTAGE |
|---|---|---|---|
| 100a | 1 | $0.10 | 0.01% |
| 100b | 2 | $5.00 | 0.5% |
| 100c | 3 | $10.00 | 1% |
| 100d | 4 | $15.00 | 1.5% |
| 100e | 5 | $20.00 | 2% |
| 100f | 6 | $35.00 | 3.5% |
| 100g | 7 | $100.00 | 10% |

FIG. 6

222

| AWARD | POINT RANGE | POINTS |
| --- | --- | --- |
| 1 | 25-50 | 40 |
| 2 | 35-65 | 55 |
| 3 | 65-80 | 75 |
| 4 | 70-95 | 85 |
| 5 | 90-110 | 105 |
| 6 | 95-120 | 115 |
| 7 | 150-300 | 250 |

236a 236b 236c 236d 236e 236f 236g

FIG. 7

228

| GAME COMPONENT | POINT RANGE | POINTS |
|---|---|---|
| 1 | 5-100 | 10 |
| 2 | 5-100 | 20 |
| 3 | 5-100 | 35 |
| 4 | 5-100 | 50 |

238a

238b

238c

238d

16

GAMING SYSTEM AND METHOD FOR ENABLING A PLAYER TO SELECT PROGRESSIVE AWARDS TO TRY FOR AND CHANCES OF WINNING PROGRESSIVE AWARDS

PRIORITY CLAIM

This application is a non-provisional of, claims the benefit of, and claims priority to U.S. Provisional Patent Application No. 60/804,399, filed on Jun. 9, 2006, entitled "GAMING SYSTEM AND METHOD FOR ENABLING A PLAYER TO SELECT PROGRESSIVE AWARDS TO TRY FOR AND CHANCES OF WINNING PROGRESSIVE AWARDS," the entire contents of which are incorporated herein, and U.S. Provisional Patent Application No. 60/826,872, filed on Sep. 25, 2006, entitled "GAMING SYSTEM AND METHOD FOR ENABLING A PLAYER TO SELECT PROGRESSIVE AWARDS TO TRY FOR AND CHANCES OF WINNING PROGRESSIVE AWARDS."

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines that provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations that are less likely to occur usually provide higher awards.

In such known gaming machines, the amount of the wager made on the base game by the player may vary. For instance, the gaming machine may allow the player to wager a minimum number of credits, such as one credit (e.g., one penny, nickel, dime, quarter or dollar) up to a maximum number of credits, such as five credits. The player may make this wager a single time or multiple times in a single play of a primary game. For instance, a slot game may have one or more paylines and the slot game may allow the player to make a wager on each payline in a single play of the primary game. Slot games with 1, 3, 5, 9, 15 and 25 lines are widely commercially available. Thus, it is known that a gaming machine, such as a slot game, may allow players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

Progressive awards associated with gaming machines are also known. A progressive award is an award amount which includes an initial amount funded by a casino and an additional amount funded through a portion of each wager made on the progressive gaming machine. For example, 1% to 5% of each wager placed on the primary game of the gaming machine associated with the progressive award may be allocated to the progressive award or progressive award fund. The progressive award grows in value as more players play the gaming machine and thus portions of these players' wagers are allocated to the progressive award. When a player obtains a winning symbol or symbol combination which results in the progressive award, the accumulated progressive award is provided to the player. After the progressive award is provided to the player, the amount of the next progressive award is reset to the initial value and a portion of each subsequent wager on a gaming machine associated with the progressive is allocated to the next progressive award as described above.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressives ("LAP") and wide area progressives ("WAP"), respectively.

Progressive awards generally increment through communication between a progressive controller and one or more gaming machines. The gaming machines associated with the progressive award transfer coin-in information to the progressive controller. From this information, the progressive controller calculates how much to increment the progressive award based on a set increment rate and then increments the progressive award accordingly.

Certain known gaming machines provide the player a choice between different wager levels prior to the commencement of a primary game. The different wager levels enable the player to win different progressive awards.

However, known gaming machines do not enable a player to select which progressive award to play for, such as after the triggering event, because there is no known reliable manner in which the progressive payouts can be mathematically controlled. Enabling a player to select which of a plurality of different progressive awards to play for adds uncertainty to the game.

This uncertainty stems in part from how to account for players with different skill levels and different strategies, how to guarantee an average payback percentage, and how to properly fund a bonus game, an award attempt or other secondary game having such player selectable progressive awards. For instance, optimal play of a first progressive award attempt may cost a first amount, while sub-optimal play may cost a second different amount. This uncertainty causes a mathematical challenge that has yet to be solved by known gaming machines. Other mathematical challenges due to this uncertainty may include players winning too many multiple progressive awards or players repeatedly attempting to play for the top or highest level progressive award which may not always be the optimal play.

There is a continuing need to provide new and different gaming machines and gaming systems as well as new and different ways to provide awards to players including bonus awards and progressive awards. There is also a continuing need to provide new and different linked or related gaming machines.

SUMMARY

The present disclosure provides a gaming device, a gaming system and a method for operating a gaming device or gaming system having a plurality of awards, such as a plurality of progressive awards. The gaming device enables a player to select and play for one or more of the progressive awards. The player's selection of which progressive award to play for is based, at least in part, on a relative likelihood of the player winning the selected progressive award compared to the relative likelihoods of the player winning the non-selected progressive awards. In one embodiment, after the player selects which award to play for, the gaming device either provides the selected progressive award to the player or modifies the relative likelihood that the player will win the selected progressive award with one or more of any subsequent award selections remaining. Such a configuration enables the player to strategically select which progressive award to play for and the order that the player will play for the progressive awards.

In one embodiment, upon a suitable triggering event, the gaming device displays a plurality of progressive awards. Each progressive award is associated with one or more displayed characteristics which generally relate to the relative likelihood or probability of a player winning that progressive award. In one embodiment, the gaming device enables the player to participate in one or more game events, wherein in each game event, the gaming device enables the player to select one of the progressive awards based, at least in part, on the relative likelihood of winning each of the progressive awards. The gaming device determines whether to provide the selected progressive award to the player or to modify the relative likelihood that the player will subsequently win the selected progressive award. If the gaming device determines to provide the selected progressive award to the player, and at least one game event remains, the gaming device provides the selected progressive award to the player and enables the player to select another progressive award. If the gaming device determines to modify the relative likelihood of the player subsequently winning the selected progressive award and at least one game event remains, the gaming device modifies the relative likelihood of the player winning the selected progressive award and enables the player to reselect the previously selected progressive award (wherein a subsequent award determination is based, at least in part, on the modified relative likelihood) or select another different progressive award. Accordingly, in one embodiment, the determined modification increases the player's likelihood of winning the selected progressive award in a subsequent game event. This increased likelihood of success rewards the player for the player's previous attempts to win the selected progressive award.

In one embodiment, the gaming device designates at least one of the displayed progressive awards as unavailable for initial selection by the player. The gaming device enables the player to select and play for any of the available progressive awards, however, the gaming device does not enable the player to select and play for any unavailable progressive awards. In this embodiment, if the player satisfies a predetermined winning condition, such as winning one of the available progressive awards, the gaming device designates one or more of the unavailable progressive awards as available. It should be appreciated that the available progressive awards which the player selects, and the order which the player selects such awards, influence whether the player will be enabled to play for the designated award in any of the game events.

In one embodiment, the gaming device displays a plurality of progressive awards. Each award is associated with a displayed characteristic, such as a number of points. The gaming device also displays a plurality of game components, such as player selections or selectable elements. Each displayed game component is associated with a displayed characteristic, such as a number of points. In operation, the gaming device enables the player to select one of the progressive awards and one of the game components. The multiple displayed characteristics of the game components, in combination with the multiple displayed characteristics of the progressive awards, inform the player of a relative likelihood of the player winning one of the progressive awards. That is, a first game component with a low number of points has a lower relative likelihood or probability of winning a progressive award than a second gaming component with a high number of points. Additionally, a selected game component with a high number of points has a higher relative likelihood or probability of obtaining a first progressive award with a low number of points than a second progressive award with a high number of points. It should be appreciated that the gaming device enables the player to strategically select which progressive award to play for according to the displayed characteristic of each progressive award (i.e., the relative probability of winning each progressive award). Such strategic selection introduces an element of skill or perceived skill for the player.

After the player selects one of the progressive awards and one of the game components (wherein, each selection of a progressive award and a game component is considered a separate game event,) the gaming device determines a game event outcome. In one embodiment, this determination is a random determination although this determination could be predetermined or otherwise suitably determined in alternative embodiments. The game event outcome is based on a comparison between the characteristics or number of points associated with the selected progressive award and the characteristics or number of points associated with the selected game component. The game event outcome either provides the selected progressive award to the player or modifies the likelihood or probability of the player subsequently winning the selected progressive award. In one alternative embodiment, a player wins part or all of the progressive award and the selected game component is also modified. In one such embodiment, the game event outcome modifies the characteristics or number of points associated with the selected progressive award and/or the selected game component. As a result, this modification modifies the relative probability of winning the selected progressive award and any subsequent award determination in the series of game events provided to the player is based on the modified relative probability of winning the selected progressive award. In one embodiment, these relative probabilities remain the same for a subsequent series of game events, such as a subsequent bonus round, or are alternatively reset or determined for each series of game events, such as each bonus round.

After providing the selected progressive award to the player or increasing the player's likelihood of subsequently winning the selected progressive award, the gaming device determines if any game components remain for player selection. If one or more game components remain, the gaming device enables the player to select another progressive award and another game component for a subsequent game event. In the subsequent game event, the progressive awards and the game components are associated with the modified number of points (as determined from a previous game event outcome). Because the number of points associated with the progressive awards and/or the game components are modified from a previous game event, the relative probability of the player winning a progressive award in the subsequent game event is modified. In one embodiment, the relative probability of winning one of the progressive awards increases in the subsequent game event. If the gaming device determines that no game components remain, the player's attempt to select and win the progressive awards ends.

For example, the gaming machine displays first and second progressive awards associated with 75 and 100 points, respectively, and displays first and second game components associated with 40 and 50 points, respectively. The first game component associated with 40 points has a lower relative probability of obtaining the first progressive award or the second progressive award than the second game component associated with 50 points. Either game component has a higher relative likelihood of winning the first progressive award than the second progressive award. In a first game event, the player selects the first game component associated with 40 points and the first progressive award associated with 75 points. The gaming device determines the game event outcome, which in this example, reduces the number of points associated with the selected first game component to 0 points and reduces the number of points associated with the selected first progressive award to 30 points. It should be appreciated that the game event outcome can be based on any suitable algorithmic formula.

For a subsequent game event, the gaming device enables the player to select either the first progressive award now associated with 30 points or the second progressive award associated with 100 points. The second game component associated with 50 points thus has a higher relative likelihood of winning the first progressive award than the second progressive award. If the player selects the first progressive award associated with 30 points in the subsequent game event, the gaming device determines the game event outcome. In this example, the game event outcome reduces the number of points associated with the selected first progressive award to 0 points and reduces the number of points associated with the remaining (previously selected) second game component to 10 points. The gaming machine provides the selected first progressive award to the player. The second game component, which is now associated with 10 points, is eligible for a subsequent game event. In this subsequent game event, the second progressive award is available and the second game component is used to play for the second progressive award. It should be appreciated that the award determination for the subsequent game event is based on the modified number of points associated with the first progressive award and the initial number of points associated with the second progressive award. In one embodiment, the award determination is a random determination although this could alternatively be predetermined or otherwise suitably determined.

It should be appreciated that the gaming device enables the player to change which progressive award that the player plays for during different game events. In the above example, if the player plays for the first progressive award in the first game event, the gaming device enables the player to play for the second progressive award in the subsequent game event. In one embodiment, if the player plays for and wins a first progressive award in a first game event, the gaming device enables the player to play for a different progressive award, e.g., a second progressive award, in a second or subsequent game event.

In operation of one embodiment, after the occurrence of the triggering event, the gaming device determines and displays the number of points associated with each of the progressive awards. In one embodiment, the gaming device randomly determines the number of points associated with each progressive award, such as from a range of points or randomly selected from one or more potentially different determined pools of points (with each pool including one or more potentially different ranges of points). In another embodiment, the number of points associated with each progressive award is predetermined. In an additional embodiment, the number of points associated with each progressive award is based on an amount or value of each progressive award. For example, the gaming device may associate ten points with an award of $10.00, fifty points with a progressive award of $50.00 and one-thousand points with a progressive award of $1,000.00. In one embodiment, the number of points associated with each progressive award is based, at least in part, on a wager amount made by a player or a status of one or more players (such as determined through a player tracking system). In another embodiment, the number of points associated with each progressive award is based, at least in part, on time, on an outcome generated in a primary game or is determined in any other suitable manner by the game implementer.

After the occurrence of the triggering event, the gaming device also determines and displays the number of points associated with each of the game components. In one embodiment, the gaming device randomly determines the number of points associated with each game component, such as from a range of points. In another embodiment, the number of points associated with each game component is predetermined. In another embodiment, the number of points is randomly selected from one or more potentially different determined pools of points (with each pool including one or more potentially different ranges of points). In one embodiment, the number of points associated with each game component is based, at least in part, on a wager amount made by a player or a status of one or more players (such as determined through a player tracking system). In another embodiment, the number of points associated with each game component is based, at least in part, on time, on an outcome generated in a primary game or is determined in any other suitable manner by the game implementer.

In one embodiment, the gaming device determines the number of points associated with the progressive awards and the number of points associated with the game components based on the relative probability of the player winning one of the progressive awards. In this embodiment, for example, if the gaming device displays three game components to the player that are associated with 50 total points, the player has (1) a low probability of winning one of the progressive awards if each progressive award is associated with 75 or more points, (2) an intermediate probability of winning one of the progressive awards if one or more of the progressive awards is associated with 50 points, and (3) a high probability of winning a progressive award if at least one of the progressive awards is associated with less than 50 points. Selecting which progressive awards to play for, at least partially based on the number points associated with the awards, introduces an element of skill or perceived skill into the player's attempt to select and win the progressive awards.

In operation of one embodiment, the gaming device determines each game event outcome (i.e., the selection of a game component and a progressive award and a subsequent comparison between the characteristics of the selected game component and the selected progressive award) through one or a plurality of randomly generated results. The gaming device displays each random result to enable a player to follow the progress of the game event. The random results include: (i) a first generated result that changes the number of points associated with the selected progressive award; (ii) a second generated result that changes the number of points associated with the selected game component, and/or (iii) a third generated result that changes the number of points associated with the selected progressive award and the number of points associated with the selected game component. In one embodiment, the third generated result changes the number of points associated with the selected progressive award and the number of points associated with the selected game component by different amounts. In another embodiment, the third generated result changes the number of points associated with the selected progressive award and the number of points associated with the selected game component by the same amount. For each generated result, the gaming device changes the number of points associated with the selected progressive awards and/or game components. As the number of points change, the gaming device displays the progress of the game event until the game event outcome is reached.

In one embodiment, the player's attempt to select and win one or more progressive awards is provided in a gaming system that includes a plurality of gaming devices in communication with a central controller. Upon a suitable triggering event, the gaming system selects a gaming device and provides the player at the selected gaming device with an attempt to win one or more of the awards. In another embodiment, the gaming system selects a plurality of gaming devices and provides the players at the selected gaming devices with an attempt to win one or more of the awards.

In one embodiment, the gaming system enables a plurality of players to play for the same progressive award(s). The gaming system enables a first player and a second player to play for a first progressive award. If the first player wins the progressive award, the gaming system resets the progressive award to an initial or base value. The gaming system enables the second player to play for a different progressive award since the first progressive award was won by the first player. In another embodiment, if the first player does not win the progressive award, the gaming system modifies the number of points associated with the progressive award for a subsequent game event. In the subsequent game event, the gaming system enables the first player and/or the second player to play for the progressive award with the modified number of points. In such embodiments, the number of points associated with the progressive award(s) and any game components used to play for such progressive award(s) may be the same or different for different players. Additionally, the number of points associated with the progressive award(s) and any game components used to play for such progressive award(s) may be stored by a player and used or continued at a later time.

In another embodiment, the gaming system enables a plurality of players to play for the same progressive award(s). In one embodiment, when two players play for the same progressive award, the gaming system provides the progressive award to the player who first wins the award. That is, if a second player wins the progressive award before a first player, the gaming system provides the progressive award to the second player. In one embodiment, if the first player does not win one of the progressive awards, the gaming system provides the first player with a consolation award to ensure that the first player is rewarded in some manner. In one embodiment, the gaming system resets the won progressive award to an initial or base value and enables the first player and/or the second player to play for the reset progressive award. In one such embodiment, if the reset progressive award is subsequently won by the first player, the gaming system provides that player with the reset progressive award and an additional supplemental award associated with the provided reset progressive award. In another embodiment, the gaming system enables the first player to play for a supplemental award (in addition to or in replacement of the reset progressive award). As described below, the supplemental and consolation awards ensure that a player who did not win a progressive award is rewarded in some manner for attempting to win one of the progressive awards.

It should be appreciated that one manner of rewarding a player who does not win a progressive award is through one or more of the supplemental awards. In one embodiment, a supplemental award is associated with each progressive award for each award attempt or game opportunity. If a first player wins the progressive award that a second player was also playing for, the gaming system enables the second player to play for a supplemental award (in addition to the reset progressive award). In one embodiment, the supplemental awards are exclusive to each player such that the gaming system enables each player to play for the same or different supplemental awards. In this embodiment, different supplemental awards may cause the player(s) to select different progressive awards and employ different strategies in selecting and trying to win one or more of the progressive awards.

In another embodiment, the gaming system enables a player to qualify to play a bonus round in which the player may win a designated progressive award, such as the top level progressive award or the progressive award associated with the highest award value. In this embodiment, the gaming system enables a player to select at least one of a plurality of game components, wherein to qualify to play for the designated progressive award, the player must select a specific game component from the plurality of game components. If the player selected the specific game component, the gaming system qualifies the player to play the bonus round in which the player plays for the designated progressive award. If the player did not select the specific game component, the gaming system does not enable the player to play the bonus round.

In another embodiment, the gaming system enables the player to pick one selection or outcome from a plurality of masked selections or outcomes in each bonus round. The gaming system associates each masked selection with a number of points. The gaming system also associates zero, one or a plurality of the masked selections with at least one additional pick. After the player picks one of the selections, the gaming system reveals the number of points associated with the picked selection to the player. The gaming system then enables the player to use the revealed points to play for the designated progressive award in the bonus round. As described above, the gaming system determines whether to provide the designated progressive award to the player based on a comparison between the number of points associated with the picked selection and a number of points associated with the designated progressive award. For the player to win the designated progressive award, the gaming system modifies a number of points associated with the progressive award to zero points. In one embodiment, each pick reduces the number of points associated with the designated progressive award.

If the player wins the designated progressive award, the gaming system provides the designated progressive award to the player and the bonus round ends. However, if the gaming system modifies the number of points associated with the picked selection to zero points, the player does not win the designated progressive award. After determining whether to provide the designated progressive award to the player, the gaming system determines whether the picked selection is associated with at least one additional pick. If so, the above sequence repeats to enable the player another opportunity to play for the designated progressive award. If not, the bonus round ends. In one embodiment, the bonus round ends when the player wins the designate progressive award or the player has no picks remaining. In one embodiment, the player picks from different sets of masked selections until no picks remain in the bonus round.

In one embodiment, after the occurrence of a suitable triggering event, the triggered gaming device associates a cost or set value with the triggered award attempt. The set value is funded by the paytable of the appropriate gaming device(s) and is paid out or distributed in its entirety during the award attempt. That is, no matter what events transpire during the award attempt, the triggered gaming device distributes the set value as an outcome of the triggered award attempt. The set value is not allocated in any certain manner and the triggered gaming device may distribute the set value in any suitable manner. In one embodiment, each gaming machine distributes the set value or a portion thereof to one or more players (if a player wins one or more progressive awards or wins a consolation award). In addition, each gaming machine distributes the set value or a portion thereof to one or more progressive awards (by incrementing the progressive awards for a future award attempt). Depending on player skill or player strategy, some players will win larger portions of the set value than other players during an award attempt. The triggered gaming machine utilizes the set value to neutralize or minimize mathematical uncertainty in the award attempt which are caused by enabling one or more players to select which progressive awards to play for after a suitable triggering event. Additionally, each gaming machine utilizes the set value to neutralize or minimize the effect of differences in how each player plays for one or more of the progressive awards after the occurrence of a suitable triggering event.

In one embodiment, the set value includes a supplemental award associated with each of the available progressive awards, a supplemental award associated with each of the available game components and a supplemental award associated with the consolation award. The sum of these supplemental awards represents the set value for the award attempt. For each award attempt, the gaming machine knows only to fund this set value and to distribute this set value as an outcome of the award attempt regardless of how skillfully or strategically a player plays the award attempt. The gaming machine does not require the set value or any portion thereof to be allocated in any certain manner. The set value or any portion thereof is distributed independent of how the player plays the award attempt. Any portion of the set value that is not won by a player in the award attempt is funded back into the progressive awards at the end of the award attempt. In this manner, the gaming machine uses the set value or a portion thereof to increment the progressive awards for a future or subsequent award attempt.

In one embodiment, the set value remains the same for each award attempt regardless of how skillfully or strategically each player plays during the triggered award attempt. Regardless of (a) the number of progressive award(s) won in the triggered award attempt, (b) which, if any, of the progressive awards are won in the triggered award attempt, (c) how each player plays in the triggered award attempt, (d) which progressive award(s) and/or game component(s) that each player selects in the triggered award attempt, or (e) any other outcome variables that occur in the triggered award attempt, the gaming machine associates and distributes the set value in its entirety for each triggered award attempt. In one embodiment, the set value partially funds the consolation award if the player does not win a progressive award.

In one embodiment, if the player plays for and wins a selected progressive award, the player is provided the selected progressive award and any supplemental award associated with the won progressive award. The supplemental award associated with the won progressive award may include the supplemental awards associated with any game components previously used to win that progressive award. If any of the progressive awards are not won during the player's attempt to win the progressive awards, the gaming system adds a portion of the set value (i.e., the supplemental awards associated with the progressive awards and played game components) not won in the player's attempt to win the progressive awards. In this manner, the gaming device increases the progressive awards for future game events and accounts for the set value at all times during each award attempt.

In one embodiment, the gaming machine distributes the set value among a plurality of the supplemental awards. In this embodiment, the set value is divided among each of the progressive awards, each of the game components, and the consolation award. For each game event, if the gaming device and/or gaming system determines not to provide the player with the selected progressive award, the supplemental award associated with the selected game component is added to the supplemental award associated with the selected progressive award. This rewards the player by increasing the selected progressive award when the game event is unsuccessful for the player. This also rewards the player for investing a number of their game components in the same progressive award. Additionally, because the supplemental awards are exclusive to each player in one embodiment, one or more players may play for the same progressive award at the same time without the risk of winning no award. That is, the gaming machine enables a first player to play for the supplemental award if a second player beats the first player to a particular progressive award. In one embodiment, the gaming machine enables the first player to play for a reset progressive award in addition to the supplemental award. This provides a type of insurance for players so a player doesn't waste a portion or all of the player's game components on a progressive award that is reset to a relatively low value compared with the other non-reset progressive awards.

It should be appreciated that the gaming system utilizes the supplemental awards or the set value to combat the uncertainty of player behavior during the award attempt. By associating the set value with each and every award attempt, the gaming system distributes the set value in its entirety regardless of how each player performs in each award attempt. This removes uncertainty in funding the progressive awards, guaranteeing the average payback percentage, and solving the other mathematical considerations by creating a uniform cost for each award attempt. For example, a player who plays skillfully and strategically may recoup a large percentage of the set value, while a player who plays less skillfully and strategically may recoup a small percentage of the set value with any portion of the set value that is not provided to the player in the award attempt further funds the progressive awards. This substantially eliminates uncertainty by accounting for player skill and strategy while guaranteeing certain payback percentages.

In one embodiment, each triggered gaming machine communicates with a central controller to return any unused portion of the set value back to the progressive awards. If a player unsuccessfully plays for a progressive award, the triggered gaming machine determines an amount or value to increase or increment the progressive award. The gaming machine sends this amount or value to the central controller, which increments the progressive award accordingly. Each triggered gaming machine sends the values generated in the award attempt related to the supplemental awards to the central controller. The central controller increments the progressive awards by the value associated with the supplemental awards sent by each gaming machine. The gaming machine sends information based on the outcome of the award attempt and the central controller increments the progressive awards by a certain amount based on this outcome (and the values sent by each gaming machine). Additionally, if a consolation prize is to be distributed between one or more of the progressive awards, the gaming machine sends appropriate messaging to the central controller.

In one embodiment, the gaming system utilizes the consolation award to fund the reset values of any progressive awards won during the game or award attempt. For example, if a player wins one of the progressive awards during the game or award attempt, the gaming system resets the won progressive award based on a value of the consolation award. In one example embodiment, if the consolation award has a value of 500 credits and a player wins two of the progressive awards during the award attempt, the gaming system resets the won progressive awards to 250 credits each. In this manner, the gaming system distributes the value of the consolation award to one or more progressive awards won during the award attempt. In another example embodiment, if the consolation award has a value of 500 credits and a player wins one of the progressive awards during the award attempt, the gaming system resets the won progressive award to 500 credits. In this manner, the value of the consolation award is accounted for when one or more players win one or more of the progressive awards during the award attempt. Thus, in one embodiment, it should be appreciated that the consolation award and the progressive reset values are interchangeable.

In one embodiment, the gaming device advises the player which progressive award and/or game component to select in at least one game event. The advice may be in the form of player activated hints or may be automatically provided to the player. In one embodiment, the advice is based on a comparison between the number of points associated with each progressive award and the number of points associated with each game component.

In one embodiment, the advice may have different volatilities. For example, the advice includes: (a) at least one conservative hint, which offers the player selections of progressive award(s) and/or game component(s) that define a high or intermediate likelihood of winning one of the progressive awards; and (b) at least one risky hint, which offers the player selections of progressive award(s) and/or game component(s) that define a low or intermediate likelihood of winning one of the progressive awards.

In an alternative embodiment, the player selects a strategy (or volatility), such as a conservative strategy or a risky strategy, for the award attempt based on the advice provided by the gaming device. In this embodiment, after the player selects the strategy, the gaming device automatically selects which progressive award(s) and/or game component(s) for each game event according to the strategy selected by the player.

In one embodiment, the gaming system and/or the gaming machine advises the player toward a conservative strategy by suggesting a hint which offers information or knowledge on which progressive award(s) the player is likely to obtain while enabling the player to play for any of the progressive awards (which does not restrict or hinder play). In another embodiment, the gaming device advises the player toward a risky strategy by suggesting a hint which offers information or knowledge on which progressive award(s) the player is less likely to obtain (but which may have a higher award value) while enabling the player to play for any of the progressive awards (which does not restrict or hinder play).

In one embodiment, the gaming system periodically or randomly determines to modify or change the number of points associated with one of the progressive awards and/or one of the game components. If the gaming system determines to change the number of points associated with one of the progressive awards and/or one of the game components, the gaming system triggers or provides an additional game feature. One or more additional game features may be provided to the player at any time during the award attempt and may increase or decrease the likelihood of the player winning one of the progressive awards. For example, one additional game feature may decrease the number of points associated with one of the progressive awards to increase the likelihood of the player winning that progressive award. An alternative additional game feature may increase the number of points associated with one of the game components to increase the likelihood of the player winning one of the progressive awards. In one embodiment, the number of points associated with one of the progressive awards and/or the number of points associated with one of the game components is modified by a random amount. In another embodiment, the number of points associated with one of the progressive awards and/or the number of points associated with one of the game components is modified by an amount selected by a player.

It is therefore an advantage of the disclosed embodiments to provide a gaming device, a gaming system and a method for operating a gaming device or gaming system with a plurality of progressive awards in which a player selects one or more progressive awards to play for based on a relative probability of winning each selected progressive award.

Another advantage of the disclosed embodiments is to provide a gaming device, a gaming system and a method for operating a gaming device or gaming system with a plurality of progressive awards in which one or more players select which progressive awards to play for using skill or perceived skill.

A further advantage of the disclosed embodiments is to provide a gaming device, a gaming system and a method for operating a gaming device or gaming system with a plurality of progressive awards in which one or more players select which progressive award to play for in a game event and an outcome of the game event changes the likelihood of the player(s) winning the selected progressive award for a subsequent game event. This advantage also enables one or more players to select a desired progressive award to play for after a suitable triggering event has occurred.

Another advantage of the disclosed embodiments is to provide a gaming device, a gaming system and a method for operating a gaming device or gaming system with a plurality of progressive awards in which one or more of the progressive awards are initially unavailable to the player and become available upon the player satisfying a predetermined winning condition, such as winning another progressive award or selecting a specific or designated game component.

A further advantage of the disclosed embodiments is to provide a gaming device, a gaming system and a method for operating a gaming device or gaming system with a plurality of progressive awards in which the progressive awards and other awards to neutralize player strategy, skill or perceived skill. This advantage enables a set value to be associated with each game or award attempt regardless of how skillfully or strategically each player plays.

Another advantage of the disclosed embodiments is to provide a gaming device, a gaming system and a method for operating a gaming device or gaming system with a plurality of progressive awards in which the set value is used to overcome mathematical uncertainty caused by enabling one or more players to select one or more progressive awards after a suitable triggering event.

Additional objects, features and advantages of the disclosure will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 3 is a schematic representation of one sampling of awards of one embodiment of the present disclosure.

FIG. 6 is a schematic representation of one sampling of awards and points associated with the sampling of awards of one embodiment of the present disclosure.

FIG. 7 is a schematic representation of one sampling of game components and points associated with the sampling of game components of one embodiment of the present disclosure.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
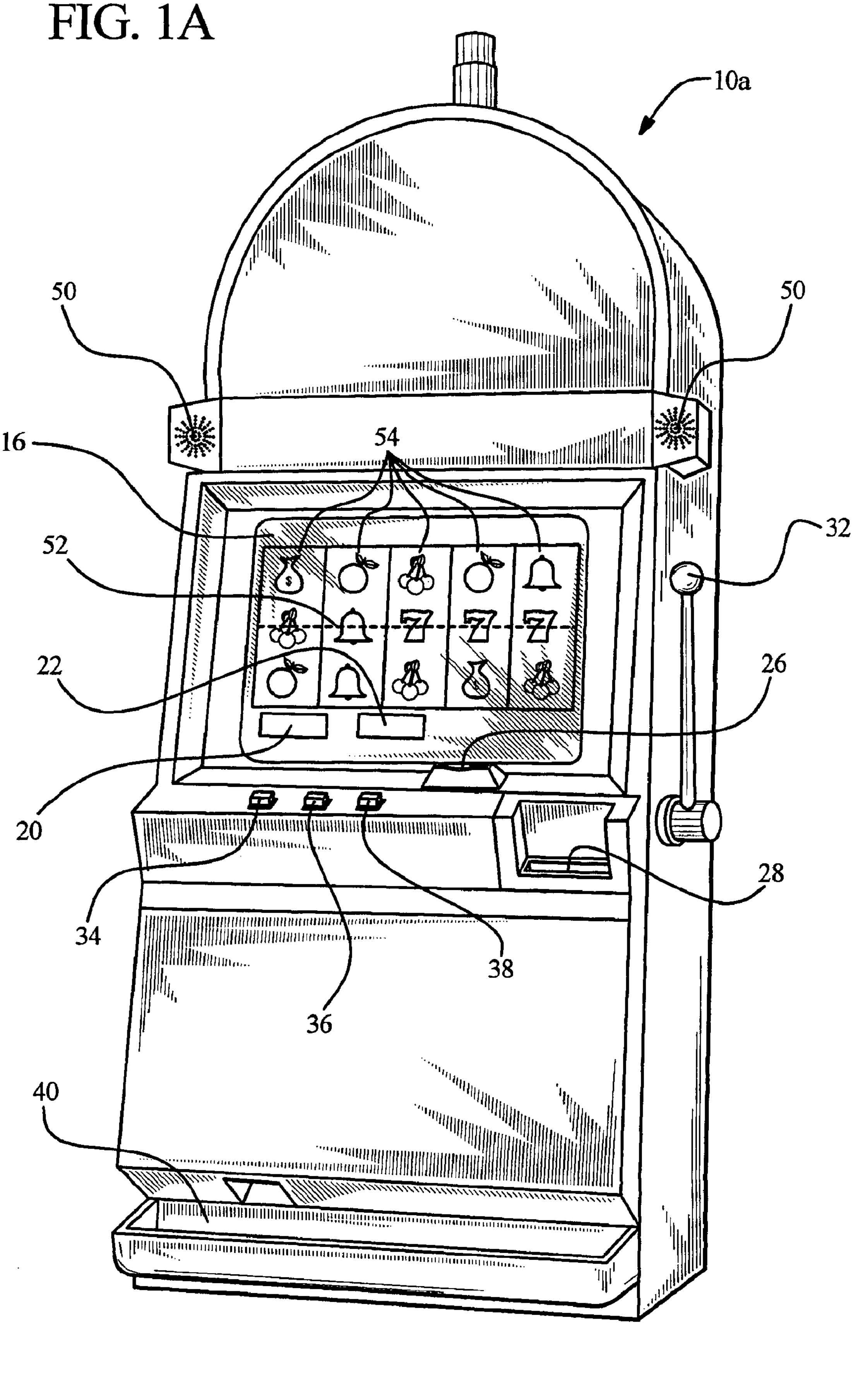
FIGS. 1A and 1B are perspective views of example alternative embodiments of the gaming device of the present disclosure.
Figure 1B:
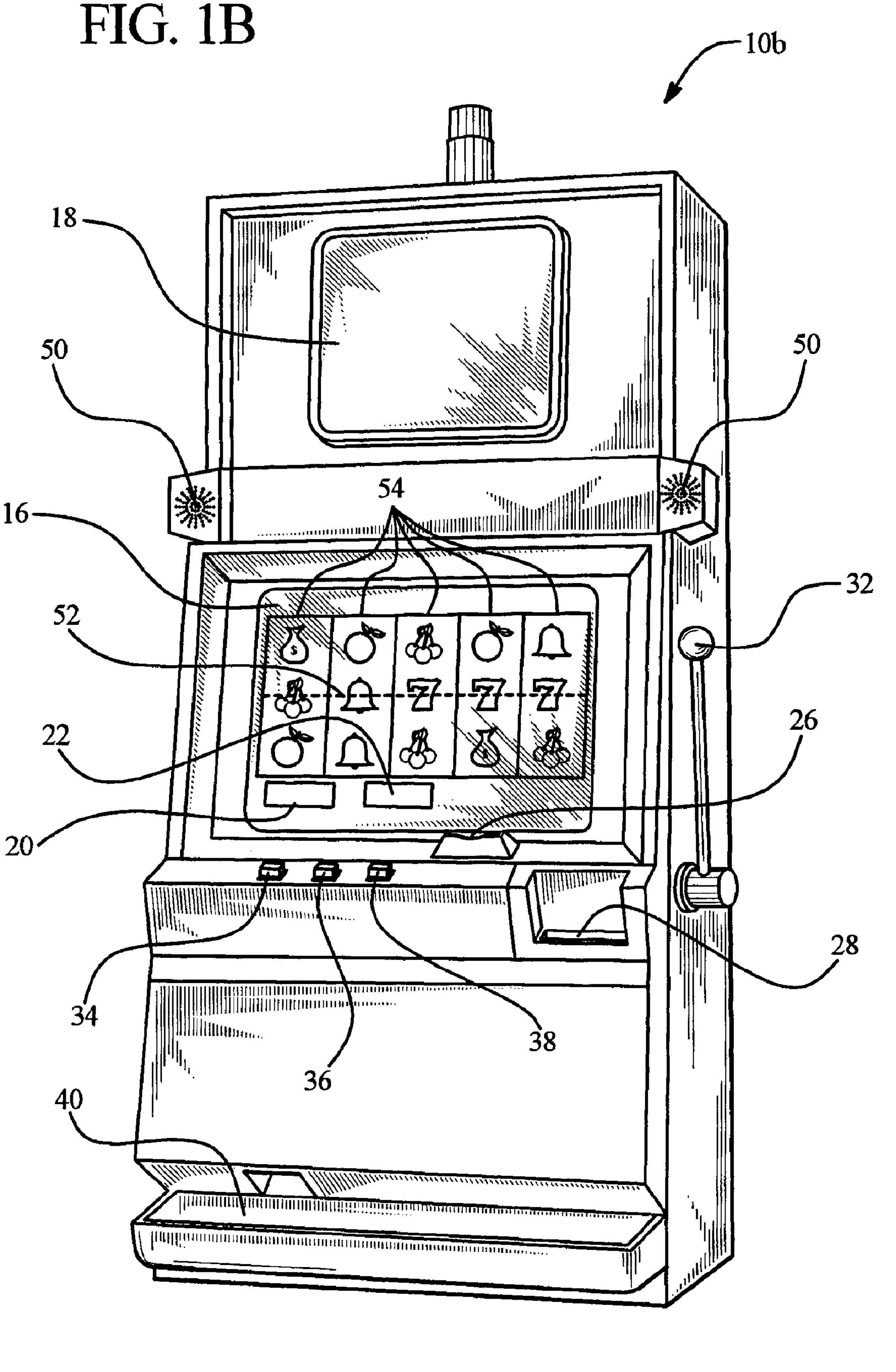

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. The gaming device is configured so that a player can operate it while standing or sitting. The gaming device may be positioned on a base or stand or can be configured as a pubstyle table-top game (not shown) which a player can operate preferably while sitting. As illustrated by the different configurations shown in FIGS. 1A and 1B, the gaming device may have varying cabinet and display configurations.

Figure 2A:
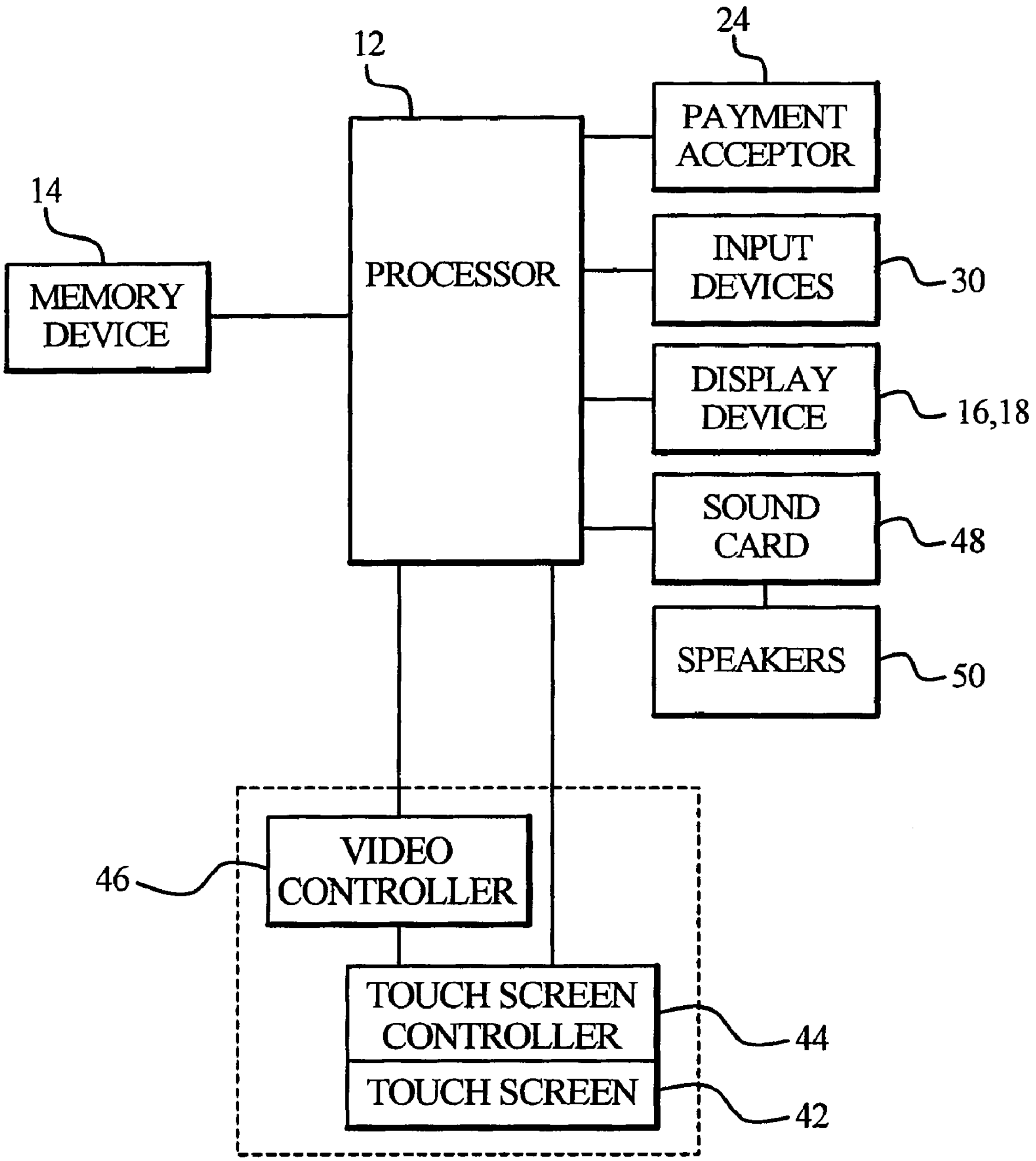
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

The processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
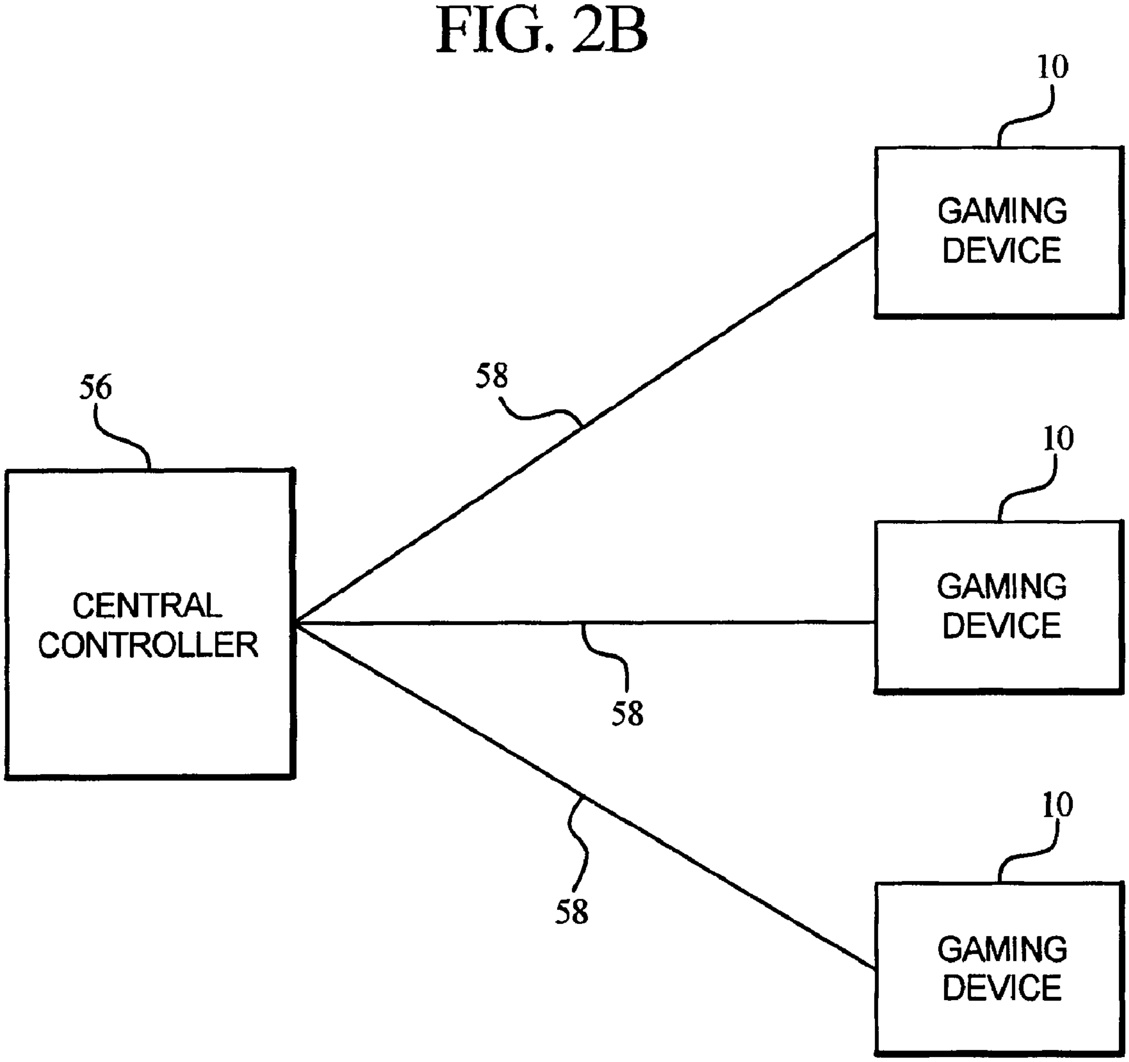
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available.

The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

In one embodiment, a plurality of gaming devices at one or more gaming sites are networked to the central server in a progressive configuration, wherein a portion of each wager placed is allocated to one or more progressive awards. In one embodiment, the progressive awards are associated with a plurality of gaming devices in the gaming system and each gaming device contributes portions of the progressive awards. In one such embodiment, different progressive awards are associated with different numbers of gaming devices. For example, a progressive award valued at $10,000 may be associated with ten gaming devices while another progressive award valued at $500,000 may be associated with one-hundred gaming devices.

In one embodiment, the multiple gaming devices may be in the same bank of gaming devices, in the same casino or gaming establishment such as through LAN or in two or more different casinos or gaming establishments such as through a WAN. In another embodiment, each individual gaming device maintains one or more progressive awards wherein a portion of each wager placed at that respective gaming device is allocated to one or more progressive awards maintained by such individual gaming device. In another embodiment, each individual gaming device maintains one or more progressive awards and the central server simultaneously or substantially simultaneously maintains one or more progressive awards. In one such embodiment, the lower valued, more frequently awarded progressive awards are maintained by the individual gaming devices and the higher valued, less frequently awarded progressive awards are maintained by the central server.

In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state. In one embodiment, the host site computer is maintained for the overall operation and control of the system. In this embodiment, a host site computer oversees the all or part of the progressive gaming system and is the master for computing all or part of the progressive jackpots. All participating gaming sites report to, and receive information from, the host site computer. Each central server computer is responsible for all data communication between the gaming device hardware and software and the host site computer.

In one embodiment, the central controller and/or individual gaming device processor enables one or more players to select and play for one or more progressive awards. Each award attempt or opportunity is triggered by the central controller and/or individual gaming device processor. In one embodiment, the central controller and/or individual gaming device processor causes a triggering event to occur, selects at least one gaming device in the gaming system and enables a player at the selected gaming device to play for one or more of the progressive awards. In one embodiment, the triggering event occurs based on a play of a game. For example, the triggering event is symbol-driven and occurs via a symbol or symbol combination in a primary game of one of the gaming devices in the gaming system. In an alternative embodiment, the triggering event occurs randomly and apparently independent of game play. In another embodiment, the triggering event occurs randomly and independent of any displayed symbols. In different embodiments, the triggering event is predetermined, randomly determined, determined or weighted based on the player's wager, determined or weighted based on the status of one or more players (such as determined through a player tracking system), determined based on time, determined based on an outcome generated in a primary game or determined based on any other suitable method.

In one embodiment, the central server or other central controller determines when one or more award attempts or opportunities are triggered. In this embodiment, a central controller and an individual gaming device work in conjunction with each other to determine when an award attempt is triggered, for example through an individual gaming device meeting a predetermined requirement or criteria established by the central controller. In another embodiment, an individual gaming device determines when one or more award attempts are triggered. In another embodiment, an individual gaming device determines when at least one award attempt is triggered and the central controller determines when at least one other award attempt is triggered.

In one embodiment, a plurality of gaming devices in the gaming system are operable to provide a plurality of award attempts to a plurality of players at the same time or substantially the same time. If a plurality of players play for the same progressive award(s), the gaming system enables a first player and a second player to play for a first progressive award. When two players win the same progressive award, the gaming system provides the progressive award to the player who first wins the award. If the first player wins the progressive award, the gaming system resets the first progressive award to an initial, base or reset value. In one embodiment, the second player plays for the first progressive award with the reset value. In this embodiment, the gaming system provides the second player with a supplemental award, which may be predetermined or randomly determined, to ensure that the second player is rewarded in some manner. In an alternative embodiment, a plurality of gaming devices in the gaming system are operable to provide a plurality of award attempts to a plurality of players in an overlapping or sequential manner. In another embodiment, the gaming system enables the second player to play for a different progressive award since the first progressive award was won by the first player.

In one embodiment, the central controller and/or individual gaming device processor maintains at least one and preferably a plurality of the progressive awards. Award attempts for the progressive awards are provided to players of the linked gaming devices in an apparently random fashion as perceived by the players of these gaming devices. These progressive awards are distinguished from the awards that the gaming devices provide to the players for winning outcomes in the plays of the primary wagering games, such as slot games, card games (e.g., poker, blackjack) or any other suitable game.

In one embodiment, the central controller and/or individual gaming device processor does not provide any apparent reasons to the players for obtaining such award attempts. In this embodiment, the award attempts are not triggered by an event in the primary game or based specifically on any of the plays of any primary game or on any of the plays of any secondary game of a plurality of gaming devices in the gaming system. That is, the award attempts are provided to the players without any explanation or alternatively with simple explanations.

In one embodiment, a plurality of gaming devices in the gaming system provides a reason to the players of the gaming system for obtaining one or more award attempts upon the occurrence of a triggering event. In this embodiment, the triggering event is triggered by an event in or based on any of the plays of any primary game or on any of the plays of any secondary game of a plurality of gaming devices in the gaming system. For example, the triggering event is caused by a random occurrence of a predetermined symbol or a predetermined combination of symbols (e.g., a symbol combination including a plurality of bonus symbols) in a play of the primary game. That is, the triggering event is symbol driven.

In one embodiment, the triggering event is caused by a random trigger number selected from a range of numbers. When a game on one of the gaming devices in the gaming system is commenced, each game/player is allotted numbers from the same number range from which the random number was selected. That is, prior to each primary game, the central server and/or individual gaming device processor selects a random number from a range of numbers and during each primary game, the central server and/or individual gaming device processor allocates N number(s) in the range to the plurality of players. The previously selected random number is compared with the N number(s) allotted to the player(s). If there is a match between the trigger number and one of the player's allotted numbers, the central server and/or individual gaming device processor determines that the triggering event will occur and causes the triggering event to occur.

In one embodiment, the triggering event is caused by a random trigger number selected from a range of numbers. When the game is commenced, each game/player is allotted numbers from the same number range from which the random number was selected. One number in the range is allotted for each credit bet such that the player's probability of being awarded any award(s) is proportional to the wager amount. That is, prior to each primary game, the central server and/or individual gaming device processor selects a random number from a range of numbers and during each primary game, the central server and/or individual gaming device processor allocates the first N numbers in the range to each player, where N is the number of credits bet by the player in that primary game. The previously selected random number is compared with the N numbers allotted to the player(s). If there is a match between the trigger number and one of the player's allotted numbers, the central server and/or individual gaming device processor determines that the triggering event will occur and causes the triggering event to occur.

In one embodiment, the central server and/or individual gaming device processor maintains one or more trigger values that are each associated with a separate range of values. In this embodiment, a triggering event will occur when the trigger value increments or increases to a value (i.e., a trigger hit value) within the range of values associated with that trigger value. For example, a triggering event will occur when the trigger value for a total wagered amount or a total coin-in increments to a trigger hit value of $500. In another example, a triggering event will occur when the trigger value for one progressive award increments to a progressive hit value of $2000. The trigger hit values can be randomly selected, predetermined or otherwise determined by the implementer or operator of the gaming system.

In one example embodiment, as illustrated in FIG. 3, the gaming system includes a plurality of different awards, such as progressive awards 100*a* to 100*g*, adapted to be played for by one or more players at the gaming devices in the gaming system. The progressive awards 100*a* to 100*g* start at the same default level such as $0 and increment or increase until provided to a player. As illustrated in the example in FIG. 3, the progressive awards 100*a* to 100*g* increment from the default level based on a percentage (such as 0.01%, 0.5%, 1%, 1.5%, 2%, 3.5% and 10%, respectively) of coin-in or wagered amounts by the player. At these accrual rates, the progressive awards 100*a* to 100*g* have incremented values of $0.10, $5, $10, $15, $20, $35 and $100, respectively, based on player wagers totaling $1,000. The default level and the percentage of coin-in or wagered amounts for each progressive award is predetermined and may be set to any suitable value or level determined by the game implementer. In the illustrated embodiment, the percentage that goes to each progressive award is unequal. It should be appreciated that any suitable increment levels may be employed and that the ranges for the increments may vary and depending on the minimum wager levels and the number of progressive awards, suitable ranges for the increment levels may be anywhere from 0.1% to 10%. Unequal percentages of coin-in or wagered amounts enables a first progressive award or a progressive award of a first level to accrue at a different rate (e.g., faster or slower) than a second progressive award or a progressive award of a second level. For example, a progressive award with a higher value may increment at a higher rate than a progressive award with a lower value.

In an alternative embodiment, the percentage that goes to each progressive award 100*a* to 100*g* is equal (such as 0.1% to each of seven progressive awards). At this accrual rate, player wagers totaling $1,000,000 are required for the seventh progressive to reach $1,000. At least a fraction of this amount may be funded by the casino, such as through one or more of the casino's marketing and/or advertising departments, by using a starting value higher than zero to make the progressive awards attractive even after they are reset. In another embodiment, at least one progressive award is funded by the casino, such as through one or more of the casino's marketing and/or advertising departments. In these embodiments, the central server and/or individual gaming device processor continues to increase the progressive levels until a progressive award is provided to a player (upon the occurrence of a successful award attempt), at which point the progressive award is reset and another progressive award starts incrementing from the appropriate default progressive award level.

In one embodiment, a plurality of the progressive awards are set to different default levels and increment based on a different percentage of coin-in or wagered amounts by the player. For example, the default levels for the progressive awards are set at $10, $20, $40, $40, $50, $75 and $100, respectively, and the percentage of coin-in or wagered amounts for each progressive award ranges from about 0.001% to about 10%. In another embodiment, each progressive award is set to a different default level and incremented based on the same percentage or a different percentage of coin-in or wagered amounts by the player. In an alternative embodiment, the default level and the percentage of coin-in or wagered amounts for each progressive award may be randomly determined, predetermined or otherwise suitably determined by the game implementer. It should be appreciated that a plurality of progressive awards may be funded or be incremented at different times and at different rates. In one embodiment, the amount which each progressive award may increment to is unlimited. In another embodiment, the amount which each progressive award may increment to is limited or capped so the progressive awards will tend to be awarded more frequently. In an alternative embodiment, the progressive awards include at least one unlimited progressive award and at least one limited or capped progressive award.

In another embodiment, two or more of the progressive awards may be funded at different temporal rates. In this embodiment, the different progressive awards are incremented or funded in different increments of time wherein until one of the progressive awards is provided to a player, a set amount is added to the progressive at each determined time increment. In another embodiment, two or more of the progressive awards may each be incremented or funded based on different incrementing factors or incrementors. In this embodiment, a first of the progressive awards may increment each time a first incrementing factor occurs and a second of the progressive awards may increment each time a second incrementing factor occurs, wherein the first incrementing factor and the second incrementing factor are different. Examples of incrementing factors could be a symbol-driven event in the base game, a random or player selectable event in a bonus or secondary game, the player betting a maximum amount, a percentage of possible gaming devices being actively played or in active status, a side-wager, or any other suitable method for defining an incrementor.

In one embodiment, one or more of the progressive awards are funded, at least partially, via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers in the base game as described above as well as any side-bets or side-wagers placed.

In another alternative embodiment, a minimum wager level is required for a gaming device in the gaming system and/or player to qualify to be selected to obtain a progressive award attempt. In one embodiment, this minimum wager level is the maximum wager level for the primary game in the gaming device. In one alternative embodiment, a minimum wager level is required for a gaming device and/or player to qualify to be selected to obtain an award attempt. In one embodiment, this minimum wager level is the maximum wager level for the primary game in the gaming device. In another embodiment, no minimum wager level is required for a gaming device and/or player to qualify to be selected to obtain an award attempt.

Figure 4:
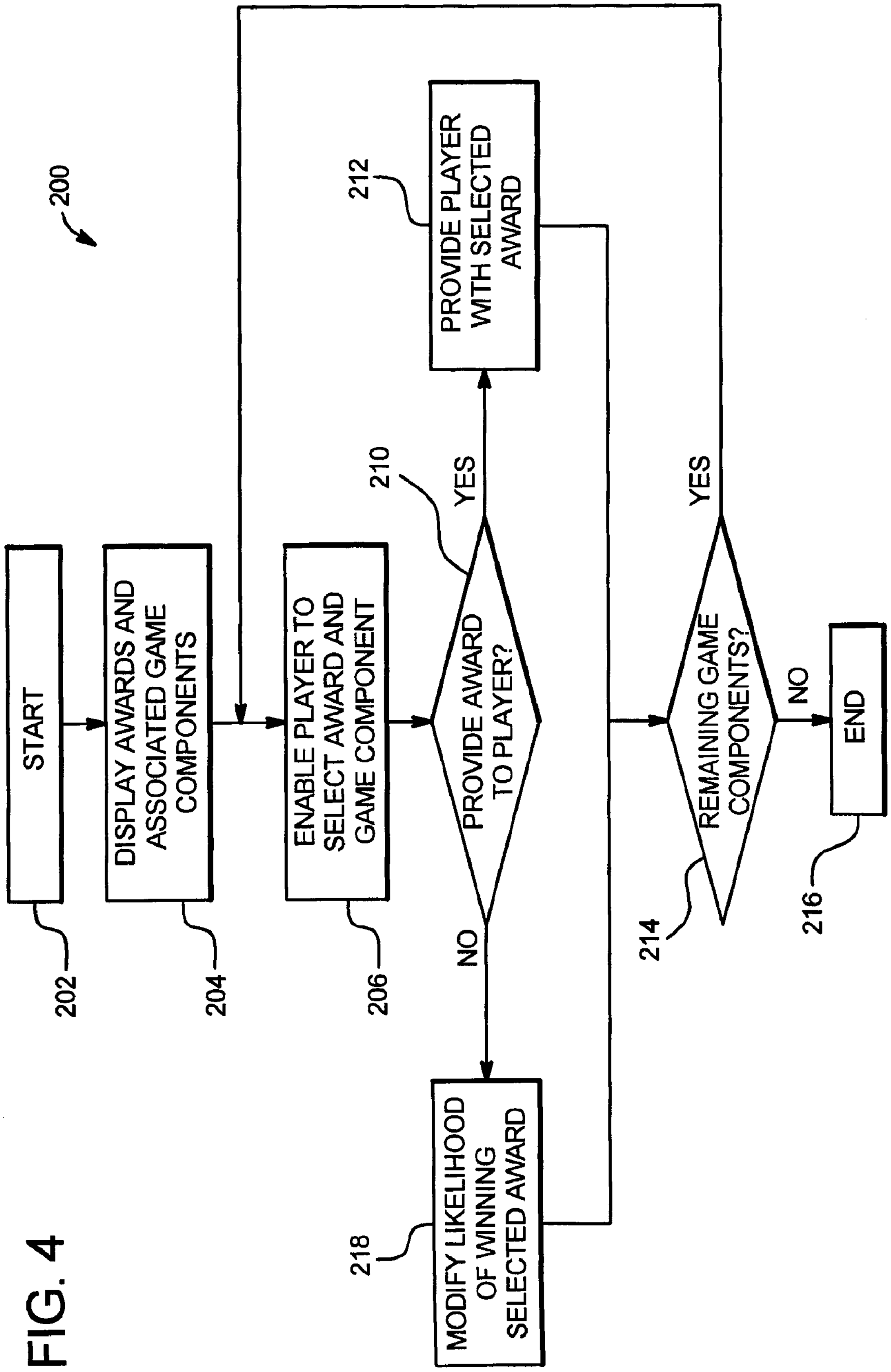
FIG. 4 is a process flow diagram showing one possible flow sequence of one embodiment of the present disclosure.

Referring now to FIG. 4, one embodiment of an award attempt of the present disclosure generally operates according to sequence 200. The award attempt may be a primary game or a bonus game on one of the gaming devices in the system and may include one or more rounds in which one or more players play for a plurality of awards, such as progressive awards. It should be appreciated that one or more awards may be set awards, such as non-progressive awards.

Sequence 200 starts as indicated in block 202. Upon initiation of the award attempt, the central controller and/or gaming device processor causes the display device to display a number of progressive awards and a number of associated game components to a player as indicated in block 204. The central controller and/or individual gaming device processor enables the player to select one of the awards and one of the game components as indicated in block 206. Each selection of a progressive award and a game component (and a subsequent comparison between the selected progressive award and the selected game component) is considered a separate game event. A likelihood or probability of winning is associated with each progressive award, wherein the association is based, at least in part, on the selected game component.

After selecting a progressive award and a game component, the central controller and/or gaming device processor determines whether to provide the player with the selected progressive award as indicated by diamond 210. The determination is based on the selected game component's probability or likelihood of winning the selected progressive award. If the central controller and/or gaming device processor determines to provide the player the selected progressive award, the player is provided with the selected progressive award as indicated in block 212. After providing the player the selected progressive award as indicated in block 212, the central controller and/or gaming device processor determines if any game components remain in the award attempt as indicated by diamond 214. If any game components remain, the central controller and/or gaming device processor enables the player to select another award and/or gaming component as indicated in block 206 and the sequence 200 continues from block 206 in FIG. 4. It should be appreciated that the game component selected in block 206 and used to win the selected progressive award may be reused or may be considered a remaining game component for a subsequent game event. If no game components remain, the central controller and/or gaming device processor ends the award attempt as indicated in block 216.

If the central controller and/or individual gaming device processor determines not to provide the player with the selected progressive award as indicated by diamond 210, the central controller and/or individual gaming device processor modifies the likelihood or probability of winning the selected progressive award as indicated in block 218. In one embodiment, the selected progressive award is increased if the selected progressive award is not provided to the player. The selected progressive award may be increased by a predetermined amount, a random amount or another suitable amount, such as a supplemental amount or award associated with one of the game components. After modifying, the central controller and/or gaming device processor determines if any game components remain in the award attempt as indicated by diamond 214. If any game components remain, the central controller and/or gaming device processor enables the player to select another award and/or gaming component as indicated in block 206 and the sequence 200 continues from block 206 as described above. If no game components remain, the central controller and/or gaming device processor ends the game as indicated in block 216. In this embodiment, the sequence 200 continues until all of the progressive awards are provided to the player and/or no game components remain for subsequent player selections.

Figure 5:
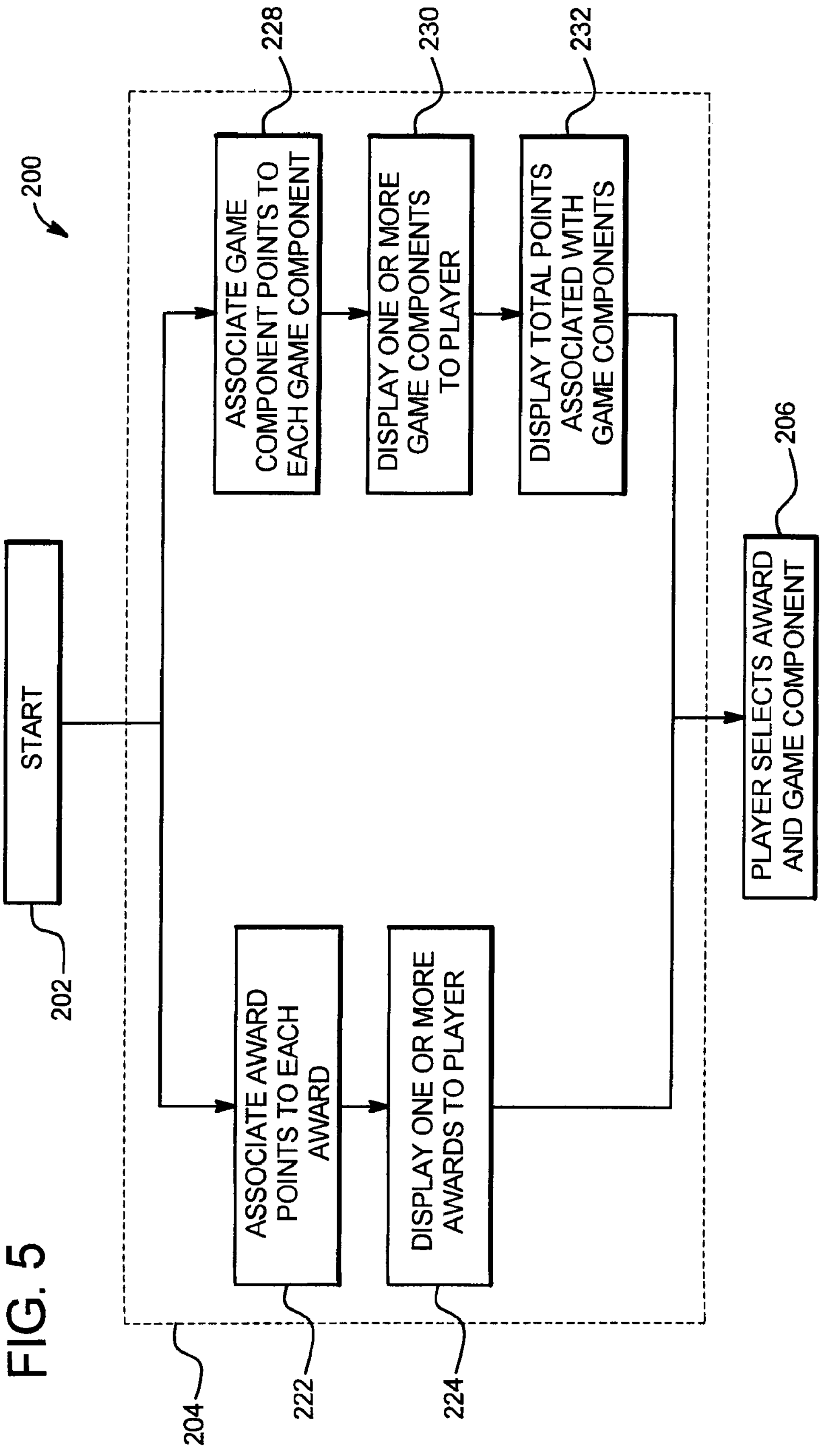
FIG. 5 is a process flow diagram showing one possible flow sequence of one embodiment of the present disclosure.

FIG. 5 illustrates one example of the central controller and/or gaming device processor causing the display device to display a number of awards and a number of game components to the player as generally indicated in block 204. After the sequence 200 starts as indicated in block 202, the central controller and/or gaming device processor associates a number of points or award points to each award as indicated in block 222. The number of award points may be predetermined, randomly determined, determined or weighted based on the player's wager, determined or weighted based on the status of one or more players (such as determined through a player tracking system), determined based on time, determined based on an outcome generated in a primary game or determined based on any other suitable method. The central controller and/or gaming device processor causes the display device to display the awards and the associated award points to the player as indicated in block 224. The central controller and/or gaming device processor enables the player to select one of the displayed awards as indicated in block 206 and continues from block 206 as described above.

After the sequence 200 starts as indicated in block 202, the central controller and/or gaming device processor also associates a number of points or game component points to each game component as indicated in block 228. The number of game component points may be predetermined, randomly determined, determined or weighted based on the player's wager, determined or weighted based on the status of one or more players (such as determined through a player tracking system), determined based on time, determined based on an outcome generated in a primary game or determined based on any other suitable method. The central controller and/or gaming device processor enables the display device 16 or 18 to display the game components and the associated game component points to the player as indicated in block 230. In this embodiment, the central controller and/or gaming device processor cooperates with the display device to display a total number of the game component points associated with the game components as indicated in block 232. The central controller and/or gaming device processor enables the player to select one of the displayed game components as indicated in block 206 described above and the sequence 200 continues from block 206 as described above.

The number of award points and the number of game component points define a plurality of likelihoods or probabilities of winning each of the progressive awards. For example, a first game component with a low number of points has a lower relative likelihood of winning a progressive award than a second game component with a high number of points. Additionally, a selected game component with a higher number of points has a higher relative likelihood of obtaining a first progressive award with a low number of points than a second award with a high number of points. Based on the displayed number of points, the central controller and/or individual gaming device processor enables the player to strategically select which award to play for, and in what order, according to the relative likelihood of winning that award.

In one embodiment, the central controller and/or gaming device processor determines the number of award points of each award and the number of game component points of each game component (e.g., a total number of game component points of a plurality of game components) based on a likelihood or probability of winning each award. Selecting which awards to play for, at least partially based on the number points associated with the awards as indicated in block 206, introduces an element of skill or perceived skill into the award attempt.

In one embodiment, the number of award points associated with the selected progressive award in block 222 and the number of game component points associated with the selected game component in block 228 determine the probability of the player winning the selected progressive award. For example, if the number of game component points associated with the selected game component is less than the number of award points associated with the selected progressive award, the probability of the player winning the selected progressive award is low. For example, the player has a low likelihood of winning an award associated with 100 points when the game component is associated with 50 points. In another example, if the number of game component points associated with the selected game component is equal to the number of award points associated with the selected progressive award, the probability of the player winning the selected progressive award is intermediate. For example, the player has an intermediate likelihood of winning an award associated with 100 points when the game component is associated with 100 points. In an additional example, if the number of game component points associated with the selected game component is greater than the number of award points associated with the selected progressive award, the probability of the player winning the selected progressive award or multiple awards is high. For example, the player has a high likelihood of winning one or more awards associated with 100 total points when the game component is associated with 150 points.

In one example, as illustrated in FIG. 6, the central controller and/or gaming device processor associates each award with a range of award points. Based on the range of award points for each award, the central controller and/or gaming device processor determines to associate a number of points to each award as indicated in block 222 in FIG. 5. The determination may be random or based on wager history, player status or any other suitable factor. For example, the central controller and/or gaming device processor associates a range of 25 to 50 award points with a first award 236*a* and determines to associate 40 award points with the first award 236*a*. It should be appreciated that the central controller and/or gaming device processor may determine to associate any number of award points from the associated range to the first award.

As illustrated, the central controller and/or gaming device processor associates a range of 35 to 65 award points with a second award 236*b* and determines to associate 55 award points to the second award 236*b*. The central controller and/or gaming device processor associates a range of 65 to 80 award points with a third award 236*c* and determines to associate 75 award points with the third award 236*c*. The central controller and/or gaming device processor associates a range of 70 to 95 award points with a fourth award 236*d* and determines to associate 85 award points with the fourth award 236*d*. The central controller and/or gaming device processor associates a range of 90 to 110 award points with a fifth award 236*e* and determines to associate 105 award points with the fifth award 236*e*. The central controller and/or gaming device processor associates a range of 95 to 120 award points with a sixth award 236*f* and determines to associate 115 award points with the sixth award 236*f*. The central controller and/or gaming device processor associates a range of 150 to 300 award points with a seventh award 236*g* and determines to associate 250 award points with the seventh award 236*g*. In one embodiment, the awards 236*a* to 236*g* are progressive awards. In another embodiment, at least one of the awards 236*a* to 236*g* is a set award, such as a non-progressive award that is predetermined, randomly determined, determined or weighted based on the player's wager, determined or weighted based on the status of one or more players (such as determined through a player tracking system), determined based on time, determined based on an outcome generated in a primary game or determined based on any other suitable method.

In one embodiment, the number of award points, or the range of award points, associated with each award 236*a* to 236*g* overlap as shown in FIG. 6. For example, the first award 236*a* is associated with a range of 25 to 50 award points and the second award 236*b* is associated with a range of 35 to 65 award points. With overlapping ranges, a plurality of awards may have the same number of award points (e.g., a first award and a second award associated with 45 award points). In an alternative embodiment, each award is associated with a separate range of award points. The range of award points associated with each award may not overlap. For example, a first award may be associated with 10 to 25 award points, a second award may be associated with 26 to 40 award points and a third award may be associated with 41 to 50 award points. It should be appreciated that the range for each award may be set by the game implementer between any minimum value and any maximum value and that the ranges for each award may be the same or different ranges.

Similarly, as illustrated in FIG. 7, the central controller and/or gaming device processor associates each game component with a range of game component points. As illustrated, the range for each game component is 5 to 100 game component points. The central controller and/or gaming device processor determines to associate a number of game component points from the range of game component points associated with each game component as indicated in block 228. The determination may be predetermined, randomly determined, determined or weighted based on the player's wager, determined or weighted based on the status of one or more players (such as determined through a player tracking system), determined based on time, determined based on an outcome generated in a primary game or determined based on any other suitable method. As illustrated, the central controller and/or gaming device processor determines to associate 10 game component points to a first game component 238*a,* 20 game component points to a second game component 238*b,* 35 game component points to a third game component 238*c* and 50 game component points to a fourth game component 238*d.*

In another embodiment, the range of game component points is different for a plurality of the game components. For example, the first game component may be associated with a range of 10 to 15 game component points, the second game component may be associated with a range of 16 to 25 game component points, the third game component may be associated with a range of 26 to 30 game component points and the fourth game component may be associated with a range of 31 to 50 game component points. In an alternative embodiment, the number of game component points, or the range of game component points, associated with each game component overlap. For example, the first game component may be associated with a range of 10 to 20 award points and the second game component may be associated with a range of 15 to 30 game component points. A plurality of game components may have the same number of game component points (e.g., the first game component and the second game component may be associated with 15 game component points).

In another embodiment, the central controller and/or gaming device processor determines the number of award points and/or the number of game component points from one or more potentially different determined pools of points, wherein each pool includes a range of points. For example, the central controller and/or gaming device processor associates a first progressive award and/or a first game component with a first pool of points, wherein the first pool of points includes a plurality of ranges of points. The first pool may include a first range of points from 10 to 15 points, a second range of points from 15 to 25 points and a third range of points from 25 to 35 points. Different pools may be associated with the same or different ranges of points and different progressive awards and/or game components may be associated with the same or different pools.

In an additional embodiment, the central controller and/or gaming device processor determine the number of award points and/or the number of game component points from a plurality of values associated with each progressive award and/or game component. Each value is associated with a probability of being selected and the central controller and/or gaming device processor selects one of the values for the number of award points and/or the number of game component points based on these probabilities. For example, if a first progressive award is associated with 35 points or 40 points, the central controller and/or gaming device processor randomly determines whether to associate 35 points or 40 points with the first progressive award. In one embodiment, the probabilities associated with the values are equal. In alternative embodiments, the probabilities associated with the values are weighted based on the player's wager, weighted based on the status of one or more players (such as determined through a player tracking system), weighted based on time, weighted on an outcome generated in a primary game or weighted based on any other suitable method.

In an alternative embodiment, the progressive awards are shared between a plurality of players. In this manner, the gaming system enables a plurality of players to play for the same progressive awards. In one embodiment, the number of points associated with each progressive award and the number of points associated with each game component may be the same or may differ for each player. That is, the number of points associated with each progressive award and the number of points associated with each game component may be player specific. In different embodiments, the number of points associated with each progressive award and/or the number of points associated with each game component is predetermined, randomly determined, determined or weighted based on the player's wager, determined or weighted based on the status of one or more players (such as determined through a player tracking system), determined based on time, determined based on an outcome generated in a primary game or determined based on any other suitable method. In another embodiment, the number of points associated with each progressive award and the number of points associated with each game component is based on a status of one or more players (such as determined through a player tracking system).

In an alternative embodiment, the number of points associated with each progressive award is specific to each gaming machine. That is, the number of points associated with each progressive award and the number of points associated with each game component may be the same or different for different gaming machines in the gaming system. For example, the number of points associated with a first progressive award for a first gaming machine may be different, such as higher or lower, than a first progressive award for a second gaming machine. Alternatively, a central server or controller determines the number of points associated with each progressive award and/or game component and shares the associated number of points with each gaming machine participating in the award attempt or game in the gaming system.

It should be appreciated that having randomness in the number of points associated with the progressive awards and the number of points associated with the game components enables different players to play the game or award attempt in different ways or with different strategies. For example, if a first player triggers an award attempt and is provided with one or more game components associated with a high number of points, the first player may play for a different progressive award than a second player who triggers the award attempt and is provided with one or more game components associated with a low number of points.

In one embodiment, the gaming device advises the player which progressive award and/or game component to select in at least one game event. The advice may be in the form of player activated hints, wherein player input activates the information or advice provided by the hints. Alternatively, the advice may be automatically provided to the player. In one embodiment, the advice is based on a comparison between the number of points associated with each progressive award and the characteristics or number of points associated with each game component.

In one embodiment, the advice may have different volatilities. For example, the advice includes: (a) at least one conservative hint, which offers the player selections of progressive award(s) and/or game component(s) that define a high or intermediate likelihood of winning one of the progressive awards; and (b) at least one risky hint, which offers the player selections of progressive award(s) and/or game component(s) that define a low or intermediate likelihood of winning one of the progressive awards.

In an alternative embodiment, the player selects a strategy (or volatility), such as a conservative strategy or a risky strategy, for the award attempt based on the advice provided by the gaming device. In this embodiment, after the player selects the strategy, the gaming device automatically selects which progressive award(s) and/or game component(s) for each game event according to the strategy selected by the player.

In one embodiment, the gaming system and/or the gaming machine advises the player toward a conservative strategy by suggesting a hint which offers information or knowledge on which progressive award(s) the player is likely to obtain while enabling the player to play for any of the progressive awards (which does not restrict or hinder play). In another embodiment, the gaming system and/or the gaming machine advises the player toward a risky strategy by suggesting a hint which offers information or knowledge on which progressive award(s) the player is less likely to obtain (but which may have a higher award value) while enabling the player to play for any of the progressive awards (which does not restrict or hinder play).

Figure 8:
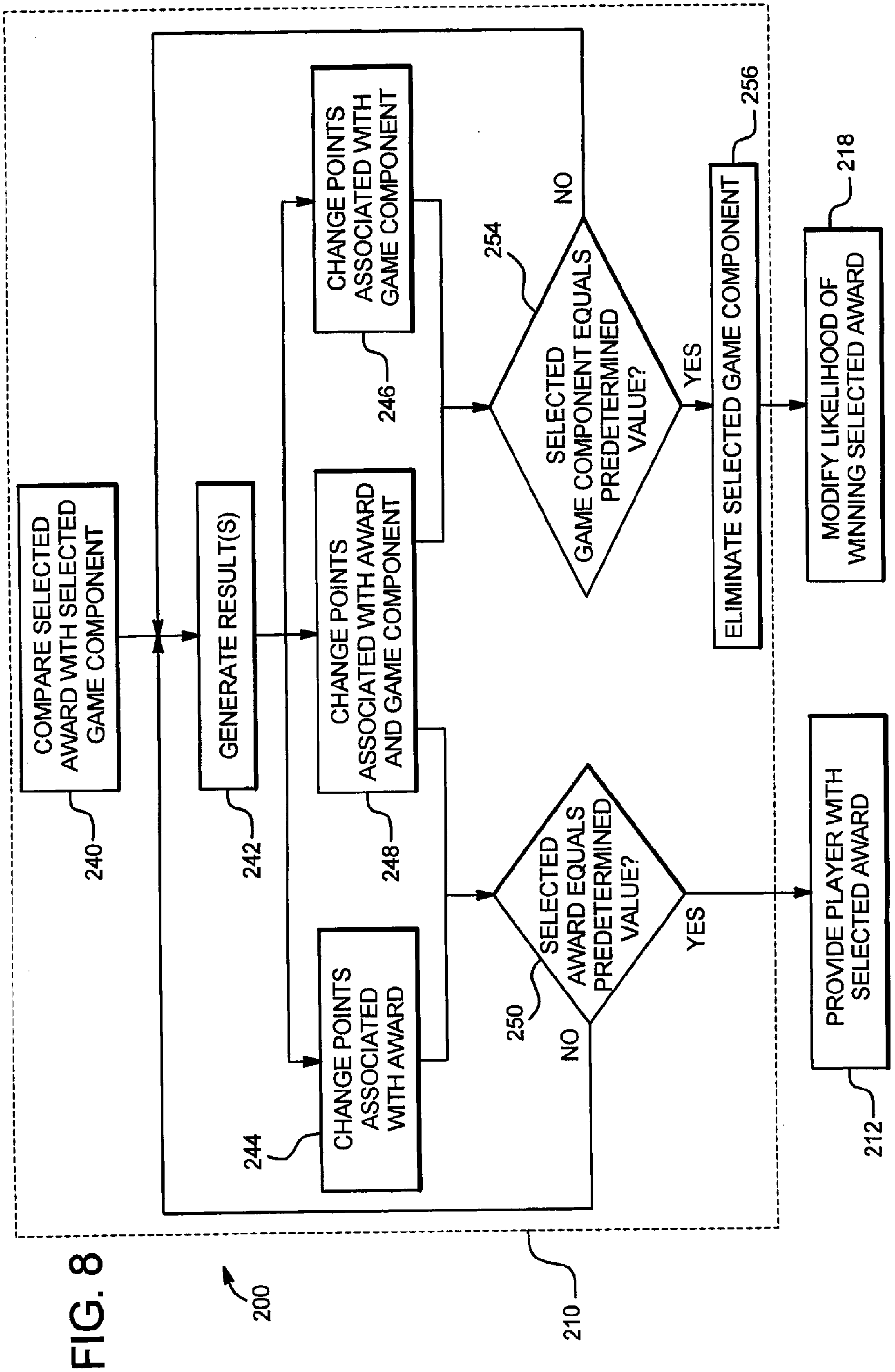
FIG. 8 is a process flow diagram showing one possible flow sequence of one embodiment of the present disclosure.

FIG. 8 illustrates one example of how the central controller and/or gaming device processor determines whether to provide the selected progressive award to the player as indicated in block 210 in FIGS. 4 and 5. The central controller and/or gaming device processor enables the player to select one or more of the progressive awards and one of the game components as indicated in block 206. After the player selects one of the progressive awards and one of the game components, the central controller and/or individual gaming device processor determines a game event outcome. The game event outcome is based on a comparison between the number of points associated with the selected progressive award and the number of points associated with the selected game component as indicated in block 240. In one embodiment, the central controller and/or individual gaming device processor determines the game event outcome through one or more randomly generated results or outcomes as indicated in block 242.

For each generated result, the central server and/or gaming device processor determines to: (1) change the number of award points associated with the selected progressive award as indicated in block 244, (2) change the number of game component points associated with the selected game component as indicated in block 246, or (3) change the number of award points associated with the selected progressive award and the number of points associated with the selected game component as indicated in block 248.

As indicated in block 244, one generated result changes the number of points associated with the selected progressive award. For example, the generated result reduces the number of points associated with the selected progressive award by one or more points. This result increases the likelihood that the player will win the selected progressive award and is positive for the player.

As indicated in block 246, one generated result changes the number of points associated with the selected game component. For example, the generated result reduces the number of points associated with the selected game component by one or more points. This result decreases the likelihood that the player will win the selected progressive award and is negative for the player.

As indicated in block 248, one generated result changes the number of award points associated with the selected progressive award and the number of game component points associated with the selected game component. In one embodiment, the generated result changes the number of points associated with the selected progressive award and the number of points associated with the selected game component by the same amount. For example, the generated result reduces the number of points associated with the selected progressive award by 5 points and reduces the number of points associated with the selected game component by 5 points. This result does not increase or decrease the likelihood that the player will win the selected progressive award and is neutral for the player. In another embodiment, the generated result changes the number of points associated with the selected progressive award and the number of points associated with the selected game component by different amounts. For example, the generated result reduces the number of points associated with the selected progressive award by 3 points and reduces the number of points associated with the selected game component by 1 point. This result increases the likelihood that the player will win the selected progressive award and is positive for the player.

In one embodiment, the processor determines whether to provide the selected award through an iteration of comparisons. The comparison between the number of points associated with the progressive award and the number of points associated with the selected game component is based on a number of sub-comparisons for each remaining point on the selected game component. For each sub-comparison, the central controller and/or the gaming device processor accesses a comparison algorithm to determine the outcome for that point.

For the comparison algorithm, the central controller and/or the gaming device processor accesses a probability table and chooses one of a plurality of weighted outcomes: win, lose, tie, and 5-point win. A "5 point win" outcome reduces the number of award points associated with the selected progressive award by 5 award points. A "win" outcome reduces the number of award points associated with the selected progressive award by 1 award point. A "lose" outcome reduces the number of game component points associated with the selected game component by 1 game component point. A "tie" outcome reduces the number of award points associated with the selected progressive award and the number of game component points associated with the selected game component by 1 point. In another embodiment, one or more alternative outcomes with alternative point alterations may be implemented.

In this embodiment, the central controller and/or the gaming device processor continues to generate sub-comparisons (using the comparison algorithm) automatically until either the number of points associated with the selected progressive award reaches zero award points or the number of game component points associated with the selected game component reaches zero game component points. In one embodiment, the iteration of comparisons is masked from the player so the player does not see the outcome of each sub-comparison.

If the number of points associated with the selected progressive award reaches zero award points, the central controller and/or the gaming device processor provides the player with the selected progressive award. The central controller and/or the gaming device processor enables the player to use the last selected game component (which was used to win the selected progressive award) in a future or subsequent attempt to win other progressives. If the number of game component points associated with the selected game component reaches zero points, then the selected progressive award is not won and the selected game component is unavailable for any subsequent selection. The central controller and/or the gaming device processor enables the player to use other remaining game components in future or subsequent attempts to win the same progressive award or other progressive awards. If the player wins the progressive award with a selected game component but the number of game component points associated with the selected game component reaches zero game component points in the process, the selected game component may not be used to attempt to win another progressive award. In one embodiment, the central controller and/or the gaming device processor does not restore the number of award points associated with a won progressive award until the beginning of a future or subsequent award attempt when all of the progressive awards are again assigned new numbers of award points.

The central controller and/or gaming device processor continues to generate results as indicated in block 242. For each result, the central controller and/or gaming device processor changes the number of points associated with the selected progressive award and/or changes the number of points associated with the selected game component as indicated by blocks 244, 246 and 248. The central controller and/or gaming device processor continues to change the number of points associated with the selected progressive award and/or the selected game component until the number of points associated with the selected progressive award and/or the selected game component reaches a designated or predetermined value, such as zero points.

After the central controller and/or gaming device processor generates the results represented by blocks 244 and 248, the central controller and/or gaming device processor determines whether the award points associated with the selected progressive award equal the predetermined value as indicated by diamond 250. If the award points associated with the selected progressive award equal the predetermined value, the central controller and/or gaming device processor provides the selected progressive award to the player as indicated in block 212. The central controller and/or gaming device processor provides the selected progressive award to the player when the number of award points associated with the selected progressive award reaches the predetermined amount.

For example, if the selected progressive award is associated with 50 points as indicated in block 222, one or more generated results may change the number of award points associated with the selected progressive award from 50 points to zero points as indicated by blocks 240, 244 and 248. Since zero points is the predetermined amount in this embodiment, the central controller and/or gaming device processor provides the player with the selected progressive award as indicated in block 212 and the sequence 200 continues from block 212 in FIG. 4.

If provided, the selected progressive award is unavailable for selection by the player in future or subsequent game events or competitions as indicated in block 206. For example, in this embodiment, if the central controller and/or individual gaming device processor provides the selected progressive award, the central controller and/or individual gaming device processor may enable a player to select another award for a future or subsequent game event or competition along with one of the game components when the sequence continues from block 212 in FIGS. 4 and 8. The selected game component used to win the selected progressive award may be reused or considered a remaining game component for a future or subsequent game event. In this manner, the central controller and/or individual gaming device processor enables the player to play for a plurality of different awards during the sequence 200. Alternatively, the selected progressive award provided to the player in block 212 is reset to an initial or base value and is associated with another number of points as in block 222.

After the central controller and/or gaming device processor generates the results represented by blocks 246 and 248, the central controller and/or gaming device processor determines whether the game component points associated with the selected game component equal the predetermined value as indicated by diamond 254. If the game component points associated with the selected game component equal the predetermined value as indicated by diamond 254, the central controller and/or gaming device processor eliminates the selected game component as indicated in block 256. The central controller and/or gaming device processor eliminates the selected game component if the number of game component points associated with the selected game component reaches a predetermined amount, such as zero points. The eliminated game component becomes unavailable to the player in future or subsequent game events and cannot be used to play for the previously selected progressive award or any of the other progressive awards. Upon elimination of the selected game component, the central controller and/or gaming device processor modifies the probability or likelihood associated with the selected progressive award as indicated in block 218 and the sequence 200 continues from block 218 in FIG. 4.

If the central controller and/or gaming device processor eliminates the selected game component, the selected game component is unavailable for selection by the player in future or subsequent game events or competitions as indicated in block 206. In one embodiment, if the central controller and/or individual gaming device processor eliminates the selected game component, the central controller and/or individual gaming device processor enables the player to select another game component for a future or subsequent game event or competition. In this manner, the central controller and/or individual gaming device processor enables the player to employ a plurality of game components in an attempt to win one or more of the progressive awards. As illustrated by blocks 256, 212, 214 and 216 in FIGS. 4 and 8, the sequence 200 ends when each of the game components is eliminated. In an alternative embodiment, the sequence 200 ends when at least one of the game components is eliminated.

As indicated in block 218, the central controller and/or individual gaming device processor increases the selected progressive award when the selected game component is eliminated as indicated in block 256. The selected progressive award is increased when the game component points associated with the selected game component reach zero points. The central controller and/or gaming device processor increases the selected progressive award by an amount that is predetermined, randomly determined, determined or weighted based on the player's wager, determined or weighted based on the status of one or more players (such as determined through a player tracking system), determined based on time, determined based on an outcome generated in a primary game or determined based on any other suitable method.

As described above, enabling the player to choose which progressive award to play for introduces an element of player skill or strategy into the award attempt. This introduction of skill or strategy presents a mathematical challenge in determining how much money to allot for the award attempt, as skillful or strategic play may cost one amount and less skillful or strategic play may cost another amount. In one embodiment, to account for the differences in how skillfully or strategically each player may play the award attempt, the central controller and/or gaming device processor associates a set value with each award attempt. In one embodiment, the set value includes a supplemental award associated with each progressive award, a supplemental award associated with each game component and a supplemental award associated with a consolation award (which is provided to the player if the player does not win a progressive award during the award attempt). The sum of these supplemental awards comprise the total set value or total supplemental award funded by the paytable of the appropriate gaming machine(s). The triggered gaming machine knows only that for each occurrence of the award attempt, that the set value must be funded as the outcome of the award attempt.

The central controller and/or gaming device processor does not require the set value or a portion thereof to be allocated or distributed in any certain manner. The set value or a portion thereof is funded independent of player skill or strategy. Any portion of the set value that is not won by the player in the award attempt is distributed between the progressive awards, thus making sure the set value is accounted for regardless of player performance.

In one embodiment, the supplemental award associated with each of the progressive awards is set upon entry of the award attempt to an initial value for each progressive award. In one embodiment, the central controller and/or gaming device processor adds these supplemental awards to the associated progressive awards when the player exits the award attempt. In one embodiment, the supplemental awards are exclusive to each player playing the award attempt and are not displayed on the progressive meters of other players until the player exits the award attempt. If a player wins a progressive award, the player also wins the supplemental award associated with the won progressive award. In this embodiment, the supplemental awards are exclusive to each player, the won supplemental award is masked from the other players in the gaming system.

For example, a player plays for a progressive award (valued at $65.78 and associated with a supplemental award of $2.25). In the award attempt, the player uses four game components (each associated with a supplemental award of $0.50) while trying to win the progressive award. After each unsuccessful attempt to win the progressive award, the supplemental award associated with the unsuccessful game component ($0.50) is added to the supplemental award ($2.25) associated with the progressive award. For example, after a first unsuccessful attempt to win the progressive award, the supplemental award associated with the unsuccessful gaming component ($0.50) is added to the supplemental award associated with the progressive award ($2.25). The supplemental award associated with the progressive award increases to $2.75. After a second unsuccessful attempt to win the progressive award, the supplemental award associated with the unsuccessful gaming component ($0.50) is added to the supplemental award associated with the progressive award ($2.75). The supplemental award associated with the progressive award increases to $3.25. After a third unsuccessful attempt to win the progressive award, the supplemental award associated with the unsuccessful gaming component ($0.50) is added to the supplemental award associated with the progressive award ($3.25). The supplemental award associated with the progressive award increases to $3.75. After a fourth unsuccessful attempt to win the progressive award, the supplemental award associated with the unsuccessful gaming component ($0.50) is added to the supplemental award associated with the progressive award ($3.75). The supplemental award associated with the progressive award increases to $4.25. At the end of the award attempt, the supplemental award (which now totals $4.25) is added to the progressive award (valued at $65.78). Accordingly, the progressive award is now valued at $70.03 (which the central controller and/or gaming device processor provides to the player if a positive outcome resulted from playing the last game component or which will be retained by the gaming system if a negative outcome resulted from playing the last game component).

Additionally, there is a supplemental award associated with each of the game components. For each game event, if the gaming device and/or gaming system determines not to provide the player with the selected progressive award, the supplemental award associated with the selected game component is added to the supplemental award associated with the selected progressive award. This configuration rewards the player by increasing the selected progressive award when the game event is unsuccessful for the player. This also rewards the player for investing a number of their game components in the same progressive award. Additionally, because the supplemental awards are exclusive to each player, one or more players may play for the same progressive award at the same time without the risk of winning no award. That is, the gaming machine enables a first player to play for the supplemental award if a second player beats the first player to a particular progressive award. In one embodiment, the gaming machine enables the first player to play for a reset progressive award in addition to the supplemental award. This provides a type of insurance for players so a player doesn't waste all of the player's game components on a progressive award that is reset to a relatively low value compared with non-reset progressive awards.

In one embodiment, each gaming machine communicates with a central controller to return any unused portion of the set value back to the progressive awards. If a player unsuccessfully plays for a progressive award, the triggered gaming machine determines an amount or value to increase or increment the progressive award. The gaming machine sends this amount or value to the central controller, which increments the progressive award accordingly. Each triggered gaming machine sends the values generated in the award attempt related to the supplemental awards to the central controller. The central controller increments the progressive awards by the value associated with the supplemental awards sent by each gaming machine. The gaming machine sends information based on the outcome of the award attempt and the central controller increments the progressive awards by a certain amount based on this outcome (and the values sent by each gaming machine). Additionally, if a consolation prize is to be distributed between one or more of the progressive awards, the gaming machine sends appropriate messaging to the central controller.

In one embodiment, the gaming machine sends information to the central controller at the end of the award attempt, regarding the outcome of the award attempt. For example, a first progressive award, Progressive 1, has a value of $15.67 and at the end of the award attempt is associated with a supplemental award of $2.50. The gaming machine sends a message to the central controller indicating that the first progressive award should be incremented by the supplemental award (i.e., $2.50). In one embodiment, this calculation is done at the gaming machine level and is sent to the central controller (such as by a messaging saying "Increment Progressive 1 by $2.50"). The central controller then increments Progressive 1 by the appropriate amount and the progressive award reflects its new value of $18.17.

It should be appreciated that such messages, and other messages described herein, can be provided to the player before the award attempt, during the award attempt or after the award attempt.

In one embodiment as described above, the central controller and/or gaming device processor increases the selected progressive award by a predetermined amount or a supplemental award. The supplemental award may be associated with each eliminated game component. For example, if the central controller and/or gaming device processor associates a supplemental award, e.g., $0.50, with each game component, the central controller and/or gaming device processor increases the selected progressive award by $0.50 regardless of which game component the central controller and/or gaming device processor eliminates as indicated in block 256. Alternatively, the central controller and/or gaming device processor associates different supplemental awards with a plurality of the game components. For example, the central controller and/or gaming device processor associates one game component with a supplemental award of $0.50 and associates another game component with a predetermined amount of $0.75. In this example, the central controller and/or gaming device processor increases the selected progressive award by the supplemental award associated with the game component that the central controller and/or gaming device processor eliminates as indicated in block 256. After the central controller and/or gaming device processor increases the selected progressive award as indicated in block 218, the sequence 200 continues to block 220 in FIG. 4.

In one embodiment, the central server and/or the gaming device processor periodically determines to change the number of points associated with one of the awards and/or game components. The determination occurs at any time during the sequence 200 as an additional game feature. The central server and/or gaming device processor determines to provide the game feature to the player zero, one or a plurality of times during the sequence 200. The game feature may increase or decrease the likelihood of the player winning one of the awards during the sequence 200. For example, the player's likelihood of winning an award is increased if the number of points associated with the award is decreased. Alternatively, the likelihood of the player winning an award is increased if the number of points associated with one of the game components is increased.

In one embodiment, the game feature includes a plurality of outcomes, each associated with a characteristic, such as a number of points. The plurality of outcomes includes different outcomes that change the number of points associated with one of the awards and/or the number of points associated with one of the game components by different amounts. For example, the central server and/or the gaming device processor randomly selects an outcome associated with 10 points and decreases the number of points associated with one of the progressive awards by 10 points. Decreasing the number of points associated with one of the progressive awards increases the player's likelihood of winning that progressive award.

In an alternative embodiment, the central controller and/or gaming device processor enables the player to select one of the outcomes and the central server and/or the gaming device processor changes the number of points associated with one of the awards and/or the number of points associated with one of the game components by the number of points associated with the player selected outcome.

The game feature enables the player to change, such as increase or decrease, the number of points associated with one of the awards. In one embodiment, the central controller and/or gaming device processor randomly determines to provide the player with the game feature and enables the player to increase the likelihood of winning the highest award, e.g., progressive award 236*g*. In an alternative embodiment, the central controller and/or gaming device processor provides the player with the game feature in association with a predetermined event or time, such as when progressive 236*g* reaches a predetermined level, or occurs at a predetermined time. The determination to provide the game feature may be random, predetermined or otherwise determined to occur in any suitable manner by a game implementer.

In one embodiment, the sequence 200 designates one or more of the progressive awards as unavailable and disqualifies the designated and unavailable award(s) from selection by the player. The central controller and/or gaming device processor enables the player to select and play for any of the available progressive awards in sequence 200. At least one of the progressive awards remain unavailable to select and play for until the player satisfies a predetermined condition. The predetermined condition may require the player to win one of the available awards before being enabled to select and play for the designated and unavailable progressive award. If the player wins one of the available progressive awards, the central controller and/or gaming device processor designates one or more of the unavailable progressive awards as available and enables the player to select and play for the designated and previously unavailable progressive award. The available awards which the player selects, and the order in which the player selects such awards, influences whether the player will be enabled to play for the designated progressive award in the sequence 200.

In an alternative embodiment, the predetermined winning condition may require the player to win a plurality of the progressive awards or wager a predetermined minimum amount to play for the designated and previously unavailable progressive award.

In one embodiment, if all of the progressive awards are provided to the player, any supplemental awards associated with the progressive awards, the game components and any consolation awards are also provided to the player.

Referring now to FIGS. 9 to 33, the display device 16 illustrates one example of a game play screen for one embodiment of the award attempt described herein. For ease of illustration, the relevant game information for the award attempt is shown on the same display device 16. In alternative embodiments, the relevant game information for the award attempt is divided between different areas of the gaming device 10 or the display devices 16 and 18. Alternatively, the display device 18 is adapted to display the game play screen.

In one embodiment, the display device 16 is operable with the central controller and/or gaming device processor to display one embodiment of an award attempt in accordance with the present disclosure after a suitable triggering event. Upon a suitable triggering event, the central server and/or gaming device processor enables one or more players to attempt to win one or more of the progressive awards. The triggering event informs one or more players that an award attempt has been won. Appropriate messages such as "AWARD ATTEMPT WON!" or "BONUS WON!" may be provided to the player visually, or through suitable audio or audiovisual displays.

Figure 9:
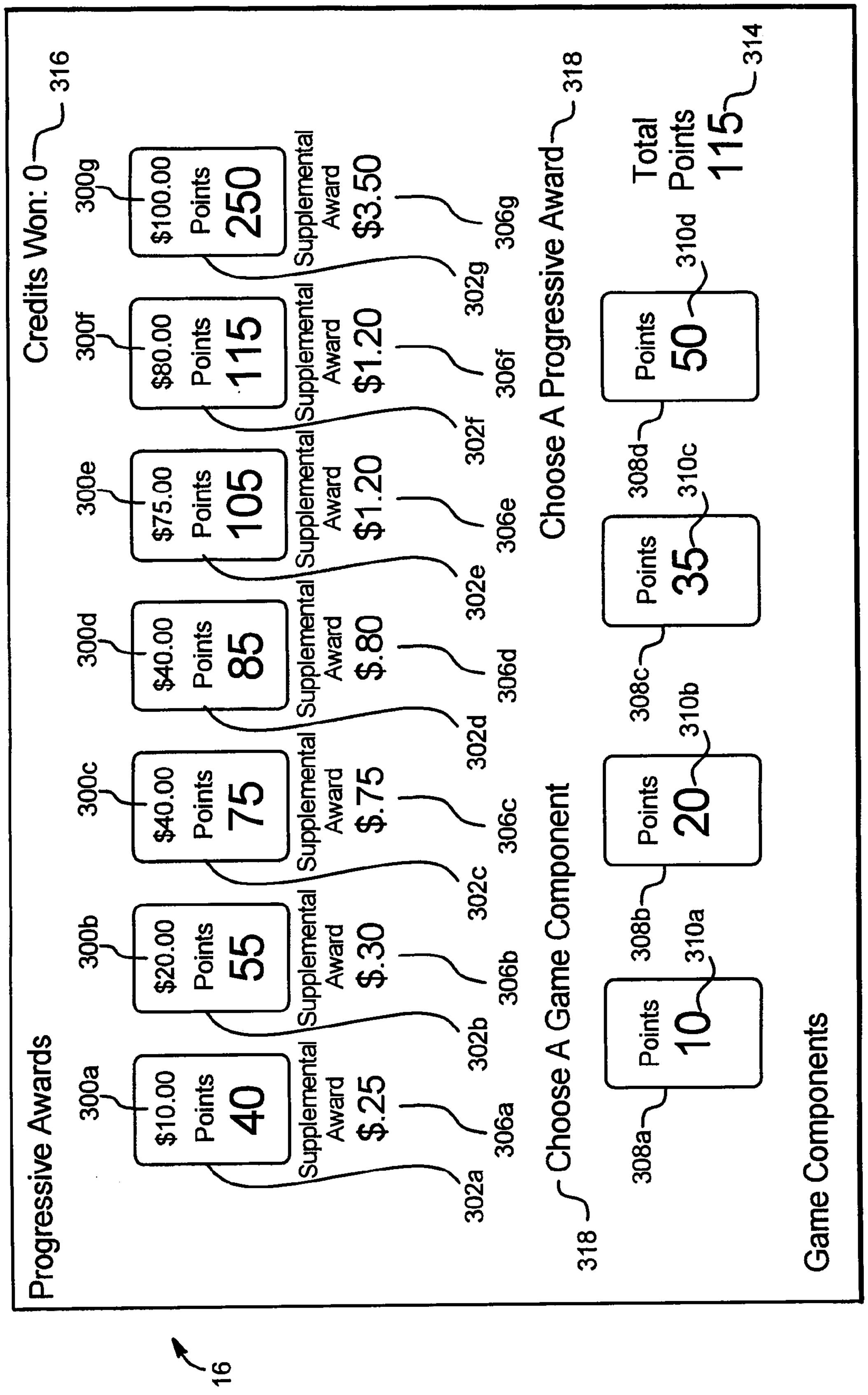
FIGS. 9 to 33 are enlarged front plan views of a display device of the gaming device and/or gaming system disclosed herein, illustrating an example of one embodiment of the present disclosure where a player is provided with an award attempt or game opportunity.

In one embodiment of the award attempt as illustrated in FIG. 9, the display device 16 is operable with the central controller and/or gaming device processor to display a plurality of the progressive awards 300*a* to 300*g*. The progressive awards 300*a* to 300*g* are displayed as symbols, characters, numbers, cards, or any other suitable form determined by the game implementer. In this embodiment, the highest award, e.g., progressive award 300*g*, is unavailable for selection by the player until the player wins one of the other awards 300*a* to 300*f*. In one embodiment, all of the progressive awards 300*a* to 300*g* are displayed to the player and are available for selection by the player. It should be appreciated that any number of the progressive awards 300*a* to 300*g* may be displayed in each award attempt. In one embodiment, the number of progressive awards increases in subsequent award attempts. For example, a first award attempt may provide the player with progressive awards 300*a* to 300*e*. A subsequent award attempt may provide the player with additional progressive awards, such as progressive award 300*f* and/or progressive award 300*g*. In one embodiment, each award attempt may provide the player with any combination of the progressive awards 300*a* to 300*g*.

As illustrated in FIG. 9, the progressive awards 300*a* to 300*g* are set at respective incremented levels of $10.00, $20.00, $40.00, $40.00, $75.00, $80.00 and $100.00. The incremented levels are displayed on the display device 16 in this embodiment. In this embodiment, the progressive awards 300*a* to 300*g* incremented from selected default levels, such as $0, before the award attempt was won. For example, the progressive awards 300*a* to 300*g* may be at levels equal to or higher than the default levels in each award attempt.

Each progressive award 300*a* to 300*g* is associated with a characteristic 302*a* to 302*g*, such as a number of points or metered values. The display device 16 displays the characteristics or number of points 302*a* to 302*g* in association with the progressive awards 300*a* to 300*g*. It should be appreciated that the characteristics associated with the progressive awards 300*a* to 300*g* may be displayed in other forms, such as in the form of symbols, characters, numbers, cards, card hand types (i.e., full house, flush or straight) or any other suitable form determined by the game implementer.

As illustrated in FIG. 9, the central controller and/or individual gaming device processor associates the first progressive award 300*a* with 40 award points. The central controller and/or individual gaming device processor associates the second progressive award 300*b* with 55 award points. The central controller and/or individual gaming device processor associates the third progressive award 300*c* with 75 award points. The central controller and/or individual gaming device processor associates the fourth progressive award 300*d* with 85 award points. The central controller and/or individual gaming device processor associates the fifth progressive award 300*e* with 105 award points. The central controller and/or individual gaming device processor associates the sixth progressive award 300*f* with 115 award points and associates the seventh progressive award 300*g* with 250 award points.

In one embodiment, the number of award points, or the range of award points, associated with each progressive award 300*a* to 300*g* is determined by the amount of the progressive award. For example, the central controller and/or gaming device processor associates high progressive awards, such as progressive awards 300*e* to 300*g*, with a high number of award points, such as 105, 115 and 250 points, respectively. The central controller and/or gaming device processor associates intermediate progressive awards, such as progressive awards 300*c* and 300*d*, with an intermediate number of award points, such as 75 and 85 points, respectively. The central controller and/or gaming device processor associates low progressive awards, such as progressive awards 300*a* and 300*b*, with a low number of award points, such as 40 and 55 points, respectively. In this example, the central controller and/or gaming device processor associates each progressive award with a separate range of award points, wherein the central controller or gaming device processor randomly determines the number of points associated with each progressive award from the separate range of points for each progressive award.

As illustrated in FIG. 9, the display device 16 is operable with the central controller and/or gaming device processor to display a plurality of supplemental awards 306*a* to 306*g*. The central controller and/or the gaming device processor associates each supplemental award 306*a* to 306*g* with one of the progressive awards 300*a* to 300*g*. The supplemental awards 306*a* to 306*g* may be predetermined, randomly determined, determined or weighted based on the player's wager, determined or weighted based on the status of one or more players (such as determined through a player tracking system), determined based on time, determined based on an outcome generated in a primary game or determined based on any other suitable method. In this embodiment, each supplemental award 306*a* to 306*g* is predetermined based on the level of each progressive award 300*a* to 300*g*. For example, the central controller or gaming device processor associates low progressive awards, such as progressive awards 300*a* and 300*b*, with low supplemental awards, such as $0.25 and $0.30. In another example, the central controller or gaming device processor associates low progressive awards, such as 300*a* and 300*b*, with high supplemental awards, such as $1.25 and $2.30, to help the low progressive awards increment at a suitable rate. In one embodiment, the supplemental awards are not displayed to the players.

In FIG. 9, the central controller and/or gaming device processor associates the first progressive award 300*a* with a supplemental award of $0.25. The central controller and/or gaming device processor associates the second progressive award 300*b* with a supplemental award of $0.30. The central controller and/or gaming device processor associates the third progressive award 300*c* with a supplemental award of $0.75. The central controller and/or gaming device processor associates the fourth progressive award 300*d* with a supplemental award of $0.80. In this embodiment, the central controller and/or gaming device processor associates the fifth and sixth progressive awards 300*e* and 300*f* with the same supplemental award of $1.20. The central controller and/or gaming device processor associates the seventh progressive award 300*g* with a supplemental award of $3.50. In an alternative embodiment, the central controller and/or gaming device processor associates the progressive awards 300*a* to 300*g* with the same supplemental award, such as $0.80 as indicated by characteristic 302*d*. In another alternative embodiment, the supplemental awards are configured to be changeable between award attempts, such as based on wager history, based on player status or based upon any other suitable factor as determined by the game implementer.

In FIG. 9, the display device 16 is operable with the central controller and/or gaming device processor to display a plurality of game components 308*a* to 308*d*. The game components 308*a* to 308*d* are displayed as symbols, characters, numbers, cards, player cards or any other suitable form determined by the game implementer. In one embodiment, the display device 16 displays the plurality of game components 308*a* to 308*d* to the player, wherein each game component 308*a* to 308*d* is available for selection by the player.

In different embodiments, the central controller and/or gaming device processor determines to display a number of game components that is greater than, less than or equal to the number of progressive awards. In another embodiment, the central controller and/or gaming device processor determines to display one game component. It should be appreciated that the central controller and/or gaming device processor may display any number of the game components for each award attempt.

In one embodiment, the central controller and/or gaming device processor increases the number of displayed game components in subsequent award attempts. For example, a first award attempt may provide the player with game components 308*a* to 308*d*. In a subsequent award attempt, the central controller and/or gaming device processor may display the player with additional game components, such as game components 308*f* and/or 308*g* (not shown). In one embodiment, the central controller and/or gaming device processor determines to provide and display any combination of the game components 308*a* to 308*g*.

Each of the game components 308*a* to 308*g* is associated with a characteristic 310*a* to 310*g*, such as a number of points or metered values. The characteristics 310*a* to 310*g* associated with the game components 308*a* to 308*g* and the characteristics 302*a* to 302*g* associated with the progressive awards 300*a* to 300*g* define a plurality of likelihoods of winning each of the progressive awards 300*a* to 300*g*. It should be appreciated that the characteristic 310*a* to 310*g* associated with each game component may be displayed in other forms, such as in the form of symbols, characters, numbers, cards, card hand types (i.e., full house, flush or straight) or any other suitable form determined by the game implementer.

As illustrated in FIG. 9, the central controller and/or gaming device processor associates the first game component 308*a* with 10 game component points. The central controller and/or gaming device processor associates the second game component 308*b* with 20 game component points. The central controller and/or gaming device processor associates the third game component 308*c* with 35 game component points. The central controller and/or gaming device processor associates the fourth game component 300*d* with 50 game component points.

The relationships between the characteristics or number of award points 302*a* to 302*g* associated with the progressive awards 300*a* to 300*g* and the characteristics or number of game component points 310*a* to 310*g* associated with the game components 308*a* to 308*g* indicate a probability or likelihood of winning one of the progressive awards 300*a* to 300*g* to the player. That is, the player may infer the likelihood of winning one of the progressive awards 300*a* to 300*g* based on these relationships. Based on probability or likelihood indicated or inferred by these relationships, the central controller and/or gaming device processor enables the player to select one of the progressive awards 300*a* to 300*g* and/or one of the game components 308*a* to 308*g*.

For example, the relationship between the characteristic 302*a* associated with the progressive award 300*a* and the characteristics 310*c* associated with the game component 308*c* defines the likelihood of the player winning the progressive award 300*a* if the player selects the game component 308*c*. Similarly, the relationship between the characteristic 302*a* associated with the progressive award 300*a* and the characteristics 310*b* associated with the game component 308*b* defines the likelihood of the player winning the progressive award 300*a* if the player selects the game component 308*b*.

As illustrated, the game component 308*b* is associated with 20 game component points, the game component 308*c* is associated with 35 game component points and the progressive award 300*a* is associated with 40 award points. If the player selects either the game component 308*b* or the game component 308*c*, the player has a low or intermediate chance of winning the progressive award 300*a* because the progressive award 300*a* is associated with more points than either of the game components 308*b* and 308*c*. The game component 308*c* is associated with more game component points than the game component 308*b* and gives the player a higher chance of winning the progressive award 300*a* than the game component 308*c*.

In one embodiment, the player plays for the progressive award 300*a* with the game component 308*b* in a first game event and plays for the progressive award 300*a* with the game component 308*c* in a second game event. The relationship between the characteristic 302*a* associated with the progressive award 300*a* and the characteristics 310*b* and 310*c* associated with the game components 308*b* and 308*c* defines the likelihood of the player winning the progressive award 300*a* if the player selects the game components 308*b* and 308*c* (e.g., in separate game events). That is, the probability or likelihood of winning one of the progressive awards 300*a* to 300*g* is indicated to the player or inferred by the player based on a total number of game component points associated with a plurality of game components. The player has an intermediate to high chance of winning the progressive award 300*a* because the game components 308*b* and 308*c* are collectively associated with more points than the progressive award 300*a*.

The central controller and/or gaming device processor enables the player to select which progressive award to play for in each game event based on the indicated or inferred probabilities or likelihoods determined from these relationships.

The display device 16 displays a game component point display 314. The game component point display 314 displays the total number of game component points associated with any game components 308*a* to 308*d* displayed to the player and available for selection. As the player progresses through the award attempt, the game component point display 314 updates to display the total game component points associated with the game components available for selection by the player. As shown in FIG. 9, the game component display 314 indicates that the player is provided with 115 game component points for this award attempt. As described above, the total number of game component points and the number of award points associated with one of the progressive awards 300*a* to 300*g* may indicate a probability or likelihood of winning that progressive award.

The display device 16 also displays an award meter 316. The award meter 316 indicates to the player how many credits or other type(s) of award(s) are provided in the award attempt. During the award attempt, any award received by a player is added to the award indicated by the award meter 316. Once the award attempt ends, the central controller and/or gaming device processor provides the award amount indicated by the award meter 316 to the player and adds the award amount to the credit meter 20 described above. As shown in FIG. 9, the award meter 316 indicates that the player's award is zero.

In one embodiment, the display device 16 displays instructions 318 to the player to advance the award attempt. Appropriate instructions such as "CHOOSE A PROGRESSIVE AWARD" or "CHOOSE A GAME COMPONENT" may be provided to the player visually, or through suitable audio or audiovisual displays.

Figure 10:
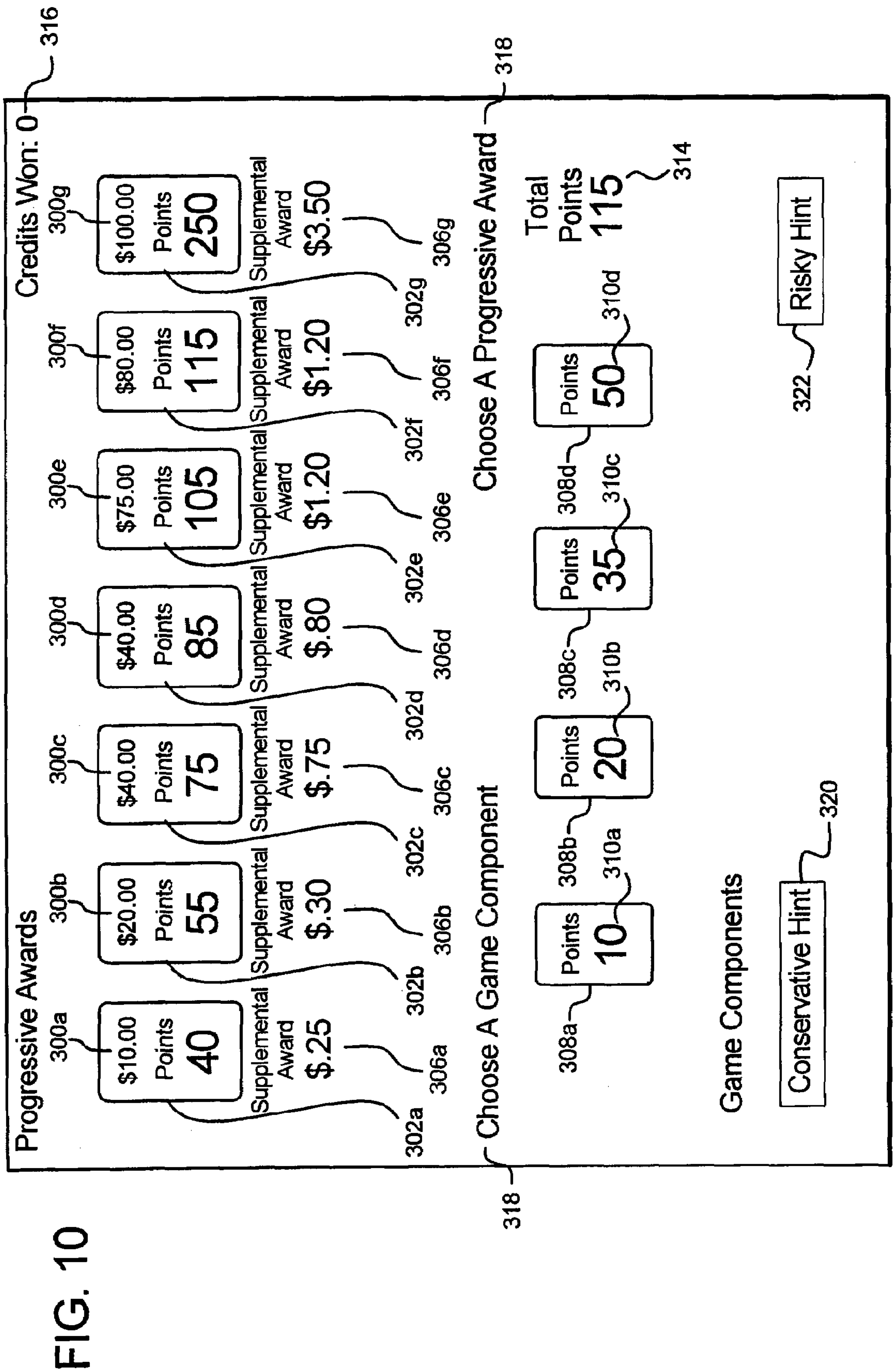

In FIG. 10, the display device 16 displays one or more hints or clues 320 and 322 to the player. In this embodiment, the hints 320 and 322 suggest which progressive award 300*a* to 300*g* for the player to select. In another embodiment, the hints suggest which progressive award 300*a* to 300*g* and/or which game component 308*a* to 308*d* to select. The hints inform the player to select a particular progressive award or a particular game component, or the hints inform the player to select a plurality of the progressive awards or a plurality of the game components in a particular order. Appropriate hints such as "GO FOR P2" or "GO FOR P5 THEN P1" may be provided to the player visually, or through suitable audio or audiovisual displays. In this example, "P1," "P2" and "P5" may correspond to the first, second and fifth progressive awards, 300*a*, 300*b* and 300*e*, respectively.

In one embodiment, the central controller and/or gaming device processor determines and displays the hints 320 and 322 based on the probability or likelihood of the player winning each of the progressive awards 300*a* to 300*g*. For example, hint 320 which is referred to as a conservative hint, suggests one or more progressive awards to the player that the player has a high likelihood of winning. Hint 322, which is referred to as a risky hint, suggests one or more progressive awards to the player that the player has a low or intermediate likelihood of winning. In one embodiment, the display device 16 displays the hints 320 and 322 simultaneously. In another embodiment, an additional wager is required to activate one or both of the hints 320 and 322. As illustrated in FIGS. 9 to 32, the central controller or the gaming device processor updates or changes the hints 320 and 322 based on the progress of the award attempt.

In one embodiment, the central controller and/or gaming device processor bases hints 320 and 322 on the number of award points associated with each award and the number of game component points associated with each game component displayed to the player. The central controller and/or gaming device determines which progressive award or awards to suggest to the player via hints 320 and 322. The hints 320 and 322 may be provided for any progressive award, such as a high award like progressive award 300*g*, or any order of awards, such as awards of different values like progressive awards 300*a* and 300*g*. In one embodiment, the central controller and/or gaming device provides one or more of the hints 320 and 322 to the player for each award selection. In another embodiment, the central controller and/or gaming device provides the hints 320 and 322 randomly, at a predetermined time or in another manner determined by the game implementer. In another embodiment, the central controller and/or gaming device processor may automatically pick one or more of the progressive awards and/or the game components for the player based on a conservative or risky strategy selected by the player and associated with the hints 320 and 322.

FIGS. 11 to 14 illustrate a first game event in the award attempt, wherein the player selects the game component 308*c* in an attempt to win the progressive award 300*a*.

Figure 11:
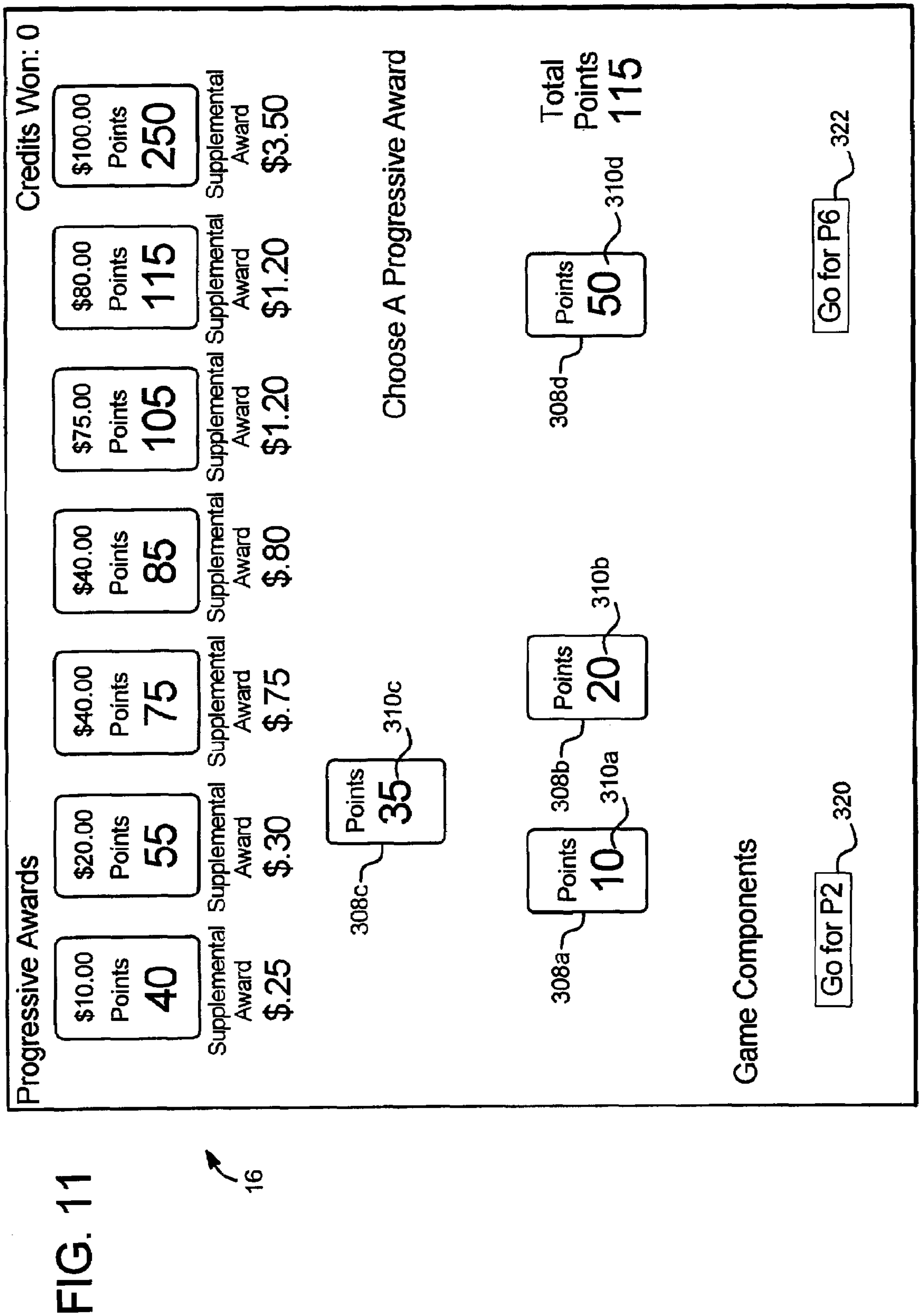

FIG. 11 illustrates the award attempt after the player selects the third game component 308*c*. The selected game component 308*c* is associated with 35 game component points. The player has not yet selected a progressive award to attempt to win. The conservative hint 320 suggests for the player to select the second progressive award 300*b*, which is associated with 55 award points. The player has 115 game component points as shown on the game component display 314. Since the total number of game component points is greater than the 55 award points associated with the second progressive award 300*b*, the player has an intermediate to high likelihood of winning the second progressive award 300*b*. The risky hint 322 suggests for the player to select the sixth progressive award 300*f*, which is associated with 115 award points. Since the total number of game component points is equal to the 115 award points associated with the sixth progressive award 300*f*, the player has a low to an intermediate likelihood of winning the sixth progressive award 300*f*. Selecting which progressive awards to play for, at least partially based on the number points associated with the progressive awards, introduces an element of skill or perceived skill into the award attempt.

Figure 12:
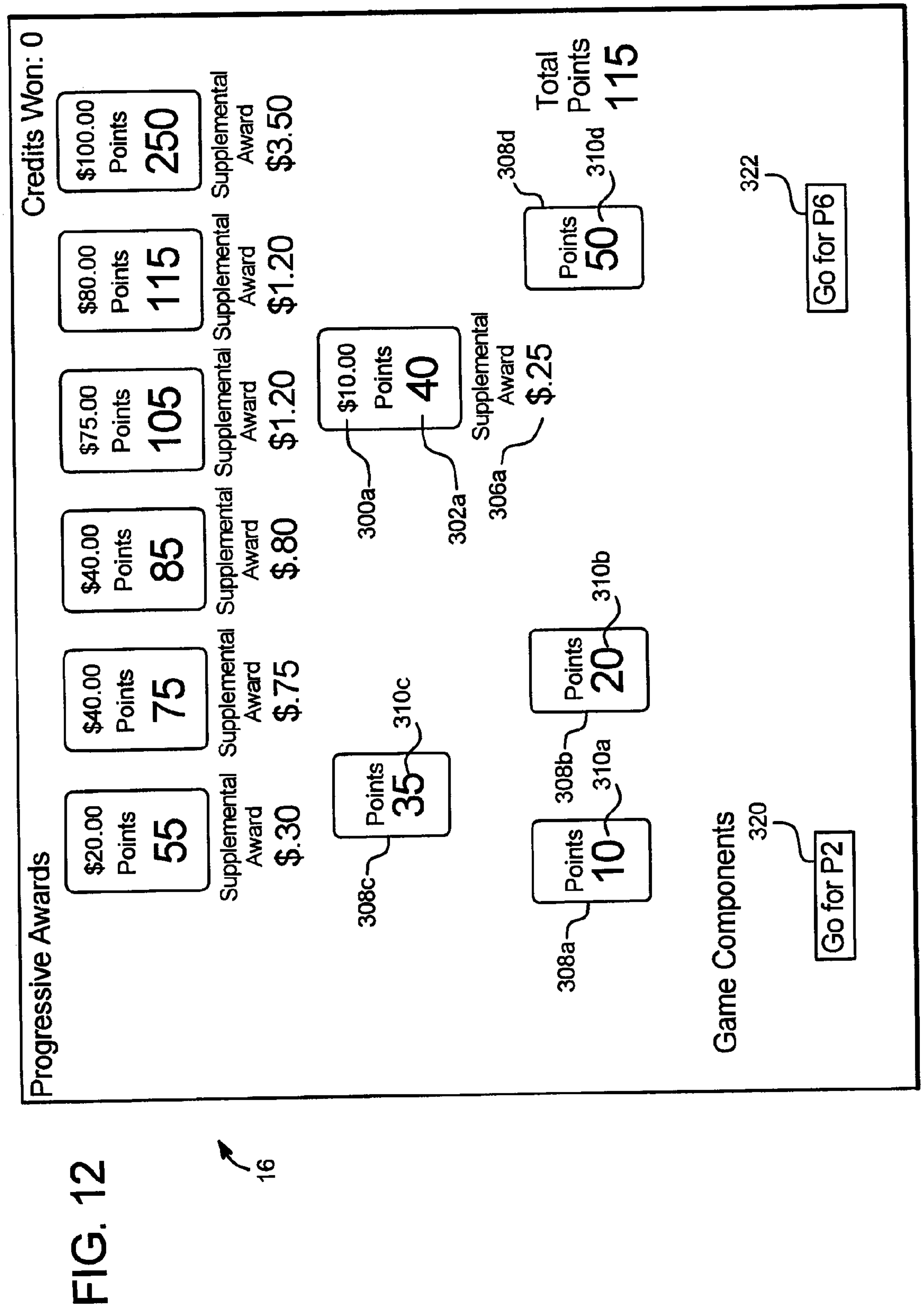

FIG. 12 illustrates the award attempt after the player selects the first progressive award 300*a*. As illustrated, the player may select the game component 308*c* before or after selecting one of the progressive awards 300*a* to 300*g* to play for. The central controller and/or gaming device processor enables the player to select the progressive awards and the game components in any order during the award attempt. In one embodiment, the central controller and/or gaming device processor automatically selects one of the game components 308*a* to 308*d* for the player after the player selects one of the progressive awards 300*a* to 300*g*. The automatic selection may optimize part of the play for the player, such as using the game component 310*a* to increase the supplemental award 306*a* before the player is awarded the progressive award 300*a*. Alternatively, the automatic selection may be random so that the central controller and/or gaming device processor randomly selects one of the game components 308*a* to 308*d* after the player selects one of the progressive awards 300*a* to 300*g*. In an alternative embodiment, the central controller and/or gaming device processor automatically selects one of the progressive awards 300*a* to 300*g* and one of the game components 308*a* to 308*d* for the player. In one embodiment, the player designates a strategy for the central controller and/or gaming device processor to follow when making such automatic selections. For example, one strategy may be conservative in which the central controller and/or gaming device processor selects one or more of the progressive awards that the player has a high likelihood of winning. Another strategy may be a risky strategy in which the central controller and/or gaming device processor selects the highest progressive award available to the player regardless of the likelihood of the player winning that progressive award. Alternatively, the central controller and/or gaming device processor randomly selects the progressive awards and/or the game components.

As illustrated in FIG. 12, the player selected the first progressive award 300*a* and the third game component 308*c*. The selected progressive award 300*a* is associated with 40 award points and the selected game component 308*c* is associated with 35 game component points. Since the selected progressive award 300*a* is associated with more points than the selected game component 308*c*, the player has a low to an intermediate likelihood of winning the selected progressive award 300*a* with the selected game component 308*c*.

The player deviated from the suggestions indicated by the conservative hint 320 and the risky hint 322 by selecting the first progressive award 300*a*. As illustrated, the display device 16 displays the selected progressive award 300*a* substantially adjacent to the selected game component 308*c* in a central portion thereof. Such a configuration allows the player to differentiate the selected progressive award 300*a* from the non-selected progressive awards 300*b* to 300*g* and to differentiate the selected game component 308*c* from the non-selected game components 308*a*, 308*b* and 308*d*. It should be appreciated that the selected and non-selected progressive awards and the selected and non-selected game components may be displayed in other suitable formats as determined by the game implementer.

After the player selects the selected progressive award 300*a* and the selected game component 308*c*, the central controller and/or gaming device processor determines a game event outcome. The game event outcome is based on a comparison or competition between the characteristics or number of points 306*a* associated with the selected progressive award 300*a* and the characteristics or number of points 310*c* associated with the selected game component 308*c*.

Figure 13:
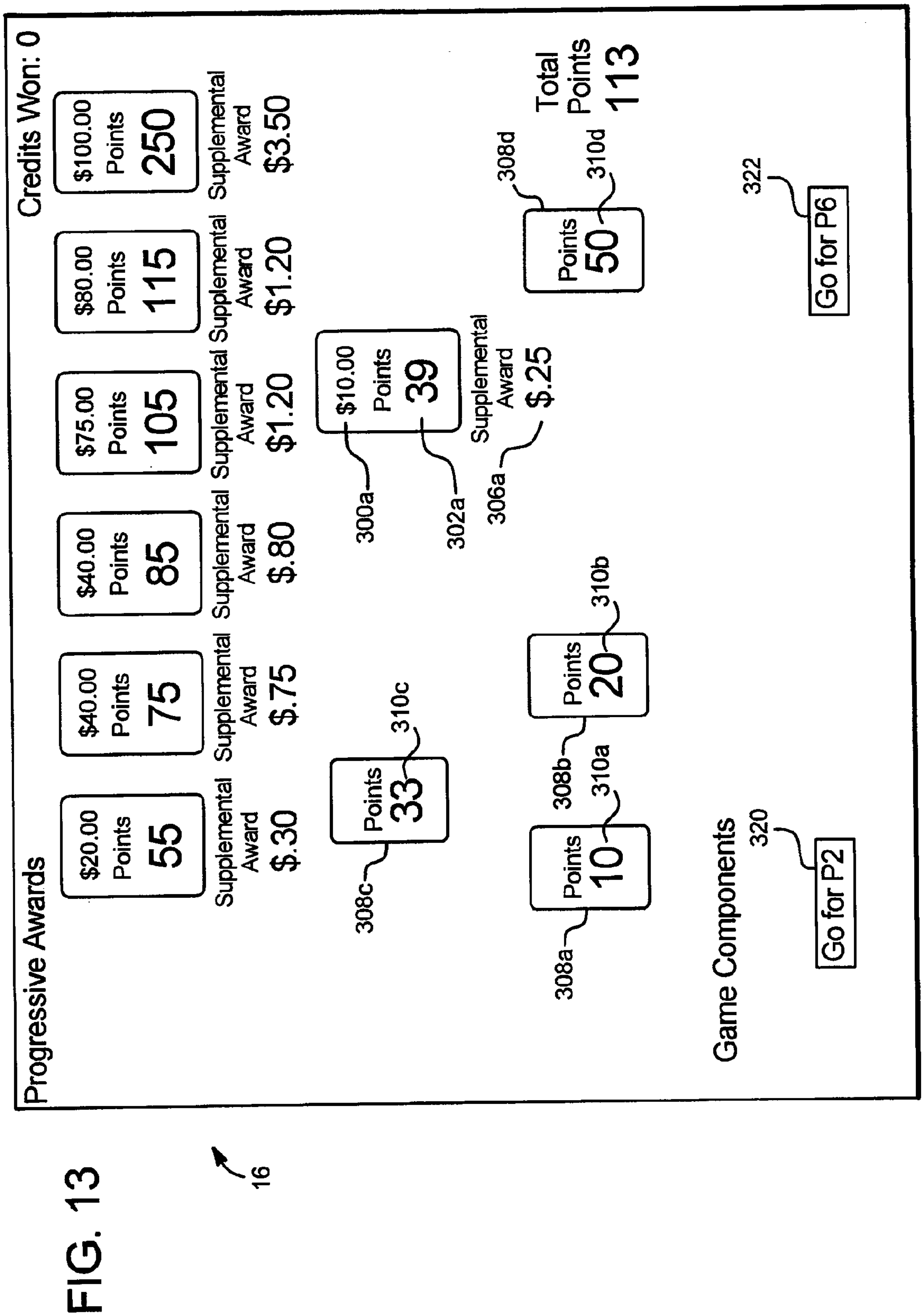

FIG. 13 illustrates the comparison or competition between the selected progressive award 300*a* and the selected game component 308*c*. For each competition, the central controller and/or gaming device processor generates one or more results or outcomes to determine a result of the competition. The result of the competition determines whether or not the central controller and/or gaming device processor provides the selected progressive award 300*a* to the player. The central controller and/or gaming device processor randomly selects the generated outcome from a plurality of outcomes. The plurality of generated outcomes may be the same or different for each game event or competition.

For one generated outcome (not shown), the central controller and/or gaming device processor modifies or changes the award points associated with the selected progressive award 300*a* by zero points. The central controller and/or gaming device processor also changes the game component points associated with the selected game component 308*c* by zero points. In this instance, the selected progressive award remains at 40 award points and the selected game component 308*c* remains at 35 game component points. This generated outcome neither increases or decreases the likelihood of the player winning the selected progressive award 300*a*.

In another generated outcome, the central controller and/or gaming device processor changes the award points associated with the selected progressive award 300*a* by 1 point. As illustrated in FIG. 13, the number of points associated with the selected progressive award 300*a* changes from 40 award points to 39 award points. This generated outcome increases the likelihood of the player winning the selected progressive award 300*a*.

In another generated outcome, the central controller and/or gaming device processor changes the game component points associated with the selected game component 308*c* by 2 points. As illustrated in FIG. 13, the number of points associated with the selected game component 308*c* changes from 35 game component points to 33 game component points. This generated outcome decreases the likelihood of the player winning the selected progressive award 300*a*. The game component display 314 is updated to indicate the change in the game component points. The game component display indicates that the player has 113 total game component points remaining at this point of the competition.

The central controller and/or gaming device processor continues to generate outcomes until the number of award points associated with the selected progressive award 300*a* and/or the number of game component points associated with the selected game component 308*c* reaches zero points. When the number of award points associated with the selected progressive award 300*a* and/or the number of game component points associated with the selected game component 308*c* reaches zero points, the competition ends.

In an alternative embodiment, one or more of the generated outcomes increase the number of award points associated with the selected award 300*a* and/or the number of game component points associated with the selected game component 308*c*. For example, if the selected game component is initially associated with 35 game component points (FIG. 9), one or more of the generated outcomes may increase the number of game component points to 40 game component points. This generated outcome increases the likelihood of the player winning the selected progressive award.

Figure 14:
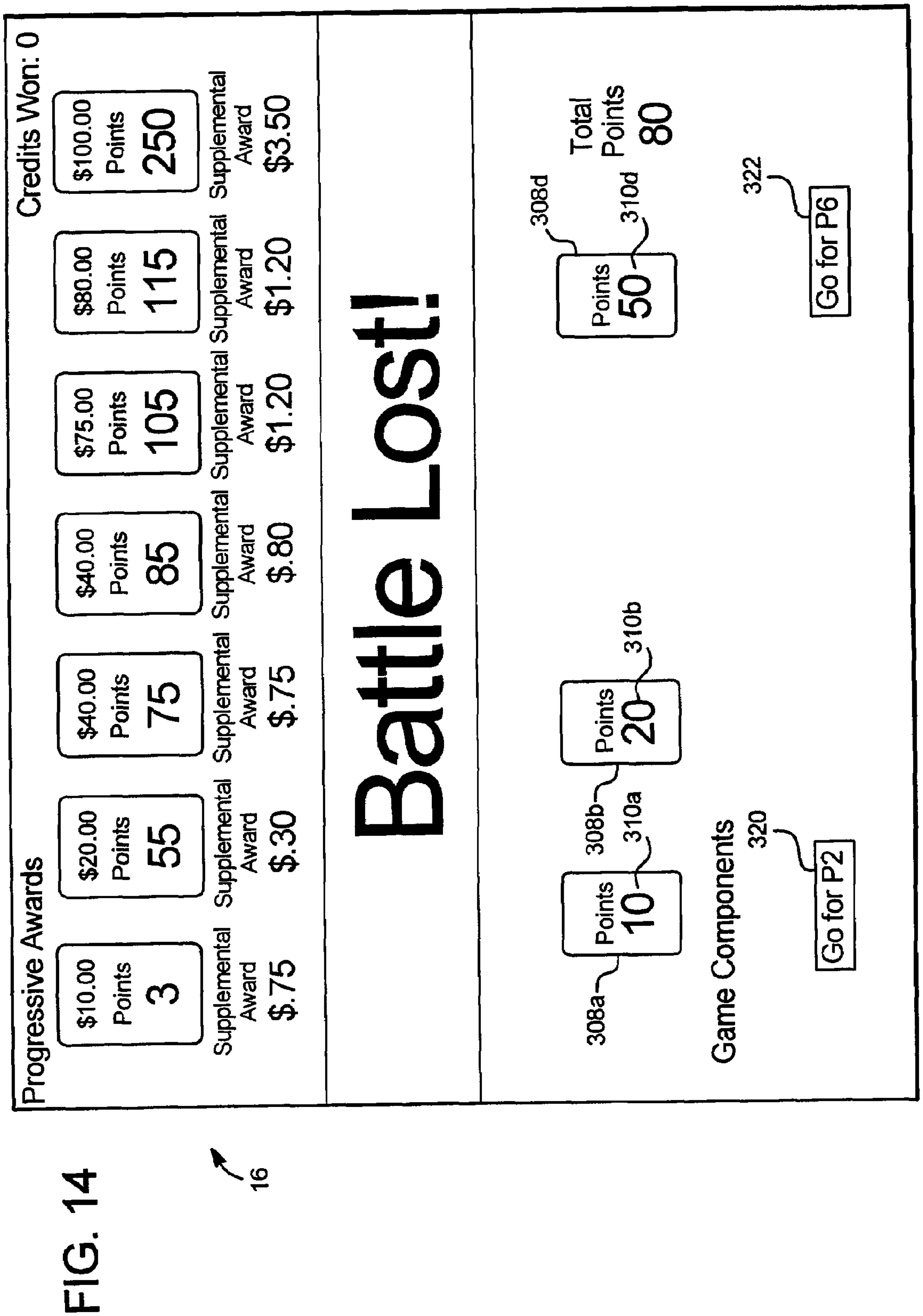

FIG. 14 illustrates the end of the competition between the selected progressive award 300*a* and the selected game component 308*c*. The central controller and/or gaming device processor eliminates the selected game component 308*c* during the competition and the eliminated game component 308*c* is not shown in FIG. 14. The competition resulted in the central controller and/or gaming device processor changing the number of game component points associated with the selected game component 308*c* to zero points and subsequently eliminating the selected game component 308*c*. Because the game component 308*c* was eliminated, the game component 308*c* is unavailable for player selection in future or subsequent game events. The modified number of game component points associated with the selected game component 308*c* changes the likelihood of the player winning the selected progressive award 300*a* with one of the remaining game components 308*a*, 308*b* and 308*d*. Display device 16 indicates the result of the competition to the player. Appropriate messages such as "BATTLE LOST!" or "COMPETITION LOST!" may be provided to the player visually, or through suitable audio or audiovisual displays.

Upon elimination of the game component 308*c*, the central controller and/or gaming device processor increases the supplemental award 306*a* associated with the progressive award 300*a*. The elimination is based, at least in part, on the determination by the central controller and/or gaming device processor to not provide the selected progressive award. As illustrated, the supplemental award 306*a* was increased from $0.25 to $0.75. The increase is attributed to a supplemental award of $0.50 associated with the eliminated game component 308*c*. In this embodiment, each game component 308*a* to 308*d* is associated with a supplemental award of $0.50, which is not displayed to the player. In an alternative embodiment, the supplemental award associated with each game component is displayed to the player.

One or more of the supplemental awards 306*a* to 306*g* and any corresponding progressive awards 300*a* to 300*g* increase by $0.50, $1.00 or $1.50 if the remaining game components 308*a*, 308*b* and 308*d* are eliminated. For example, if the player unsuccessfully tries to win the fourth progressive award 300*d* with the game components 308*a*, 308*b* and 308*d*, the supplemental award 308*d* will be increased from $0.80 to $2.30. Similarly, if the player unsuccessfully tries to win the fourth progressive award 300*d* with the game components 308*a* and 308*d*, the supplemental award 308*d* will be increased from $0.80 to $1.80. The central controller and/or individual gaming device processor increases the supplemental award, which increments the corresponding progressive award. The amount of the supplemental award may be set by the game implementer to ensure that one or more of the progressive awards increment at a suitable rate.

As illustrated in FIG. 14, the central controller and/or gaming device processor changed or modified the award points associated with the previously selected progressive award 300*a*. The number of award points now associated with the selected progressive award 300*a* is 3 award points. During the competition of FIG. 13, the central controller and/or gaming device processor decreased the progressive award 300*a* by 37 award points. The player has three game components 308*a*, 308*b* and 308*d* remaining for a subsequent competition. The game component display 314 indicates the total number of remaining game component points associated with the remaining game components 308*a*, 308*b* and 308*d*. The game component display 314 indicates that the remaining game components 308*a*, 308*b* and 308*d* are associated with 80 total game component points. The selected progressive award 300*a* was not won by the player, the award meter 316 equals zero.

FIGS. 15 to 19 illustrate a second game event in the award attempt, wherein the player selects the game component 308*b* in an attempt to win the progressive award 300*a*.

Figure 15:
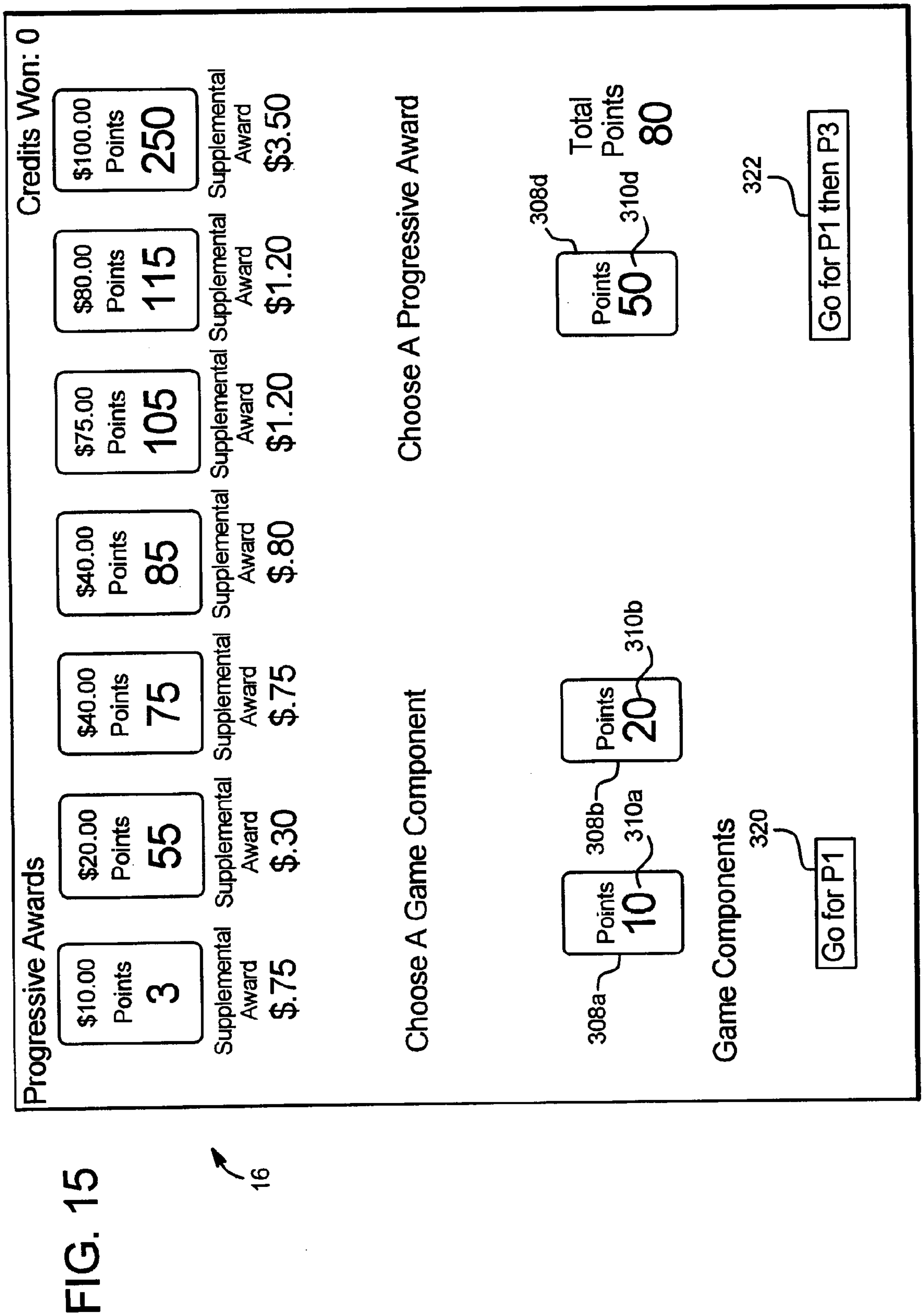

FIG. 15 illustrates display device 16 after the competition between the selected progressive award 300*a* and the selected game component 308*c*. Progressive awards 300*a* to 300*g* remain for selection by the player in a subsequent competition. Previously selected progressive award 300*a* was weakened by the previous competition (i.e., the number of award points 302*a* associated with the selected progressive award 300*a* decreased), which increases the player's chance of winning the selected progressive award 300*a* in a subsequent competition. Game components 308*a*, 308*b* and 308*d* remain for selection by the player for a subsequent competition. The display device 16 displays instructions 318 to the player to advance the award attempt. The hints 320 and 322 displayed to the player have changed. As a result of the competition, the total game component points have been reduced to 80 game component points as indicated by the game component display 314. The conservative hint 320 suggests for the player to select the progressive award 300*a*. The risky hint 322 suggests for the player to select the progressive award 300*a* before progressive award 300*c*.

Figure 16:
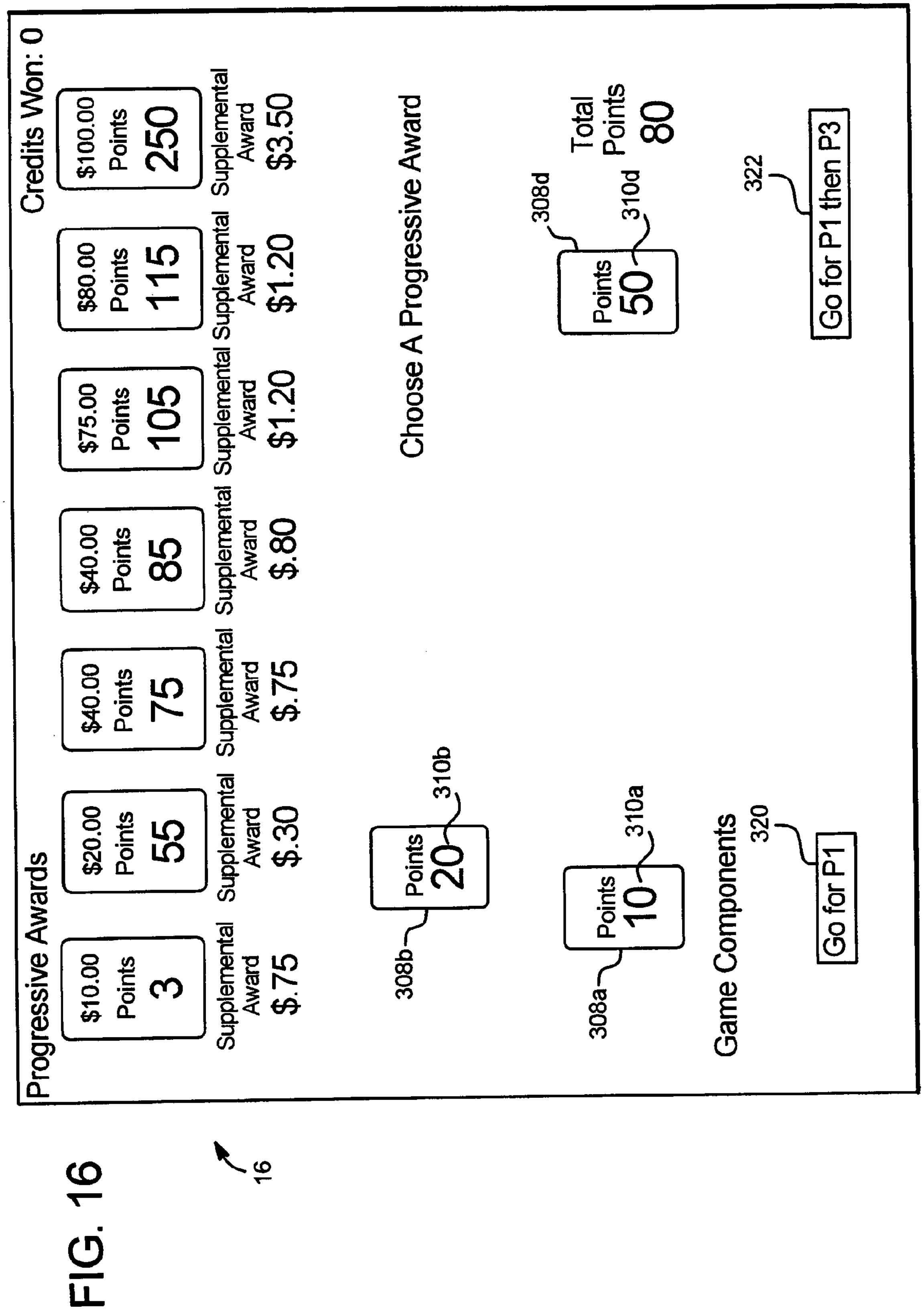

FIG. 16 illustrates the display device 16 after the player selects the game component 308*b* for the next competition. The selected game component 308*b* is associated with 20 game component points. Display device 16 displays the instructions 318 to the player to advance the award attempt. By selecting the game component 308*b*, the player has a higher likelihood of winning the first progressive award 300*a* than any of the other progressive awards 300*b* to 300*g*.

Figure 17:
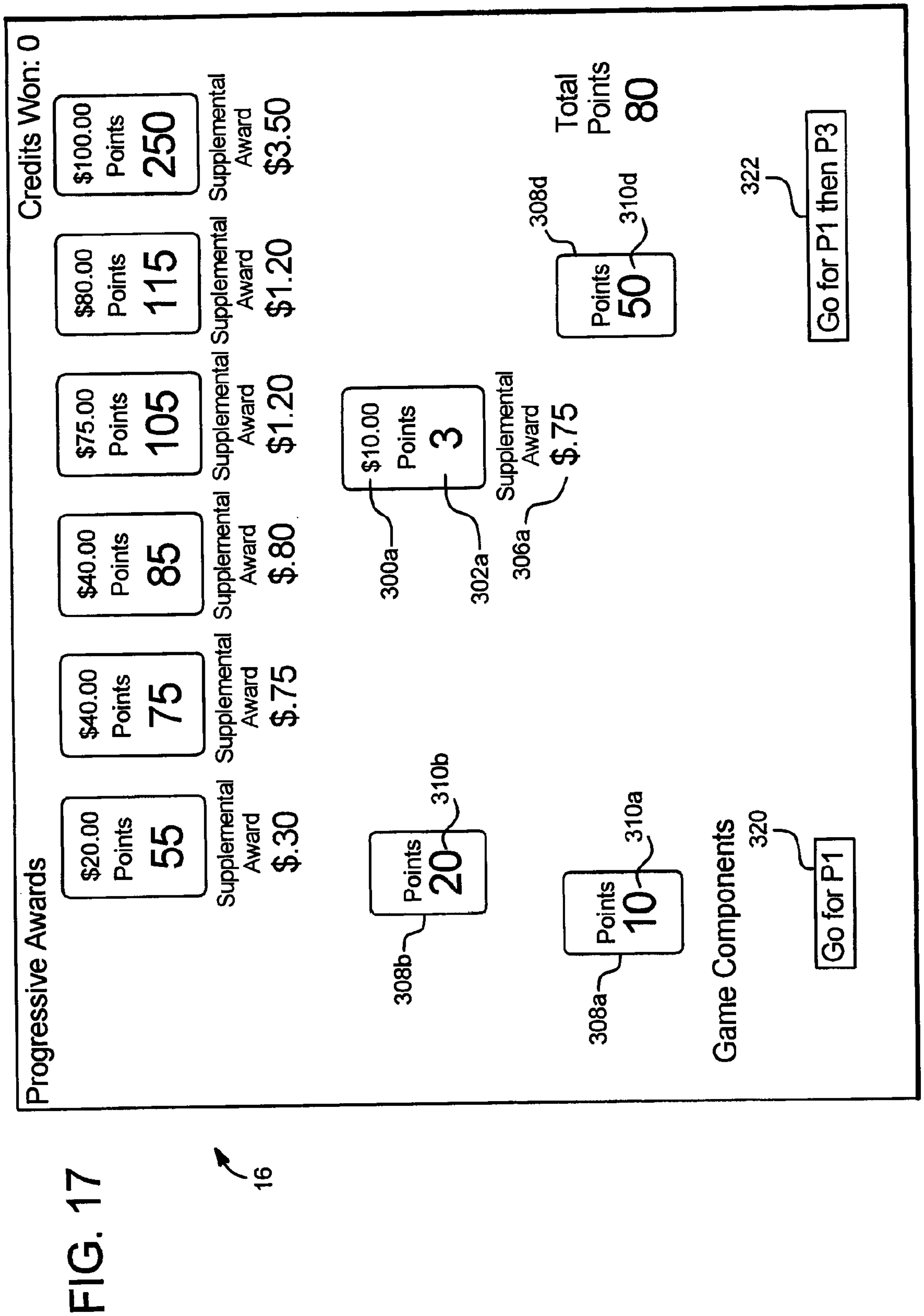

FIG. 17 illustrates the display device 16 after the player has selected the progressive award 300*a*. The selected progressive award 300*a* is associated with 3 award points. For this selection, the player followed the suggestions of the conservative hint 320 and the risky hint 322. After the player selects the progressive award 300*a*, the central controller and/or individual gaming device processor determines the game event outcome based on a comparison or competition between the selected award 300*a* and the selected game component 308*b*.

Figure 18:
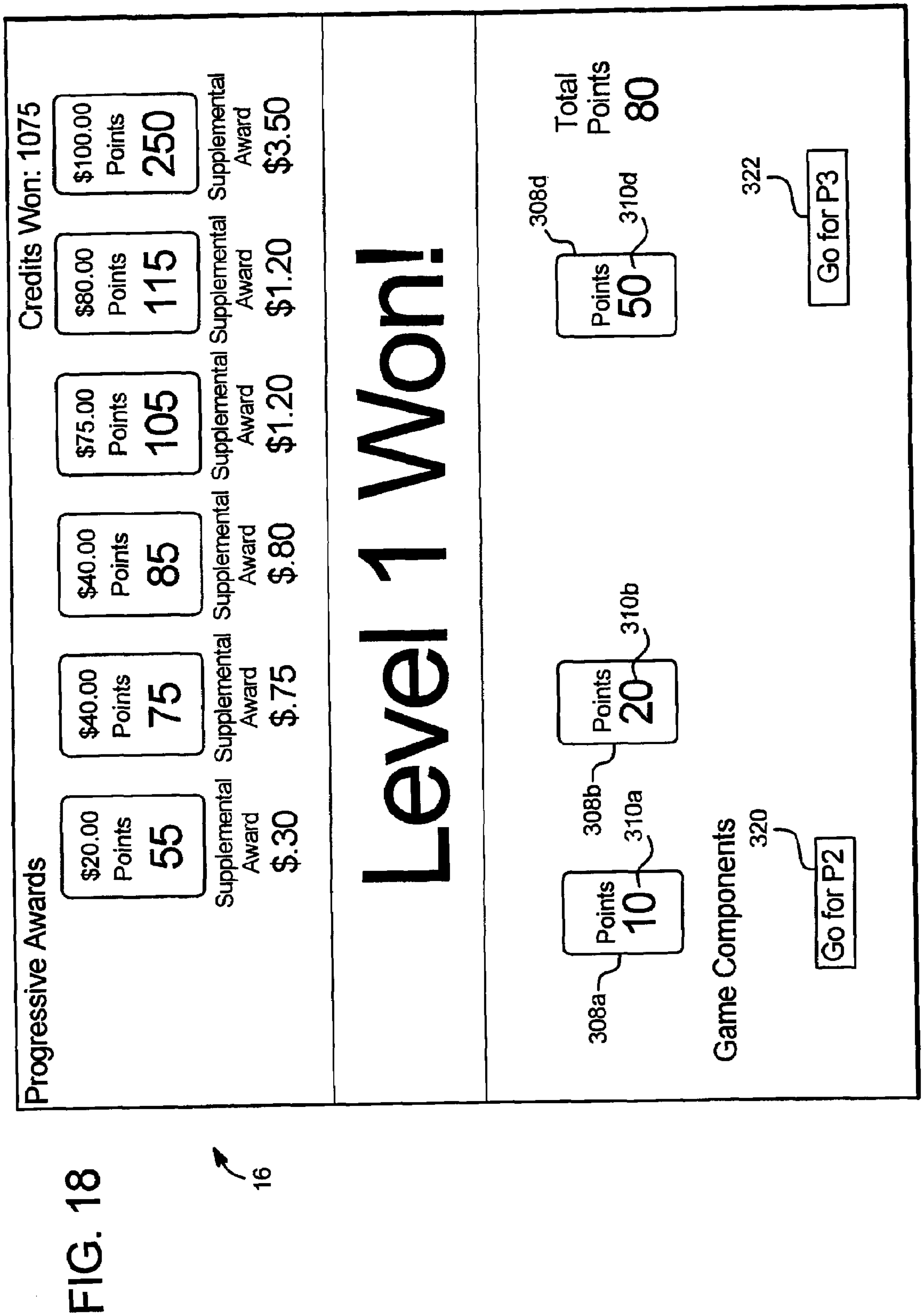

FIG. 18 illustrates a result of the competition between the selected progressive award 300*a* and the selected game component 308*b*. Based on the number of award points associated with the selected award 300*a* and the number of game component points associated with the selected game component 308*b*, the central controller and/or gaming device processor determined to provide the selected award 300*a* to the player during the competition.

During the competition, the central controller and/or individual gaming device processor changed the number of award points associated with the selected progressive award 300*a* to zero points. As a result, the central controller and/or individual gaming device processor provides the progressive award 300*a* and the supplemental award 306*a* to the player. The central controller and/or individual gaming device processor did not change the game component points associated with the selected game component 308*b* during the competition. The game component points associated with the game component 308*b* remain at 20 game component points for a subsequent competition. Because the game component 308*b* has 20 remaining game component points, the game component 308*b* is available to the player and may be reused in a future or subsequent game event.

The award meter 316 displays the amount of the progressive award 300*a* (i.e., $10.00 or 1000 credits) and the amount of the supplemental award 306*a* (i.e., $0.75 or 75 credits) as a total win (i.e., $10.75 or 1075 credits) won by the player. In this embodiment, one credit equals $0.01. The award meter 316 may display credits in any denomination set for the gaming system and/or gaming device. The player has three game components 308*a*, 308*b* and 308*d* remaining after the competition. The remaining game components 308*a*, 308*b* and 308*d* are associated with a total of 80 game component points as indicated by the game component display 314.

Display device 16 indicates the result of the competition to the player. Appropriate messages such as "LEVEL 1 WON!" or "COMPETITION WON!" may be provided to the player visually, or through suitable audio or audiovisual displays.

Figure 19:
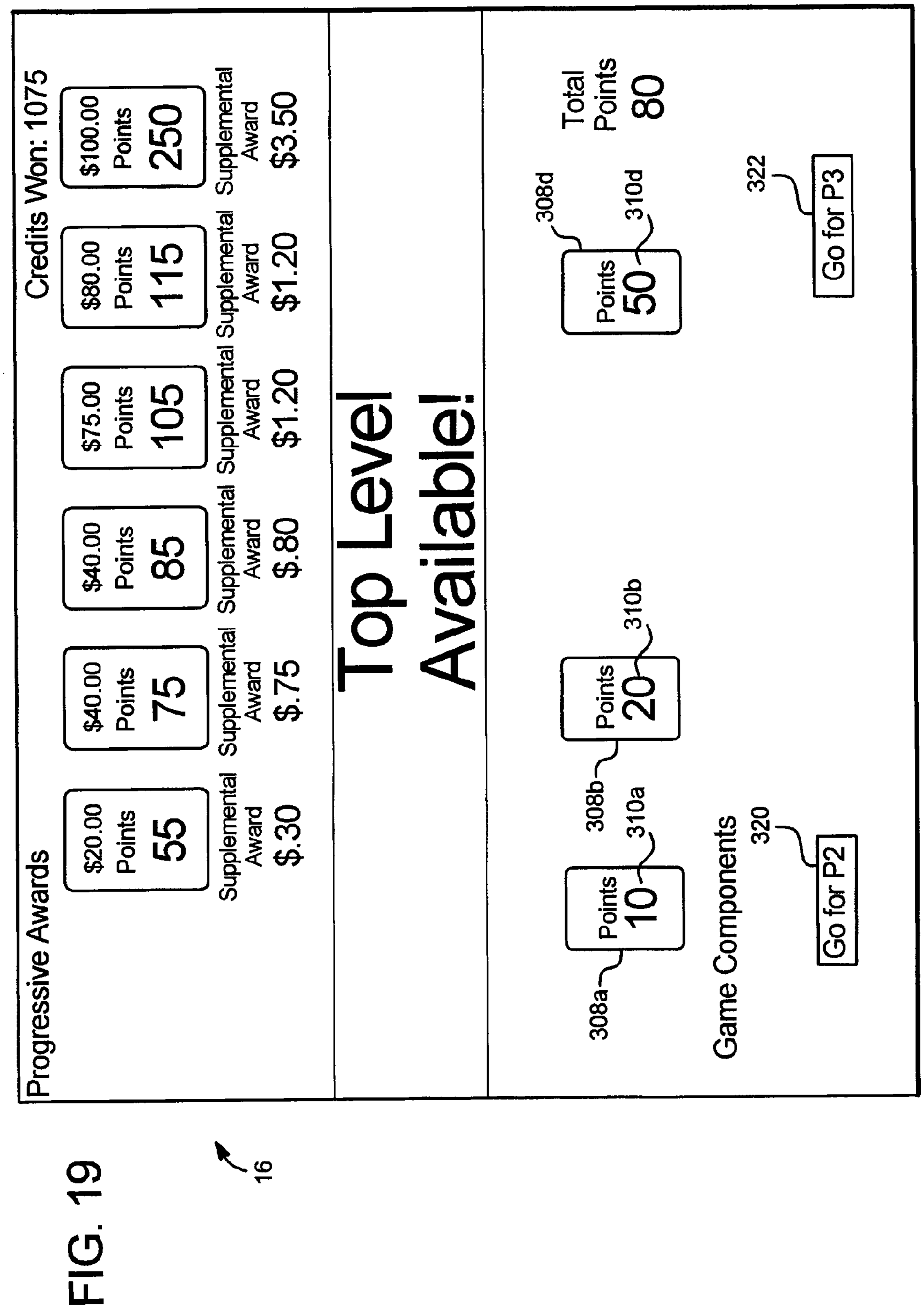

FIG. 19 illustrates the display device 16 after the player won the selected progressive award 300*a*. As described above, winning one of the progressive awards 300*a* to 300*f* satisfies a predetermined condition for the player to play for a top level progressive award, progressive award 300*g*. Since the player won the progressive award 300*a*, the central controller and/or individual gaming device processor enables the player to play for the top level or highest award 300*g* in subsequent competitions. Display device 16 indicates that the highest progressive award 300*g* is available for selection. Appropriate messages such as "TOP LEVEL AVAILABLE!" or "JACKPOT AVAILABLE!!" may be provided to the player visually, or through suitable audio or audiovisual displays.

FIGS. 20 to 23 illustrate a third game event in the award attempt, wherein the player selects the game component 308*a* in an attempt to win the progressive award 300*g*.

Figure 20:
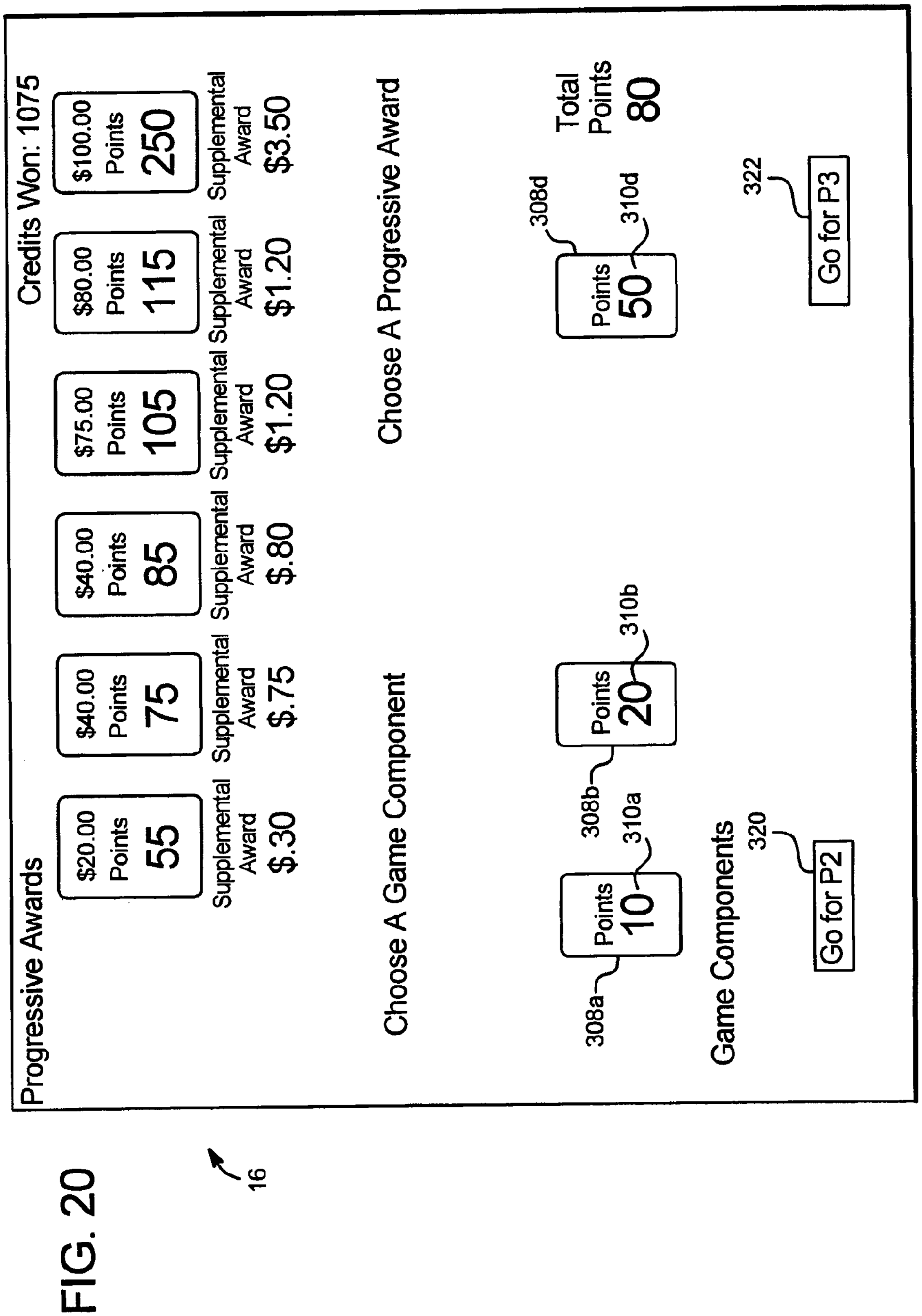

FIG. 20 illustrates the award attempt after the selected progressive award 300*a* was provided to the player. Display device 16 displays instructions 318 to the player to advance the award attempt. Appropriate instructions such as "CHOOSE A PROGRESSIVE AWARD" or "CHOOSE A GAME COMPONENT" may be provided to the player visually, or through suitable audio or audiovisual displays.

The display device 16 displays the progressive awards 300*b* to 300*g* that remain available for selection. The progressive award 300*a* is not shown because the progressive award 300*a* was provided to the player in a previous game event. In an alternative embodiment, the progressive award 300*a* is reset to an initial or base value and is associated with another number of award points. The central controller and/or gaming device processor may cause the display device to display the progressive award 300*a* having the reset value and associated with a new number of award points. In this embodiment, the central controller and/or gaming device processor enables the player to play for the reset progressive award.

The display device also displays the game components 308*a*, 308*b* and 308*d* that remain available for selection. The game component display 314 indicates that the remaining game components 308*a*, 308*b* and 308*d* total 80 game component points. Award meter 316 displays how many credits, i.e., 1075 credits, that the player has won in the award attempt.

The central controller and/or gaming device changes the hints 320 and 322 as a result of the progressive award 300*a* being provided to the player. The hints 320 and 322 now suggest for the player to select the progressive awards 300*b* and 300*c*, respectively. Progressive award 300*b* is associated with 55 award points and each of the game components 308*a*, 308*b* and 308*d* has a higher relative likelihood of winning the progressive award 300*b* than any other of the progressive awards 300*c* to 300*g*.

Figure 21:
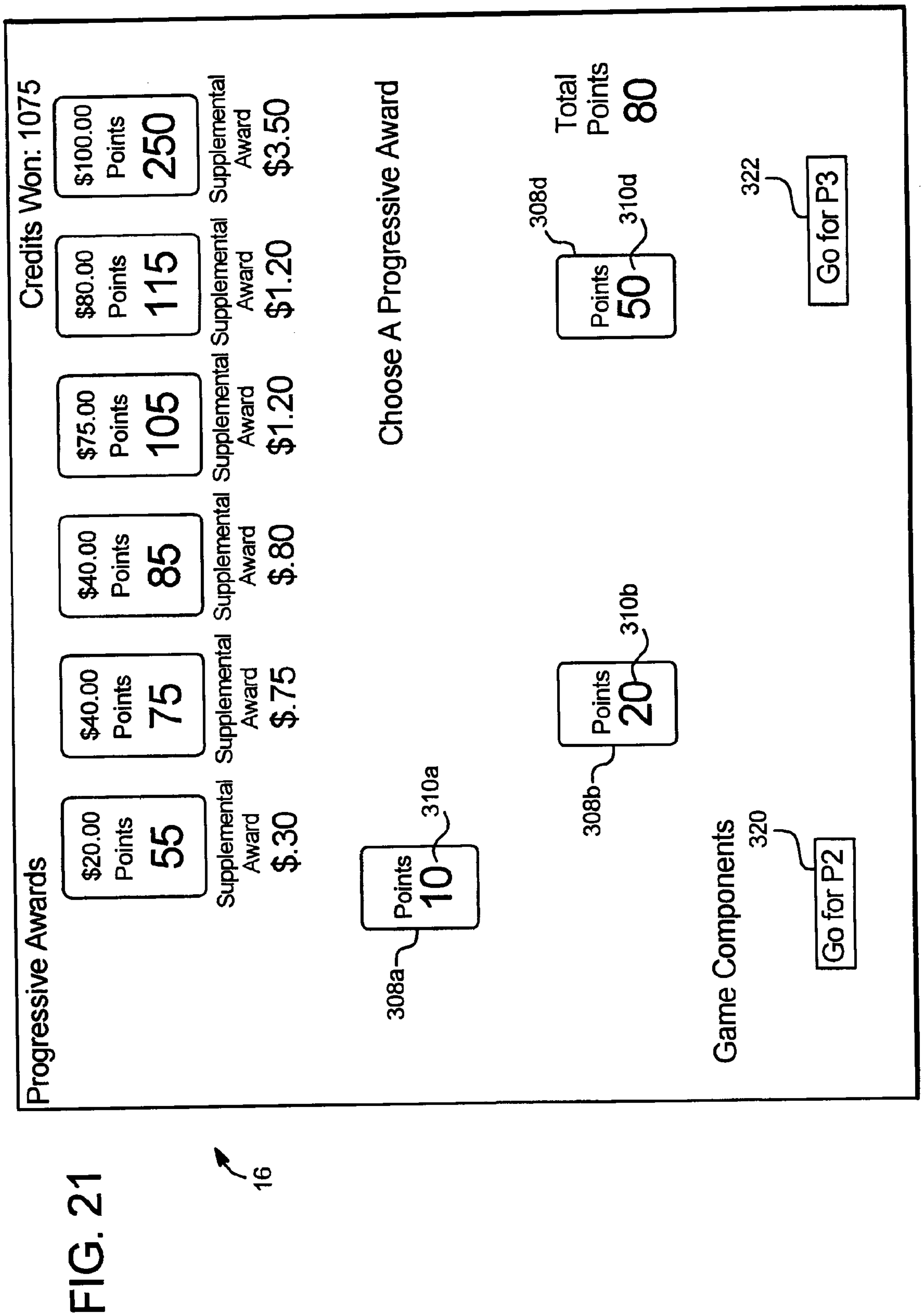

FIG. 21 illustrates the award attempt after the player selects the first game component 308*a*. The selected game component 308*a* is associated with 10 game component points. The player has not yet selected a progressive award to play for. Display device 16 displays instructions 318 to the player to advance the award attempt. Appropriate instructions such as "CHOOSE A PROGRESSIVE AWARD" or "CHOOSE A PROGRESSIVE CARD" may be provided to the player visually, or through suitable audio or audiovisual displays.

The conservative hint 320 suggests for the player to select the second progressive award 300*b*, which is associated with 55 award points. The risky hint 322 suggests for the player to select the third progressive award 300*c*, which is associated with 75 award points. The game component display 314 indicates that the remaining game components 308*a*, 308*b* and 308*d* have 80 total game component points. Since the total number of game component points is greater than the 55 award points associated with the second progressive award 300*b*, the player has an intermediate to high likelihood of winning the second progressive award 300*b*. The player has an intermediate to low likelihood of winning the third progressive award 300*c* since that progressive award is associated with 75 award points. The player has a low likelihood of winning any of the other progressive awards 300*d* to 300*g* since each is associated with at least 85 award points.

Figure 22:
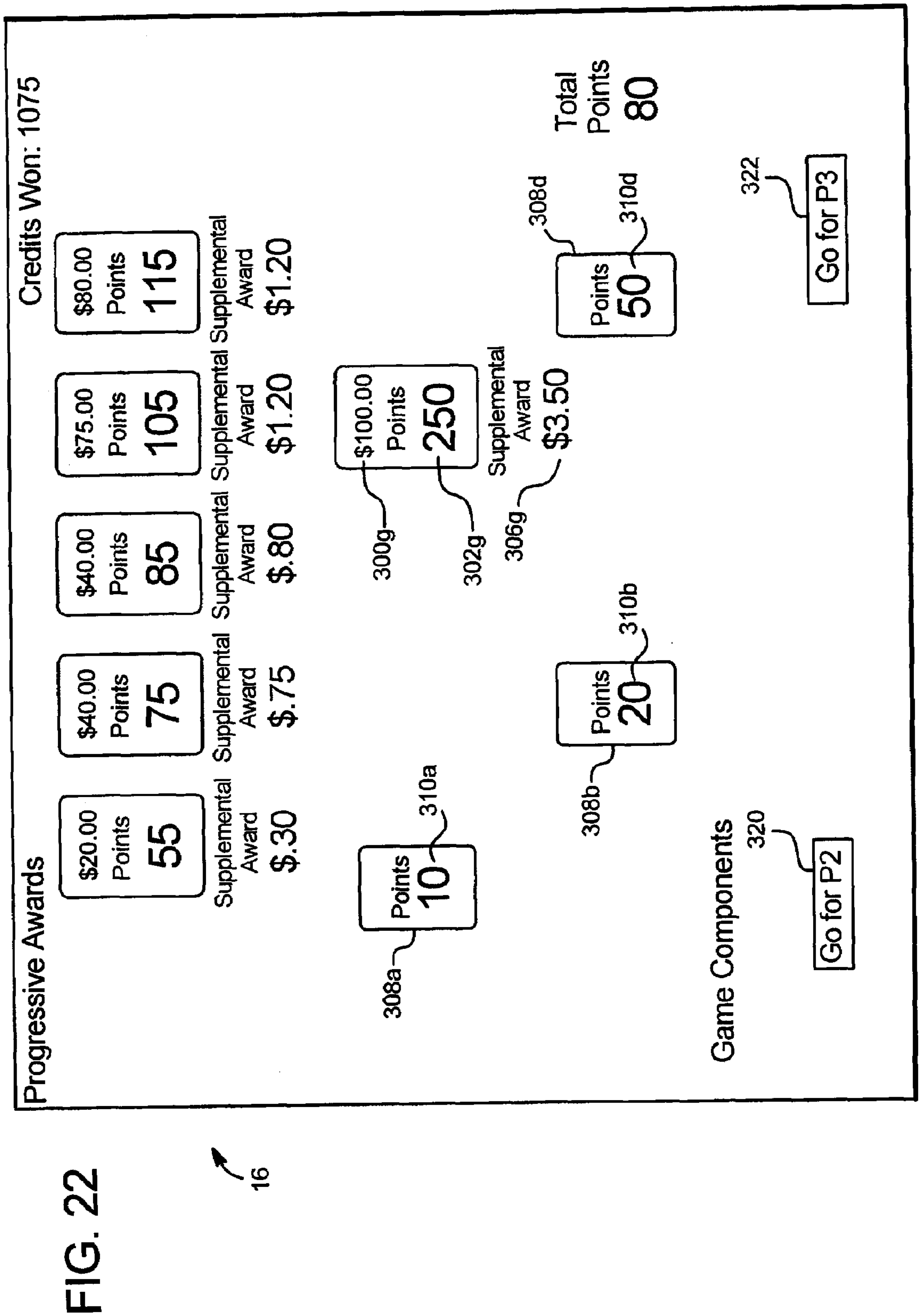

FIG. 22 illustrates the award attempt after the player selected the seventh progressive award 300*g*, which is the highest progressive award available to the player. The seventh progressive award 300*g* is associated with 250 award points. As illustrated, the player deviated from the suggestions of the conservative hint 320 and the risky hint 322 with this selection. The central controller and/or gaming device processor determines whether or not to provide the progressive award 300*g* to the player. Although not shown, a competition or comparison between the selected progressive award 300*g* and the selected game component 308*a* occurs.

Figure 23:
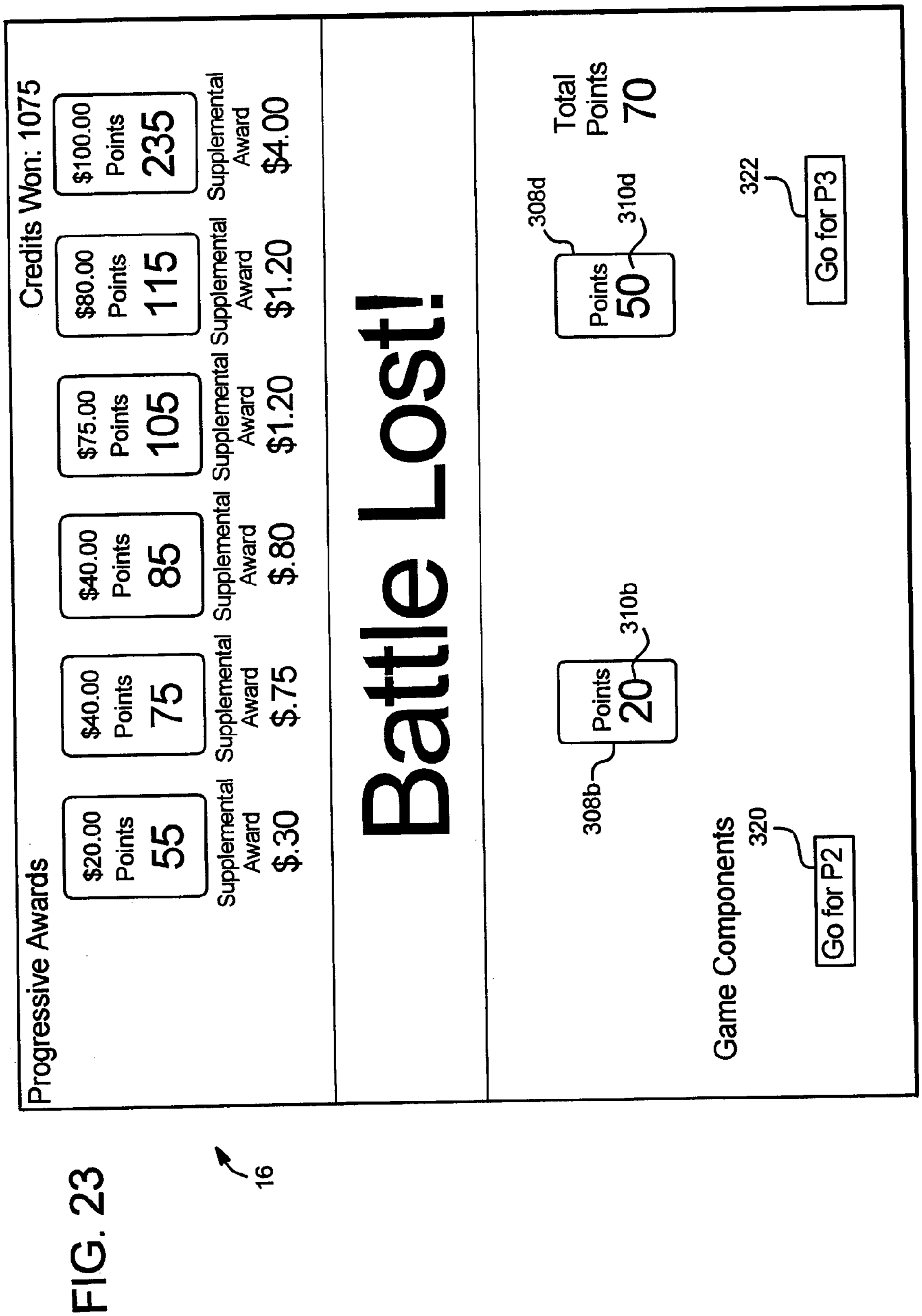

FIG. 23 illustrates the end of the competition between the selected progressive award 300*g* and the selected game component 308*a*. The central controller and/or gaming device processor determined not to provide the selected progressive award 300*g* to the player. Based on this determination, the central controller and/or gaming device processor eliminated the selected game component 308*a* during the competition. The eliminated game component 308*c* is not shown in FIG. 23.

The competition of FIG. 22 resulted in the central controller and/or gaming device processor changing or modifying the award points associated with the previously selected progressive award 300*g*. The number of award points now associated with the progressive award 300*g* is 235 award points. During the competition, the central controller and/or gaming device processor decreased the progressive award 300*g* by 15 award points.

The competition also resulted in the central controller and/or gaming device processor changing the number of game component points associated with the selected game component 308*a* to zero points and subsequently eliminating the selected game component 308*a*. Because the game component 308*a* was eliminated, the game component 308*a* is unavailable for player selection in future or subsequent game events. The modified number of game component points associated with the selected game component 308*a* changes the likelihood of the player winning the selected progressive award 300*g* with one of the remaining game components 308*b* and 308*d*. The game component display 314 indicates that the remaining game components 308*b* and 308*d* are associated with 70 total game component points.

Display device 16 indicates the result of the competition to the player. Appropriate messages such as "BATTLE LOST!" or "COMPETITION LOST!" may be provided to the player visually, or through suitable audio or audiovisual displays.

Upon the elimination of the game component 308*a*, the central controller and/or gaming device processor increases the supplemental award 306*g* associated with the selected progressive award 300*g*. The elimination is based, at least in part, on the determination by the central controller and/or gaming device processor to not provide the selected progressive award 300*g*. As illustrated, the supplemental award 306*g* increases from $3.50 to $4.00. The increase is attributed to a supplemental award of $0.50 associated with the eliminated game component 308*a*.

FIGS. 24 to 28 illustrate a fourth game event in the award attempt, wherein the player selects the game component 308*b* in an attempt to win the progressive award 300*b*.

Figure 24:
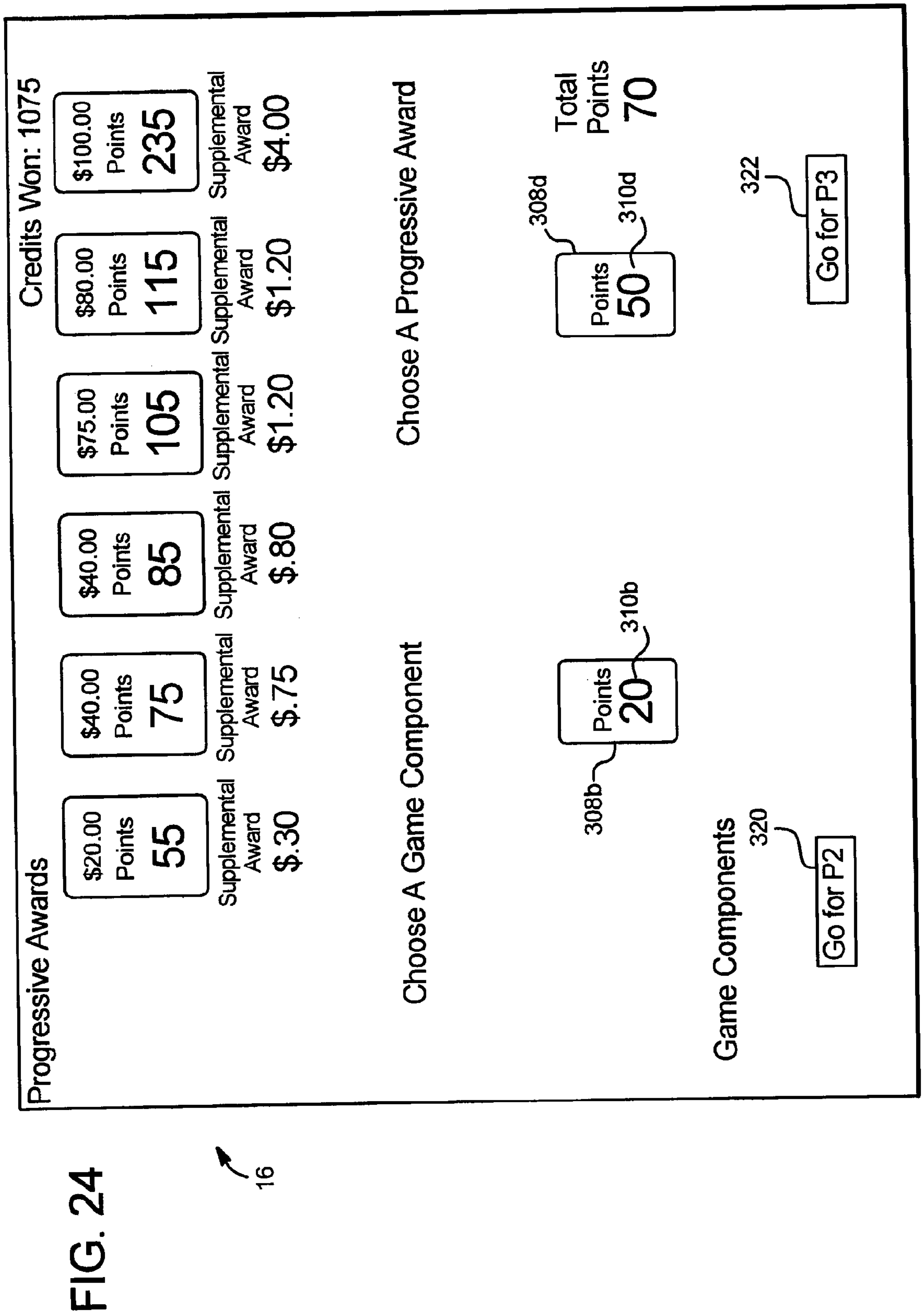

FIG. 24 illustrates the award attempt after the game component 308*a* was eliminated. Display device 16 displays instructions 318 to the player to advance the award attempt. Appropriate instructions such as "CHOOSE A PROGRESSIVE AWARD" or "CHOOSE A GAME COMPONENT" may be provided to the player visually, or through suitable audio or audiovisual displays. The player has two game components 308*b* and 308*d* remaining for selection. The game component display 314 indicates the total number of remaining game component points associated with the remaining game components 308*b* and 308*d* to be 70 total game component points. The hints 320 and 322 suggest for the player to select the progressive awards 300*b* and 300*c*, respectively.

Figure 25:
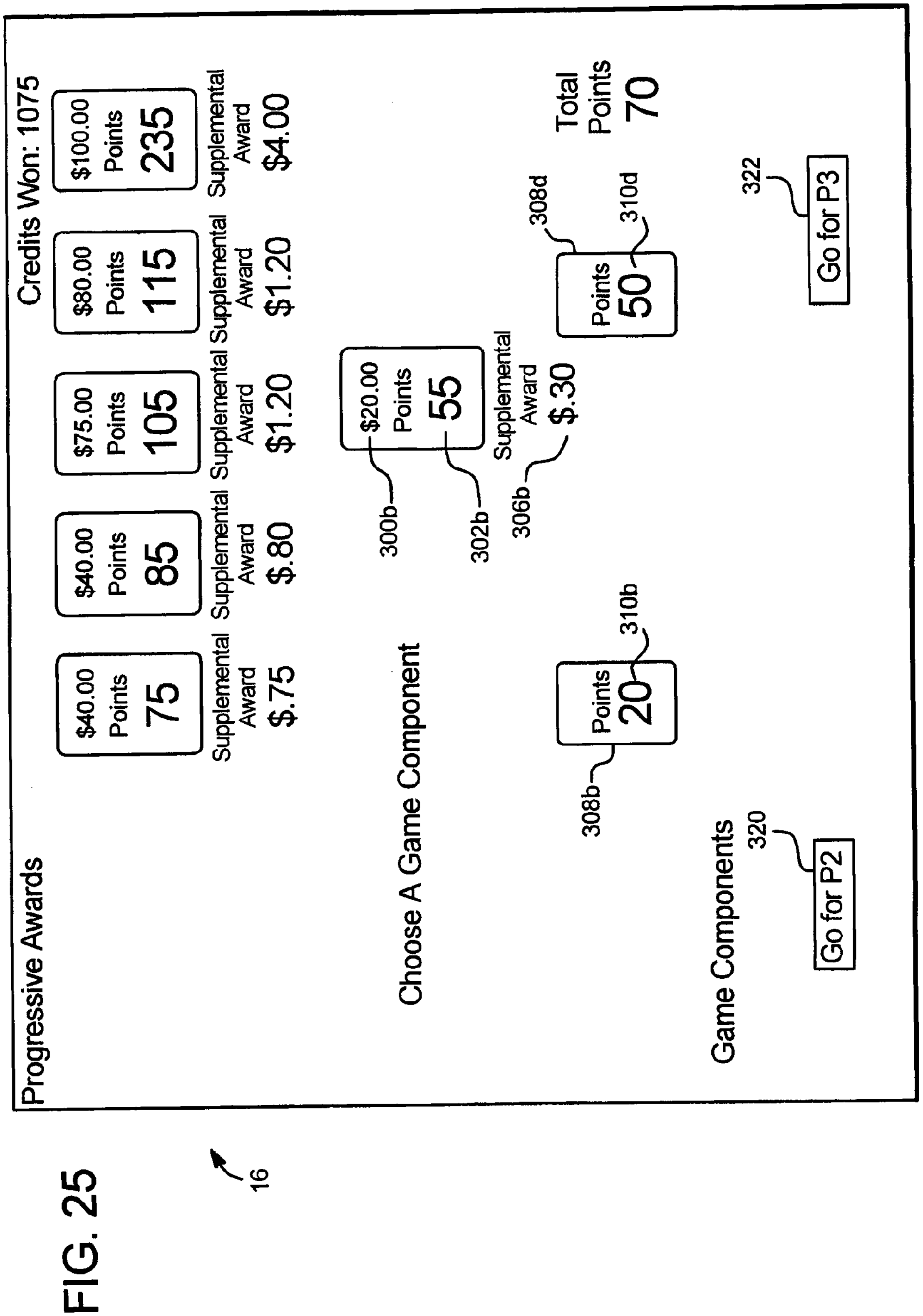

FIG. 25 illustrates the award attempt after the player selected the progressive award 300*b*. The second progressive award 300*b* is associated with 55 award points. As illustrated, the player followed the suggestions of the conservative hint 320 with this selection. The player has not yet selected a game component for a subsequent competition. Display device 16 displays instructions 318 to the player to advance the award attempt. Appropriate instructions such as "CHOOSE A GAME COMPONENT" or "CHOOSE A PLAYER CARD" may be provided to the player visually, or through suitable audio or audiovisual displays.

Figure 26:
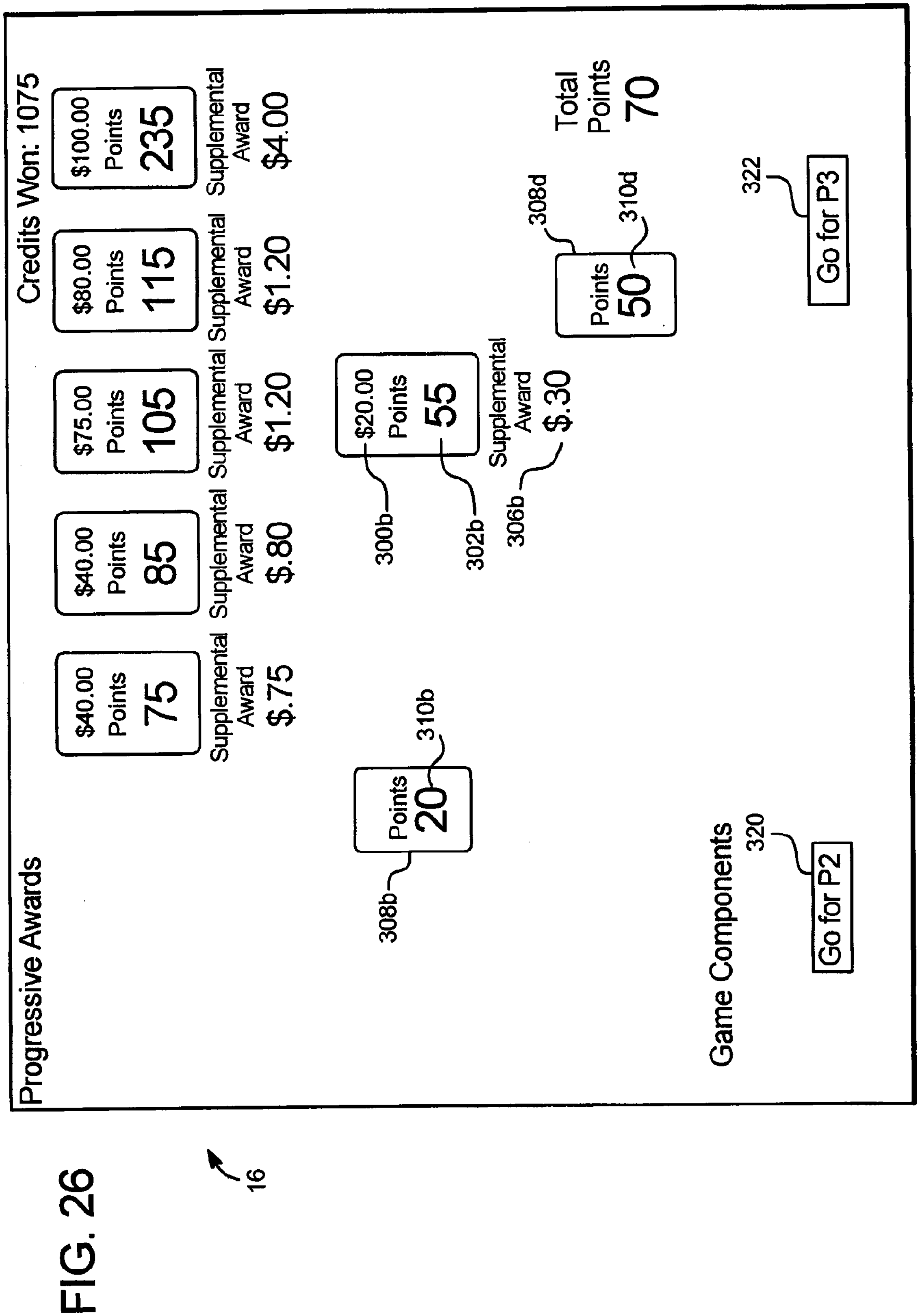

FIG. 26 illustrates the award attempt after the player selects the second game component 308*b*. The selected game component 308*b* is associated with 20 game component points. The likelihood for the player to win the second progressive award 300*b* is low because the award points associated with the progressive award 300*b* are greater than the game component points associated with the selected game component 308*b*. The central controller and/or gaming device processor determines whether to provide the selected progressive award 300*b* to the player. The determination is based on a competition or comparison between the game component 308*b* and the progressive award 300*b*.

Figure 27:
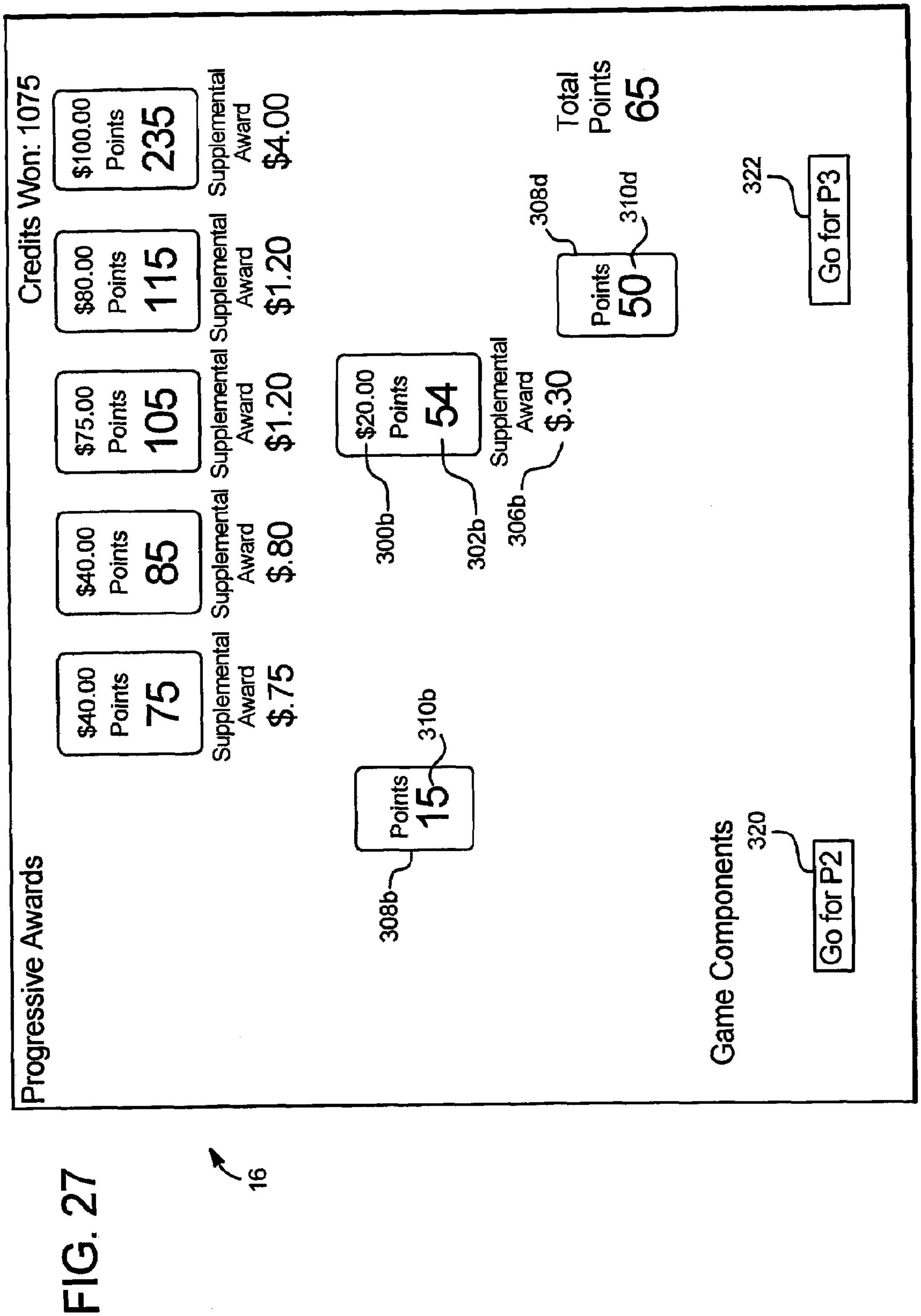

FIG. 27 illustrates the award attempt after the central controller and/or the gaming device processor generates one outcome for the competition. The generated outcome changes the game component points associated with the selected game component 308*b* by 5 points and changes the award points associated with the selected progressive award 300*b* by 1 point. As a result of the generated outcome, the game component 308*b* is now associated with 15 points and the selected progressive award 300*b* is now associated with 54 points. This generated outcome decreased the likelihood of the player winning the selected progressive award 300*b*. The game component display 314 indicates the change to the total number of game component points associated with the selected game component 308*b*. The game component display 314 indicates that the player has 65 total game component points remaining at this point of the competition.

Figure 28:
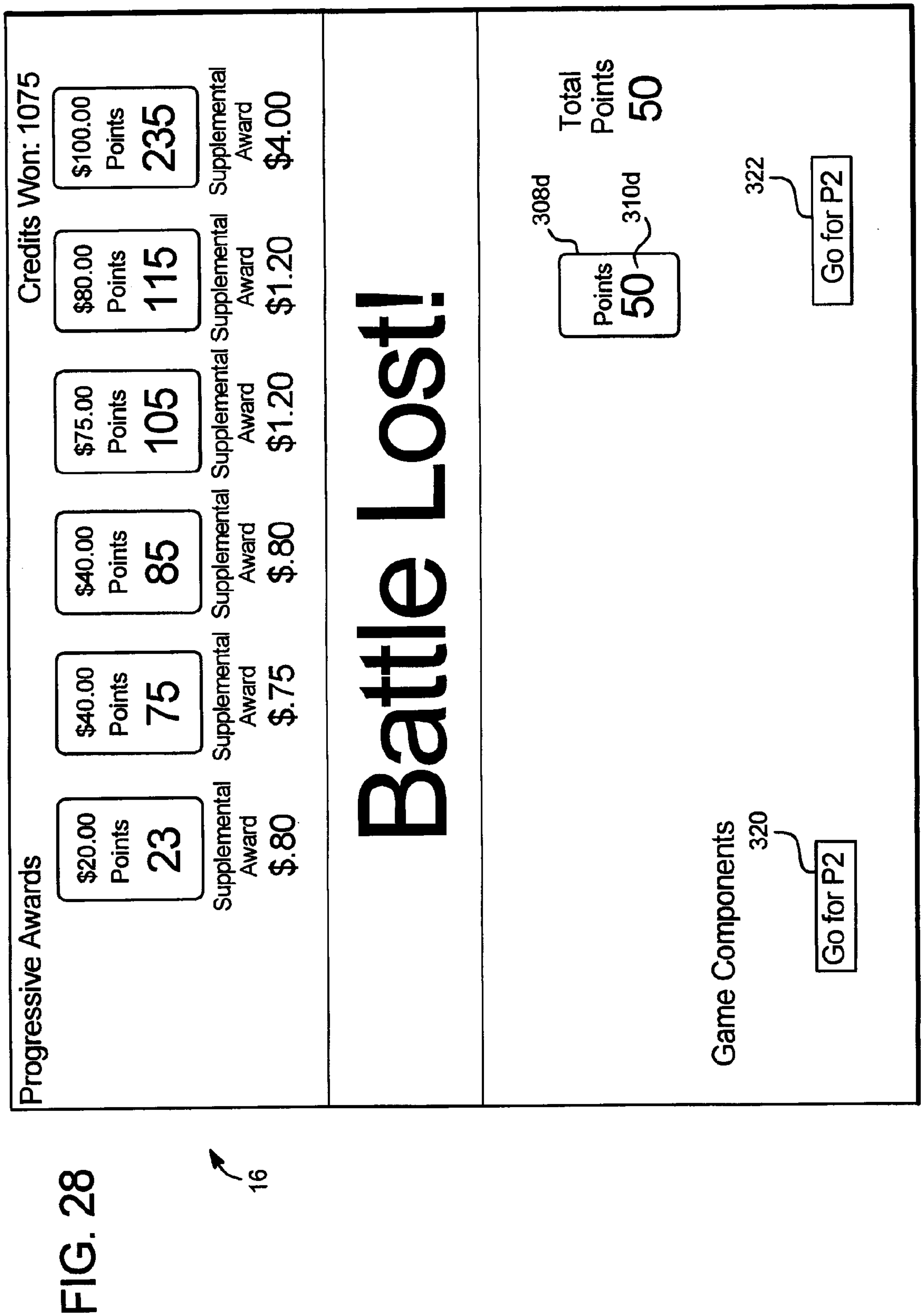

FIG. 28 illustrates the end of the competition between the selected progressive award 300*b* and the selected game component 308*b*. The central controller and/or gaming device processor eliminates the selected game component 308*b* during the competition and the eliminated game component 308*b* is not shown in FIG. 28. The competition resulted in the central controller and/or gaming device processor changing the number of game component points associated with the selected game component 308*b* to zero points and subsequently eliminating the selected game component 308*b*. Because the game component 308*b* was eliminated, the game component 308*b* is unavailable for player selection in future or subsequent game events. The modified number of game component points associated with the selected game component 308*b* changes the likelihood of the player winning the selected progressive award 300*b* with the remaining game component 308*d*. The game component display 314 indicates that the player has 50 game component points remaining for this award attempt. Progressive award 300*b* has 23 award points remaining and the player increased the likelihood of winning the progressive award 300*b* in a subsequent game event.

Display device 16 indicates the result of the competition to the player. Appropriate messages such as "BATTLE LOST!" or "COMPETITION LOST!" may be provided to the player visually, or through suitable audio or audiovisual displays.

Upon the elimination of the game component 308*b*, the central controller and/or gaming device processor increases the supplemental award 306*b* associated with the previously selected progressive award 300*b*. The elimination is based, at least in part, on the determination by the central controller and/or gaming device processor to not provide the selected progressive award 300*b*. As illustrated, the supplemental award 306*b* increases from $0.30 to $0.80. The increase is attributed to a supplemental award of $0.50 associated with the eliminated game component 308*b*.

FIGS. 29 to 32 illustrate a fifth game event in the award attempt, wherein the player selects the game component 308*d* in an attempt to win the progressive award 300*b*.

Figure 29:
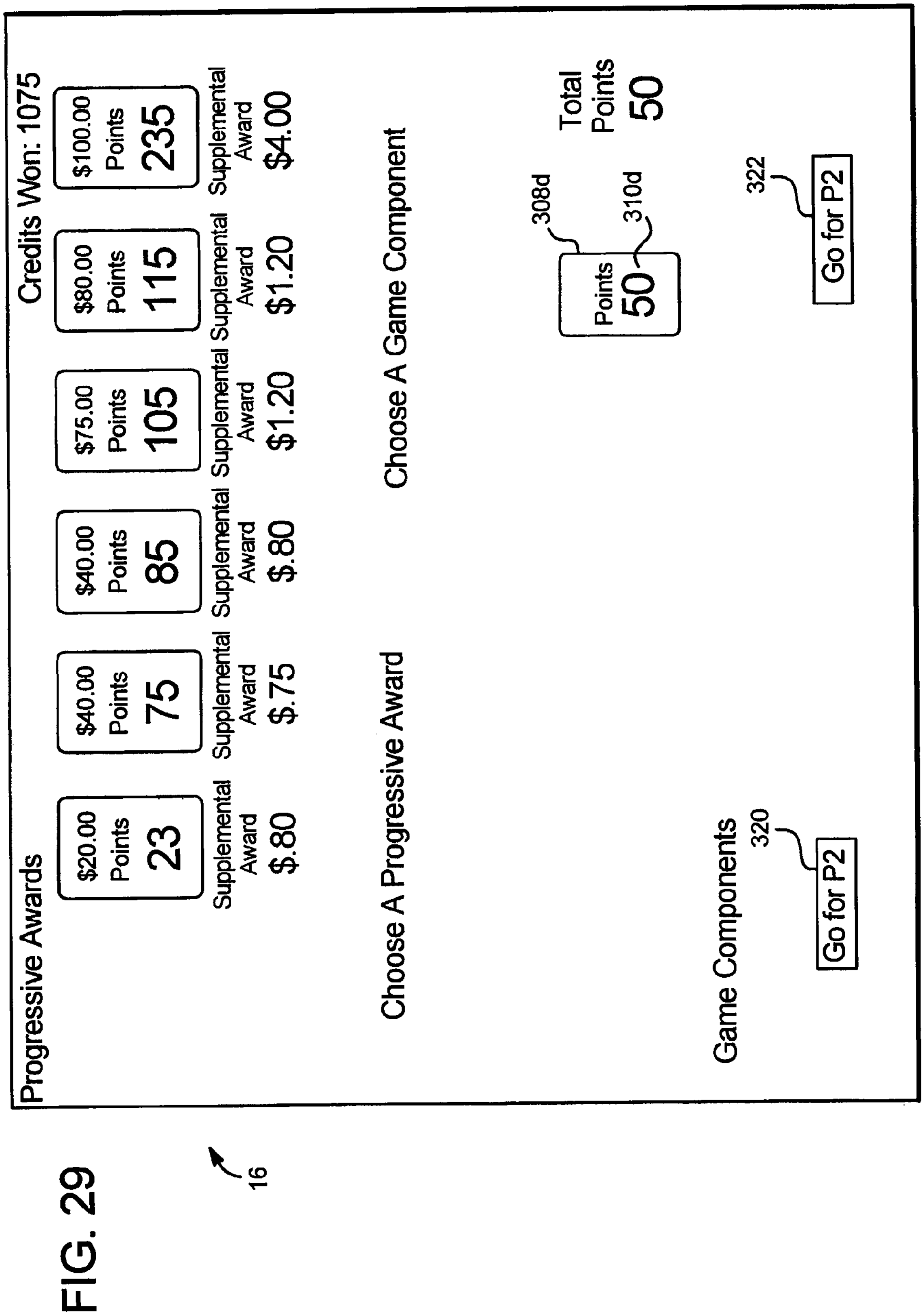

FIG. 29 illustrates the award attempt after the game component 308*b* was eliminated. Display device 16 displays instructions 318 to the player to advance the award attempt. Appropriate instructions such as "CHOOSE A PROGRESSIVE AWARD" or "CHOOSE A GAME COMPONENT" may be provided to the player visually, or through suitable audio or audiovisual displays.

The player has the game component 308*d* remaining for selection. The game component display 314 indicates the total number of remaining game component points associated with the remaining game component 308*d* to be 50 total game component points. The hints 320 and 322 both suggest for the player to select the progressive award 300*b*.

Figure 30:
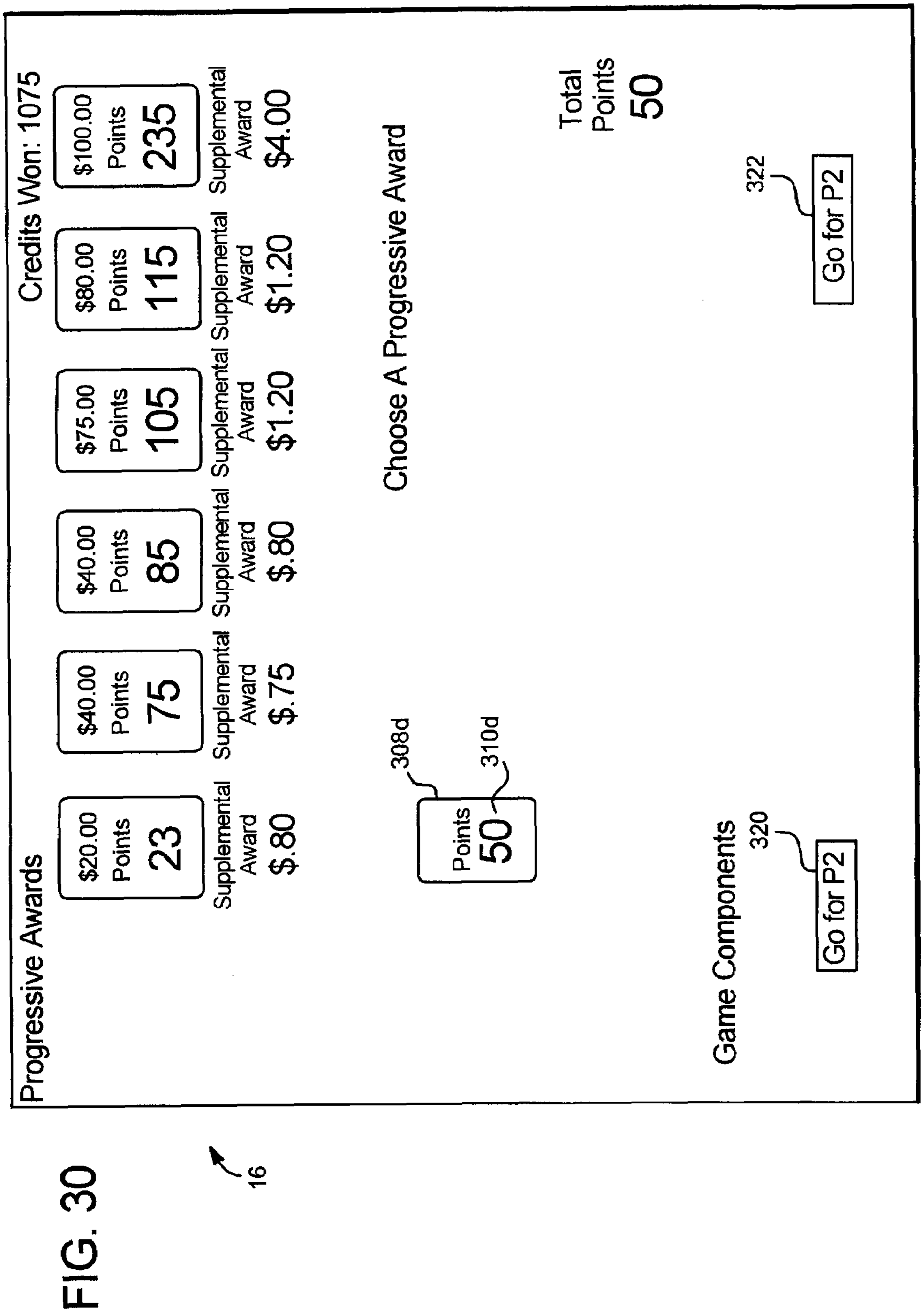

FIG. 30 illustrates the award attempt after the player selected the only remaining game component 308*d*. The selected game component 308*d* is associated with 10 game component points. Display device 16 displays instructions 318 to the player to advance the award attempt. Appropriate instructions such as "CHOOSE A PROGRESSIVE AWARD" or "CHOOSE A PROGRESSIVE CARD" may be provided to the player visually, or through suitable audio or audiovisual displays.

Figure 31:
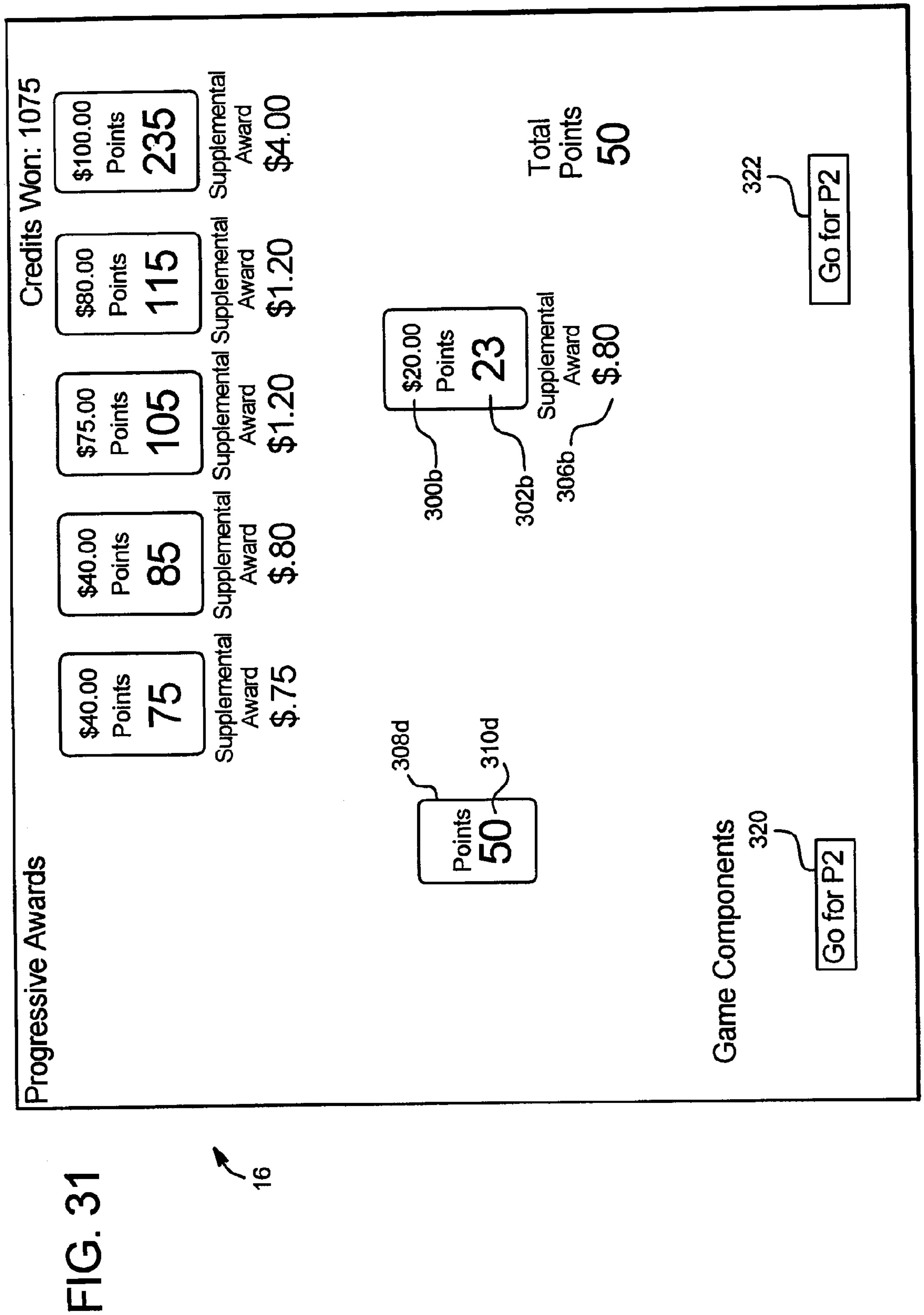

FIG. 31 illustrates the award attempt after the player selected the progressive award 300*b*. The selected progressive award 300*b* is associated with 23 award points. As illustrated, the player followed the suggestions of the conservative hint 320 and the risky hint 322 with this selection. Although not shown, a competition between the selected progressive award 300*b* and the selected game component 308*d* occurs.

Figure 32:
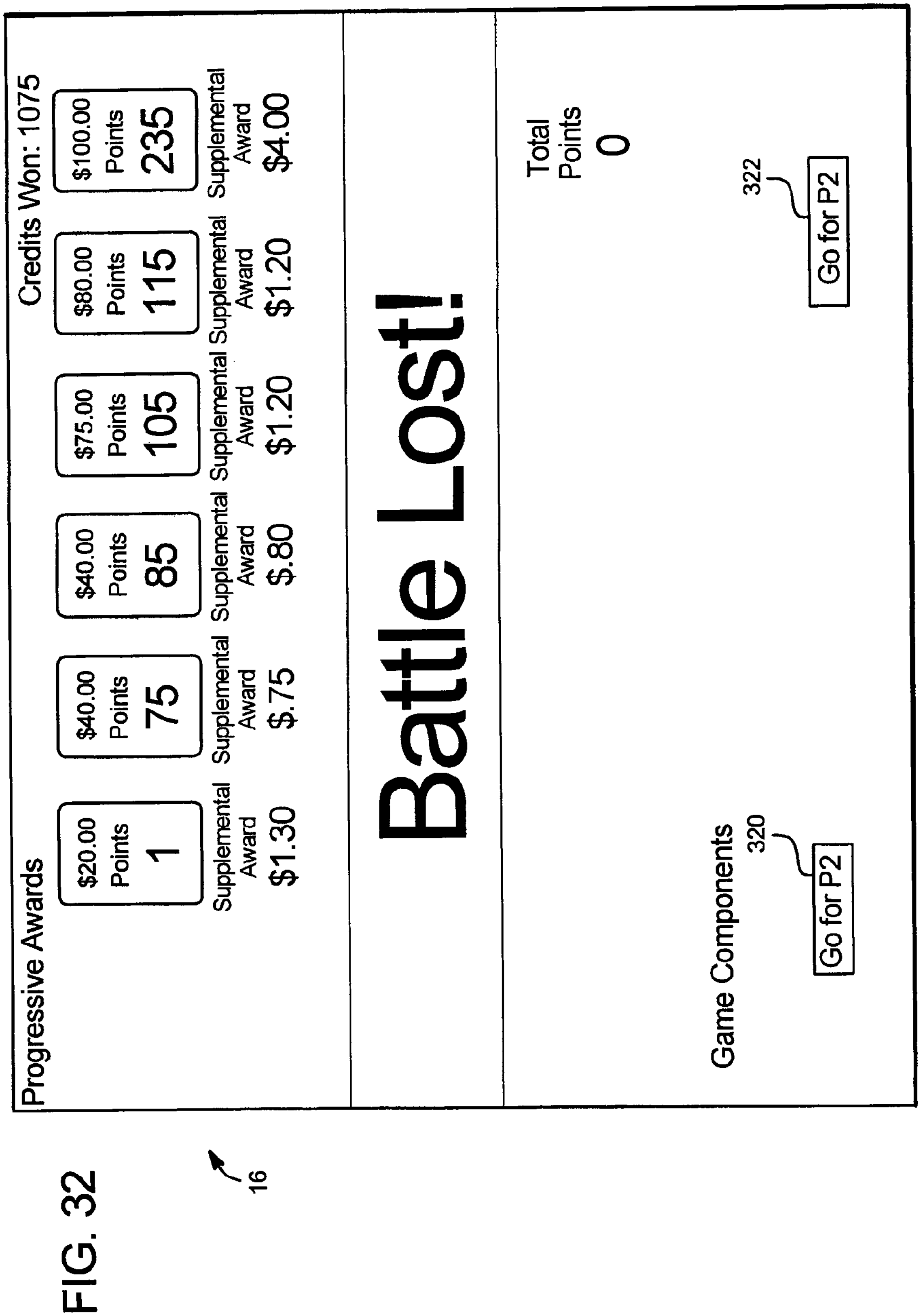

FIG. 32 illustrates the end of the competition between the selected progressive award 300*b* and the selected game component 308*d*. The central controller and/or gaming device processor eliminates the selected game component 308*d* during the competition and the eliminated game component 308*d* is not shown in FIG. 32. The competition resulted in the central controller and/or gaming device processor changing the number of game component points associated with the selected game component 308*d* to zero points and subsequently eliminating the selected game component 308*d*.

Upon the elimination of the game component 308*d*, the central controller and/or gaming device processor increases the supplemental award 306*b* associated with the selected progressive award 300*b*. The elimination is based, at least in part, on the determination by the central controller and/or gaming device processor to not provide the selected progressive award 300*b*. As illustrated, the supplemental award 306*b* increases from $0.80 to $1.30. The increase is attributed to a supplemental award of $0.50 associated with the eliminated game component 308*d*.

Progressive award 300*b* is associated with 1 award point. During the competition, the award points associated with the progressive award 300*b* changed by 22 award points. Display device 16 indicates the result of the competition to the player. Appropriate messages such as "BATTLE LOST!" or "COMPETITION LOST!" may be provided to the player visually, or through suitable audio or audiovisual displays. No game components remain for this award attempt. The game component display 314 indicates that the player has 0 game component points remaining. The award attempt ends.

Figure 34:
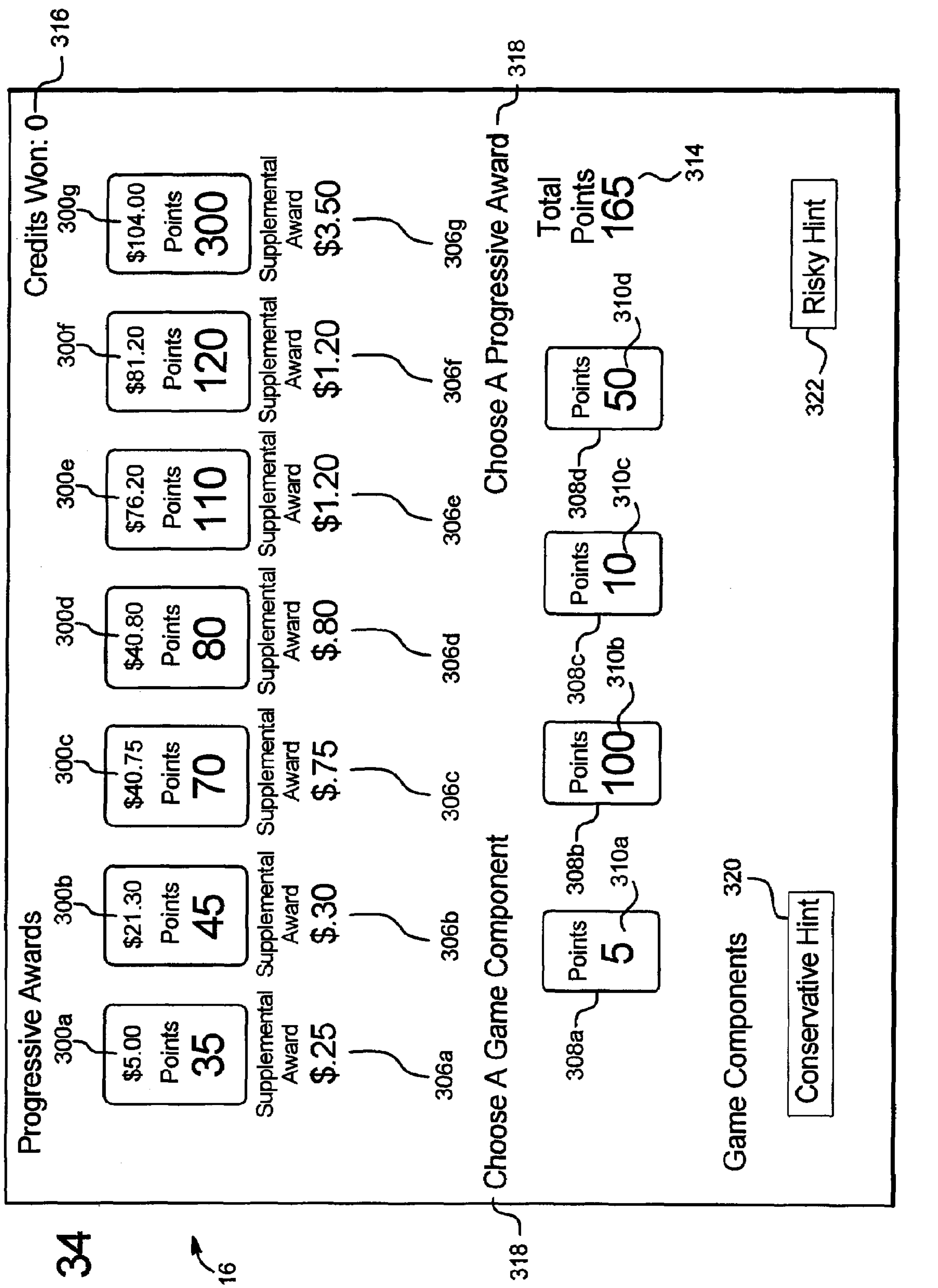
FIG. 34 is an enlarged front plan view of a display device of the gaming device and/or gaming system disclosed herein, illustrating an example of one embodiment of the present disclosure where a player is provided with a future or subsequent award attempt or game opportunity.

Upon completion of the award attempt, the values of the supplemental awards 306*b* to 306*g* are added to the values of the corresponding progressive award 300*b* to 300*g* to ensure that the central controller and/or gaming device processor distributes the supplemental awards as shown in FIG. 34.

Figure 33:
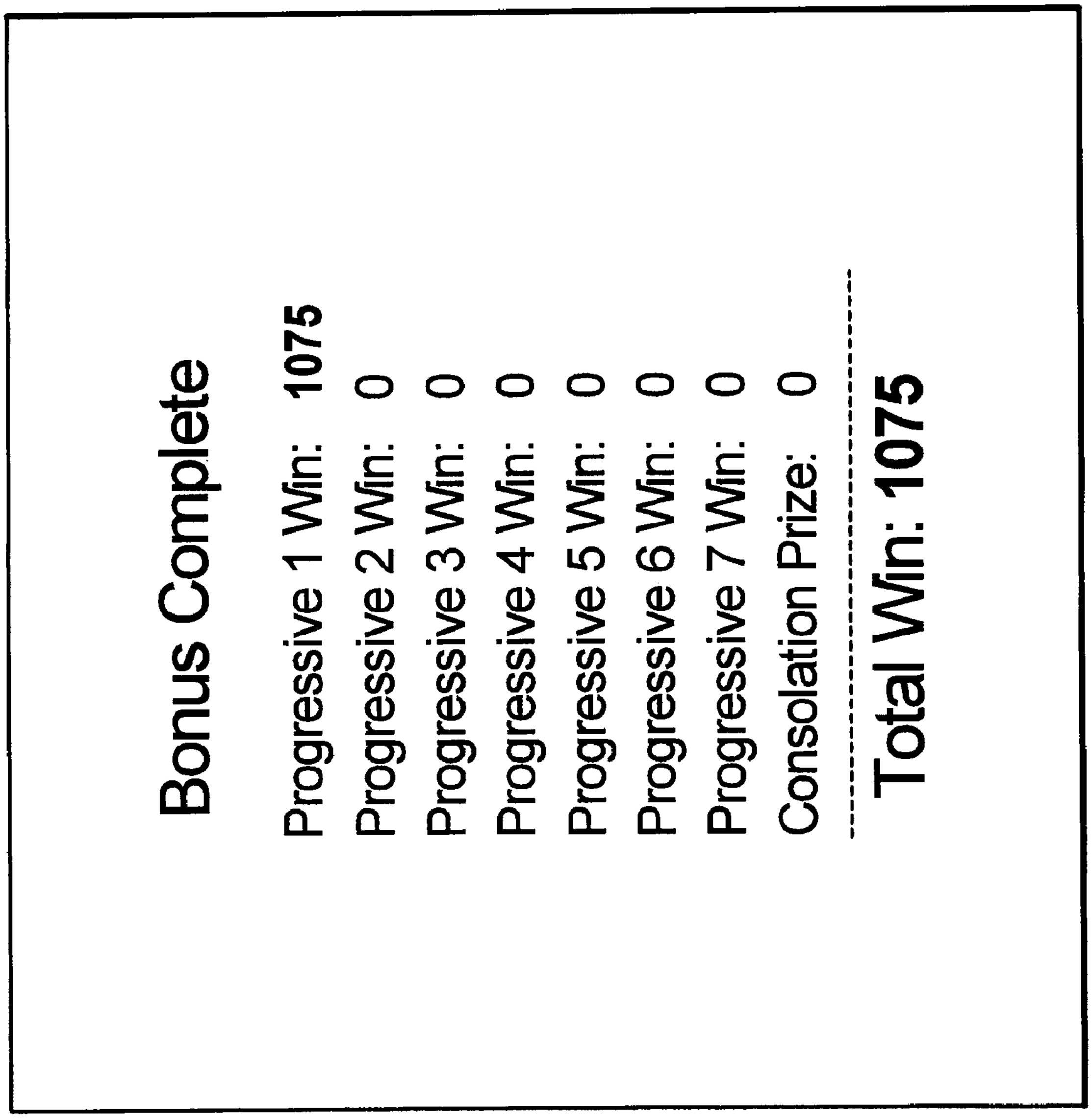

FIG. 33 illustrates a summary of the award attempt. Display device 16 indicates the summary of the award attempt to the player. Appropriate messages such as "PROGRESSIVE 1 WIN: ______" or "TOTAL WIN: ______" may be provided to the player visually, or through suitable audio or audiovisual displays. The summary displays how many credits or other type(s) of awards that the player won in the award attempt. The player won the first progressive award for a total of 1075 credits.

After displaying the summary shown in FIG. 33, the central controller and/or gaming device processor adds the 1075 credits won in the award attempt and indicated by the award meter 316 to the credit display 20. The central controller and/or gaming device processor returns to the primary or secondary game after the award attempt ends.

FIG. 34 illustrates a subsequent award attempt, wherein progressive award 300*a* is reset and progressive awards 300*b* to 300*g* are incremented. For example, the value, e.g., $1.30, of supplemental award 306*b* is added to the value, e.g., $20.00, of progressive award 300*b*. As illustrated, the value of the progressive award 300*b* is $21.30 in the subsequent award attempt. In a similar manner, the values of supplemental awards 306*c* to 306*g* are added to the values of respective progressive awards 300*c* to 300*g*. The value of the progressive award 300*c* is $40.75. The value of the progressive award 300*d* is $40.80. The value of the progressive award 300*e* is $76.20. The value of the progressive award 300*f* is $81.20. The value of the progressive award 300*f* is $104.00. Since the player won the first progressive award 300*a*, the first progressive award 300*a* and the corresponding supplemental award 306*a* are reset to $5.00 and $0.25, respectively, in a subsequent award attempt. A consolation award of 500 credits was used to fund the reset value of the progressive award 300*a*.

For an award attempt in which the player is unsuccessful (e.g., does not win all of the awards), any remaining supplemental awards that the player attempted to win or a portion thereof is added back to the progressive awards. For example, if multiple progressive awards are won, the consolation can be distributed amongst won progressive awards to fund the reset values of those won progressive awards. In this manner, the unearned supplemental awards in one award attempt are eventually paid out to the player in the form of a progressive payout in a subsequent award attempt.

In one embodiment, the number of award points associated with one or more of the progressive awards and/or the number of game component points associated with one or more of the game components remain the same for a series of game events, such as a bonus round. In an alternative embodiment, the number of award points associated with one or more of the progressive awards and/or the number of game component points associated with one or more of the game components are determined or reset for each series of game events, such as each bonus round.

In an alternative embodiment, the central controller and/or gaming device processor provides the player with an option to continue the award attempt via an additional wager. For example, the additional wager enables the player to purchase at least one additional game component and/or at least one additional game component point to continue the award attempt. In one example, a wager of $1.00 buys the player an additional 10 game component points. The amount of points provided to the player may be predetermined, randomly determined, determined or weighted based on the player's wager, determined or weighted based on the status of one or more players (such as determined through a player tracking system), determined based on time, determined based on an outcome generated in a primary game or determined based on any other suitable method. In another example, a wager of $1.00 buys the player an additional game component, which may be associated with a randomly selected number of game component points from an associated range of game component points. In one embodiment, unsuccessful additional wagers or portions thereof are added to the progressive award that the player attempted to win. For example, if the player attempts to win a progressive award of $20.00 and is unsuccessful in the attempt, the $1.00 additional wager (or a percentage or portion thereof) is added to the $20.00 progressive award for a new progressive total of $21.00.

In one embodiment, multiple players reduce the number of points associated with the same progressive award during an award attempt. For example, if a first player plays for a first progressive award, and does not win the progressive award, the number of points associated with the progressive award may be reduced for a future or subsequent game event. In a subsequent game event, a second player tries for the first progressive award (with the modified number of points).

In one example embodiment, the number of points associated with the progressive awards and/or the gaming components are player specific. For example, the number of points associated with the progressive awards and/or the gaming components may be tied to a player's identification (as determined through player tracking). In this example embodiment, the number of points associated with the progressive awards and/or the gaming components are carried by the player from gaming machine to gaming machine. In this manner, the number of points associated with each progressive award and/or each game component may be stored or escrowed so that the player may stop or interrupt play at one time and continue the award attempt at a later time. This also enables a player to start play of the award attempt at one gaming machine and continue the award attempt at the same or a different gaming machine. Alternatively, in another embodiment, the number of points associated with the progressive awards and/or the gaming components are gaming machine specific. In this example embodiment, the number of points associated with the progressive awards and/or the gaming components are tied to a specific gaming machine no matter which player is playing at that specific gaming machine.

In one embodiment, the central controller and/or each gaming device processor determines the number of award points associated with one or more of the progressive awards and/or the number of game component points associated with one or more of the game components to be the same values for a plurality of players, such as players playing at different gaming machines in the gaming system. This enables players at different gaming machines to play the same game for the same progressive awards with the same odds or likelihoods of winning the progressive awards.

Alternatively, in another embodiment, the central controller and/or each gaming device processor determines the number of award points associated with one or more of the progressive awards and/or the number of game component points associated with one or more of the game components to be different amounts for each player and/or gaming machine. This enables players at different gaming machines to play the same game for the same progressive awards with different odds or likelihoods of winning the progressive awards.

Referring now to FIGS. 35 to 52, the display device 16 illustrates one example of a game play screen for one embodiment of the award attempt described herein. For ease of illustration, the relevant game information for the award attempt is shown on the same display device 16. In alternative embodiments, the relevant game information for the award attempt is divided between different areas of the gaming device 10 or the display devices 16 and 18. Alternatively, the display device 18 is adapted to display the game play screen.

In this example, the display device 16 displays one embodiment of an award attempt in accordance with the present disclosure after a suitable triggering event as described above.

Figure 35:
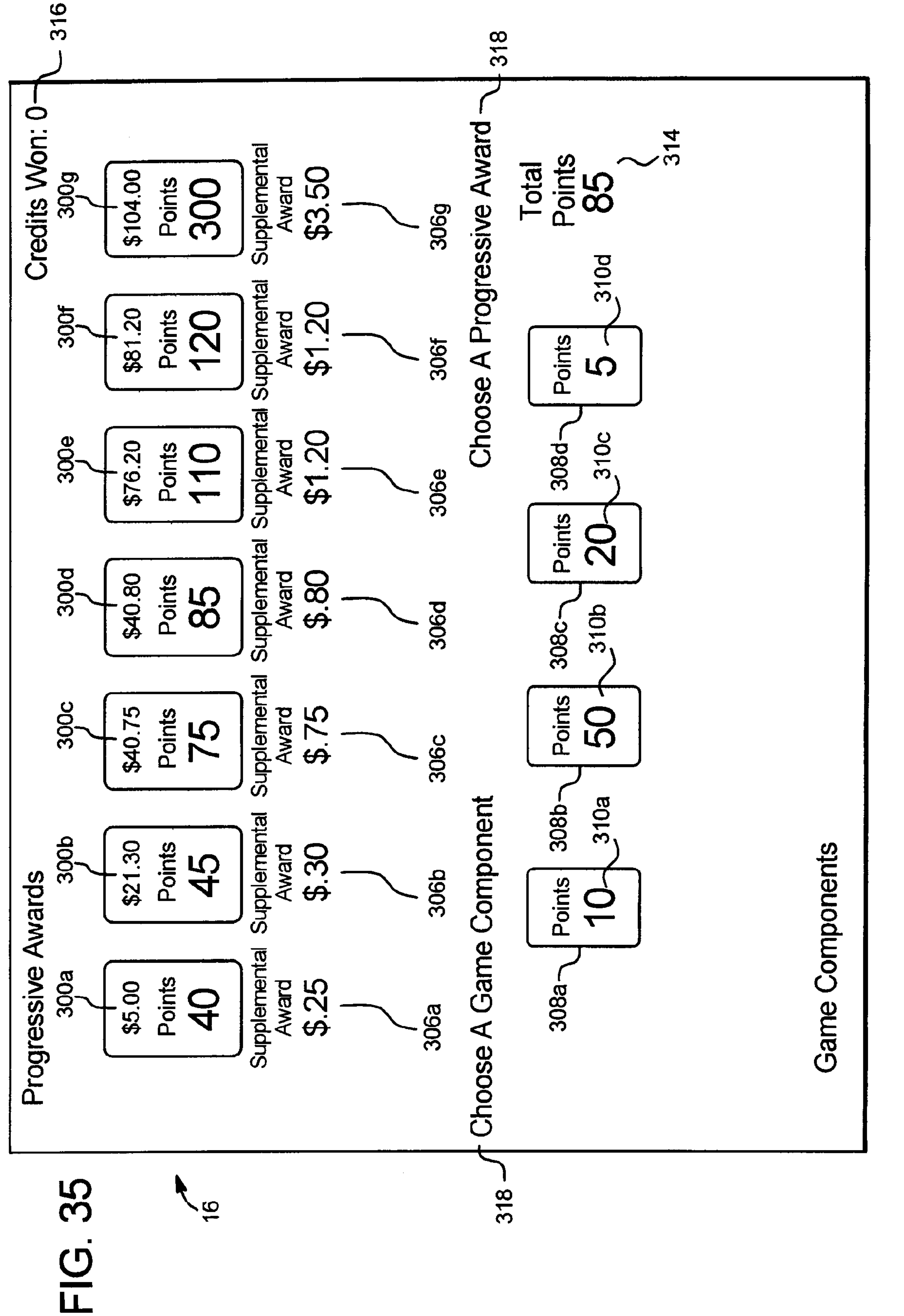
FIGS. 35 to 52 are enlarged front plan views of a display device of the gaming device and/or gaming system disclosed herein, illustrating an example of one embodiment of the present disclosure where a player is provided with an alternative award attempt or game opportunity.

Generally, in one embodiment of the award attempt as illustrated in FIG. 35, the display device 16 displays a plurality of progressive awards 400*a* to 400*g* to a player in the form of symbols, characters, numbers, cards, player cards or any other suitable form determined by the game implementer. As illustrated, the progressive awards 400*a* to 400*g* are set at levels of $3.23, $8.60, $11.22, $13.58, $18.60, $13.60 and $48.35, respectively. The selected levels are displayed on the display device 16 in this embodiment. In this embodiment, the progressive awards 400*a* to 400*g* have been incremented from their selected default levels and are at levels higher than the default levels. It should be appreciated that the progressive awards 400*a* to 400*g* may be set at any value or level.

Each progressive award 400*a* to 400*g* is associated with a characteristic 402*a* to 402*g*, which is displayed in the form of award points. The characteristics or award points 402*a* to 402*g* are displayed in association with the progressive awards 400*a* to 400*g* on the display device 16. As illustrated in FIG. 34, the central controller and/or gaming device processor associates the first progressive award 400*a* with 40 award points. The central controller and/or individual gaming device processor associates the second progressive award 400*b* with 45 award points. The central controller and/or individual gaming device processor associates the third progressive award 400*c* with 75 award points. The central controller and/or individual gaming device processor associates the fourth progressive award 400*d* with 85 award points. The central controller and/or individual gaming device processor associates the fifth progressive award 400*e* with 110 award points. The central controller and/or individual gaming device processor associates the sixth progressive award 400*f* with 120 award points and associates the seventh progressive award 400*g* with 300 award points.

As illustrated in FIG. 35, the display device 16 displays a plurality of supplemental awards 406*a* to 406*g* to a player in the award attempt. The central controller and/or the gaming device processor associates each supplemental award 406*a* to 406*g* with one of the progressive awards 400*a* to 400*g*. In this embodiment, each supplemental award 406*a* to 406*g* is predetermined based on the level of each progressive award 400*a* to 400*g*. For example, low progressive awards may be associated with low supplemental awards and high progressive awards may be associated with high supplemental awards. In FIG. 35, the central controller and/or gaming device processor associates the first progressive award 400*a* with a supplemental award of $0.25. The central controller and/or gaming device processor associates the second progressive award 400*b* with a supplemental award of $0.30. The central controller and/or gaming device processor associates the third progressive award 400*c* with a supplemental award of $0.75. The central controller and/or gaming device processor associates the fourth progressive award 400*d* with a supplemental award of $0.80. The central controller and/or gaming device processor associates the fifth and sixth progressive awards 400*e* and 400*f* with the same supplemental award of $1.20. The central controller and/or gaming device processor associates the seventh progressive award 400*g* with a supplemental award of $3.50. The supplemental awards may be changed, such as increased or decreased, between award attempts, such as based on wager history, based on player status or based upon any other suitable factor determined by the game implementer.

In FIG. 35, the display device 16 also displays a plurality of game components 408*a* to 408*d* to a player in the award attempt. The game components 408*a* to 408*d* are displayed to the player as symbols, characters, numbers, cards, player cards or any other suitable form determined by the game implementer.

Each of the game components 408*a* to 408*d* is associated with a characteristic 410*a* to 410*d*, which is displayed in the form of a number of game component points. The characteristics or game component points 410*a* to 410*d* are displayed in association with the game components 408*a* to 408*d* on the display device 16.

As illustrated in FIG. 35, the central controller and/or gaming device processor associates the first game component 408*a* with 10 game component points. The central controller and/or gaming device processor associates the second game component 408*b* with 50 game component points. The central controller and/or gaming device processor associates the third game component 408*c* with 20 game component points. The central controller and/or gaming device processor associates the fourth game component 400*d* with 5 game component points.

The display device 16 displays a game component point display 414. The game component point display 414 displays the total number of game component points associated with the game components 408*a* to 408*d*. As the player progresses through the award attempt, the game component point display 414 updates to display any remaining game component points available to the player. As shown in FIG. 35, the game component display 414 indicates that the game components 408*a* to 408*d* are associated with 85 total game component points for this award attempt.

The display device 16 also displays an award meter 416. The award meter 416 indicates to the player how many credits or other type(s) of award are provided in the award attempt of the present disclosure. During an award attempt, any award received by a player is added to the award indicated by the award meter 416. Once an award attempt ends, the award amount indicated by the award meter 416 is provided to the player. As shown in FIG. 35, the award meter 416 indicates that the player's award at the beginning of the award attempt is zero.

In one embodiment, the display device 16 displays instructions 418 to the player to advance the award attempt. Appropriate instructions such as "CHOOSE A PROGRESSIVE AWARD" or "CHOOSE A GAME COMPONENT" may be provided to the player visually, or through suitable audio or audiovisual displays.

Figure 36:
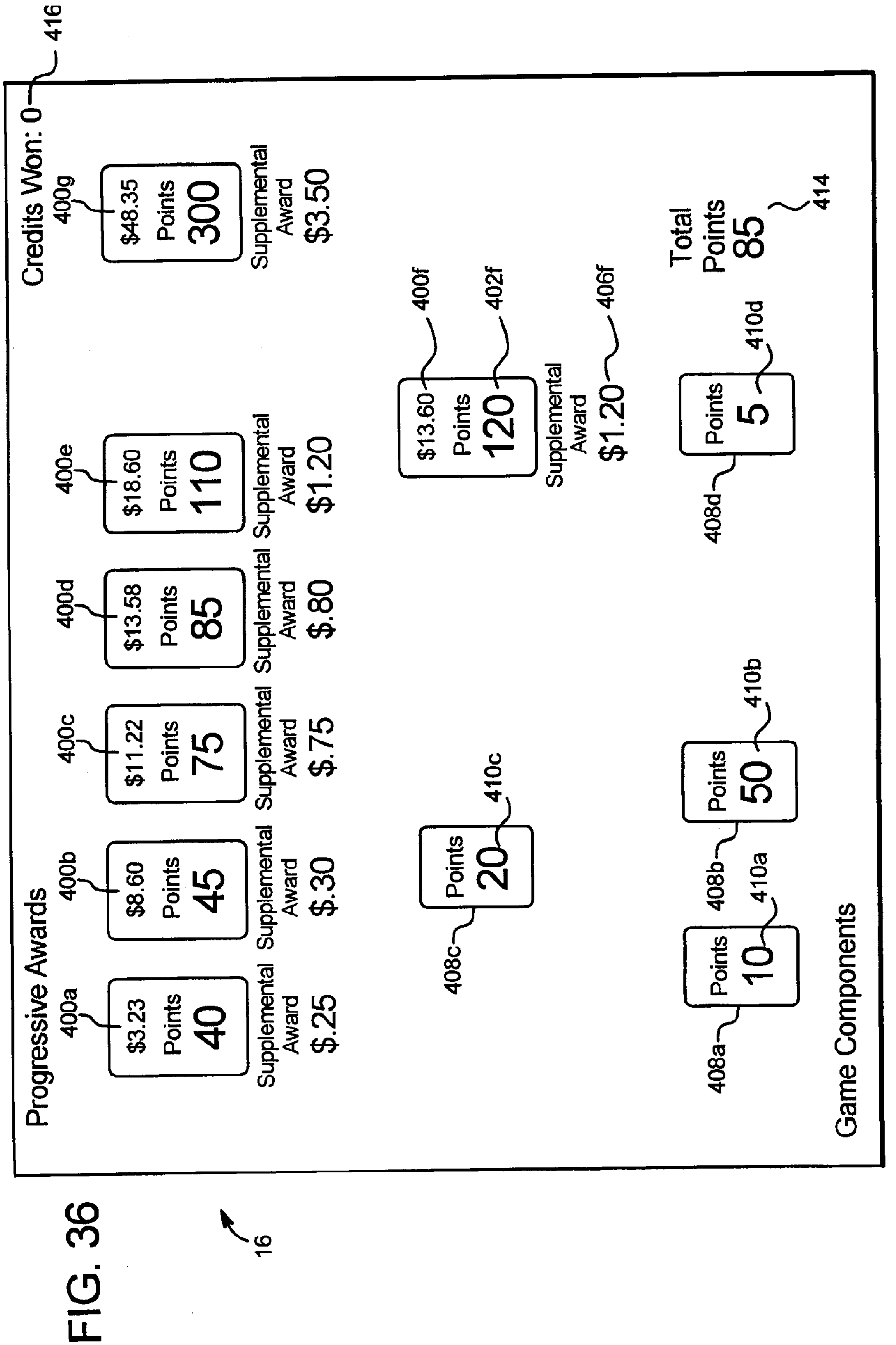

FIG. 36 illustrates the award attempt after the player selected the third game component 408*c* and the sixth progressive award 400*f*. The selected game component 408*c* is associated with 20 game component points. The selected progressive award 400*f* is associated with 120 award points. Since the number of game component points associated with the selected game component 408*c* is less than the number of award points associated with the selected progressive award 400*f*, the player has a low likelihood of winning the selected progressive award 400*f*.

The central controller and/or gaming device determines whether to provide the selected progressive award 400*f* to the player. The determination is based on a competition or comparison between the selected game component 408*c* and the selected progressive award 400*f*. Although not shown, the competition resulted in the central controller and/or gaming device processor changing the number of game component points associated with the selected game component 408*c* to zero points and subsequently eliminating the selected game component 408*c*. The central controller and/or gaming device processor also decreased the number of award points associated with the selected progressive award 400*f* by 20 award points. The modified number of game component points associated with the selected game component 408*c* changes the likelihood of the player winning the selected progressive award 400*f* (based on the modified number of award points, i.e., 100 award points) with one of the remaining game components 408*a*, 408*b* and 408*d* in a subsequent competition.

Upon the elimination of the game component 408*c*, the central controller and/or gaming device processor increases the supplemental award 406*f* associated with the selected progressive award 400*f*. The elimination is based, at least in part, on the determination by the central controller and/or gaming device processor to not provide the selected progressive award 400*f*. The supplemental award 406*f* increases from $1.20 to $1.50. The increase is attributed to a supplemental award of $0.30 associated with the eliminated game component 408*c*.

Figure 37:
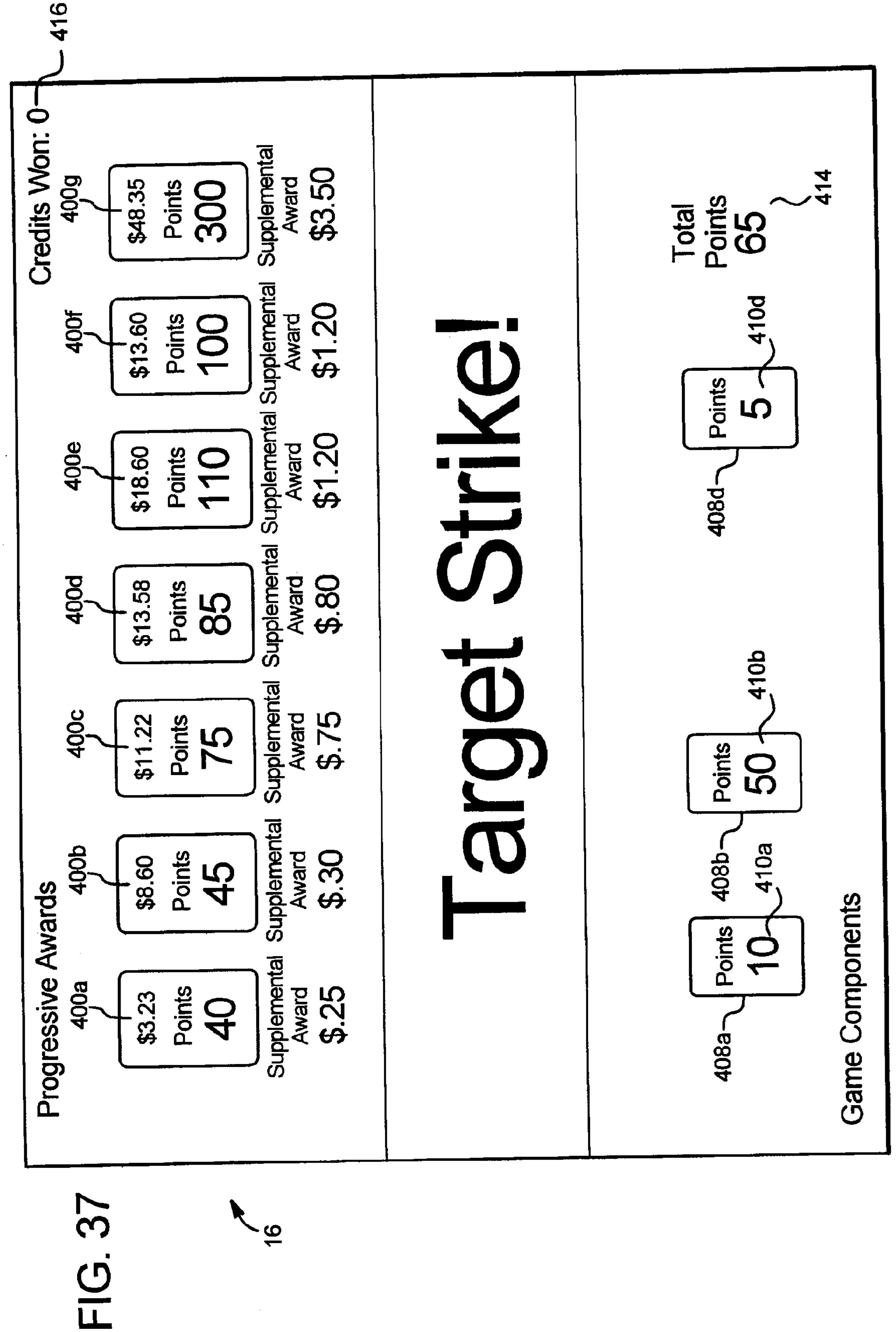

FIG. 37 illustrates an additional game feature provided to the player by the central server and/or the gaming device processor during the award attempt. The central server and/or the gaming device processor periodically or randomly determines to change the number of points associated with one or more of the awards and/or one or more of the game components. If the central server and/or the gaming device processor determines to change the number of points associated with one or more of the awards and/or one or more of the game components, the central controller and/or gaming device triggers or provides the additional game feature. The additional game feature may be provided to the player at any time during the award attempt and may increase or decrease the likelihood of the player winning one of the awards. Appropriate messages such as "TARGET STRIKE!" or "BONUS!" may be provided to the player visually, or through suitable audio or audiovisual displays to indicate that the additional game feature has been triggered.

Figure 38:
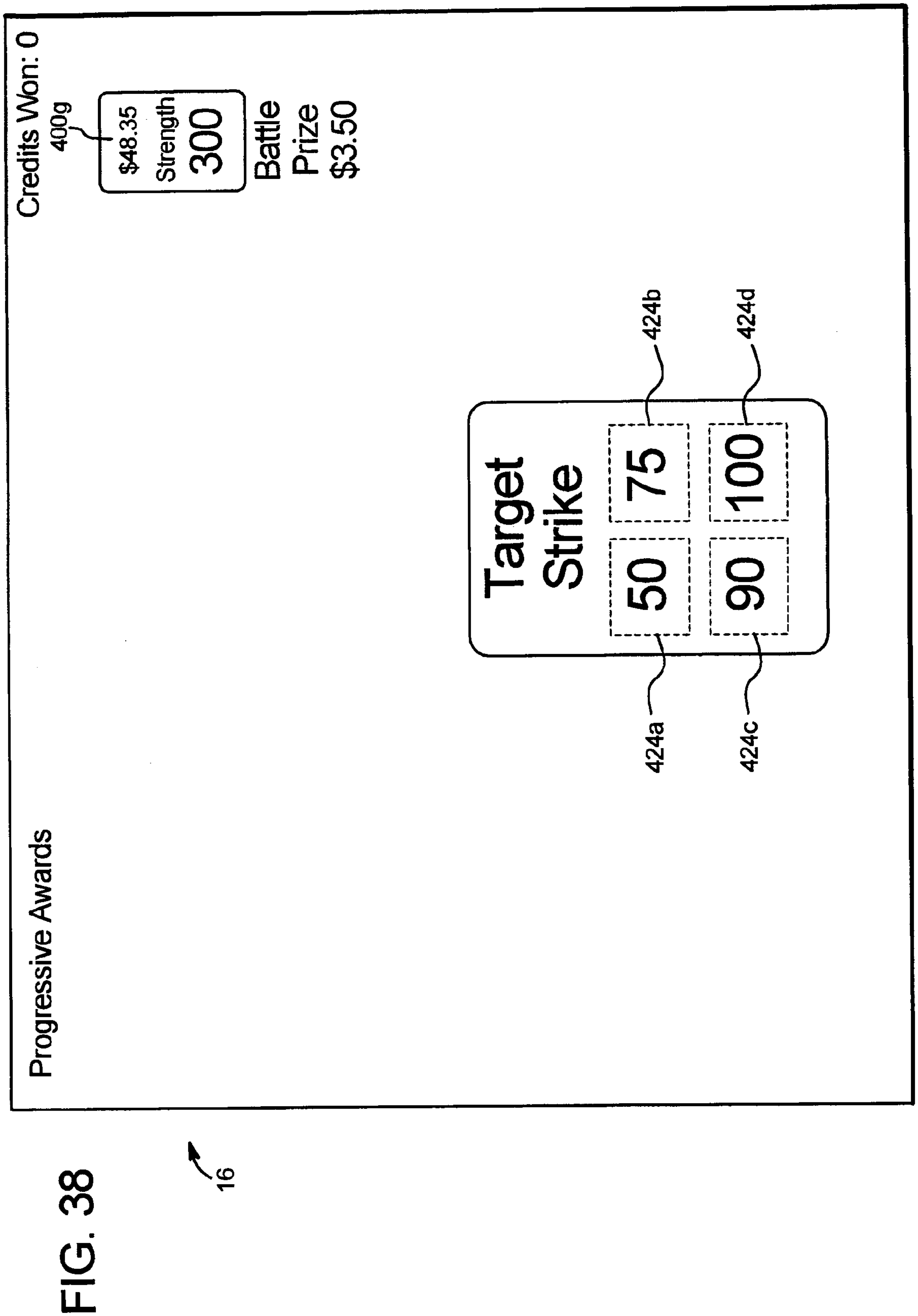

As illustrated in FIG. 38, the game feature includes a plurality of outcomes 424*a* to 424*d* adapted to change the number of award points associated with the progressive award 400*g*. Progressive award 400*g* is associated with 300 award points. Each outcome 424*a* to 424*d* is associated with a characteristic, such as a number of points. In this embodiment, the outcomes 424*a* to 424*d* includes different outcomes (i.e., different numbers of points) that change the number of points associated with the progressive award 400*g* by different amounts. For example, outcome 424*a* is associated with 50 points and decreases the progressive award 400*g* to 250 points if selected. Outcome 424*b* is associated with 75 points and decreases the progressive award 400*g* to 225 points if selected. Outcome 424*c* is associated with 90 points and decreases the progressive award 400*g* to 210 points if selected. Outcome 424*d* is associated with 100 points and decreases the progressive award 400*g* to 200 points if selected. The central server and/or the gaming device processor randomly selects (or the player selects) one of the outcomes 424*a* to 424*d* and changes the number of points associated with the progressive award 400*g* by the number of points associated with the randomly selected outcome (or player selected outcome). The central controller and/or gaming device processor indicates the random selection (or player selection) to the player by illuminating the selected outcome or in another manner determined by the game implementer.

Figure 39:
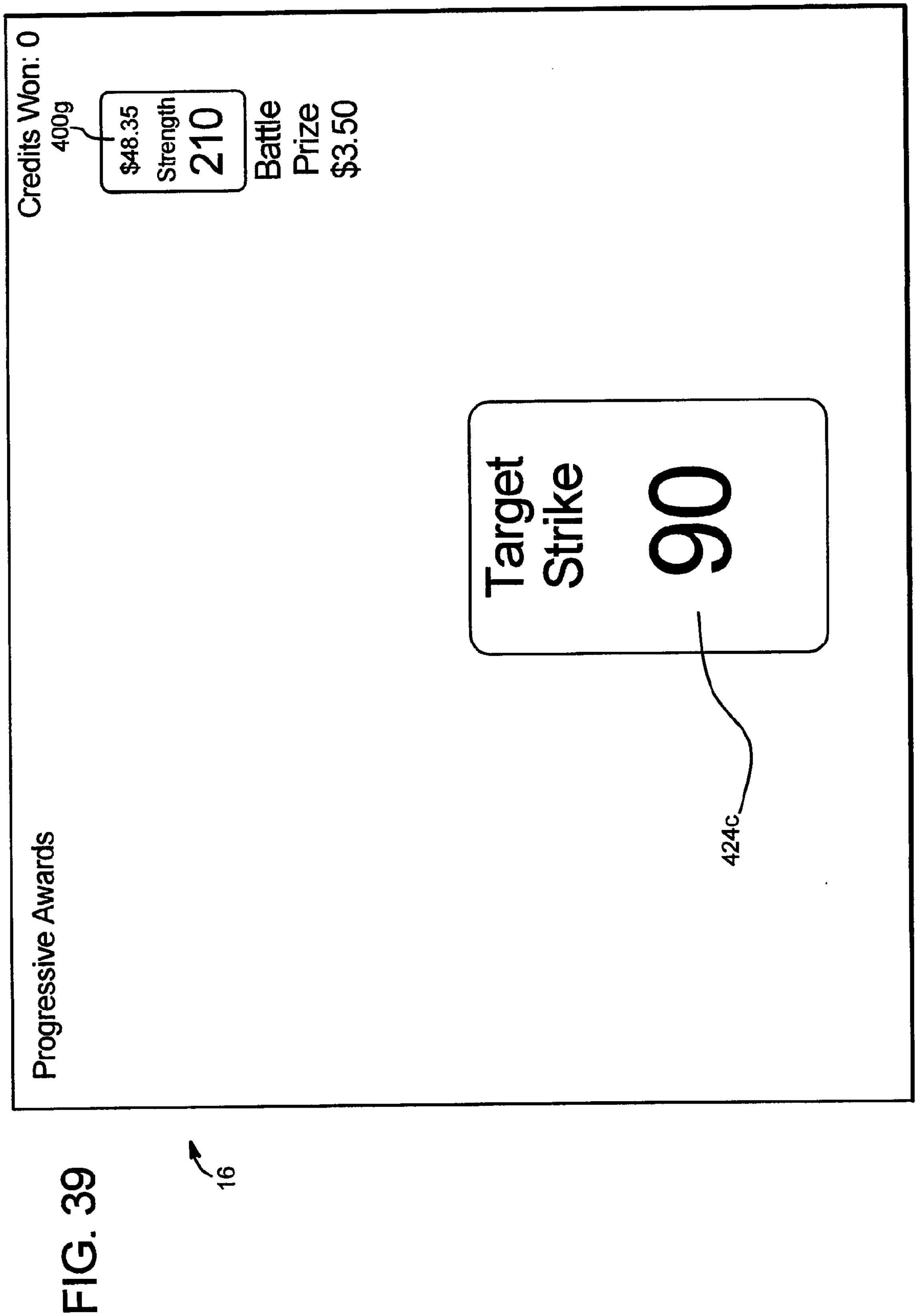

As shown in FIG. 39, the central server and/or the gaming device processor randomly selects outcome 424*c*, which is associated with 90 points. Based on outcome 424*c*, the number of award points associated with the progressive award 400*g* changes to 210 points. After the central controller and/or gaming device processor changes the number of award points associated with the progressive award 400*g*, the central controller and/or gaming device processor continues the award attempt from the point where the additional game feature was triggered.

Figure 40:
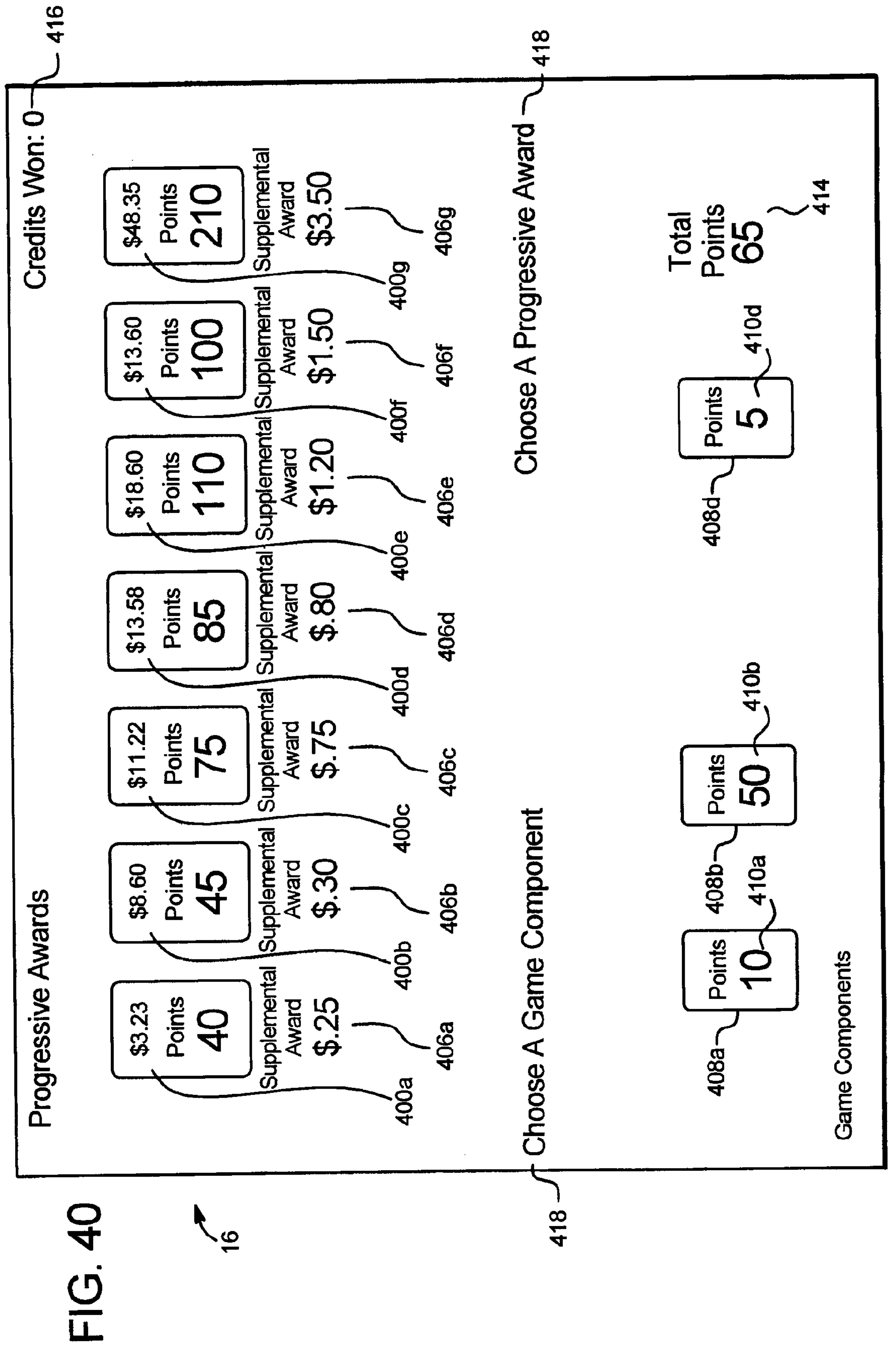

FIG. 40 illustrates display device 16 after the competition between the third game component 408*c* and the sixth progressive award 400*f*. Progressive awards 400*a* to 400*g* remain for selection by the player. Game components 408*a*, 408*b* and 408*d* remain for selection by the player for a subsequent competition. The display device 16 displays instructions 418 to the player to advance the award attempt.

Figure 41:
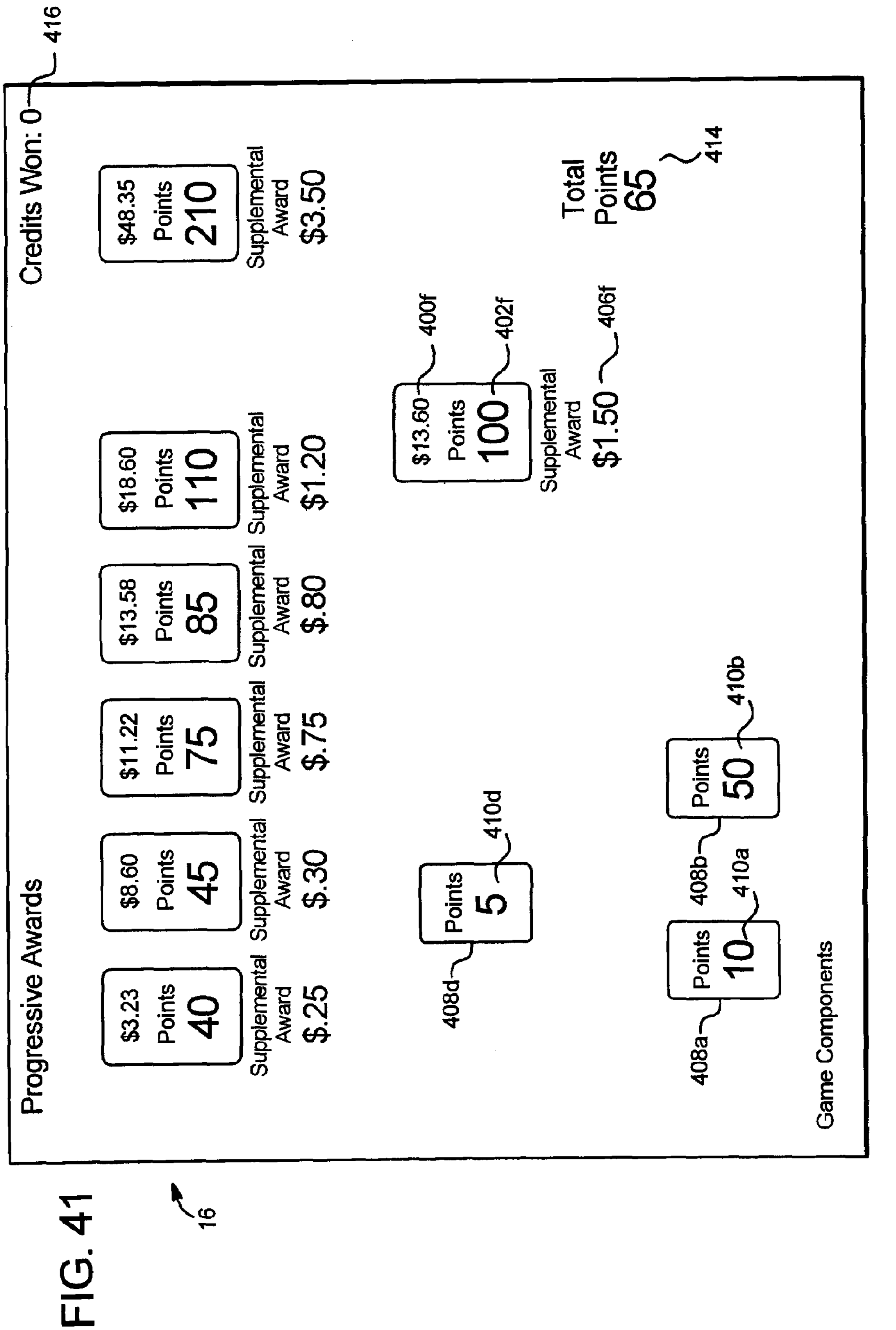

FIG. 41 illustrates the display device 16 after the player selects the fourth game component 408*d* and the sixth progressive award 400*f* for a subsequent competition. The game component 408*d* is associated with 5 game component points and the selected progressive award 400*f* is associated with 100 award points. Since the number of game component points associated with the selected game component 408*d* is less than the number of award points associated with the selected progressive award 400*f*, the player has a low likelihood of winning the selected progressive award 400*f*.

The central controller and/or gaming device determines whether to provide the selected progressive award 400*f* to the player. The determination is based on a competition or comparison between the selected game component 408*d* and the selected progressive award 400*f*. Although not shown, the competition resulted in the central controller and/or gaming device processor changing the number of game component points associated with the selected game component 408*d* to zero points and subsequently eliminating the selected game component 408*d*. The central controller and/or gaming device processor also decreased the number of award points associated with the selected progressive award 400*f* by 18 award points. The modified number of game component points associated with the selected game component 408*d* changes the likelihood of the player winning the selected progressive award 400*f* (based on the modified number of award points, i.e., 82 award points) with one of the remaining game components 408*a* and 408*b* in a subsequent competition.

Upon the elimination of the game component 408*d*, the central controller and/or gaming device processor increases the supplemental award 406*f* associated with the selected progressive award 400*f*. The elimination is based, at least in part, on the determination by the central controller and/or gaming device processor to not provide the selected progressive award 400*f*. The supplemental award 406*f* increases from $1.50 to $2.20. The increase is attributed to a supplemental award of $0.70 associated with the eliminated game component 408*d*.

Figure 42:
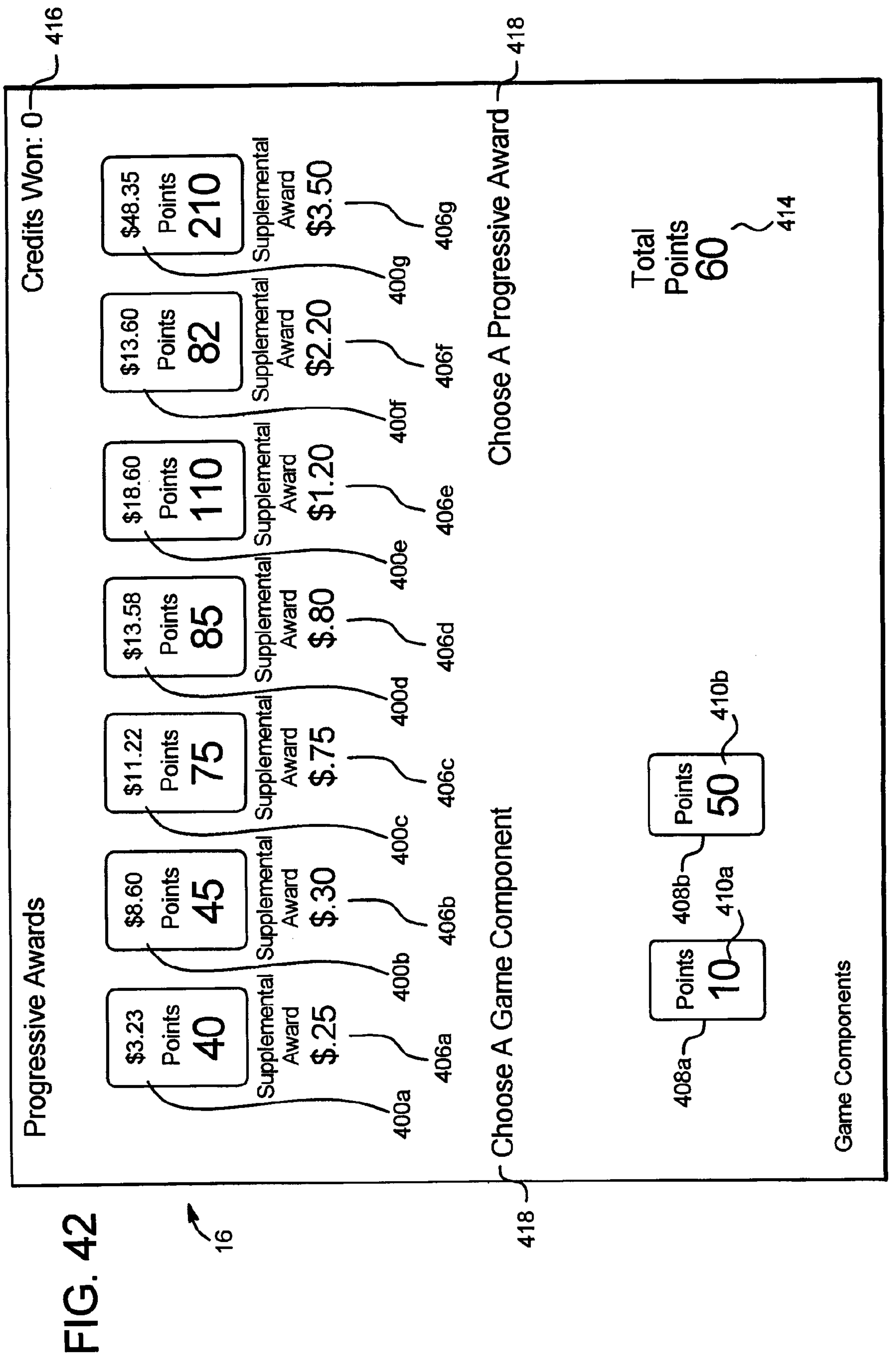

FIG. 42 illustrates display device 16 after the competition between the fourth game component 408*d* and the sixth progressive award 400*f*. Progressive awards 400*a* to 400*g* remain for selection by the player for a subsequent competition. Game components 408*a* and 408*b* remain for selection by the player for a subsequent competition. Game component display 414 indicates that the game components 408*a* and 408*b* are associated with 60 total game component points. The display device 16 displays instructions 418 to the player to advance the award attempt.

Figure 43:
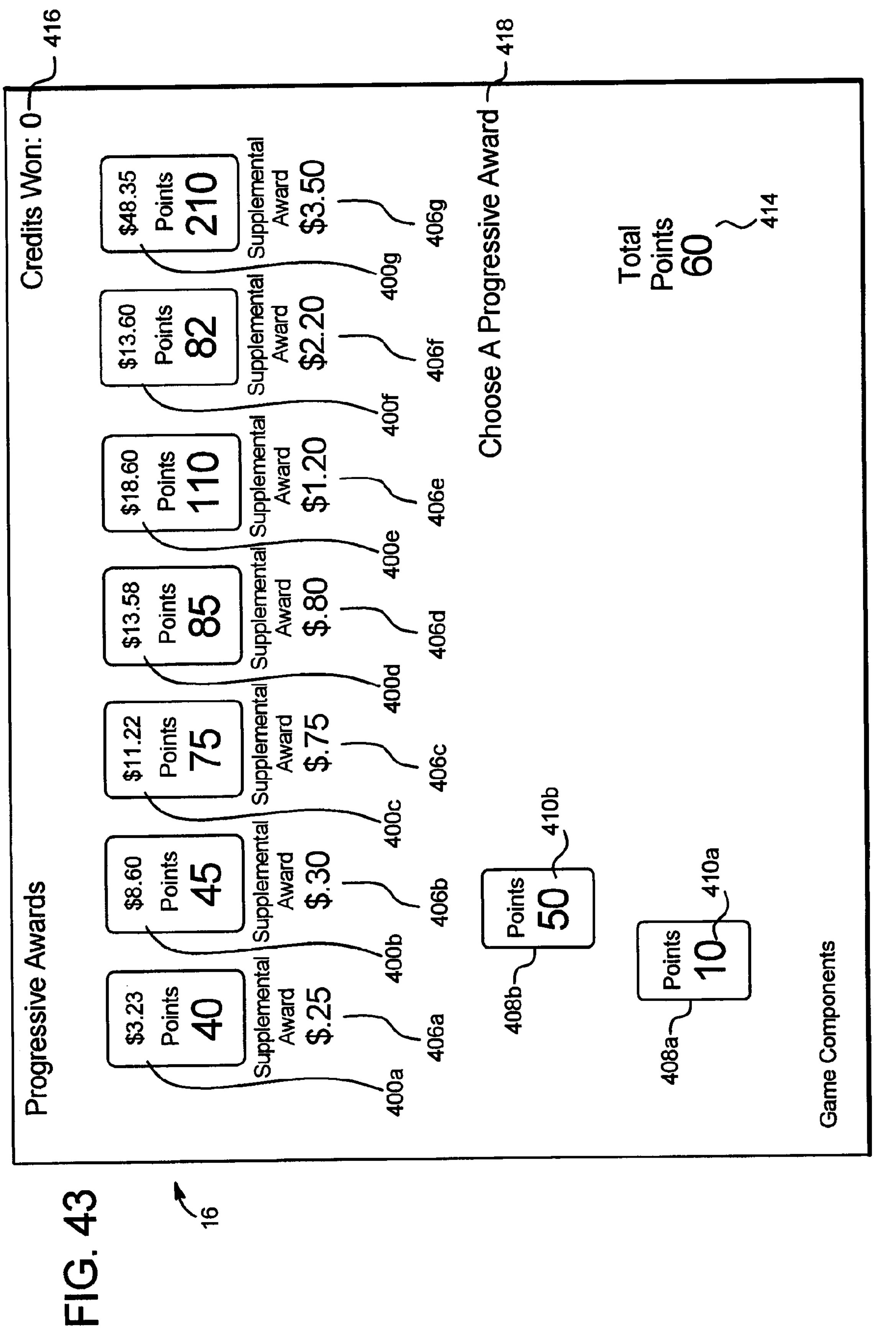

FIG. 43 illustrates the display device 16 after the player has selected the game component 408*b*. The selected game component 408*b* is associated with 50 game component points.

Figure 44:
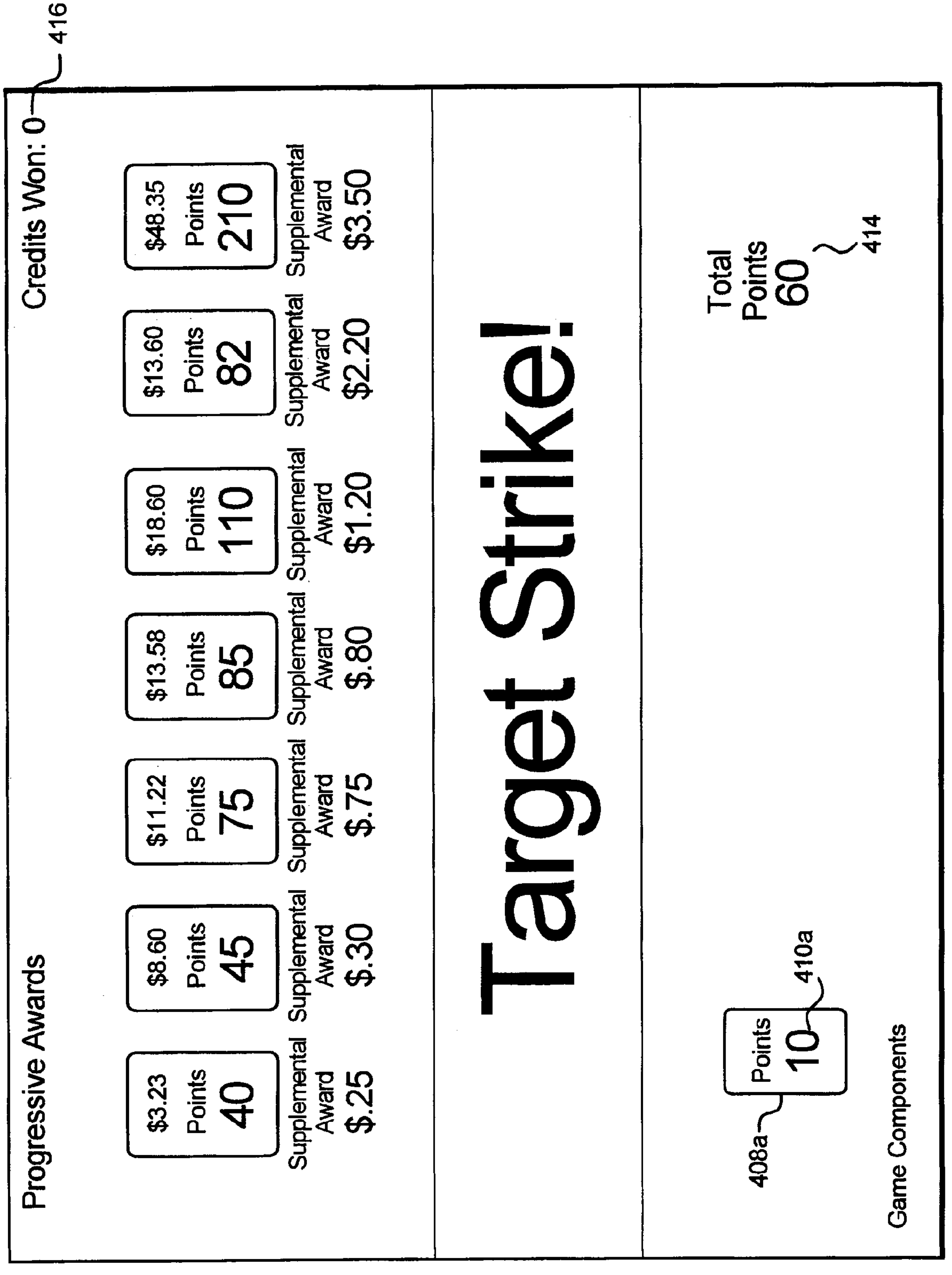

In FIG. 44, the display device 16 indicates that the additional game feature has been triggered. The central controller and/or gaming device processor determined to provide this additional game feature to the player after the player selected one of the game components. As described above, the determination may trigger or provide the additional game feature at any time during the award attempt.

Figure 45:
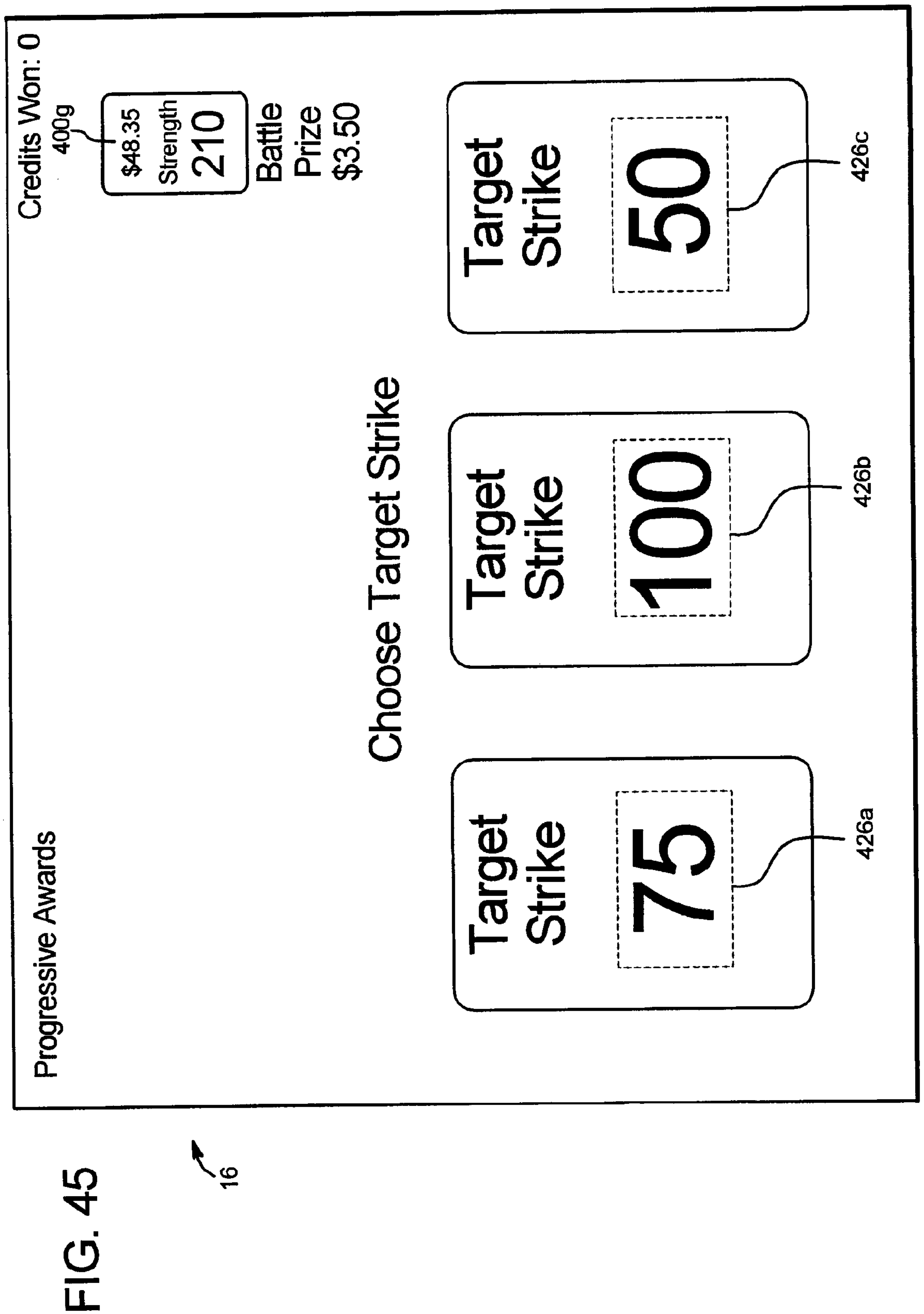

FIG. 45 illustrates the additional game feature provided to the player. In this embodiment, the game feature includes a plurality of outcomes 426*a* to 426*c* adapted to change the number of award points associated with the progressive award 400*g*. Progressive award 400*g* is associated with 210 points. Each outcome 426*a* to 426*c* is associated with a characteristic, such as a number of points. In this embodiment, the outcomes 426*a* to 426*c* include different outcomes that are hidden or masked from the player and that change the number of points associated with the progressive award 400*g* by different amounts. For example, outcome 426*a* is associated with 75 points, outcome 426*b* is associated with 100 points, and outcome 426*c* is associated with 50 points. In this embodiment, the central server and/or the gaming device processor enables the player to select one of the outcomes 426*a* to 426*c*. Based on the outcome selected by the player, the central controller and/or gaming device processor reveals the number of points associated with the selected outcome to the player and changes the number of points associated with the progressive award 400*g* by the number of points associated with the player selected outcome.

Figure 46:
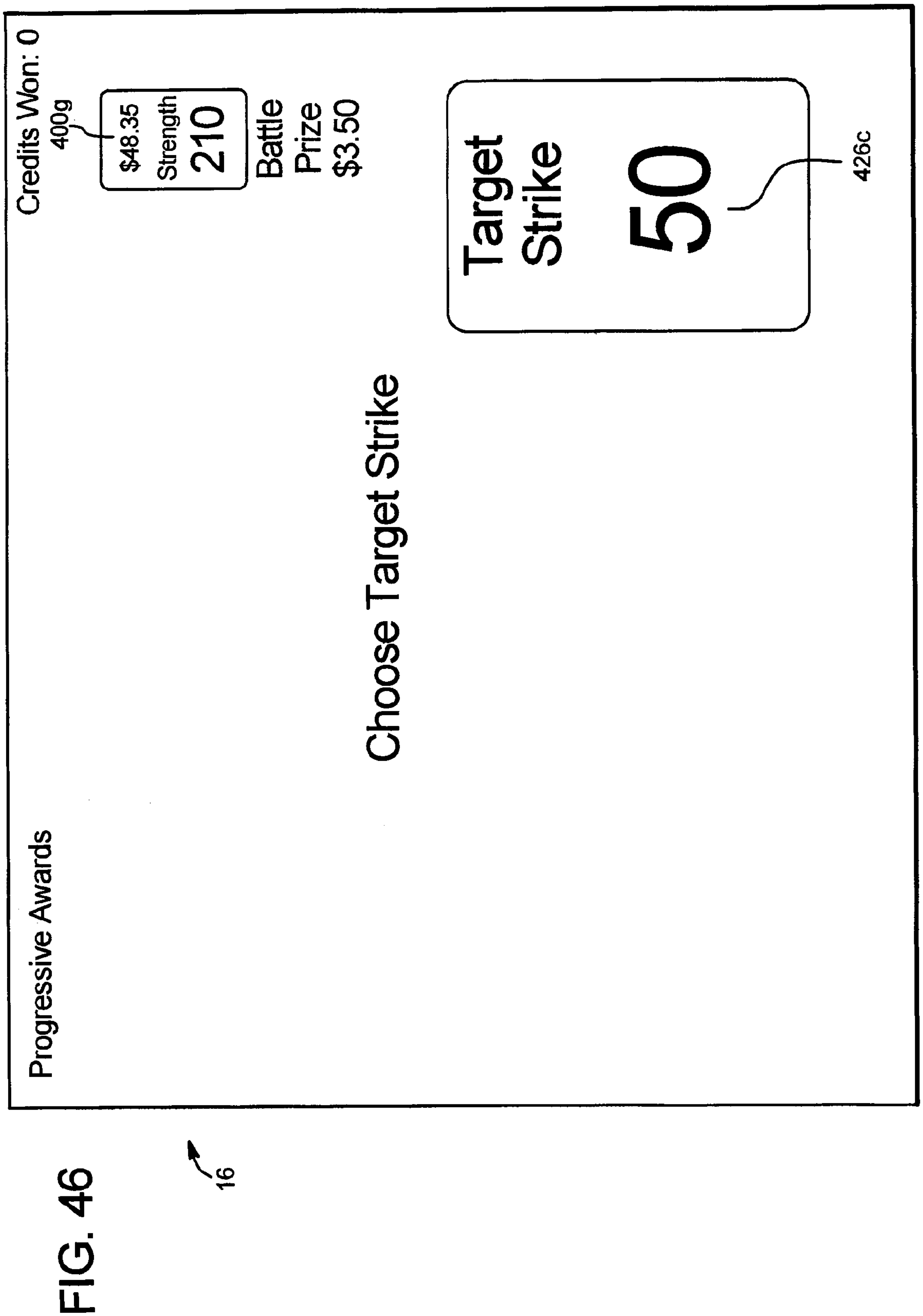

As shown in FIG. 46, the player selects outcome 426*c*, which is associated with 50 points. Based on outcome 426*c*, the number of award points associated with the progressive award 400*g* changes by 50 points, from 210 points to 160 points. It should be appreciated that the additional game feature may change the number of points associated with a progressive award that may or may not be available for selection by the player. That is, the additional game feature may be provided to the player prior to the player qualifying to play for one of the progressive awards (e.g., the progressive award 400*g*).

Alternatively, in one embodiment, the player or the central controller and/or gaming device processor selects any of the progressive awards for the additional game feature. In an alternative embodiment, one of the game components is selected and the number of points associated with the selected game component is changed in the additional game feature. For example, outcomes 426*a* to 426*d* increase the total number of game component points available to the player (e.g., increase the number of game component points associated with any remaining game components) instead of reducing the number of points associated with the progressive award 400*g*.

As illustrated in FIGS. 38, 39, 45 and 46, the central controller and/or gaming device processor determined to provide the game feature to the player multiple times in one award attempt. It should be appreciated that the central controller and/or gaming device processor may determine to provide the game feature to the player zero, one or a plurality of times in any award attempt.

Figure 47:
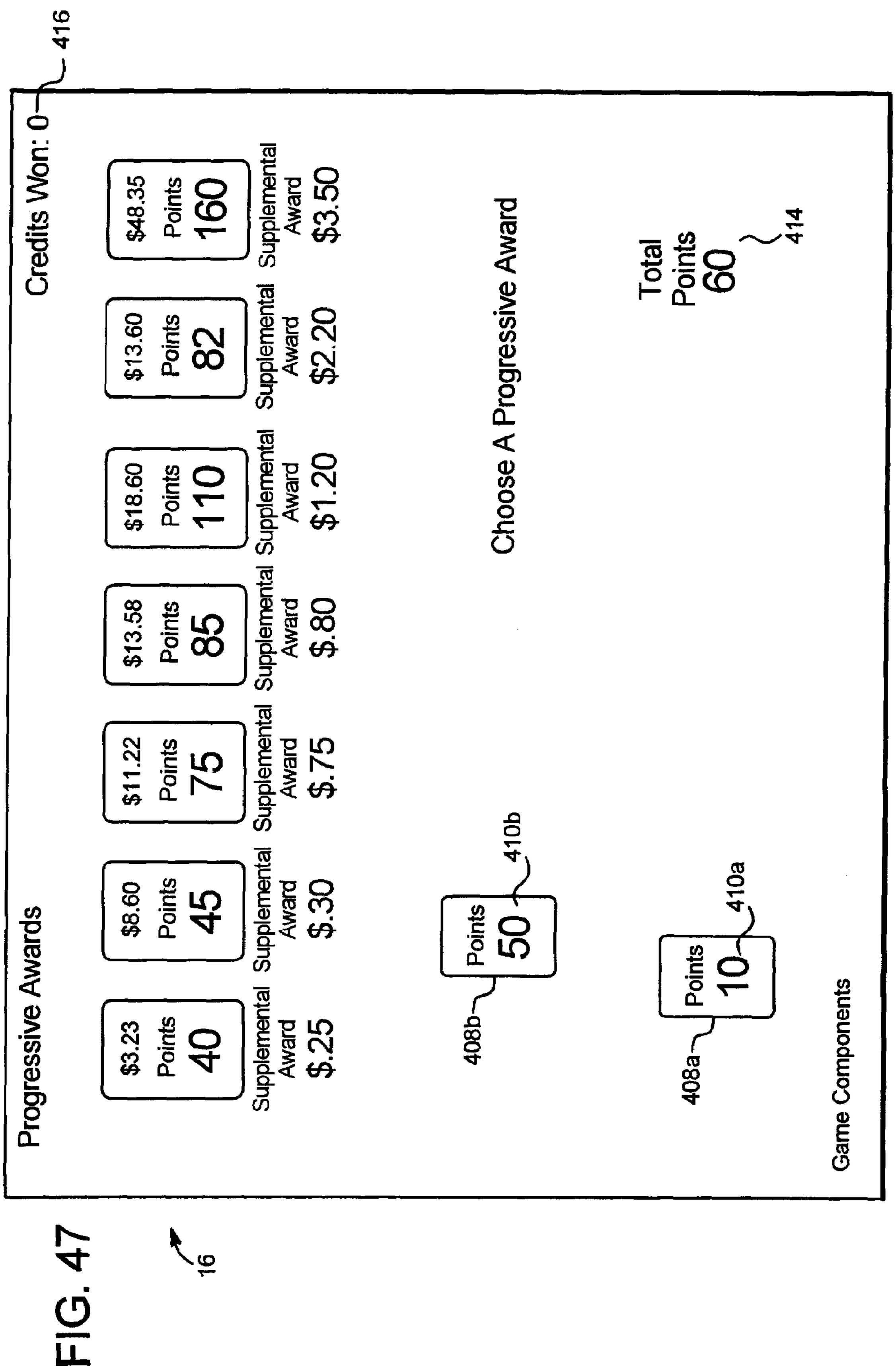

FIG. 47 illustrates display device 16 after the additional game feature is provided to the player. The game returns to the award attempt at the point before the additional game feature was triggered. As illustrated, the player has selected the game component 408*b*. The selected game component 408*b* is associated with 50 game component points.

Figure 48:
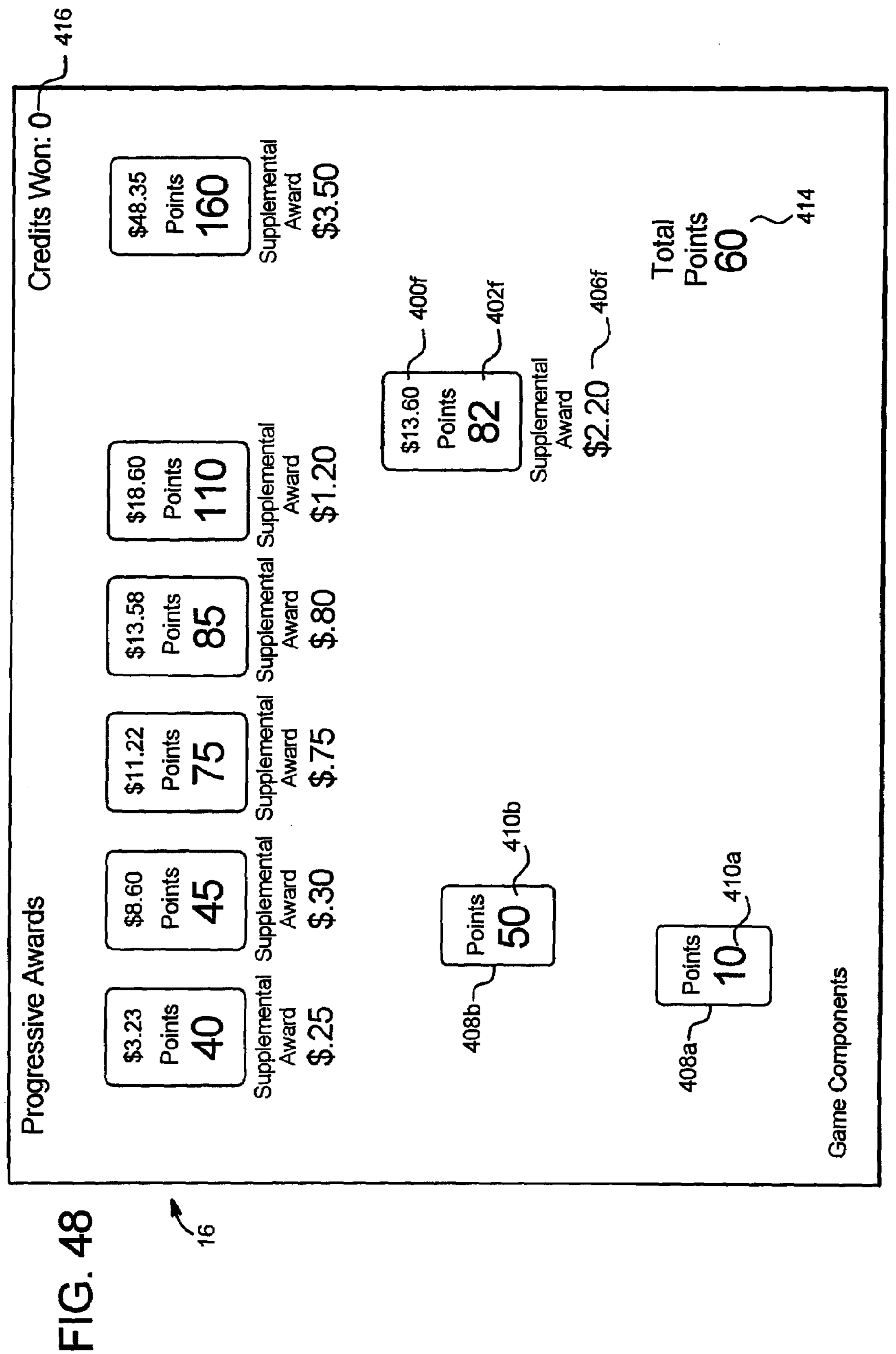

FIG. 48 illustrates the award attempt after the player selected the sixth progressive award 400*f*. The sixth progressive award 400*f* is associated with 82 award points. The game component 408*b* is associated with 50 game component points. Since the number of game component points associated with the selected game component 408*b* is less than the number of award points associated with the selected progressive award 400*f*, the player has a low likelihood of winning the selected progressive award 400*f*.

The central controller and/or gaming device determines whether to provide the selected progressive award 400*f* to the player. The determination is based on a competition or comparison between the selected game component 408*b* and the selected progressive award 400*f*. Although not shown, the competition resulted in the central controller and/or gaming device processor changing the number of game component points associated with the selected game component 408*b* to zero points and subsequently eliminating the selected game component 408*b*. The central controller and/or gaming device processor also decreased the number of award points associated with the selected progressive award 400*f* by 63 award points. The modified number of game component points associated with the selected game component 408*b* changes the likelihood of the player winning the selected progressive award 400*f* (based on the modified number of award points, i.e., 19 award points) with the remaining game component 408*a* in a subsequent competition.

Upon the elimination of the game component 408*b*, the central controller and/or gaming device processor increases the supplemental award 406*f* associated with the selected progressive award 400*f*. The elimination is based, at least in part, on the determination by the central controller and/or gaming device processor to not provide the selected progressive award 400*f*. The supplemental award 406*f* increases from $2.20 to $2.70. The increase is attributed to a supplemental award of $0.50 associated with the eliminated game component 408*b*.

Figure 49:
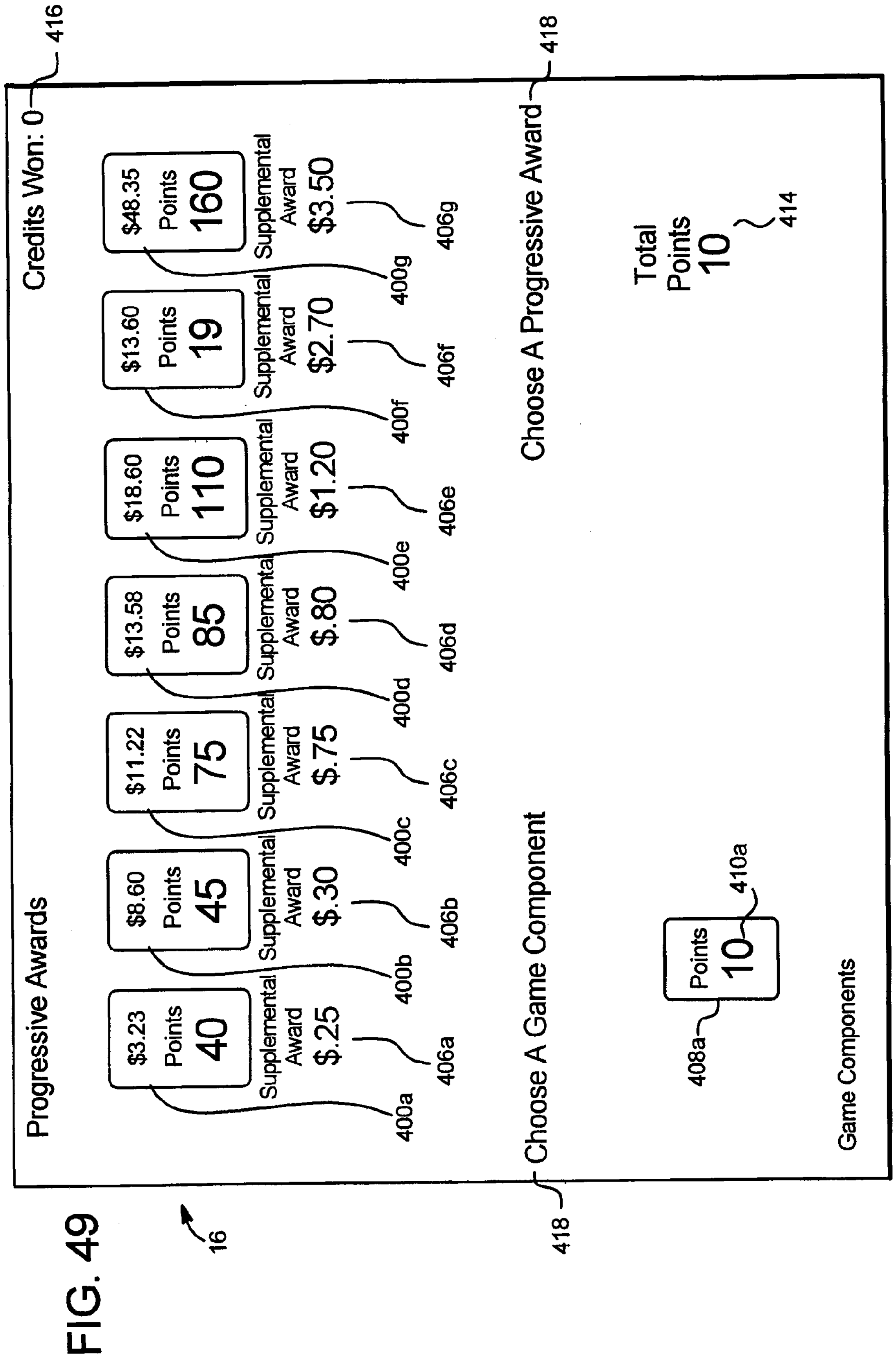

FIG. 49 illustrates the award attempt after the competition between the selected progressive award 400*f* and the selected game component 408*b*. The selected game component 408*b* was eliminated during the competition and is not shown. Display device 16 displays instructions 418 to the player to advance the award attempt. Appropriate instructions such as "CHOOSE A PROGRESSIVE AWARD" or "CHOOSE A GAME COMPONENT" may be provided to the player visually, or through suitable audio or audiovisual displays. Game component 408*a* and progressive awards 400*a* to 400*g* remain for this award attempt. The game component display 414 indicates that the game component 408*a* is associated with 10 game component points.

Figure 50:
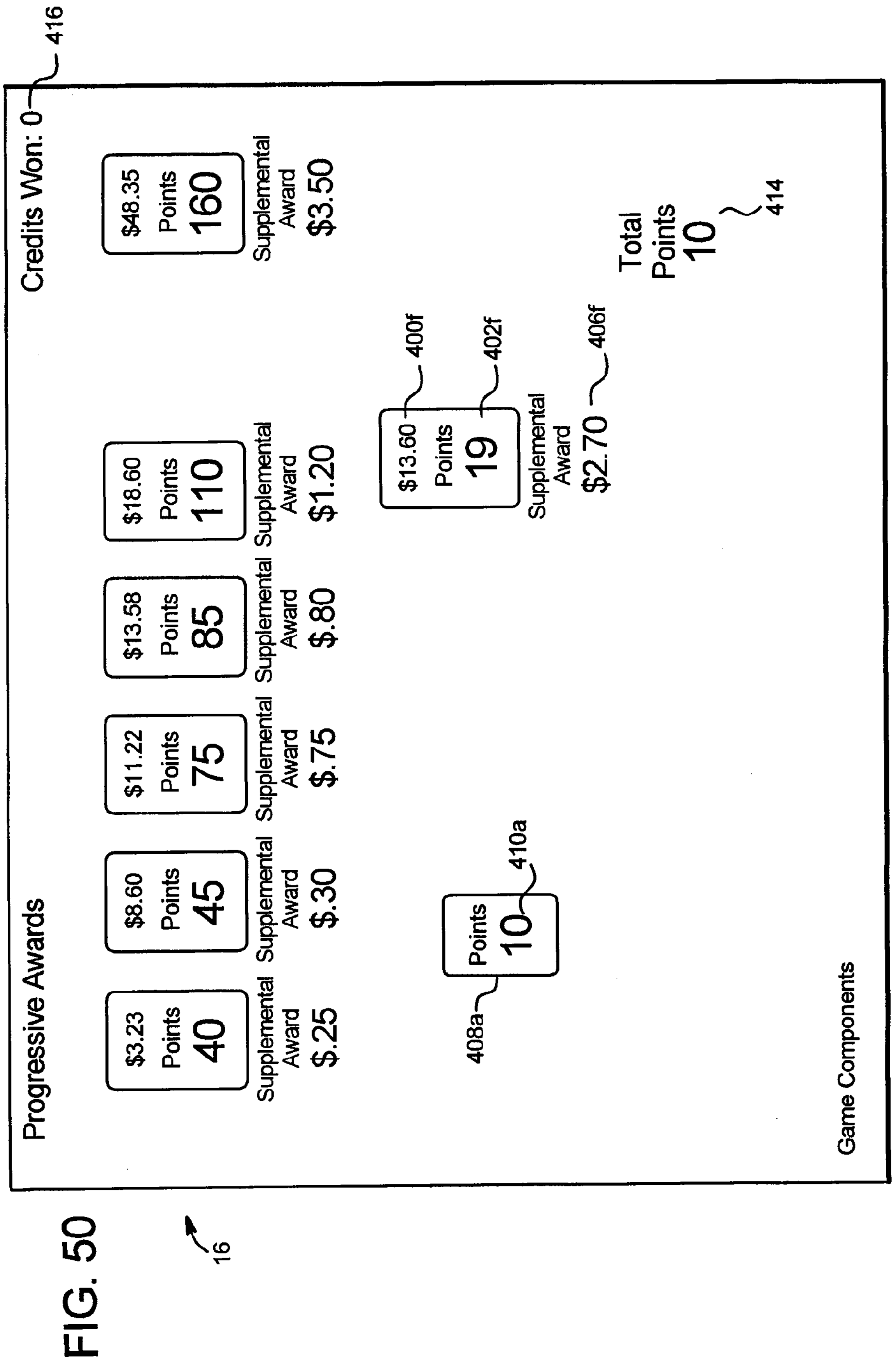

FIG. 50 illustrates the award attempt after the player selected the progressive award 400*f* and the game component 408*a*. The selected progressive award 400*f* is associated with 19 award points. The selected game component 408*a* is associated with 10 game component points. Since the number of game component points associated with the selected game component 408*a* is less than the number of award points associated with the selected progressive award 400*f*, the player has a low likelihood of winning the selected progressive award 400*f*.

The central controller and/or gaming device determines whether to provide the selected progressive award 400*f* to the player. The determination is based on a competition or comparison between the selected game component 408*a* and the selected progressive award 400*f*. Although not shown, the competition resulted in the central controller and/or gaming device processor changing the number of game component points associated with the selected game component 408*a* to zero points and subsequently eliminating the selected game component 408*a*. The central controller and/or gaming device processor also decreased the number of award points associated with the selected progressive award 400*f* by 14 award points.

Upon the elimination of the game component 408*a*, the central controller and/or gaming device processor increases the supplemental award 406*f* associated with the selected progressive award 400*f*. The elimination is based, at least in part, on the determination by the central controller and/or gaming device processor to not provide the selected progressive award 400*f*. The supplemental award 406*f* increases from $2.70 to $3.20. The increase is attributed to a supplemental award of $0.50 associated with the eliminated game component 408*a*.

Figure 51:
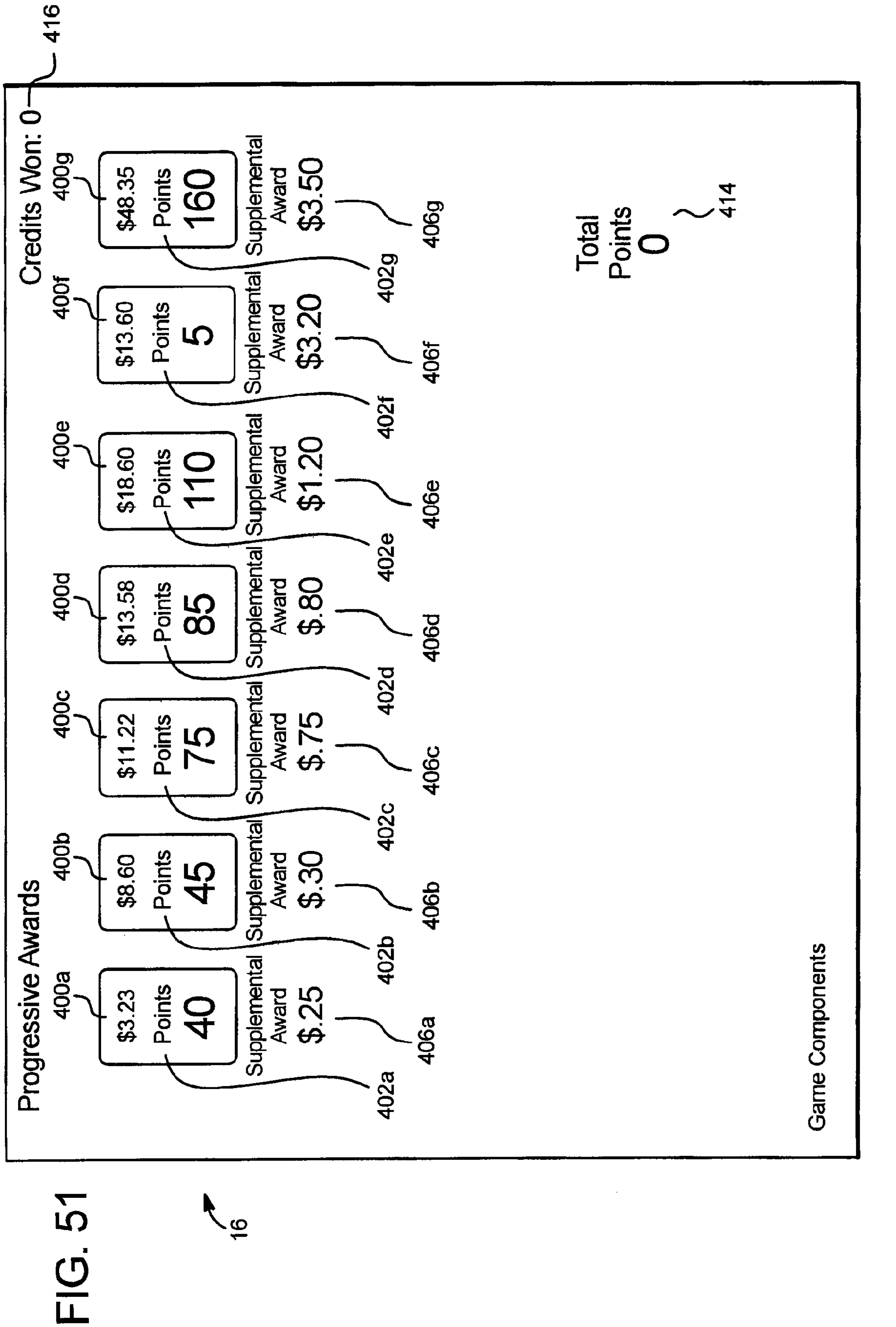

FIG. 51 illustrates the award attempt after the end of the competition between the selected progressive award 400*f* and the selected game component 408*a*. The selected game component 408*a* was eliminated during the competition and is not shown. Display device 16 indicates the result of the competition to the player. Appropriate messages such as "BATTLE LOST!" or "COMPETITION LOST!" may be provided to the player visually, or through suitable audio or audiovisual displays. No game components remain for this award attempt. The game component display 414 indicates that the player has 0 game component points remaining. The award attempt ends.

Upon completion of the award attempt, the values of the supplemental awards 406*b* to 406*g* are added to the values of the corresponding progressive award 400*b* to 400*g* to ensure that the central controller and/or individual gaming device processor distributes all of the awards allocated for the award attempt. For example, the value, e.g., $0.30, of supplemental award 406*b* is added to the value, e.g., $8.60, of progressive award 400*b*. The value of the progressive award 400*b* will be $8.90 in a subsequent award attempt. In a similar manner, the values of supplemental awards 406*c* to 406*g* are added to the values of respective progressive awards 400*c* to 400*g*.

For an award attempt in which the player is unsuccessful (e.g., does not win all of the awards), any remaining supplemental awards that the player attempted to win or a portion thereof is added back to the progressive award. For example, In this manner, the unearned supplemental awards in one award attempt are eventually paid out to the player in the form of a progressive payout in a subsequent award attempt.

Figure 52:
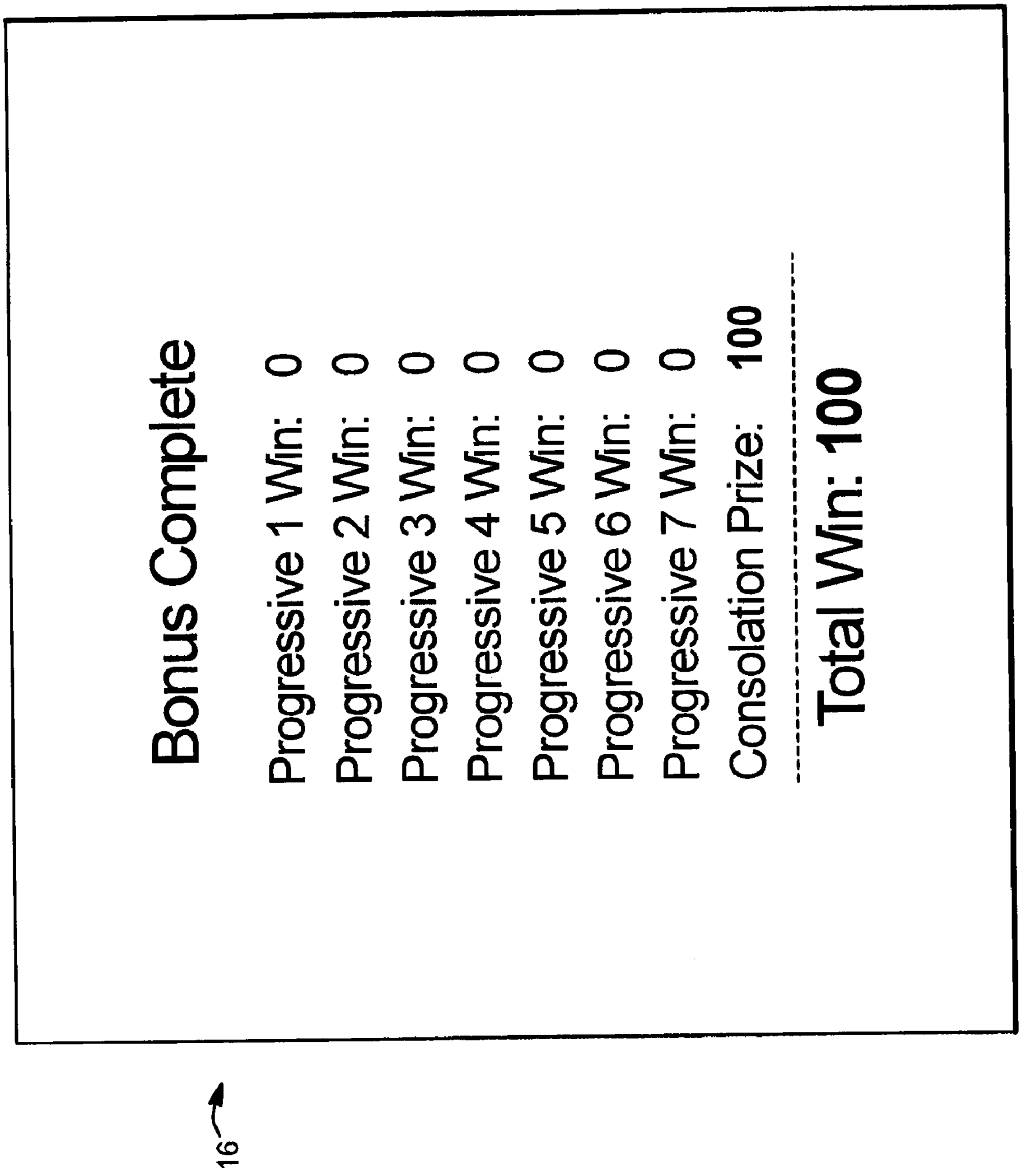

FIG. 52 illustrates a summary of the award attempt. Display device 16 indicates the summary of the award attempt to the player. Appropriate messages such as "CONSOLATION PRIZE: ______" or "TOTAL WIN: ______" may be provided to the player visually, or through suitable audio or audiovisual displays. The summary displays how many credits or other type(s) of awards that the player won in the award attempt. The player won 100 total credits as a consolation award. The central controller and/or gaming device processor provides the consolation award to the player since the player was unsuccessful in winning one or more of the progressive awards 400*a* to 400*g* in the award attempt. The consolation award ensures that the player wins at least one award in the award attempt.

In one embodiment, the central controller and/or gaming device processor associates the consolation award with a supplemental award. If the player wins the consolation award, the associated supplemental award is also won by the player. If the player wins one of the progressive awards 400*a* to 400*g* in the award attempt, the consolation award and the associated supplemental award is distributed evenly among the progressives won by the player. That is, the central controller and/or gaming device processor divides the consolation award and any supplemental award associated therewith among the progressive award(s) won by the player.

After displaying the summary shown in FIG. 52, the central controller and/or gaming device processor adds the 100 credits won in the award attempt, which are indicated by the award meter 416, to the credit display 20. In one embodiment, the central controller and/or gaming device processor returns to the primary or secondary game after the award attempt ends.

In one embodiment, the gaming machine sends information to central controller at the end of the award attempt regarding the outcome of the award attempt. A consolation award is associated with the award attempt. If a player does not win one of the progressive awards in the award attempt, the player wins the consolation award. However, if the player wins one of the progressive awards in the award attempt, the consolation award is divided amongst the number of progressive awards won in the award attempt. For example, the award attempt includes Progressive 2 (having a value of $11.15), Progressive 4 (having a value of $55.13) and Consolation Award (having a value of $1.00). If a player wins Progressive 2 and Progressive 4 in the award attempt, the values of $11.15 and $55.13 are provided to the player. The game machine determines that the consolation award of $1.00 will be evenly distributed between the two won progressive awards. The gaming machine sends a message to the central controller indicating that the progressive awards should be incremented by $0.50, which was the portion of the consolation prize distributed to each progressive award. In one embodiment, this calculation is done at the gaming machine level and is sent to the central controller (such as by a messaging saying "Increment Progressive 2 by $0.50" and "Increment Progressive 4 by $0.50"). Because the player has won both of Progressive 2 and Progressive 4, the gaming machine will also provide the central controller with this information. As a result, the central controller will reset Progressive 2 and Progressive 4. In one embodiment, Progressive 2 and Progressive 4 are reset to $0.00. The central controller then increments Progressive 2 and Progressive 4 by the appropriate amounts to reflect the message sent by the gaming machine. The central controller increments Progressive 2 to a value of $0.50 and increments Progressive 4 to a value of $0.50, which reflects the amount specified by the gaming machine.

In another embodiment, the communication between the gaming device and the central controller may be based on a primary game outcome. In this instance, the gaming machine identifies or designates specific outcomes in the primary game as increment outcomes. Each of the increment outcomes is associated with an increment amount. When an increment outcome occurs, the gaming machine messages the central controller with the increment amount and an associated progressive award is adjusted accordingly. Any of the gaming machines associated with the central controller are able to increment the progressive awards based on the primary game outcome and the incremented progressive awards are available to be won by any of the eligible gaming machines in the gaming system.

In an alternative embodiment, the central controller and/or gaming device processor provides the player with additional game components for an additional wager. In this embodiment, the player may purchase additional game components and/or game component points to continue the award attempt. The additional game components may be associated with a number of game components as described above, or may be provided with a predetermined number of game component points. In one example, a wager of $1.00 buys the player an additional 10 game component points. In another example, a wager of $1.00 buys the player an additional game component, which may be associated with a randomly selected number of game component points from an associated range of game component points. Alternatively, the additional wager may reduce the number of award points associated with one of the progressive awards 400*a* to 400*g*. For example, an additional wager of $1.00 may reduce the number of award points associated with the sixth progressive award by 10 points. Since the sixth progressive award 400*f* is associated with 5 award points in FIG. 55, a player may effectively purchase the progressive award 400*f* for the additional wager. Alternatively, if the additional wager is applied to a progressive award with more than 10 award points, such as the first progressive award 400*a*, the additional wager may increase the likelihood of the player winning the first progressive award in a subsequent award attempt.

In one embodiment, the gaming system enables a player to qualify to play a bonus round in which the player may win a designated progressive award, such as the top level progressive award or the progressive award associated with the highest award value. In this embodiment, the gaming system enables a player to select at least one of a plurality of game components, wherein to qualify to play for the designated progressive award, the player must select a specific game component from the plurality of game components. If the player selected the specific game component, the gaming system qualifies the player to play the bonus round in which the player plays for the designated progressive award. If the player did not select the specific game component, the gaming system does not enable the player to play the bonus round.

In another embodiment, the gaming system enables the player to pick one selection or outcome from a plurality of masked selections or outcomes in each bonus round. The gaming system associates each masked selection with a number of points. The gaming system also associates zero, one or a plurality of the masked selections with at least one additional pick. After the player picks one of the selections, the gaming system reveals the number of points associated with the picked selection to the player. The gaming system then enables the player to use the revealed points to play for the designated progressive award in the bonus round. As described above, the gaming system determines whether to provide the designated progressive award to the player based on a comparison between the number of points associated with the picked selection and a number of points associated with the designated progressive award. For the player to win the designated progressive award, the gaming system modifies a number of points associated with the progressive award to zero points. In one embodiment, each pick reduces the number of points associated with the designated progressive award.

If the player wins the designated progressive award, the gaming system provides the designated progressive award to the player and the bonus round ends. However, if the gaming system modifies the number of points associated with the picked selection to zero points, the player does not win the designated progressive award. After determining whether to provide the designated progressive award to the player, the gaming system determines whether the picked selection is associated with at least one additional pick. If so, the above sequence repeats to enable the player another opportunity to play for the designated progressive award. If not, the bonus round ends. In one embodiment, the bonus round ends when the player wins the designate progressive award or the player has no picks remaining. In one embodiment, the player picks from different sets of masked selections until no picks remain in the bonus round.

Figure 53:
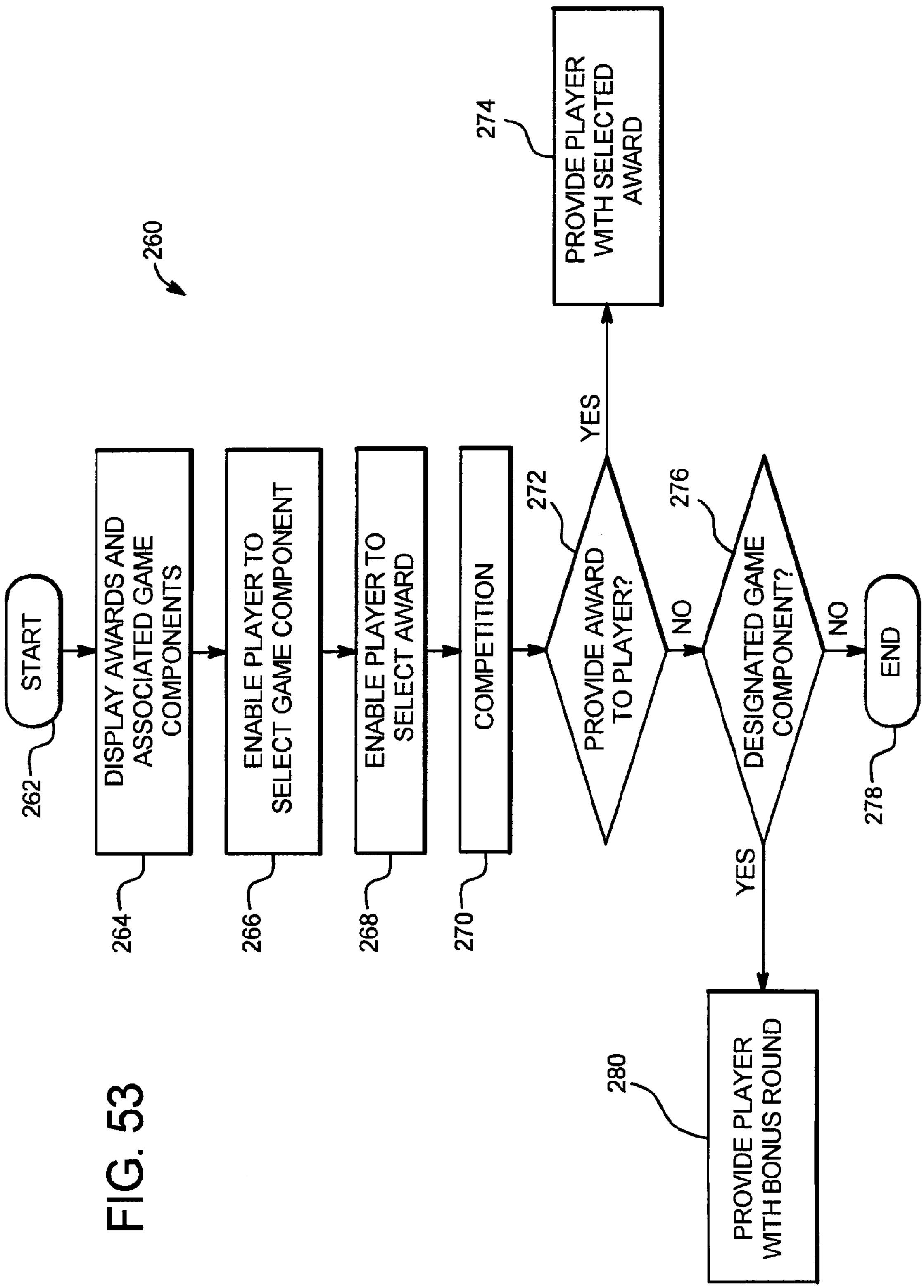
FIG. 53 is a process flow diagram showing one possible flow sequence of one embodiment of the present disclosure.

Referring now to FIG. 53, one embodiment of an award attempt of the present disclosure generally operates according to sequence 260. The award attempt may be a primary game or a bonus game on one of the gaming devices in the system and may include one or more rounds in which one or more players play for a plurality of awards, such as progressive awards. It should be appreciated that one or more awards may be set awards, such as non-progressive awards.

Sequence 260 starts as indicated in block 262. Upon initiation of the award attempt, the central controller and/or gaming device processor causes the display device to display a number of progressive awards and a number of associated game components to a player as indicated in block 264. As will be described in further detail below, when the game components are displayed, the central controller and/or the individual gaming device processor selects one of the game components as a designated game component. The designated game component determines whether the player qualifies for a bonus round feature. The central controller and/or individual gaming device processor enables the player to select one of the game components as indicated in block 266 and enables the player to select one of the awards as indicated in block 268. Each selection of a progressive award and a game component (and a subsequent comparison between the selected progressive award and the selected game component as indicated by block 270) is considered a separate game event. A likelihood or probability of winning is associated with each progressive award, wherein the association is based, at least in part, on the selected game component.

After selecting a progressive award and a game component, the central controller and/or gaming device processor determines whether to provide the player with the selected progressive award as indicated by diamond 272. The determination is based, at least in part, on the selected game component's probability or likelihood of winning the selected progressive award. If the central controller and/or gaming device processor determines to provide the player the selected progressive award, the player is provided with the selected progressive award as indicated in block 274. After providing the player the selected progressive award as indicated in block 274 or if the central controller and/or the gaming device processor does not determine to provide the award to the player as indicated in block 272, the central controller and/or gaming device processor determines if the player selected the designated game component as indicated by diamond 276. If the player selected the designated game component, the central controller and/or gaming device processor enables the player to qualify for and play in a bonus round feature as indicated in block 280. If the player did not select the designated game component, the central controller and/or gaming device processor ends the award attempt as indicated in block 278.

Figure 54:
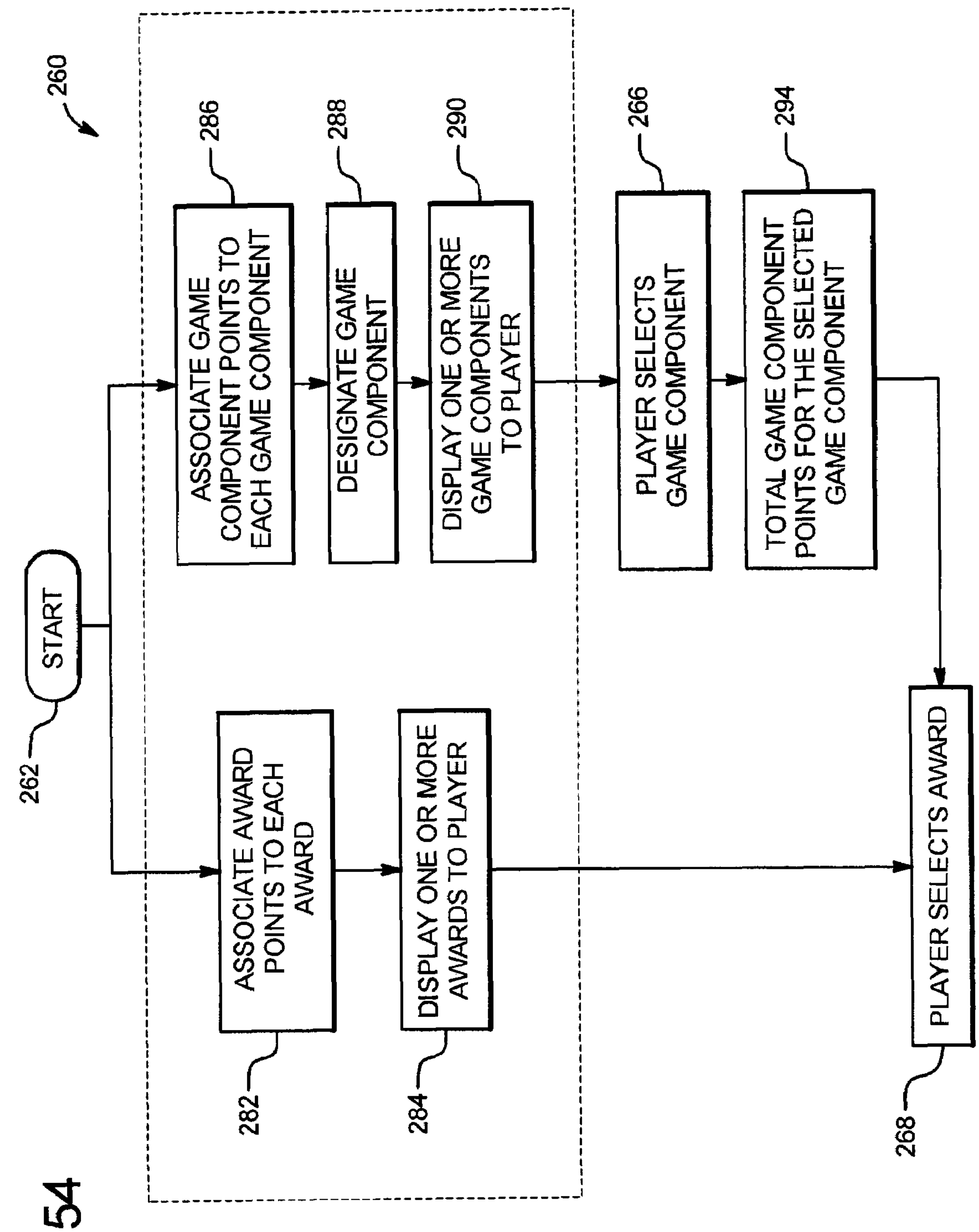
FIG. 54 is a process flow diagram showing one possible flow sequence of one embodiment of the present disclosure.

FIG. 54 illustrates one example of the central controller and/or gaming device processor causing the display device to display a number of awards and a number of game components to the player as generally indicated in block 264. After the sequence 260 starts as indicated in block 262, the central controller and/or gaming device processor associates a number of points or award points to each award as indicated in block 282. The number of award points may be predetermined, randomly determined, determined or weighted based on the player's wager, determined or weighted based on the status of one or more players (such as determined through a player tracking system), determined based on time, determined based on an outcome generated in a primary game or determined based on any other suitable method. The central controller and/or gaming device processor causes the display device to display the awards and the associated award points to the player as indicated in block 284. The central controller and/or gaming device processor enables the player to select one of the displayed awards as indicated in block 296 and continues from block 268 as described above.

After the sequence 260 starts as indicated in block 262, the central controller and/or gaming device processor also associates a number of points or game component points to each game component as indicated in block 286. The number of game component points may be predetermined, randomly determined, determined or weighted based on the player's wager, determined or weighted based on the status of one or more players (such as determined through a player tracking system), determined based on time, determined based on an outcome generated in a primary game or determined based on any other suitable method. Additionally, the central controller and/or the gaming device processor designates one of the game components as a designated game component as indicated in block 288. Selection of the designated game component is a predetermined qualifying condition for providing a bonus round feature to a player. The bonus round feature enables the player to play for a selected awards, such as an award that was previously unavailable to the player in the award attempt.

After associating points to each game component and designating one of the game components, the central controller and/or gaming device processor enables the display device 16 or 18 to display the game components and the associated game component points to the player as indicated in block 290. In this embodiment, the associated game component points are masked and remain hidden from the player until the player selects one of the displayed game components as indicated in block 292. The central controller and/or gaming device processor cooperates with the display device to display a total number of the game component points associated with the game components as indicated in block 294. The total number of game component points are revealed when the player selects one of the game components as indicated in block 292. After the player selects one of the displayed game components, the central controller and/or the gaming device processor enables the player to select one of the displayed awards as indicated in block 284 described above and the sequence 260 continues from block 268 as described above.

The number of award points and the number of game component points define a plurality of likelihoods or probabilities of winning each of the progressive awards. For example, a first game component with a low number of points has a lower relative likelihood of winning a progressive award than a second game component with a high number of points. Additionally, a selected game component with a higher number of points has a higher relative likelihood of obtaining a first progressive award with a low number of points than a second award with a high number of points. Based on the displayed number of points, the central controller and/or individual gaming device processor enables the player to strategically select which award to play for, and in what order, according to the relative likelihood of winning that award.

In one embodiment, the central controller and/or gaming device processor determines the number of award points of each award and the number of game component points of each game component (e.g., a total number of game component points of a plurality of game components) based on a likelihood or probability of winning each award. Selecting which awards to play for, at least partially based on the number points associated with the awards as indicated in block 296, introduces an element of skill or perceived skill into the award attempt.

In one embodiment, the number of award points associated with the selected progressive award in block 282 and the number of game component points associated with the selected game component in block 286 determine the probability of the player winning the selected progressive award. For example, if the number of game component points associated with the selected game component is less than the number of award points associated with the selected progressive award, the probability of the player winning the selected progressive award is low. For example, the player has a low likelihood of winning an award associated with 100 points when the game component is associated with 50 points. In another example, if the number of game component points associated with the selected game component is equal to the number of award points associated with the selected progressive award, the probability of the player winning the selected progressive award is intermediate. For example, the player has an intermediate likelihood of winning an award associated with 100 points when the game component is associated with 100 points. In an additional example, if the number of game component points associated with the selected game component is greater than the number of award points associated with the selected progressive award, the probability of the player winning the selected progressive award or multiple awards is high. For example, the player has a high likelihood of winning one or more awards associated with 100 total points when the game component is associated with 150 points.

It should be appreciated that having randomness in the number of points associated with the progressive awards and the number of points associated with the game components enables different players to play the game or award attempt in different ways or with different strategies. For example, if a first player triggers an award attempt and is provided with one or more game components associated with a high number of points, the first player may play for a different progressive award than a second player who triggers the award attempt and is provided with one or more game components associated with a low number of points. This enables the central controller to provide the award attempt associated with the same awards to different players, wherein the awards for each award attempt have different likelihoods of being won by the different players.

Figure 55:
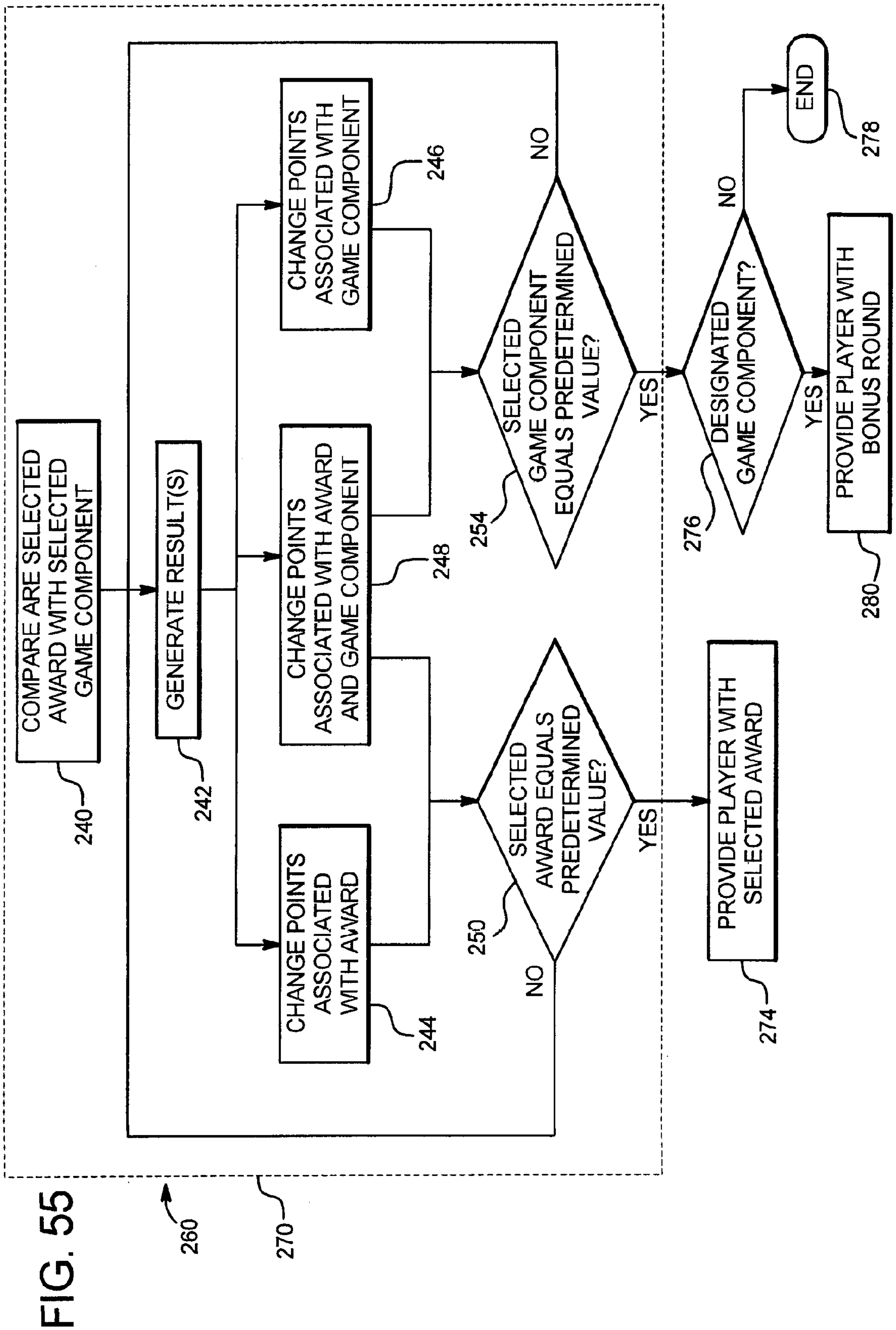
FIG. 55 is a process flow diagram showing one possible flow sequence of one embodiment of the present disclosure.

FIG. 55 illustrates one example of how the central controller and/or gaming device processor determines whether to provide the selected progressive award to the player as indicated in block 272 in FIG. 53. The central controller and/or gaming device processor enables the player to select one or more of the progressive awards and one of the game components as described above. After the player selects one of the progressive awards and one of the game components, the central controller and/or individual gaming device processor determines a game event outcome. The game event outcome is based on a comparison between the number of points associated with the selected progressive award and the number of points associated with the selected game component as indicated in block 240. In one embodiment, the central controller and/or individual gaming device processor determines the game event outcome through one or more randomly generated results or outcomes as indicated in block 242.

For each generated result, the central server and/or gaming device processor determines to: (1) change the number of award points associated with the selected progressive award as indicated in block 244, (2) change the number of game component points associated with the selected game component as indicated in block 246, or (3) change the number of award points associated with the selected progressive award and the number of points associated with the selected game component as indicated in block 248.

The central controller and/or gaming device processor continues to generate results as indicated in block 242. For each result, the central controller and/or gaming device processor changes the number of points associated with the selected progressive award and/or changes the number of points associated with the selected game component as indicated by blocks 244, 246 and 248. The central controller and/or gaming device processor continues to change the number of points associated with the selected progressive award and/or the selected game component until the number of points associated with the selected progressive award and/or the selected game component reaches a designated or predetermined value, such as zero points.

After the central controller and/or gaming device processor generates the results represented by blocks 244 and 248, the central controller and/or gaming device processor determines whether the award points associated with the selected progressive award equal the predetermined value as indicated by diamond 250. If the award points associated with the selected progressive award equal the predetermined value, the central controller and/or gaming device processor provides the selected progressive award to the player as indicated in block 274. The central controller and/or gaming device processor provides the selected progressive award to the player when the number of award points associated with the selected progressive award reaches the predetermined amount.

For example, if the selected progressive award is associated with 50 points as indicated in block 282, one or more generated results may change the number of award points associated with the selected progressive award from 50 points to zero points as indicated by blocks 240, 244 and 248. Since zero points is the predetermined amount in this embodiment, the central controller and/or gaming device processor provides the player with the selected progressive award as indicated in block 274 and the sequence 260 continues from block 274 in FIG. 53.

After the central controller and/or gaming device processor generates the results represented by blocks 246 and 248, the central controller and/or gaming device processor determines whether the game component points associated with the selected game component equal the predetermined value as indicated by diamond 254. If the game component points associated with the selected game component equal the predetermined value as indicated by diamond 254, the central controller and/or gaming device processor determines whether the selected game component is the designated game component as indicated by diamond 276. The same determination is made when the player is provided with the selected award as indicated in block 274. If the player selected the designated game component (as represented in block 292), the central controller and/or gaming device processor enables the player to qualify for and play in a bonus round feature as indicated in block 280. If the player did not select the designated game component (as represented in block 292), the central controller and/or gaming device processor ends the award attempt as indicated in block 278.

Figure 56:
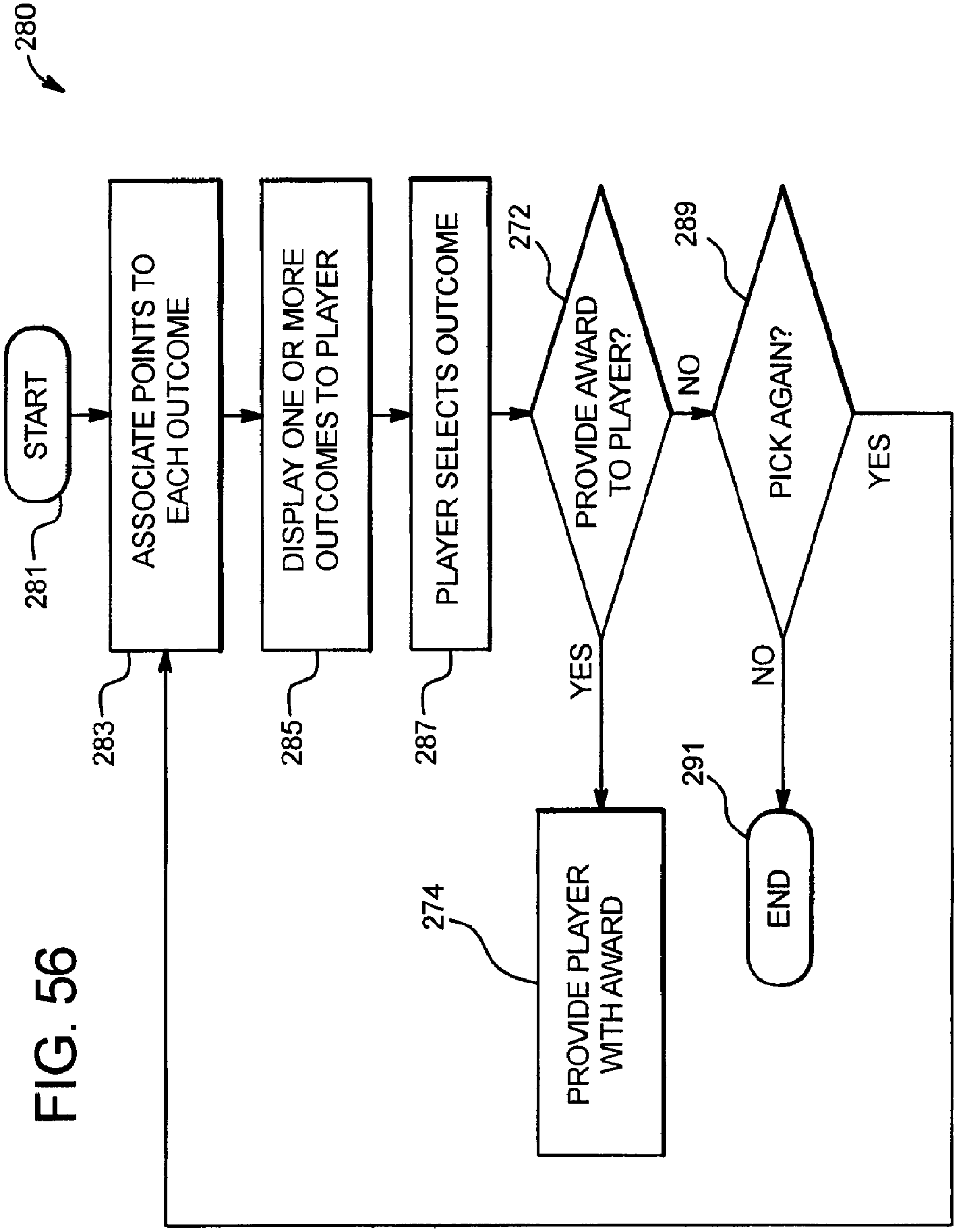
FIG. 56 is a process flow diagram showing one possible flow sequence of one embodiment of the present disclosure.

FIG. 56 illustrates one example of the central controller and/or gaming device processor causing the display device to display a bonus round feature to the player as generally indicated in block 280. In one embodiment, the central server and/or the gaming device processor provides the player with a bonus round feature when the player selects the designated game component as indicated in block 292. The bonus round sequence 280 enables a player to play for a designated or previously unavailable award, such as a top-level progressive award. The bonus round sequence 280 starts as indicated in block 281.

In one embodiment, the bonus round feature includes a plurality of outcomes, each associated with a characteristic, such as a number of points as indicated in block 283. The number of points associated with each outcome may be determined in a similar manner as the number of points associated with each game component (as indicated in block 286). The central controller and/or gaming device processor displays one or more outcomes the player as indicated in block 285. The outcomes include different outcomes that change the number of points associated with one of the awards by a predetermined amount. For example, the central controller and/or the gaming device processor enables the player to select one of the outcomes as indicated in block 287.

After the player selects one of the outcomes, the central controller and/or the gaming device processor determines whether to provide the award to the player as indicated by diamond 272. If the central controller and/or the gaming device processor determines to provide the player with the award, the player is provided the award as indicated in block 274.

In one embodiment, the central controller and/or the gaming device processor provides the player with one pick of the outcomes. Zero, one or a plurality of the outcomes are associated with at least one additional pick, which if selected, could extend the bonus round feature and increase the likelihood that the player wins the award in the bonus round feature. If the player selects an outcome which is not associated with an additional pick, the bonus round feature ends. Thus, after the central controller and/or the gaming device processor determines whether to provide the player the award, the central controller and/or the gaming device processor determines whether the player has any remaining picks or is enabled to pick another outcome as indicated by diamond 289. If the player has picks remaining, e.g., the player selected an outcome that is associated with an additional pick, the central controller and/or the gaming device processor associates points to a plurality of outcomes, displays those outcomes to the player and enables the player to select one of the outcomes as indicated in blocks 283, 285 and 287. This sequence continues until the player uses the remaining picks, does not select an outcome associated with an additional pick or is provided the award. Alternatively, if the central controller and/or the gaming device processor determines that the player has no picks remaining or provides the player with the award, the bonus round sequence ends as indicated in block 291.

In one embodiment, the bonus round feature enables the player to play for the highest award, e.g., progressive award 236*g*, when the player selects the designated game component as indicated in block 292. If the player selects the designated game component, the central controller and/or the gaming device processor may provide appropriate messaging to the player to indicate the player's qualification for the bonus round sequence. Upon qualifying to play for that progressive award, the player may be required to successfully complete a subsequent bonus round to win that progressive award.

In one embodiment, the central controller and/or gaming device processor designates one or more of the progressive awards as unavailable and disqualifies the designated and unavailable progressive award(s) from selection by the player. The central controller and/or gaming device processor enables the player to select and play for any of the available progressive awards in sequence 260. At least one of the progressive awards remain unavailable to select and play for until the player satisfies a predetermined condition. The predetermined condition may require the player to select the designated game component before being enabled to play for the unavailable progressive award. If the player selects the designated game component, the central controller and/or gaming device processor designates one or more of the unavailable progressive awards as available and enables the player to play for the previously unavailable progressive award.

In an alternative embodiment, the predetermined winning condition may also require the player to win one or more of the progressive awards or wager a predetermined minimum amount to play for the designated and previously unavailable progressive award.

Referring now to FIGS. 57 to 63, the display device 16 illustrates one example of a game play screen for one embodiment of the award attempt described herein. For ease of illustration, the relevant game information for the award attempt is shown on the same display device 16. In alternative embodiments, the relevant game information for the award attempt is divided between different areas of the gaming device 10 or the display devices 16 and 18. Alternatively, the display device 18 is adapted to display the game play screen.

Figure 57:
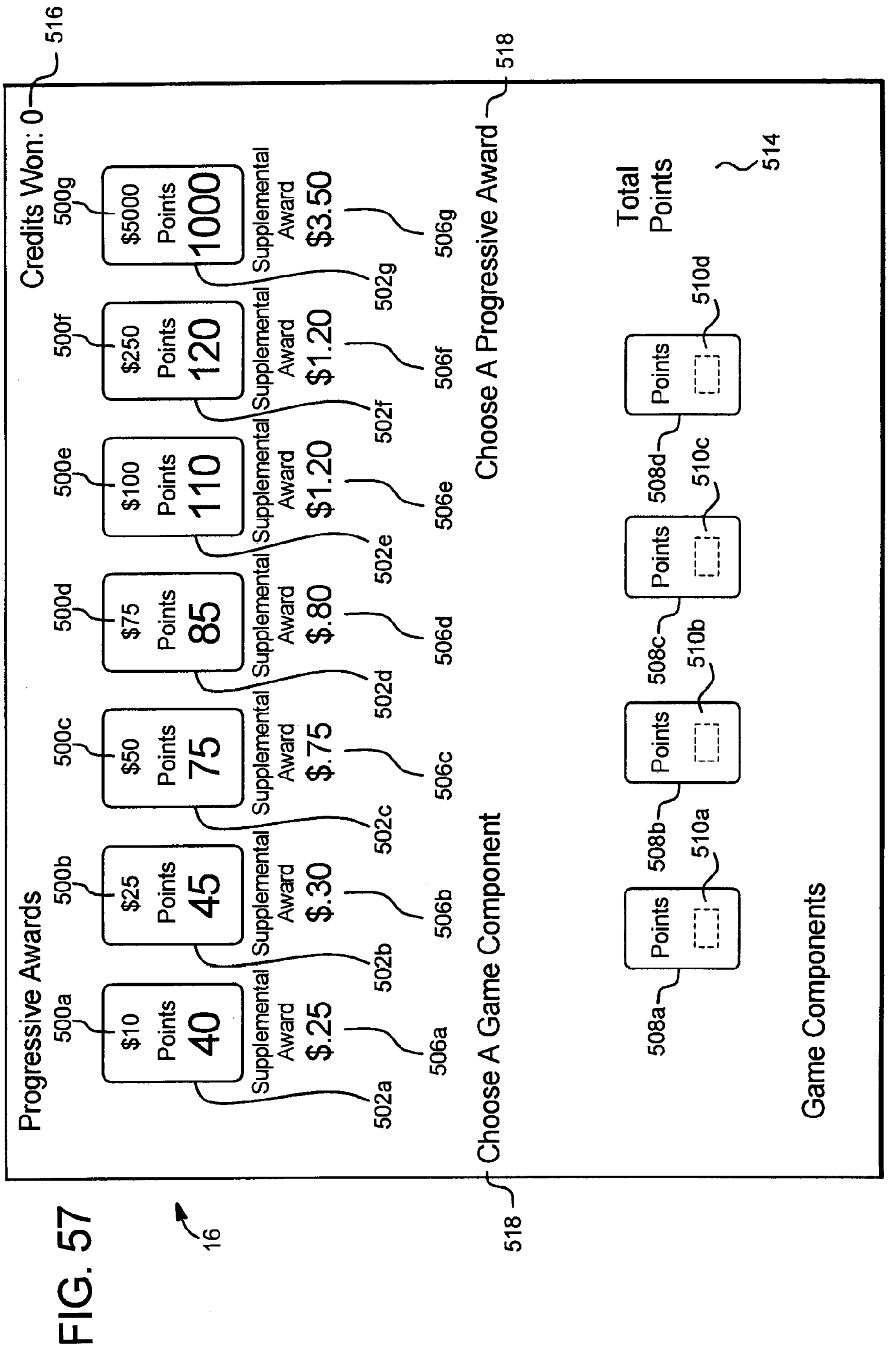
FIGS. 57 to 63 are enlarged front plan views of a display device of the gaming device and/or gaming system disclosed herein, illustrating an example of one embodiment of the present disclosure where a player is provided with another alternative award attempt or game opportunity.

In FIG. 57, the display device 16 displays one embodiment of an award attempt in accordance with the present disclosure after a suitable triggering event as described above. The display device 16 displays a plurality of progressive awards 500*a* to 500*g* to a player in the form of symbols, characters, numbers, cards, player cards or any other suitable form determined by the game implementer. As illustrated, the progressive awards 500*a* to 500*g* are set at levels of $10, $25, $50, $75, $100, $250 and $5000, respectively. The selected levels are displayed on the display device 16 in this embodiment. In this embodiment, the progressive awards 500*a* to 500*g* have been incremented from their selected default levels and are at levels higher than the default levels. It should be appreciated that the progressive awards 500*a* to 500*g* may be set at any suitable value or level deemed appropriate by the game implementer.

In this embodiment, the top level progressive award 500*g* is set at $5000 and is unavailable for selection by the player. In order to play for this progressive award 500*g*, the player must qualify for a bonus round such as described herein. It should be appreciated that it is possible for each player to play for and win the progressive award 500*g* in each award attempt. However, each player may be required to satisfy a predetermined qualifying condition to play for that progressive award. Upon qualifying to play for that progressive award, the player may be required to successfully complete a subsequent bonus round to win that progressive award.

As illustrated in FIG. 57, each progressive award 500*a* to 500*g* is associated with a characteristic 502*a* to 502*g*, which is displayed in the form of award points. The characteristics or award points 502*a* to 502*g* are displayed in association with the progressive awards 500*a* to 500*g* on the display device 16. The central controller and/or gaming device processor associates the first progressive award 500*a* with 35 award points, the second progressive award 500*b* with 45 award points, the third progressive award 500*c* with 70 award points, the fourth progressive award 500*d* with 80 award points, the fifth progressive award 500*e* with 110 award points, the sixth progressive award 500*f* with 120 award points and the seventh progressive award 500*g* with 1000 award points. The number of award points associated with the progressive awards 500*a* to 500*g* may be randomly determined by the central controller and/or the gaming device processor, predetermined or determined in any other suitable manner.

As illustrated in FIG. 57, the display device 16 displays a plurality of supplemental awards 506*a* to 506*g* in the award attempt. The central controller and/or the gaming device processor associates each supplemental award 506*a* to 506*g* with one of the progressive awards 500*a* to 500*g*. In this embodiment, the supplemental awards 506*a* to 506*g* operate in a similar manner as the supplemental awards 406*a* to 406*g* described above.

Figure 58:
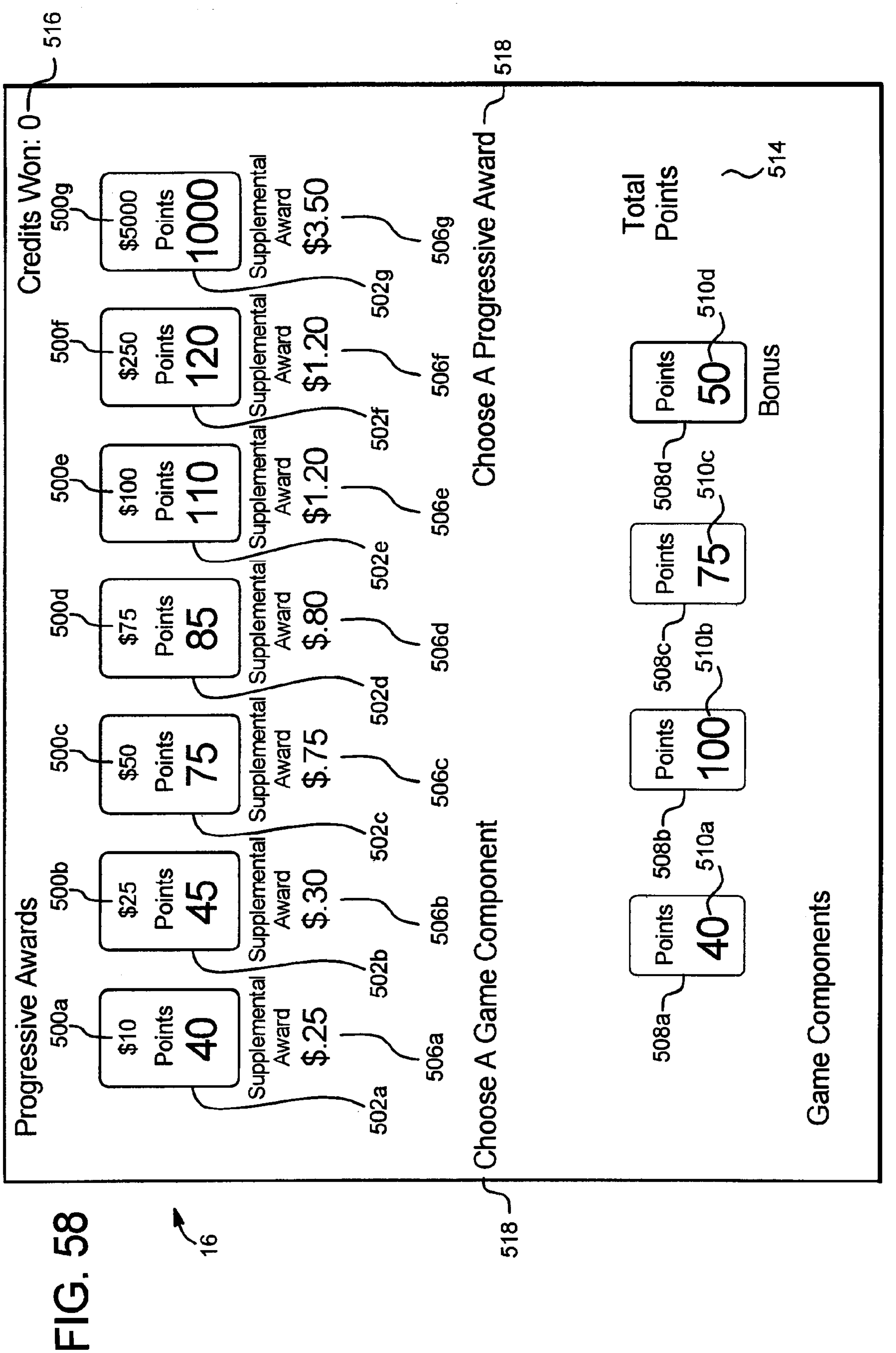

The display device 16 also displays a plurality of game components 508*a* to 508*d* in the award attempt. The game components 508*a* to 508*d* are displayed to the player as symbols, characters, numbers, cards, player cards or any other suitable form determined by the game implementer. Each of the game components 508*a* to 508*d* is associated with a characteristic 510*a* to 510*d*, which is displayed in the form of a number of game component points. In this embodiment, the central controller and/or the gaming device processor randomly determines the characteristics or game component points 510*a* to 510*d* for each game component 508*a* to 508*d*. The characteristics or game component points 510*a* to 510*d* are initially masked or hidden on the display device 16 as illustrated in FIG. 57. The game component points 510*a* to 510*d* remain masked until the player selects or picks one of the game components 508*a* to 508*d*. This enables the player to select one of the game components 508*a* to 508*d* for the award attempt without knowing the number of points associated with each game component. After the player selects or picks one of the game components 508*a* to 508*d*, the game component points 510*a* to 510*d* are revealed to the player and displayed in association with the game components 508*a* to 508*d* on the display device 16 as illustrated in FIG. 58. Alternatively, the number of points associated with each game component are not displayed on the display device and the display device displays the number of points associated with the selected game component.

The central controller and/or gaming device processor associates the first game component 508*a* with 40 game component points, the second game component 508*b* with 100 game component points, the third game component 508*c* with 75 game component points and the fourth game component 500*d* with 50 game component points.

The central controller and/or the gaming device processor selects one of the game components 508*a* to 508*d* as a designated game component. This selection may be randomly determined based on probabilities associated with each gaming component. Alternatively, the central controller and/or the gaming device processor selects the gaming component associated with the highest number of game component points relative to the other game components as the designated game component. In one embodiment, the central controller and/or the gaming device processor selects the designated gaming component after the player selection and designates the player selected gaming component as the designated game component. This enables the central controller and/or the gaming device processor to calculate the odds of, or determine the probability of, the player selecting the designated game component. For example, the central controller and/or the gaming device processor may determine a quantity of designated gaming components based on that player's wager history, the player's status (as determined through a player tracking system) or some other suitable factor or functionality. A higher quantity of designated gaming components will increase the likelihood or probability of the player selecting a designated gaming component. In one example, players having a lower status (e.g., bronze players) have a lower chance of selecting a designated game component than players having a higher status (e.g., gold).

The central controller and/or the gaming device processor enables the player to select one of the game components 508*a* to 508*d*. After the player selects one of the game components, the central controller and/or the gaming device processor determines if the selected game component is the designated game component. As illustrated in FIG. 58, the central controller and/or the gaming device processor designated the second game component 508*d* as the designated game component. Such designation is effected by a bonus designation or indication, such as "MARKED" or "BONUS" associated with one of the game components 508*a* to 508*d*.

In one embodiment, the central controller and/or the gaming device processor reveals the number of points associated with the picked game component 508*d*. The central controller and/or the gaming device processor may reveal the number of points associated with each picked and non-picked game component. This informs the player of which game component that the central controller and/or the gaming device processor selected as the designated game component and the number of points associated with each (picked and non-picked) game component. It should be appreciated that the central controller and/or the gaming device processor may reveal the number of points associated with each picked and non-picked game component at the end of the bonus round feature, or may reveal the number of points associated with each picked game component when the player picks that game component.

Additionally, the central controller and/or the gaming device processor controls the display device 16 to indicate which of the game components 508*a* to 508*d* the player picked or selected. This indication may include illumination, audio and/or visual indications to the player. For example, FIG. 58 illustrates that the display device displays the selected game component 508*d* and the non-selected game components 508*a* to 508*c* differently. Alternatively, the central controller and/or the gaming device processor may cause the display device to display the number of points associated with the selected game component and/or the designated game component.

If the player selected the designated game component, the central controller and/or the gaming device processor enables the player to play a bonus round feature in which the player plays for a designated progressive award. In one embodiment, the designated progressive award is a previously unavailable progressive award, such as the top-level progressive award 500*g*. In this embodiment, the player may only play for the top level award after selecting the designated game component. Alternatively, the top level progressive award 500*g* is made available for the player to play for after the player satisfies another predetermined qualifying condition, such as winning one of the other progressive awards 500*a* to 500*f*.

Figure 59:
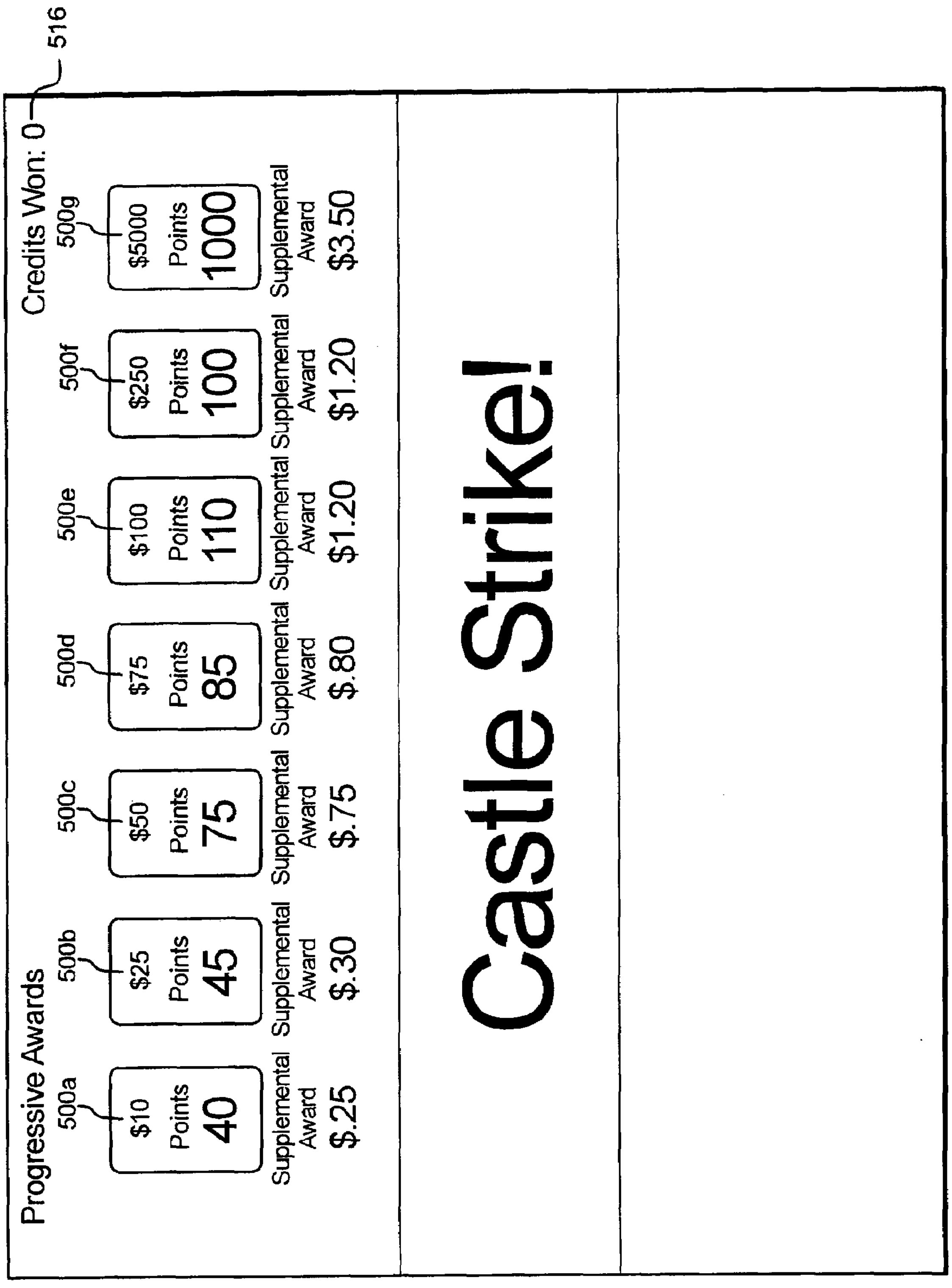

FIG. 59 illustrates an appropriate messaging such as "Castle Strike!" or "Bonus!" which may be provided to the player when the player selects the designated game component. Such messages may be provided to the player visually, or through suitable audio or audiovisual displays. These messages indicate that the player has qualified for the bonus round feature.

If the player has not selected the designated game component, the top-level progressive award 500*g* remains unavailable to the player. In one embodiment, the central controller and/or the gaming device processor disables the top level progressive award 500*g* upon initiation of the award attempt so that the top level award 500*g* is only made available to the player when the player qualifies to play for that progressive award.

The display device 16 displays a game component point display 514. The game component point display 514 displays the total number of game component points associated with the picked game component, which was the game component 508*d*. As the player progresses through the award attempt, the game component point display 514 updates to display any remaining game component points available to the player. The game component display 514 is initially blank as illustrated in FIG. 57. After the player selects one of the game components, the central controller and/or the gaming device processor updates the game component display 514 to indicate that the selected game component 508*d* is associated with 50 total game component points for this award attempt.

The display device 16 also displays an award meter 516. The award meter 516 indicates to the player how many credits or other type(s) of award are provided in the award attempt of the present disclosure. During an award attempt, any award received by a player is added to the award indicated by the award meter 516. Once an award attempt ends, the award amount indicated by the award meter 516 is provided to the player. As shown in FIGS. 57 and 58, the award meter 516 indicates that the player's award at the beginning of the award attempt is zero.

In one embodiment, the display device 16 displays instructions 518 to the player to advance the award attempt. Appropriate instructions such as "CHOOSE A PROGRESSIVE AWARD" or "CHOOSE A GAME COMPONENT" may be provided to the player visually, or through suitable audio or audiovisual displays. After the player selects one of the game components, the central controller and/or the gaming device processor enables the player to select one of the progressive awards 500*a* to 500*f*. Progressive award 500*g* is associated with the bonus round feature and is unavailable for player selection. By enabling the player to select the progressive award after selecting one of the game components, the central controller and/or the gaming device processor enables the player to estimate the likelihood of winning each progressive award. If the player knows the total game component points that the player is provided for the award attempt, the player may strategically select which progressive award(s) to play for and in which order to play for those awards.

Figure 60:
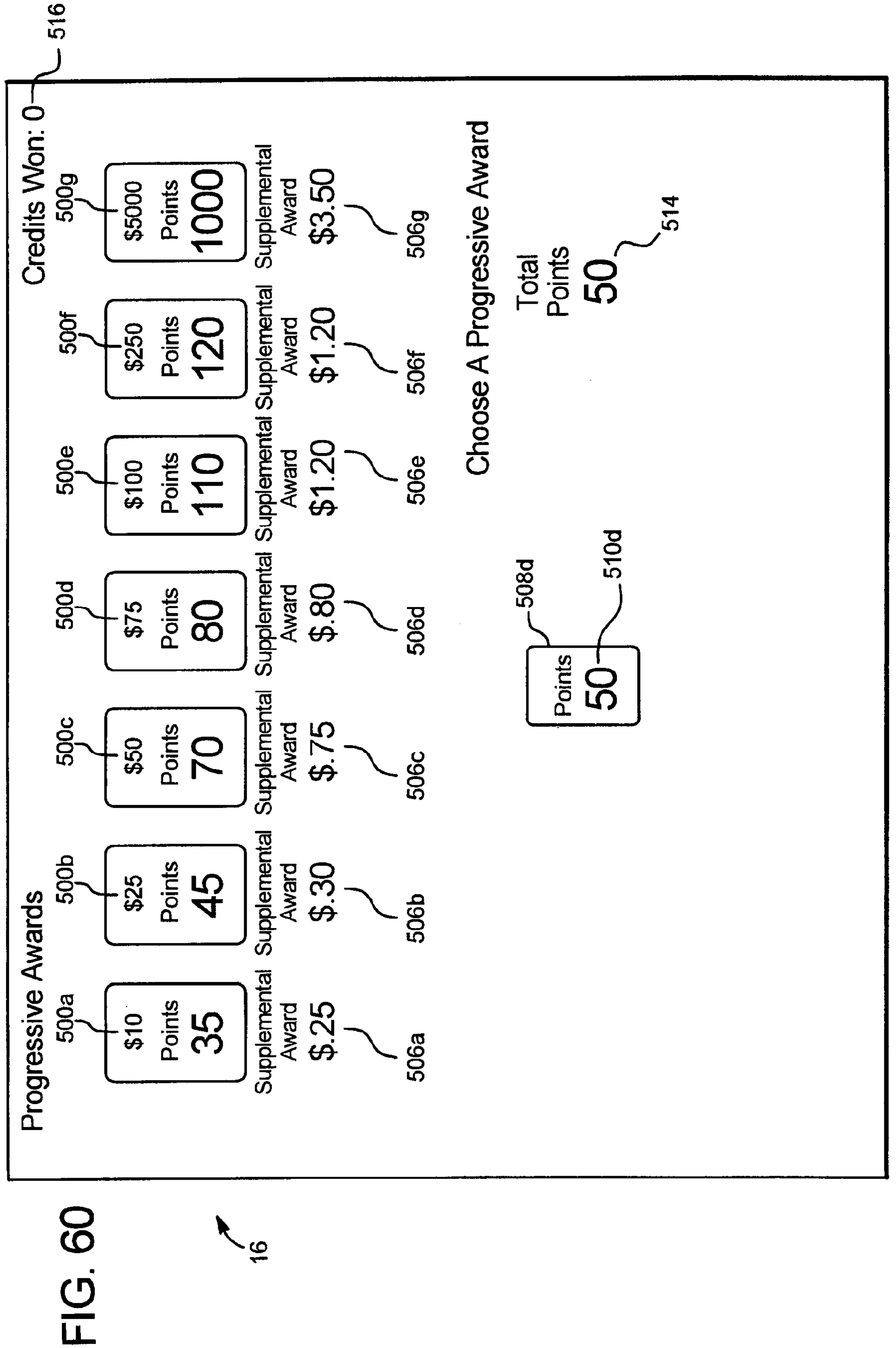

FIG. 60 illustrates the award attempt after the player selected the fourth game component 508*d* and the first progressive award 500*a*. The selected game component 508*d* is associated with 50 game component points. The selected progressive award 500*a* is associated with 35 award points. Since the number of game component points associated with the selected game component 508*d* is greater than the number of award points associated with the selected progressive award 500*a*, the player has a high likelihood of winning the selected progressive award 500*a*.

The central controller and/or gaming device determines whether to provide the selected progressive award 500*a* to the player. The determination is based on a competition or comparison between the selected game component 508*d* and the selected progressive award 500*a*. In a similar manner as described above with respect to other embodiments, the competition may include an iteration of comparisons or sub-comparisons for each remaining point associated with the selected game component. For each sub-comparison, the central controller and/or the gaming device processor accesses a comparison algorithm to determine the outcome for that point.

Although the competition is not shown, the competition resulted in the central controller and/or gaming device processor changing the number of game component points associated with the selected game component 508*d* to zero points and changing the number of award points associated with the progressive award 500*a* to 5 award points.

The player did not win the progressive award 500*a*. The player used all of the game component points displayed by the total game component points display 514 without causing the number of award points associated with the progressive award 500*a* to reach zero points. The central controller and/or the gaming device processor determines whether the player selected the designated game component. If this determination has already been made, e.g., after the player selects one of the game components, the central controller and/or the gaming device processor instructs the appropriate gaming device whether to provide the bonus round feature to the player.

If the selected game component 508*d* is not the designated game component, the central controller and/or the gaming device processor ends the game. That is, if the player has zero game component points remaining in the award attempt and the selected game component is not the designated game component, the award attempt ends because the player did not qualify for the bonus round feature. However, as described above, the player selected the designated game outcome 508*d*. This selection qualified the player for the bonus round feature.

Figure 61:
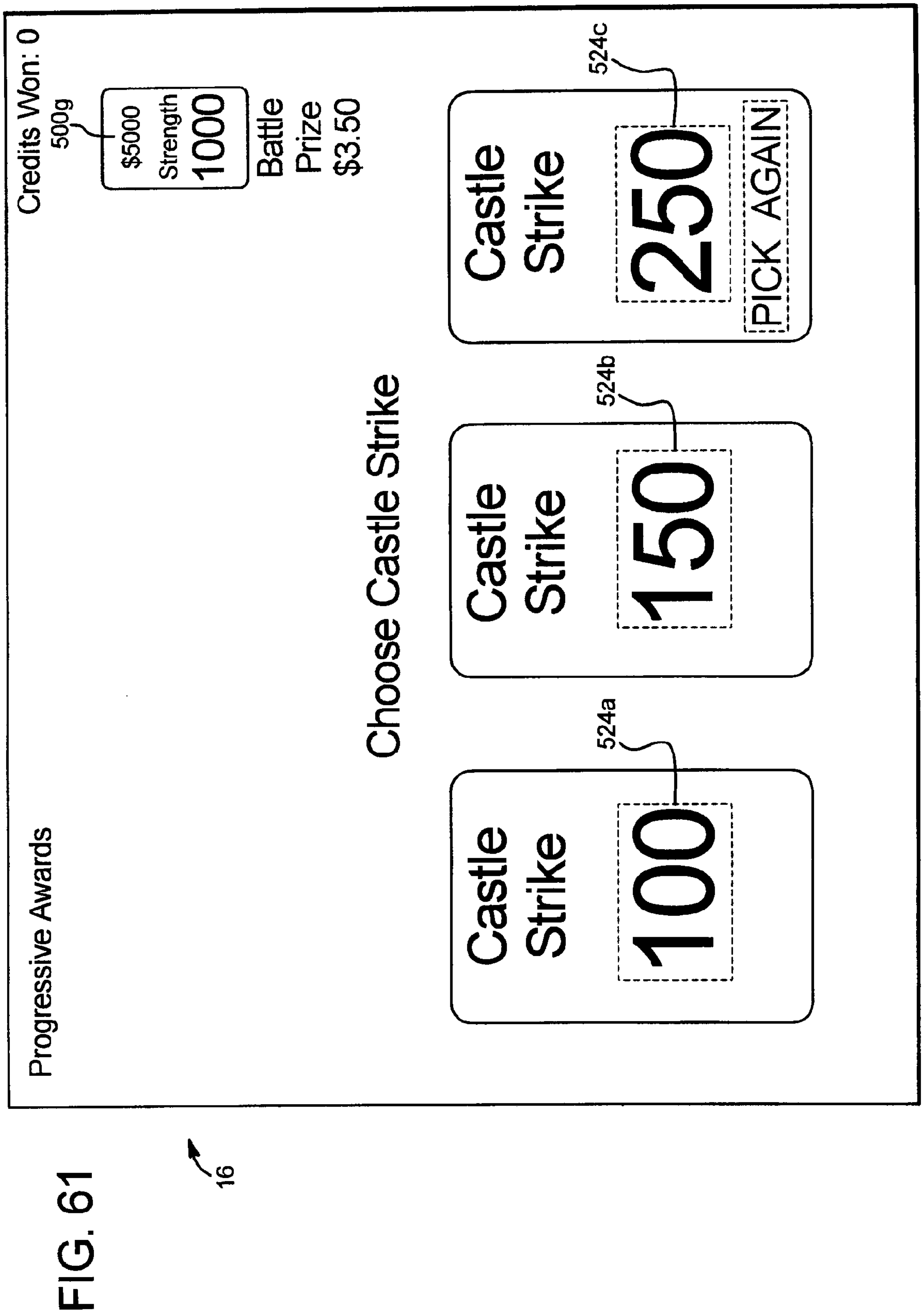
Figure 62:
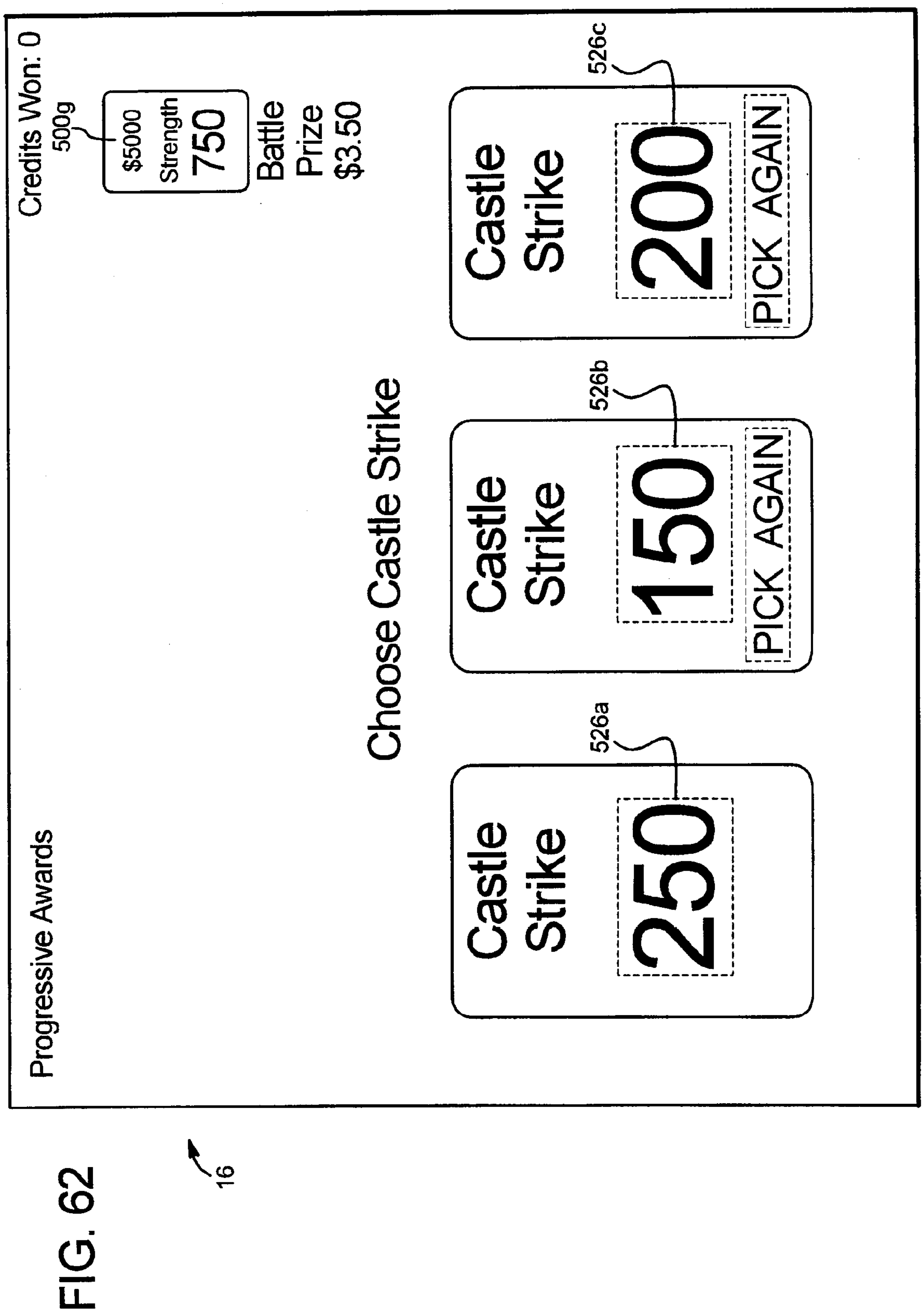

FIGS. 61 and 62 illustrate a bonus round feature that the central server and/or the gaming device processor provides to the player during the award attempt. As described above, the player must qualify for the bonus round by satisfying a predetermined qualifying condition. In this embodiment, the predetermined qualifying condition is the player picking the designated game component selected by the central controller and/or gaming device processor. That is, when the player selects which game component to play with in the award attempt, the player is also trying to qualify for the bonus round. Additionally, the player is trying to pick which game component gives the player a high likelihood of winning one of the available progressive awards 500*a* to 500*f* (e.g., a game component with a high number of game component points).

If the player qualifies for the bonus round, such as by picking the designated game component 508*b* in FIG. 58, the central controller and/or gaming device processor provides the player with the bonus round. In one embodiment, the central controller and/or the gaming device processor provides the bonus round feature to the player after the selected game component (and the game component points associated therewith) reach zero points in the award attempt. For example, the player may or may not win one of the available progressive awards 500*a* to 500*f* before playing the bonus round.

If the player does not win one of the available progressive awards 500*a* to 500*f*, the central controller and/or gaming device processor provides the player with a consolation award. As described above in other embodiments, the consolation award may be set to a predetermined value and/or may be distributed amongst different progressive awards won by one or more players in the award attempt.

The bonus round feature may be provided to the player at any time during the award attempt and may enable the player to play for any of the progressive awards 500*a* to 500*g*. In one embodiment, the bonus round enables the player to play for a previously unavailable progressive award, such as the progressive award 500*g*. Appropriate messages such as "CASTLE STRIKE!" or "BONUS!" may be provided to the player visually, or through suitable audio or audiovisual displays to indicate that the player has qualified for the bonus round feature.

As illustrated in FIG. 61, the bonus round feature includes a plurality of outcomes 524*a* to 524*c* displayed on the display device 16. Each outcome is adapted to change the number of award points associated with the progressive award 500*g*. Each change modifies the likelihood of the player winning the progressive award 500*g*. Progressive award 500*g* is associated with 1000 award points. Each outcome 524*a* to 524*c* is associated with a characteristic, such as a number of points. In this embodiment, the outcomes 524*a* to 524*c* include different outcomes (i.e., different numbers of points) that change the number of points associated with the progressive award 500*g* by different amounts. For example, outcome 524*a* is associated with 100 points and decreases the progressive award 500*g* to 900 points if selected. Outcome 524*b* is associated with 150 points and decreases the progressive award 500*g* to 850 points if selected. Outcome 524*c* is associated with 250 points and decreases the progressive award 500*g* to 750 points if selected.

Additionally, the outcome 524*c* is associated with at least one additional pick to enable the player to continue the bonus round feature. It should be appreciated that zero, one or a plurality of the outcomes 524*a* to 524*c* may be associated with at least one additional pick to enable the player to continue the bonus round feature. The central controller and/or the gaming device processor determines which, if any, of the outcomes are associated with at least one additional pick.

The central server and/or the gaming device processor enables the player to select one of the outcomes 524*a* to 524*c* and changes the number of points associated with the progressive award 500*g* by the number of points associated with the player selected outcome. The central controller and/or gaming device processor indicates the selected outcome to the player by illuminating the selected outcome or in another manner determined by the game implementer. Alternatively, the central controller and/or gaming device processor randomly selects one of the outcomes for the player (e.g., upon player request) and indicates the selected outcome to the player.

As shown in FIG. 61, the central server and/or the gaming device processor causes the display device to indicate that the player selected the third outcome 524*c*, which is associated with 250 points. Based on the outcome 524*c*, the number of award points associated with the progressive award 500*g* changes from 1000 award points to 750 award points. After the central controller and/or gaming device processor changes the number of award points associated with the progressive award 500*g*, the central controller and/or gaming device processor determines if the player wins the progressive award. Since the progressive award 500*g* is associated with 750 remaining award points, the player does not win the progressive award 500*g*. The central controller and/or gaming device processor also determines if the selected outcome 524*c* is associated with at least one additional pick to continue the bonus round feature.

FIG. 62 illustrates the display device 16 after the progressive award 500*g* changed to 750 award points. Since the previously selected outcome 524*c* was associated with an additional pick, the central controller and/or gaming device processor causes the display device to display a plurality of outcomes 526*a* to 526*c* to the player. This set of outcomes represents different outcomes as the previous set of outcomes 524*a* to 524*c*. That is, the central controller and/or gaming device processor determines the number of points and the bonus designation, if any, associated with each outcome. This determination may be random, predetermined or determined in any other suitable manner.

The player selects the first outcome 526*a* in FIG. 62. Unlike the non-picked outcomes 526*b* and 526*c*, the picked outcome 526*a* is not associated with an additional pick. The selected outcome 526*a* is associated with 250 game component points. The progressive award 500*g* changes from 750 award points to 500 award points based on the selection of outcome 526*a*.

Since the progressive award 500*g* is still associated with 500 award points, and the picked outcome is not associated with an additional pick, the bonus round feature ends. When the bonus round feature ends, the central controller and/or gaming device processor resets the number of points associated with the progressive award 500*g* to a predetermined value, such as 1000 award points, for a subsequent bonus round feature. Alternatively, the central controller and/or gaming device processor randomly determines the predetermined value. In one embodiment, the central controller and/or gaming device processor sets the predetermined value based on a player's wager and/or play activity as determined from a player tracking system.

In one embodiment, the central controller and/or gaming device processor causes the number of points associated with the progressive award 500*g* to persist over: (i) one or more bonus rounds, or (ii) for a subsequent bonus round feature. For example, if the progressive award 500*g* changes to a certain level (e.g., 500 points) in one round, the central controller and/or the gaming machine processor is programmed to enable the player to keep the progressive award 500*g* at that certain level (e.g., 500 points) for a subsequent bonus round or for a subsequent bonus round feature. In different embodiments, the central controller and/or gaming device processor enables the player to keep the progressive award 500*g* at that certain level based on a predetermined event, based on a randomly determined event, based on the player's wager, based on the player's play activity, based on the status of one or more players (such as determined through a player tracking system), based on time, based on an outcome generated in a primary game, based on a side wager, or based on any other suitable factor.

As described above, if a selected outcome is associated with an additional pick, the central controller and/or gaming device processor causes the display device to display a plurality of outcomes to the player. The central controller and/or gaming device processor enables the player to select one of the displayed outcomes to continue the bonus round. It should be appreciated that each pick reduces the number of award points associated with the progressive award 500*g*. As a result, the likelihood of the player winning the progressive award 500*g* increases with each picked outcome.

In one embodiment, the central controller and/or gaming device processor enables the player to select one of the outcomes 524*a* to 524*c* and ends the bonus round feature after the central controller and/or gaming device processor determines whether the player wins the progressive award 500*g*.

In another embodiment, the central controller and/or gaming device processor provides the player with a number of picks, which may be predetermined, and ends the bonus round feature when the player has no picks remaining in the bonus round. For example, the central controller and/or gaming device processor provides the player with two picks of the outcomes 524*a* to 524*c*. The central controller and/or gaming device processor enables the player to select one outcome from the plurality of outcomes for each pick. In this embodiment, the player is provided with a number of picks which is less than the number of outcomes and the central controller and/or gaming device processor enables the player to pick from the same set of outcomes for each pick. In this embodiment, each outcome may or may not be associated with at least one additional pick. The central controller and/or gaming device processor ends the bonus round when the player has no picks remaining or the player wins the progressive award.

In an additional embodiment, the central controller and/or gaming device processor provides the player with one pick of the outcomes. Zero, one or a plurality of the outcomes are associated with at least one additional pick to continue the bonus round. If the player selects an outcome that is associated with at least one additional pick, the central controller and/or gaming device processor provides the player with that number of picks. Alternatively, the plurality of outcomes may be grouped into different sets of outcomes so that for each pick, the player is provided with a plurality of different outcomes from which to pick. That is, for each pick, the player picks from different sets of outcomes, wherein each set of outcomes includes a plurality of different outcomes.

Figure 63:
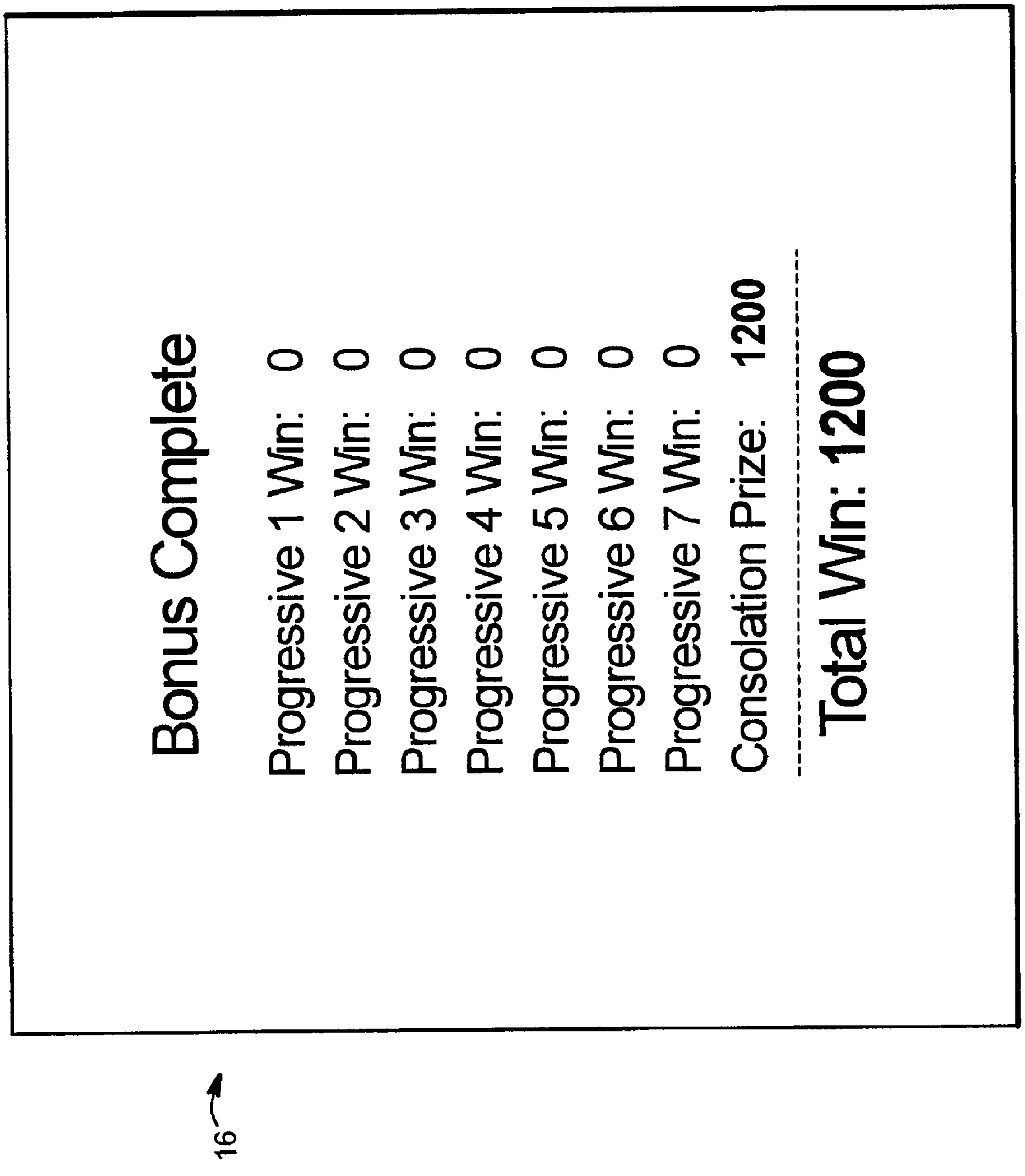

FIG. 63 illustrates a summary of the award attempt. Display device 16 indicates the summary of the award attempt to the player. Appropriate messages such as "CONSOLATION PRIZE: ______" or "TOTAL WIN: ______" may be provided to the player visually, or through suitable audio or audiovisual displays. The summary displays how many credits or other type(s) of awards that the player won in the award attempt. The player won 1200 total credits as a consolation award. The central controller and/or gaming device processor provides the consolation award to the player since the player was unsuccessful in winning one or more of the progressive awards 500*a* to 500*g* in the award attempt. The consolation award ensures that the player wins at least one award in the award attempt.

After displaying the summary shown in FIG. 63, the central controller and/or gaming device processor adds the 1200 credits won in the award attempt, which are indicated by the award meter 516, to the credit display 20. In one embodiment, the central controller and/or gaming device processor returns to the primary or secondary game after the award attempt ends.

Additionally, in another embodiment, winning one of the available progressive awards 500*a* to 600*f* forms at least a portion of the qualifying condition for the bonus round. For example, the player may be required to pick the designated game component and win one of the available progressive awards 500_a_ to 500_f_ in the award attempt to qualify for the bonus round. Alternatively, a separate progressive award may be funded and associated with this qualifying condition. That is, another top-level progressive award (not shown) and separate from the top-level progressive award 500_g_ may be played for when the player picks the designated game component and wins one of the available progressive awards 500_a_ to 500_f_ in the award attempt.

In one embodiment, the central controller and/or gaming device processor is programmed to offer the player an award to quit the bonus round while the player has at least one pick remaining in the bonus round. For example, on a first pick of the outcomes 524_a_ to 524_c_, the central controller and/or gaming device processor may offer the player 10 credits to quit the bonus round. If the player quits the bonus round, the player forgoes the opportunity to play for the progressive award 500_g_, which is associated with 1000 award points and has a value of 5000 credits. If the player accepts the offer, the player is provided with 10 credits. If the player rejects the offer, the player is enabled to play the bonus round feature for the progressive award 500_g_.

If the player rejects the offer, the player selects one of the outcomes 524_a_ to 524_c_. If the player successfully picks an outcome that reduces the number of award points associated with the progressive award (e.g., from 1000 award points to 750 award points) and provides the player with a number of picks (e.g., 1 additional pick). Since the player has a remaining pick in the bonus round, the central controller and/or gaming device processor may provide the player with a subsequent offer. The subsequent offer may increase to 100 credits. The offer may be based, at least in part, on the number of points associated with the progressive award, the value of the progressive award and the likelihood of the player winning the progressive award. For example, if the progressive award has a value of 5000 credits and is associated with 200 award points, the offer may be 1000 credits while the offer may be 250 credits if the same progressive award is associated with 500 award points.

In this example, the player now determines whether to accept the offer of 100 credits or to reject the offer to play for the progressive award now associated with 750 award points. If the player accepts the offer, the player is provided with 100 credits and the bonus round feature ends. If the player rejects the offer, the central controller and/or gaming device processor causes the display device to display a plurality of outcomes for the player from which to pick. If the player successfully selects an outcome that reduces the number of award points associated with the progressive award and provides the player with at least one additional pick, the central controller and/or gaming device processor will provide the player with a subsequent offer. The subsequent offer may increase to 250 credits.

This process continues until the player accepts an offer, selects an outcome that is not associated with at least one additional pick or wins the progressive award. In embodiments where the central controller and/or the gaming device processor provides the player with a plurality of picks, the process continues until no picks remain in the game, the player accepts an offer or the player wins the progressive award.

It should be appreciated that the outcomes displayed by the display device may or may not be associated with at least one additional pick. That is, some sets of outcomes will provide the player with no chance of continuing the bonus round. In such an instance, the plurality of outcomes from which the player selects from includes outcomes only associated with points and not associated with at least one additional pick. Other sets of outcomes include at least one outcome associated with points and at least one additional pick. For each pick in the bonus round, the central controller and/or gaming device processor enables the player to determine the amount of risk that the player accepts.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one central controller programmed to maintain a plurality of progressive awards; and a plurality of gaming machines, each gaming machine configured to communicate with the at least one central controller, each gaming machine including:

at least one display device configured to display a primary game operable upon a wager placed by a player;

at least one input device;

at least one gaming machine processor; and at least one memory device which includes a plurality of instructions, which when executed by the at least one gaming machine processor after an occurrence of a random triggering event, cause the at least one gaming machine processor to operate with said at least one input device, said at least one display device to control a play of a secondary game, regardless of an amount of the wager placed by the player on a play of the primary game, by:

(i) enabling the player to directly select any one of the maintained plurality of progressive awards as a first progressive award, (ii) enabling the player to play for the selected first progressive award at a first time during the play of the secondary game, (iii) determining whether to provide the selected first progressive award to the player, (iv) regardless of if the player is provided the selected first progressive award, enabling the player to play for a second progressive award at a second, different time during the same play of the secondary game, and (v) determining whether to provide the second progressive award to the player.

2. The gaming system of claim 1, wherein the second, different time occurs after the first time.

3. The gaming system of claim 1, wherein when executed by the at least one gaming machine processor after the occurrence of the random triggering event, the plurality of instructions cause the at least one gaming machine processor to control the play of the secondary game by enabling the player to directly select any one of the maintained plurality of progressive awards as the second progressive award.

4. The gaming system of claim 1, wherein the second progressive award is unavailable for selection by the player until a predetermined condition is satisfied.

5. The gaming system of claim 4, wherein the predetermined condition includes the player being provided the selected first progressive award.

6. The gaming system of claim 4, wherein the predetermined condition includes the player playing for the selected first progressive award.

7. The gaming system of claim 1, wherein, for a different one of the gaming machines, when executed by the at least one gaming machine processor of said different gaming machine after the occurrence of the random triggering event, the plurality of instructions cause the at least one gaming machine processor of said different gaming machine to control the secondary game by enabling the player of said different gaming machine to participate in the secondary game and providing a separate play of the secondary game to the player of said different gaming machine.

8. A gaming system comprising:

at least one central controller programmed to maintain a first plurality of progressive awards and at least one second progressive award; and a plurality of gaming machines, each gaming machine configured to communicate with the at least one central controller, each gaming machine including:

at least one display device configured to display a primary game operable upon a wager placed by a player;

at least one input device;

at least one gaming machine processor; and at least one memory device which stores a plurality of instructions, which when executed by the at least one gaming machine processor after an occurrence of a random triggering event, cause the at least one gaming machine processor to operate with said at least one input device, said at least one display device to control a play of a secondary game by:

(i) enabling the player to directly select any one of the first plurality of progressive awards to play for during the play of the secondary game, (ii) determining whether to provide the selected one of the first plurality of progressive awards to the player, (iii) subsequent to playing for the selected one of the first plurality of progressive awards, regardless of an amount of the wager placed by the player, enabling the player to subsequently directly select at least one of a different one of the first plurality of progressive awards and the at least one second progressive award to play for during the same play of the secondary game, and (iv) determining whether to provide the subsequently directly selected progressive award.

9. The gaming system of claim 8, wherein each of the first plurality of progressive awards is initially available for selection by the player and the at least one second progressive award is initially unavailable for selection by the player.

10. The gaming system of claim 8, wherein when executed by the at least one gaming machine processor, the plurality of instructions cause the at least one gaming machine processor, if the determination is to provide the selected one of the first plurality of progressive awards to the player, to control the play of the secondary game by enabling the player to directly select at least one of a different one of the first plurality of progressive awards and the at least one second progressive award during the same play of the secondary game.

11. The gaming system of claim 8, wherein when executed by the at least one gaming machine processor, the plurality of instructions cause the at least one gaming machine processor, if the determination is not to provide the selected one of the first plurality of progressive awards to the player, to control the play of the secondary game by enabling the player to directly select another progressive award from the first plurality of progressive awards during the same play of the secondary game.

12. The gaming system of claim 8, wherein when executed by the at least one gaming machine processor, the plurality of instructions cause the at least one gaming machine processor, if the determination is not to provide the selected one of the first plurality of progressive awards to the player, to control the play of the secondary game by: (i) enabling the player to keep playing for the selected first progressive award, or (ii) enabling the player to directly select at least one of another progressive award from the first plurality of progressive awards and the at least one second progressive award to play for during the same play of the secondary game.

13. The gaming system of claim 8, wherein when executed by the at least one gaming machine processor, the plurality of instructions cause the at least one gaming machine processor to control the play of the secondary game by enabling the player to directly select the at least one second progressive award after being provided with any one of the first plurality of progressive awards.

14. A gaming system comprising:

at least one central controller programmed to maintain a plurality of progressive awards; and a plurality of gaming machines, each gaming machine configured to communicate with the at least one central controller, each gaming machine including:

at least one display device;

at least one input device;

at least one gaming machine processor; and at least one memory device which stores a plurality of instructions, which when executed by the at least one gaming machine processor after an occurrence of a random triggering event, cause the at least one gaming machine processor to operate with said at least one input device, said at least one display device and said at least one memory device to control a play of a secondary game by:

(i) causing said at least one display device to simultaneously display the plurality of the progressive awards, each displayed progressive award having a displayed value and being associated with a displayed likelihood of being provided to a player, (ii) for each of the progressive awards, displaying an indication of the likelihood of said progressive award being provided to the player, and (iii) enabling the player to directly select at least one of the displayed progressive awards to play for during the play of the secondary game.

15. The gaming system of claim 14, wherein the likelihood of being provided one of the progressive awards is greater than the likelihood of being provided another one of the progressive awards.

16. The gaming system of claim 14, wherein for each of the progressive awards, the likelihood of said progressive award being provided to the player is different.

17. The gaming system of claim 14, wherein when executed by the at least one gaming machine processor, the plurality of instructions cause the at least one gaming machine processor to control the play of the secondary game by, for at least one of the progressive awards, changing the displayed indication of the likelihood of said progressive award being provided to the player during the same play of the secondary game.

18. The gaming system of claim 14, wherein when executed by the at least one gaming machine processor, the plurality of instructions cause the at least one gaming machine processor to control the play of the secondary game by: (i) determining whether to provide the selected progressive award to the player, and (ii) if the determination is to provide the selected progressive award, providing the selected progressive award to the player.

19. The gaming system of claim 18, wherein when executed by the at least one gaming machine processor, the plurality of instructions cause the at least one gaming machine processor to control the play of the secondary game by increasing the selected progressive award if the determination is not to provide the selected progressive award.

20. The gaming system of claim 14, wherein when executed by the at least one gaming machine processor, the plurality of instructions cause the at least one gaming machine processor to control the play of the secondary game by designating at least one of the displayed progressive awards as unavailable for selection by the player until a predetermined condition is satisfied.

21. The gaming system of claim 20, wherein the predetermined condition includes the player being provided with the at least one selected progressive award.

22. The gaming system of claim 14, wherein when executed by the at least one gaming machine processor, the plurality of instructions cause the at least one gaming machine processor to control the play of the secondary game by designating at least one of the progressive awards as available to the player for each play of the secondary game.

23. The gaming system of claim 14, wherein when executed by the at least one gaming machine processor, the plurality of instructions cause the at least one gaming machine processor to control the play of the secondary game by: (i)causing a random determination of whether to provide at least one of the progressive awards to the player independent from the secondary game, and (ii) if the random determination is to provide the at least one progressive award to the player, providing the at least one progressive award to the player.

24. The gaming system of claim 14, wherein when executed by the at least one gaming machine processor, the plurality of instructions cause the at least one gaming machine processor to control the play of the secondary game by: (i) displaying a plurality of game components, and (ii) enabling the player to directly select at least one of the displayed game components during the same play of the secondary game, wherein the likelihood of the selected progressive award being provided to the player is based, at least in part, on the at least one selected game component.

25. A method of operating a gaming system, said gaming system including a controller in communication with a plurality of gaming machines wherein each gaming machine includes a primary game operable upon a wager placed by a player, said method comprising:

(a) causing the controller to maintain a plurality of progressive awards;

(b) after an occurrence of a random triggering event in association with at least one of the gaming machines, regardless of any amounts of the wagers placed by the players on plays of the primary game, enabling one of the players to directly select any one of the maintained progressive awards as a first progressive award during a play of a secondary game;

(c) enabling said player to play for the selected first progressive award at a first time during the play of the secondary game;

(d) determining whether to provide the selected first progressive award to said player;

(e) regardless of if said player is provided the selected first progressive award, enabling said player to play for a second progressive award at a second, different time during the same play of the secondary game; and (f) determining whether to provide the second progressive award to said player.

26. The method of claim 25, wherein the second, different time occurs after the first time.

27. The gaming system of claim 25, which includes enabling said player to directly select any one of the maintained plurality of progressive awards as the second progressive award from the plurality of progressive awards.

28. The method of claim 25, which includes designating the second progressive award as unavailable for selection by said player until a predetermined condition is satisfied.

29. The method of claim 28, wherein the predetermined condition includes said player being provided the selected first progressive award.

30. The method of claim 28, wherein the predetermined condition includes said player playing for the selected first progressive award.

31. The method of claim 25, which includes, after the occurrence of the random triggering event in association with at least one of the gaming machines, enabling another one of the players at a different one of the gaming machines to participate in the secondary game and providing a separate play of the secondary game to said player of said different gaming machine.

32. A method of operating a gaming system, said gaming system including a controller in communication with a plurality of gaming machines wherein each gaming machine includes a primary game operable upon a wager placed by a player, said method comprising:

(a) causing the controller to maintain a first plurality of progressive awards and at least one second progressive award;

(b) after an occurrence of a random triggering event in association with least one of the gaming machines, enabling one of the players to directly select any one of the first plurality of progressive awards to play for during a play of a secondary game;

(c) determining whether to provide the selected one of the first plurality of progressive awards to the player;

(d) subsequent to playing for the selected one of the first plurality of progressive awards, regardless of an amount of the wager placed by the player, enabling the player to subsequently directly select at least one of a different one of the first plurality of progressive awards and the at least one second progressive award to play for during the same play of the secondary; and (e) determining whether to provide the subsequently directly selected progressive award to the player.

33. The method of claim 32, which includes designating each of the first plurality of progressive awards as initially available for selection by said player and designating the at least one second progressive award as initially unavailable for selection by said player.

34. The method of claim 32, which includes, if the determination is to provide the selected one of the first plurality of progressive awards to said player, enabling said player to subsequently directly select at least one of: (i) a different one of the first plurality of progressive awards, and (ii) the at least one second progressive award during the same play of the secondary game.

35. The method of claim 32, which includes enabling said player to directly select another progressive award from the first plurality of progressive awards during the same play of the secondary game if the determination is not to provide the selected first progressive award to said player.

36. The method of claim 32, which includes, if the determination is not to provide the selected one of the first plurality of progressive awards to said player, enabling said player: (i) to keep playing for the selected one of the first plurality of progressive awards, or (ii) to directly select at least one of a different one of the first plurality of progressive awards and the at least one second progressive award to play for during the same play of the secondary game.

37. The method of claim 32, which includes enabling said player to directly select the at least one second progressive award after being provided with any one of the progressive awards from the first plurality of progressive awards.

38. The method of claim 32, which is provided through a data network.

39. The method of claim 38, wherein the data network is an internet.

40. A method of operating a gaming system, said gaming system including a controller in communication with a plurality of gaming machines wherein each gaming machine includes a primary game operable upon a wager placed by a player, said method comprising:

(a) causing the controller to maintain a plurality of progressive awards;

(b) after an occurrence of a random triggering event in association with at least one of the gaming machines, causing at least one display device to simultaneously display the plurality of the progressive awards during a play of a secondary game, each displayed progressive award having a displayed value and being associated with a displayed likelihood of being provided to one of the players;

(c) for each of the progressive awards, causing the at least one display device to display an indication of the likelihood of said progressive award being provided to said player; and (d) enabling said player to directly select at least one of the displayed progressive awards to play for during the play of the secondary game.

41. The method of claim 40, wherein the likelihood of being provided one of the progressive awards is greater than the likelihood of being provided another one of the progressive awards.

42. The method of claim 40, wherein for each of the progressive awards, the likelihood of being provided said progressive award is different.

43. The method of claim 40, which includes, for at least one of the progressive awards, causing the controller to change the displayed indication of the likelihood of said progressive award being provided to said player during the same play of the secondary game.

44. The method of claim 40, which includes: (i) determining whether to provide the selected progressive award to said player, and (ii) if the determination is to provide the selected one of the displayed progressive awards, providing the selected progressive award to said player.

45. The gaming system of claim 44, which includes increasing the selected progressive award if the determination is not to provide the selected one of the displayed progressive awards.

46. The method of claim 40, which includes designating at least one of the displayed progressive awards to be unavailable for selection by said player until a predetermined condition is satisfied.

47. The method of claim 46, wherein the predetermined condition includes the player being provided with the at least one selected progressive award.

48. The method of claim 40, which includes designating at least one of the progressive awards as available to said player for each play of the secondary game.

49. The method of claim 40, which includes causing a random determination of whether to provide at least one of the progressive awards to said player independent from the secondary game, and if the random determination is to provide the at least one progressive award to said player, providing the at least one progressive award to said player.

50. The method of claim 40, which includes displaying a plurality of game components, and enabling said player to directly select at least one of the displayed game components during the same play of the secondary game, wherein the likelihood of the selected progressive award being provided to said player is based, at least in part, on the selected game component.

51. The method of claim 40, which is provided through a data network.

52. The method of claim 51, wherein the data network is an internet.

* * * * *

UNITED STATES PATENT AND TRADEMARK OFFICE

CERTIFICATE OF CORRECTION

PATENT NO. : 7,677,971 B2
APPLICATION NO. : 11/759035
DATED : March 16, 2010
INVENTOR(S) : Baerlocher et al.

It is certified that error appears in the above-identified patent and that said Letters Patent is hereby corrected as shown below:

IN THE CLAIMS:

In Claim 1, Column 84, line 33, replace “input device, said” with --input device and said--.

In Claim 8, Column 85, line 30, replace “input device, said” with --input device and said--.

In Claim 23, Column 87, line 32, insert a space between “(i)” and “causing”.

In Claim 32, Column 88, line 50, replace “secondary; and” with --secondary games; and--.

Signed and Sealed this

Twenty-fourth Day of August, 2010

David J. Kappos
*Director of the United States Patent and Trademark Office*